US012466505B2

(12) United States Patent
Sidwell

(10) Patent No.: US 12,466,505 B2
(45) Date of Patent: *Nov. 11, 2025

(54) ALL-TERRAIN VEHICLE SYSTEMS AND METHODS

(71) Applicant: Workhorse ATV, LLC, Smartsville, CA (US)

(72) Inventor: Paul Sidwell, Smartsville, CA (US)

(73) Assignee: WORKHORSE ATV, LLC, Smartsville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/971,242

(22) Filed: Dec. 6, 2024

(65) Prior Publication Data

US 2025/0091674 A1    Mar. 20, 2025

Related U.S. Application Data

(63) Continuation of application No. 17/731,354, filed on Apr. 28, 2022, now Pat. No. 12,162,559.

(60) Provisional application No. 63/181,089, filed on Apr. 28, 2021.

(51) Int. Cl.
*B62K 5/01* (2013.01)
*B62J 7/04* (2006.01)

(52) U.S. Cl.
CPC .. *B62J 7/04* (2013.01); *B62K 5/01* (2013.01)

(58) Field of Classification Search
CPC .. B60K 25/02; B60K 17/28; B60K 2025/026; B60K 2025/022; B62K 5/01; B62K 7/04; B62J 7/04; B62J 35/00; B60Y 2200/20; B62D 21/183; B62D 33/0207; E02F 3/964; E02F 9/085

See application file for complete search history.

(56) References Cited

U.S. PATENT DOCUMENTS

| 3,495,727 | A | 2/1970 | Long |
| 4,039,095 | A | 8/1977 | Long |
| 4,279,566 | A | 7/1981 | Sagaser |
| 5,765,650 | A | 6/1998 | Checkel |

(Continued)

FOREIGN PATENT DOCUMENTS

| CN | 107651071 A | * | 2/2018 | ............. B62K 5/027 |
| DE | 102017217393 A1 | | 4/2019 | |

(Continued)

OTHER PUBLICATIONS

PCT International Search Report and Written Opinion, PCT Appl. No. PCT/US2022/026797, Applicant: Workhorse ATV, LLC, International Filing Date: Apr. 22, 2022, mailing date: Jul. 27, 2022, 16 pages.

(Continued)

*Primary Examiner* — Paul N Dickson
*Assistant Examiner* — Matthew D Lee
(74) *Attorney, Agent, or Firm* — Inventive Law Inc.; Jim H. Salter

(57) ABSTRACT

All-terrain vehicle systems and methods configured for attachable tools and implements are disclosed. An example embodiment includes: an All-Terrain Vehicle (ATV) frame configured with a void; a modular Power Take-Off (PTO) system removably installable in the ATV frame in the void; and a cargo bed removably installable at a rear portion of the ATV frame.

20 Claims, 117 Drawing Sheets

(56) References Cited

U.S. PATENT DOCUMENTS

| | | |
|---|---|---|
| 5,909,960 A | 6/1999 | Jager |
| 5,975,216 A * | 11/1999 | Gibbons ............... A01B 59/068 |
| | | 172/677 |
| 6,637,136 B2 | 10/2003 | Aoki |
| 6,644,708 B1 * | 11/2003 | Grzegorzewski .. B62D 33/0273 |
| | | 296/100.06 |
| 6,705,680 B2 | 3/2004 | Bombardier |
| 6,769,858 B1 | 8/2004 | Butler |
| 6,932,555 B2 | 8/2005 | Dale |
| 7,128,341 B1 * | 10/2006 | Dahl ......................... B60R 9/06 |
| | | 180/908 |
| 7,325,638 B1 * | 2/2008 | Belloso .................... B60K 6/24 |
| | | 475/5 |
| 7,331,749 B2 | 2/2008 | Vachon |
| 7,377,570 B2 | 5/2008 | Rondeau |
| 7,600,480 B2 | 10/2009 | Olson |
| 7,600,594 B2 | 10/2009 | Jones |
| 7,607,595 B2 | 10/2009 | Farmer |
| 7,699,577 B2 | 4/2010 | Lougheed |
| 7,770,981 B2 | 8/2010 | King |
| 7,789,613 B1 | 9/2010 | Weinlader |
| 7,818,903 B2 * | 10/2010 | Elliot .................... A01B 59/064 |
| | | 37/468 |
| 7,849,614 B2 | 12/2010 | Belzile |
| 7,997,015 B2 | 8/2011 | Belzile |
| 8,046,938 B1 | 11/2011 | Jorgenson |
| 8,381,846 B2 | 2/2013 | Davies |
| 8,616,310 B2 | 12/2013 | Lopez |
| 8,689,898 B2 | 4/2014 | Benesch |
| 9,004,510 B2 | 4/2015 | Leonard |
| 10,017,915 B2 | 7/2018 | Aubin-Marchand |
| 10,206,330 B1 * | 2/2019 | Lund ....................... A01D 57/01 |
| 10,384,617 B1 | 8/2019 | Keyser |
| 10,427,608 B2 | 10/2019 | Robertson |
| 10,703,422 B2 | 7/2020 | Wilson, III |
| 11,713,226 B1 * | 8/2023 | Otte ........................ B62J 11/22 |
| | | 254/93 VA |
| 12,024,849 B2 | 7/2024 | Sidwell |
| 2003/0201109 A1 * | 10/2003 | Bolen ....................... E02F 3/80 |
| | | 172/273 |
| 2003/0235490 A1 | 12/2003 | Dale |
| 2004/0195042 A1 | 10/2004 | Smith |
| 2006/0104785 A1 * | 5/2006 | Vachon .................. E02F 3/384 |
| | | 414/686 |
| 2007/0092362 A1 | 4/2007 | Holt |
| 2010/0066152 A1 * | 3/2010 | King ....................... F16C 11/06 |
| | | 403/122 |
| 2010/0275472 A1 * | 11/2010 | Cunningham ........ B60P 1/5438 |
| | | 180/315 |
| 2011/0168417 A1 | 7/2011 | Benesch |
| 2011/0240393 A1 * | 10/2011 | Hurd .................. B62D 33/0617 |
| | | 180/364 |
| 2012/0292359 A1 | 11/2012 | O'Dell |
| 2013/0168176 A1 * | 7/2013 | Takagi ..................... B60K 6/48 |
| | | 180/65.245 |
| 2013/0269456 A1 | 10/2013 | Jones |
| 2014/0060219 A1 * | 3/2014 | Marotte ................. B60K 17/28 |
| | | 74/15.86 |
| 2014/0083335 A1 * | 3/2014 | Mayhood ............... E04H 15/06 |
| | | 108/18 |
| 2014/0144861 A1 * | 5/2014 | Davis ..................... B66C 23/44 |
| | | 212/230 |
| 2016/0327425 A1 * | 11/2016 | Gagas ...................... G01C 9/06 |
| 2017/0001508 A1 * | 1/2017 | Bessho .................... B60K 5/04 |
| 2017/0136874 A1 | 5/2017 | Harris |
| 2017/0225563 A1 * | 8/2017 | Hwang .................. B60K 17/28 |
| 2018/0297826 A1 * | 10/2018 | Haddix, II ............. B66C 1/127 |
| 2019/0009730 A1 * | 1/2019 | Hintz ........................ B62J 7/04 |
| 2020/0122571 A1 * | 4/2020 | Anderson ........ B60K 15/03006 |
| 2020/0164931 A1 * | 5/2020 | Kobayashi ............... B62J 7/04 |
| 2021/0213822 A1 * | 7/2021 | Ripley ................. B60K 17/165 |
| 2022/0356670 A1 * | 11/2022 | Sidwell .................. B62D 65/02 |
| 2022/0371674 A1 * | 11/2022 | Okabe ....................... B62J 7/02 |

FOREIGN PATENT DOCUMENTS

| | | | | |
|---|---|---|---|---|
| EP | 0182437 A2 | | 5/1986 | |
| GB | 2162910 A | * | 2/1986 | ............. B60K 17/28 |
| WO | WO-2010043837 A1 | * | 4/2010 | ............... B60R 9/00 |
| WO | WO-2018119388 A1 | * | 6/2018 | ........... A01B 71/063 |

OTHER PUBLICATIONS

PCT International Preliminary Report on Patentability, PCT Appl. No. PCT/US2022/026797, Applicant: Workhorse ATV, LLC, International Filing Date: Apr. 22, 2022, mailing date: Oct. 24, 2023, 12 pages.

* cited by examiner

```
┌─────────────────────────────────────────────┐
│  Method for Configuring an All-Terrain Vehicle (ATV)
│       for Attachable Tools and Implements
│                    -1000-
└─────────────────────────────────────────────┘
                       │
                       ▼
┌─────────────────────────────────────────────┐
│                                             │
│  Construct an All-Terrain Vehicle (ATV) frame configured with a void.
│                    -1010-                   │
│                                             │
└─────────────────────────────────────────────┘
                       │
                       ▼
┌─────────────────────────────────────────────┐
│                                             │
│  Removably install a modular Power Take-Off (PTO) system in the ATV frame in the void.
│                    -1020-                   │
│                                             │
└─────────────────────────────────────────────┘
                       │
                       ▼
┌─────────────────────────────────────────────┐
│                                             │
│  Removably install a cargo bed at a rear portion of the ATV frame.
│                    -1030-                   │
│                                             │
└─────────────────────────────────────────────┘
                       │
                       ▼
                    ( End )
```

Fig. 117

ALL-TERRAIN VEHICLE SYSTEMS AND METHODS

PRIORITY PATENT APPLICATIONS

This non-provisional U.S. patent application is a continuation application drawing priority from U.S. non-provisional patent application Ser. No. 17/731,354; filed Apr. 28, 2022; which is a non-provisional patent application drawing priority from U.S. provisional patent application Ser. No. 63/181,089; filed Apr. 28, 2021. This continuation patent application draws priority from the referenced patent applications. The entire disclosure of the referenced patent applications is considered part of the disclosure of the present continuation application and is hereby incorporated by reference herein in its entirety.

COPYRIGHT

A portion of the disclosure of this patent document contains material that is subject to copyright protection. The copyright owner has no objection to the facsimile reproduction of the patent document or the patent disclosure, as it appears in the U.S. Patent and Trademark Office patent files or records, but otherwise reserves all copyright rights whatsoever. The following notice applies to the disclosure provided herein and to the drawings that form a part of this document: Copyright 2021-2024, Workhorse ATV, LLC; All Rights Reserved.

TECHNICAL FIELD

The disclosed subject matter relates to All-Terrain Vehicles (ATVs) and/or Utility-task vehicles (UTVs). In particular, the present disclosure relates to all-terrain vehicle systems and methods configured for attachable tools and implements.

BACKGROUND

All-terrain vehicles (ATVs) are used for transportation, recreation, and as tools to help get work done around a person's home, garden, property, farm, ranch, or the like. Utility task vehicles (UTVs) are a cousin of all-terrain vehicles with similar functionality, but with more truck-like features whose use is more focused on doing larger-scale residential, commercial, or agricultural work. The use of these vehicles for work not only saves the user time, but also prevents back and muscle injuries due to overexertion. Add-on equipment is available, for example, to mow lawns, aerate lawns, transport materials, plow snow, and the like. When making a purchasing decision, a prospective buyer of such add-on equipment weighs factors such as ease of use, convenience in attaching and detaching the add-on equipment, as well as expense. This decision can preclude the use of traditional hydraulic systems because of their large initial expense, the time and effort required to install and remove these systems from the multi-use ATV/UTV, and the inconvenience of dealing with hydraulic fluid leaks and system maintenance. A separate hydraulic pump is usually driven by a vehicle engine through a V-belt, which makes retrofitting ATVs/UTVs, let alone removing such systems, impractical. While many types of add-on equipment are available for the ATV/UTV owner, the functionality of a loader, backhoe, or other implements powered through a power takeoff (PTO) assembly has not been incorporated into a standalone attachable/removable system available for use on such widely used vehicles.

SUMMARY

All-terrain vehicle systems and methods configured for attachable tools and implements are disclosed. In general, an all-terrain vehicle (ATV) can be defined as a motorized off-highway vehicle designed to travel on four low-pressure or non-pneumatic tires, having a seat designed to be straddled by the operator, and handlebars for steering control. ATVs are subdivided into two types as designated by the manufacturer. Type I ATVs are intended by the manufacturer for use by a single operator and no passenger. Type II ATVs are intended by the manufacturer for use by an operator and a passenger, and are equipped with a designated seating position behind the operator. ATVs with four wheels are also called quads.

In regard to the suspension systems provided on common ATVs, there are three basic types of shocks currently available on production quads: 1) Standard Non-Adjustable Shocks; These shocks are found on smaller, more cost-efficient quads. As the name suggests, they do not have any adjustability and rely heavily on the spring to produce suspension action (to soak up the bumps and jumps); 2) Pre-load Adjustable Shocks: These shocks are usually found on entry-level sport quads as well as most sport/utility quads. Preload adjustable suspensions have two types: the first generally uses five pre-determined preload settings, while the other uses a threaded lock ring mechanism. Both types work on the same principle to adjust suspension action; and 3) Fully Adjustable Piggyback Reservoir: The most advanced form of stock suspension is the fully adjustable piggyback shock. This type of shock is found on the newest batch of sport quads and features compression, rebound, and threaded preload adjustments that allow a rider to completely customize the suspension ride quality of their machine.

Various example embodiments described and illustrated herein relate to producing, using, and selling 4×4 gas powered and electric powered, specialized, compact ATVs, with a unique multi-function, cargo bed and multiple types of quickly attachable/detachable, tools and implements, usually only found on tractors and heavy equipment. Among other uses, the disclosed ATV systems and methods can be used for farming, construction, snow removal, mowing, and moving cargo. The disclosed ATV systems and methods can also be used for recreational riding, such as off-roading, hunting, fishing, camping, and the like. For example, in some embodiments, the present technology includes an "overland" fold out camper kit that is similar to the way a "roof top tent", or small "tent trailer" functions.

The present technology empowers an average person to get more done, with less time, money and manpower. For example, the present technology enables an "all-in-one" affordable, compact ATV and multifunctional tool as a solution alternative to the need for having to own or rent multiple types of large, costly vehicles, for multiple applications.

In various example embodiments, the present technology includes components and systems for all-terrain vehicles that act as a multifunctional tool powering multiple attached implements. For instance, hydraulic power implements, such as a backhoe, front loader, post hole digger, trencher, forklift, front-end flail mower, boom winch, and front end winch may be used with the present technology. For example, the system may include an all-terrain vehicle comprising: a power takeoff (PTO) system, the PTO system transmitting power to a first implement attached to the all-terrain vehicle; and a hydraulic system, the hydraulic system using pressurized fluids to provide power to a second implement attached to the all-terrain vehicle; wherein the PTO system and the hydraulic system are configured as a modular unit, which can be removably installed into the all-terrain vehicle. Alternatively, the ATV can be operated without the modular PTO system.

Various example embodiments of the present technology can be used by users in the private sector, including uses for pleasure riding. For example, users may use the present technology for camping, fishing, hunting, farming, gardening, ranching, construction, Do-It-Yourself (DIY) home and property maintenance, collecting firewood, taking out the trash, on wet, dry or frozen terrain, and a variety of other applications. In various embodiments, users of the present technology may be in the public sector, such as employees of the national and state parks, rural irrigation departments, Forest Service, U.S. immigration, and the like. Moreover, the present technology may be used for many commercial and business applications. As a result, the present technology provides many features and advantages, including those described below.

Example embodiments of the present technology enable the disclosed ATVs that are a compact size and weight: small compact size and weight mean that the disclosed ATV system is easily stored in small spaces when not in use and is used in small and confined spaces, where full size equipment is too large or too heavy.

Example embodiments of the present technology enable the disclosed ATVs that are easily transported: for example, ATVs are transported in the back of any full-size pickup truck, or a small vehicle trailer.

Example embodiments of the present technology enable ATVs that are all-in-one: for example, the disclosed ATV, replaces the need for expensive tractors, digging equipment and cargo hauling trailers.

Example embodiments of the present technology enable the disclosed ATVs that include a multi-function cargo bed: for example, the cargo bed may raise vertically, up to a height of 6 feet from the ground and dump at full height extension, in three directions (e.g., left, right and rear directions).

Example embodiments of the present technology enable the disclosed ATVs that include a unique tent/camper kit: for example, a pop open tent camper kit can be attached to the top of the cargo bed, leaving space below for storage of supplies and is detached and used independently of the disclosed ATV. The tent/camper kit provides a fold-out camper system, with large stand up living room and separate sleeping room.

Example embodiments of the present technology enable ATVs that have a broad market appeal (not just for work): for example, the present technology may be used for work or recreation and crosses many "market lines", unlike standard ATVs and Utility Task Vehicles (UTVs).

Example embodiments of the present technology enable the disclosed ATVs that have an affordable price point: for example, the price point of the disclosed ATV and its optional "quick connect", attachments and implements system, are affordable and easy, for the average person, to be able to perform most of the jobs that would ordinarily only be able to be performed, by multiple expensive vehicles and machines. For example, a user of the present technology can accomplish tasks done with for six or seven different work machines using a single machine of the present technology.

Example embodiments of the present technology enable the disclosed ATVs that may be used on wet, dry, and frozen terrain and include all-terrain tires for wet and dry terrain and a track system for use in deep snow.

Example embodiments of the present technology enable the disclosed ATVs that are gas and/or electric powered. For example, gas powered embodiments include 1000 cc, 4×4 ATVs. For example, electric powered embodiments include 7.5 KW or 10.5 KW, 4×4 ATVs.

Example embodiments of the present technology enable the disclosed ATVs that optionally include a quick charge battery system.

Example embodiments of the present technology enable the disclosed ATVs that have a strong towing and load capacity: for example, a 1200 lb load capacity and a 1500 lb towing capacity.

Example embodiments of the present technology enable the disclosed ATVs that include a powerful, hydraulic, vertical lifting and dumping cargo bed, that rises to a height of 6' from the ground and can dump, at full height extension, in three directions. (e.g., right, left, and rear) with a 600 lb lift capacity and 1500 lb towing capacity.

Example embodiments of the present technology enable the disclosed ATVs that include auto locking hubs and electric power steering.

Example embodiments of the present technology enable the disclosed ATVs that include tailgate pivots from both the top as well as the bottom.

Example embodiments of the present technology enable the disclosed ATVs that include side gates and a tailgate on the cargo bed, wherein the side gates and tailgate can fold down, lay flat, and can be removed.

Example embodiments of the present technology enable the disclosed ATVs that include 2" hitch receiver on the front and rear.

Example embodiments of the present technology enable the disclosed ATVs that include on powered hydraulic system.

Example embodiments of the present technology enable the disclosed ATVs that include attachable and detachable tools and implements and various hydraulic power implements with a quick connect/release system, such as: a front loader, backhoe, trencher, forklift, post hole digger/auger, front end flail mower, boom winch, and front-end winch, attachable and detachable large insulated storage compartments, and an extra-large seating area. The present technology also enables the disclosed ATVs wherein all metal surfaces of the cargo bed are powder coated with heavy duty scratch resistant material.

Example embodiments of the present technology enable the disclosed ATVs that include high power LED lights, digital and analog gauges (speedometer, tachometer, odometer, hours, KPH/MPH, temperature, fuel and oil level), six point independent suspension (e.g., two front shocks, four rear shocks with two of the rear shocks being adjustable air lift suspension shocks). Other embodiments provide an attachable/removable (e.g., bolt on) system for providing a customizable front suspension system comprising four front shocks with two of the front shocks being adjustable air lift suspension shocks. Some embodiments include heavy-duty, off road tires and an available track system for use in the snow. The various example embodiments are described in more detail below.

BRIEF DESCRIPTION OF THE DRAWINGS

Embodiments are illustrated by way of example and not limitation in the figures of the accompanying drawings, in which:

FIG. 117 illustrates a method according to and enabled by the structures and techniques disclosed herein.

DETAILED DESCRIPTION

Figure 1:
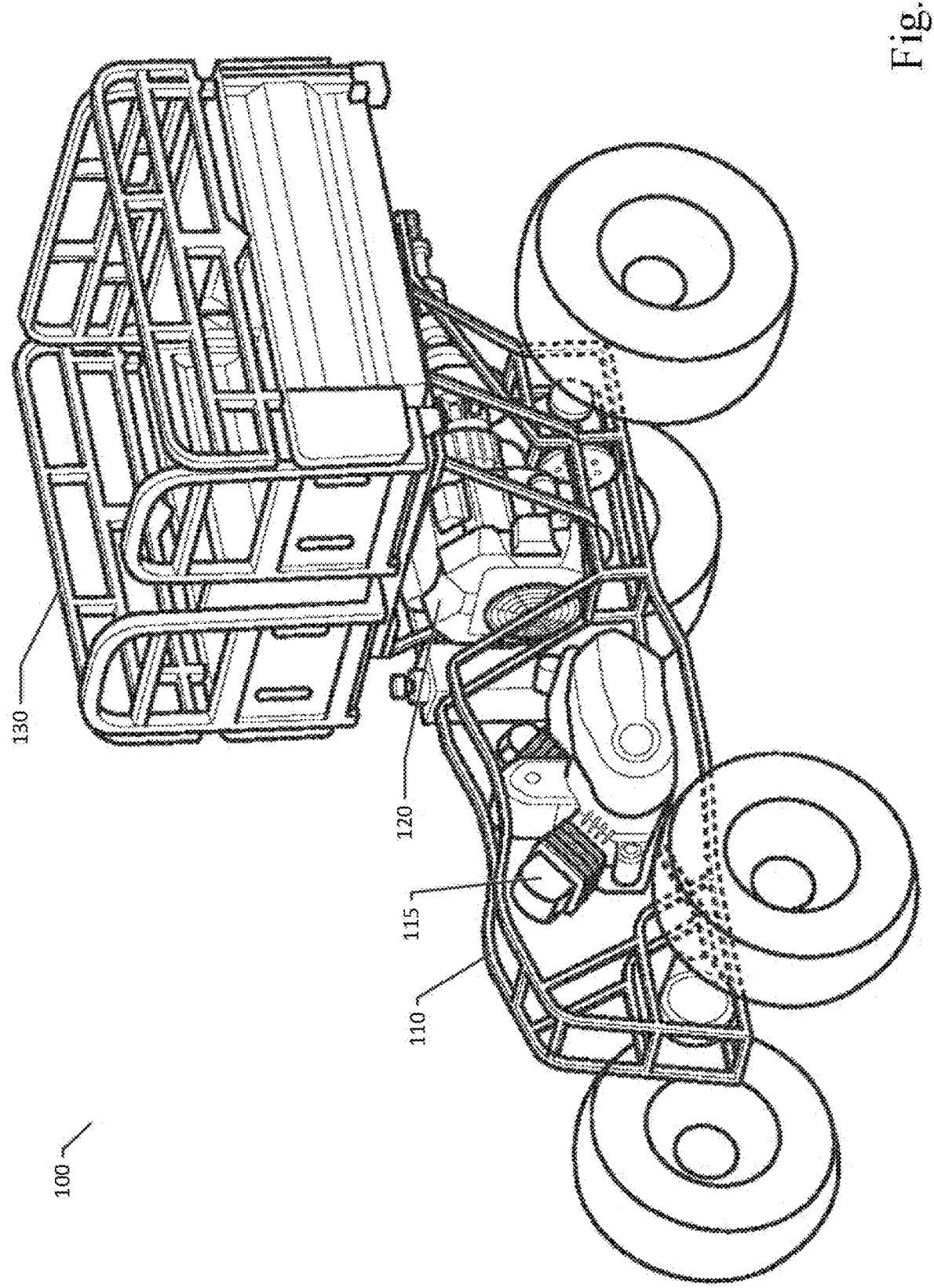
FIG. 1 illustrates a perspective view of an example embodiment showing an ATV having a wheel-driving engine, an installed modular PTO system or PTO module including a PTO engine, and an installed cargo bed.

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

All-terrain vehicle (ATV) systems and methods configured for attachable tools and implements are disclosed. The present technology includes components and systems for all-terrain vehicles that act as a multifunctional tool powering multiple attached implements. For instance, hydraulic power implements, such as a backhoe, front loader, post hole digger, trencher, forklift, front-end flail mower, boom winch, and front end winch may be used with the present technology. For example, the system may include an all-terrain vehicle comprising: a PTO system, the PTO system transmitting power to a first implement attached to the all-terrain vehicle; and a hydraulic system, the hydraulic system using pressurized fluids to provide power to a second implement attached to the all-terrain vehicle; wherein the PTO system and the hydraulic system are configured as a modular unit, which can be removably installed into the all-terrain vehicle. Alternatively, the ATV can be operated without the modular PTO system.

In particular, the ATV of an example embodiment is constructed with a specially configured frame that not only accepts a wheel-driving engine as any ATV does; but additionally, the ATV of an example embodiment also accepts a PTO module and PTO driving engine, separate from the wheel-driving engine. As such, the ATV of an example embodiment can be configured with two engines: one to drive the wheels, and a second engine to drive the PTO, a hydraulic pump, and any implements or tools attached to the PTO or hydraulics. Because of the unique construction and configuration of the ATV frame, the PTO module (including the PTO engine, hydraulic pump, and PTO shaft) can be readily installed or removed depending on the needs of the manufacturer or end user. With the modular PTO system installed, the ATV of an example embodiment supports the attachment and use of a variety of implements, tools, and hydraulic power systems to support a variety of application including construction, agriculture, ranching, and the like. Further details of the unique construction and configuration of the ATV frame and the modular PTO system of an example embodiment are provided below in the section labeled Modular PTO System and Frame.

Another important advantage of the unique construction and configuration of the ATV frame of an example embodiment is its ability to accommodate the installation of a multi-function cargo bed on the rear portion of the ATV. The cargo bed is configured with a scissor lift to lift the bed to a considerable height (e.g., 6'). Moreover, the cargo bed is configured with unique locking and pivoting structures enabling the cargo bed to tilt to the left, right, or rear of the ATV. This tilting action enables the cargo bed to be used for dumping material to the sides or behind the ATV while the ATV is moving or at a standstill. Another feature provided by the multi-function cargo bed of an example embodiment is the highly configurable railing provided around three sides of the cargo bed. These railings provide locking and hinge structures enabling the railing to be raised, lowered, partially raised, dropped completely downward, or removed entirely on each or any of the three sides. As such, the cargo bed railing can be configured and adapted for a variety of uses and for a variety of different loads. Additionally, in a particular embodiment, the cargo bed can be configured with a camping kit having a tent. In a unique departure from the conventional ATV camping systems, the camping kit of an example embodiment enables the setup of the tent from the cargo bed of the ATV while enabling the ATV to be detached from the tent, which can be left free-standing. As a result, the ATV is free to venture away from the tent while the tent provides shelter for campers. Further details of the unique construction and configuration of the ATV multi-function cargo bed system of an example embodiment are provided below in the section labeled Multi-Function Cargo Bed.

Yet another important advantage of the unique construction and configuration of the ATV frame and PTO module of an example embodiment is the ability of the ATV to provide a platform for the attachment and use of a variety of hydraulic power implements or tools, including a front loader, a backhoe, post hole digger, trencher, forklift, front-end flail mower, boom winch, and front end winch, among other tools. In each case, the PTO module and the second engine therewith provides a separately powered PTO for the attached hydraulic power tools. The specially designed ATV frame also provides structures, reinforcement, attach points, pivot points, configurable suspension, and the like to support the attachment and use of the hydraulic power tools with the ATV. Additionally, an example embodiment of the specially designed ATV and PTO module can also be configured for the attachment and use of electrical power implements or tools. The ATV can also support attachment and use of non-powered tools, such as scrapers or plows. Further details of the unique construction and configuration of the ATV frame and modular PTO system of an example embodiment in support of a variety of implements or tools are provided below in the section labeled Quad Tools.

As will be apparent from the disclosure provided herein, the unique ATV design of the example embodiments provides a variety of features and advantages over the existing ATV designs and tractor designs. Additional details of various example embodiments are provided below and in the accompanying drawings.

Modular PTO System and Frame

Figure 2:
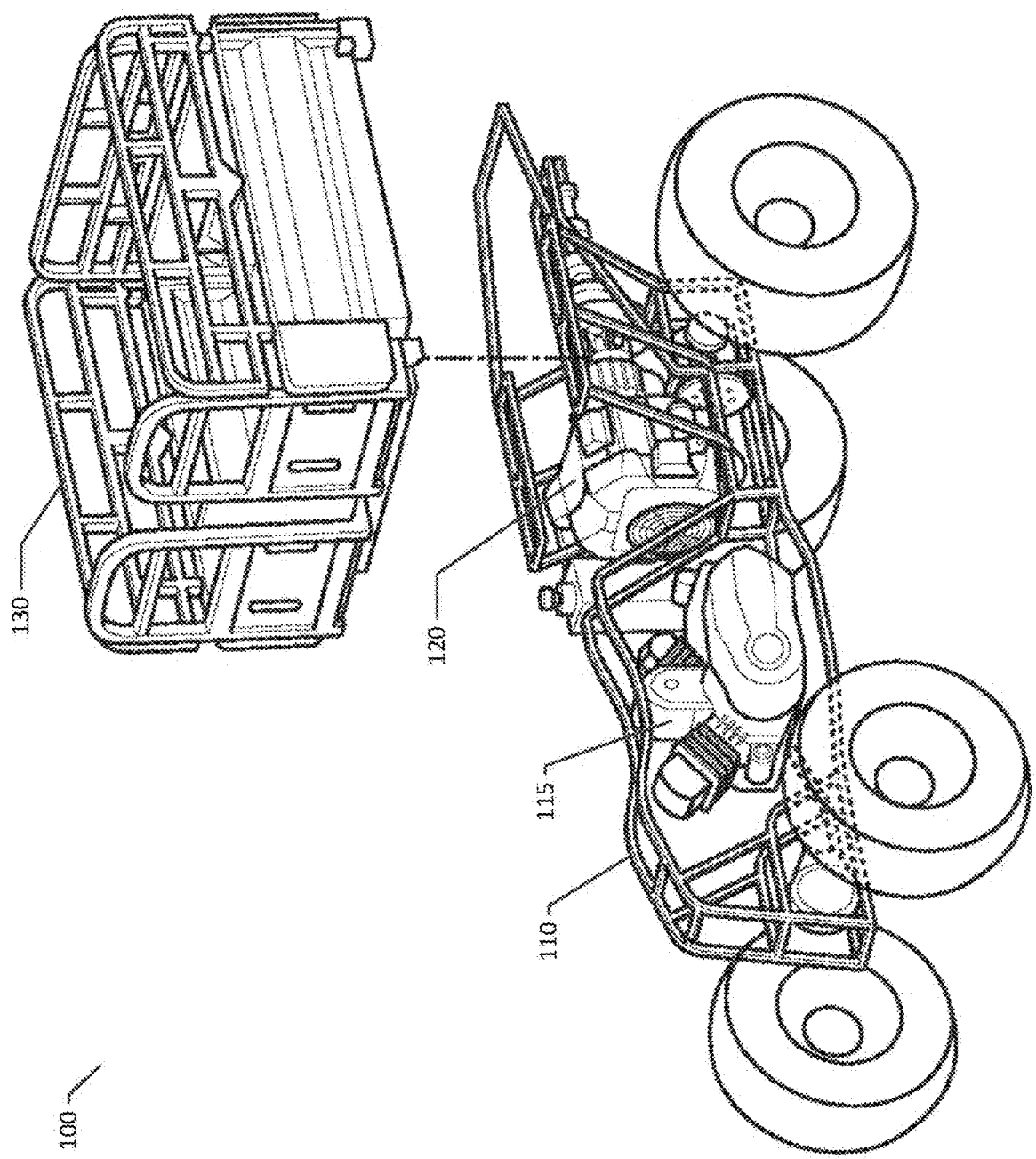
FIG. 2 illustrates a perspective view of an example embodiment showing an ATV having a wheel-driving engine, an installed modular PTO system, and a removable cargo bed.
Figure 3:
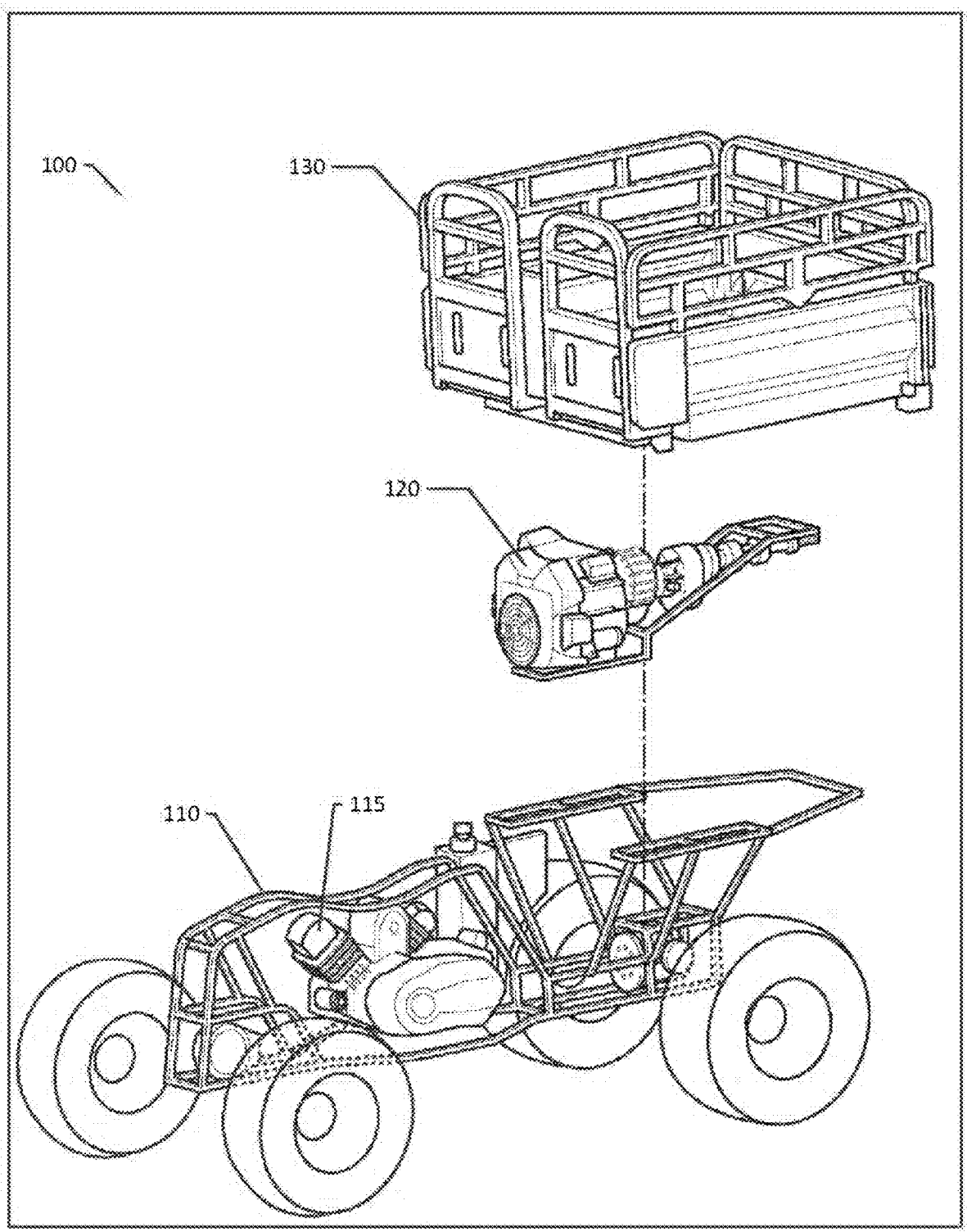
FIG. 3 illustrates a perspective view of an example embodiment showing an ATV having a wheel-driving engine, a removable modular PTO system, and a removable cargo bed.
Figure 4:
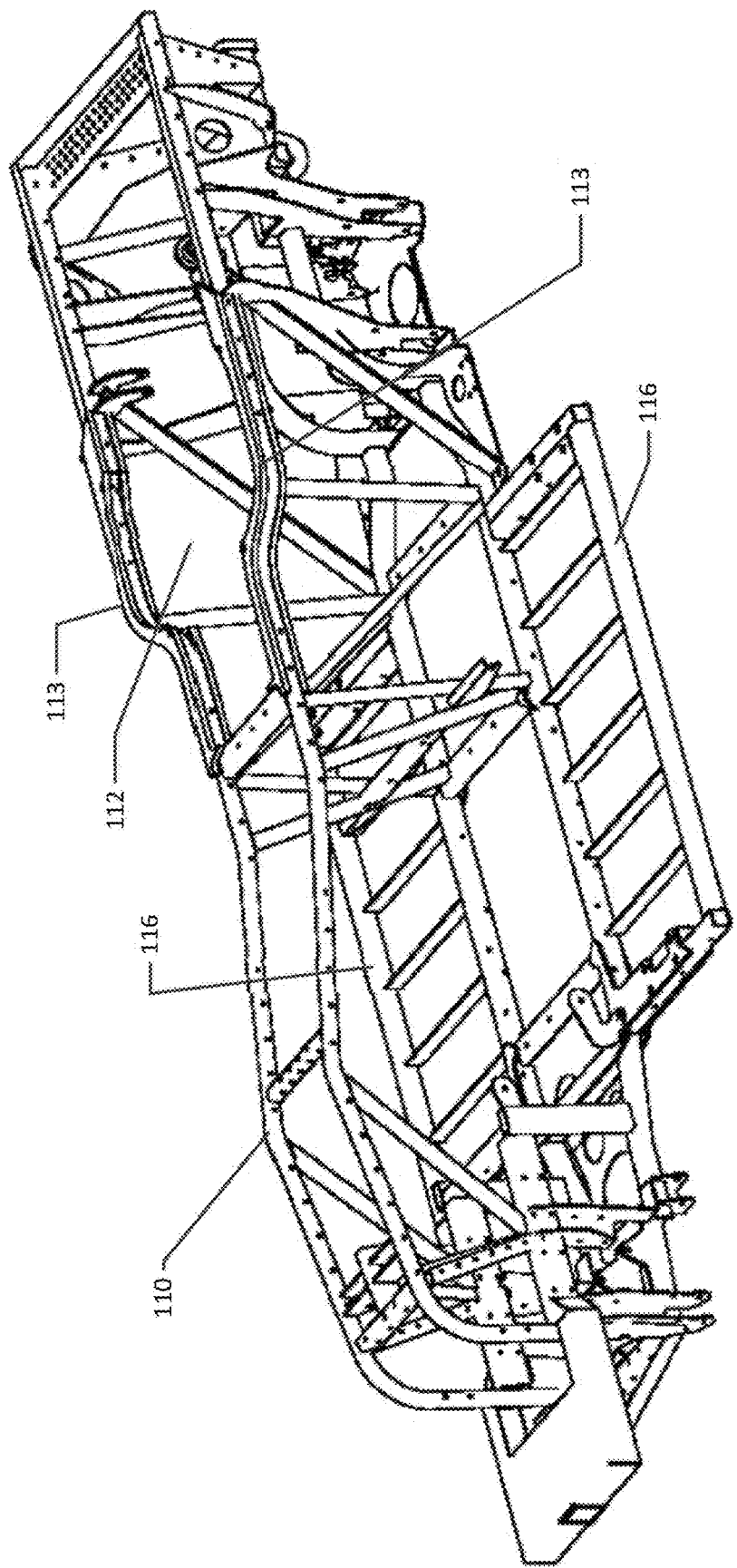
FIGS. 4 through 7 illustrate various views of a bare ATV chassis or frame of an example embodiment.
Figure 5:
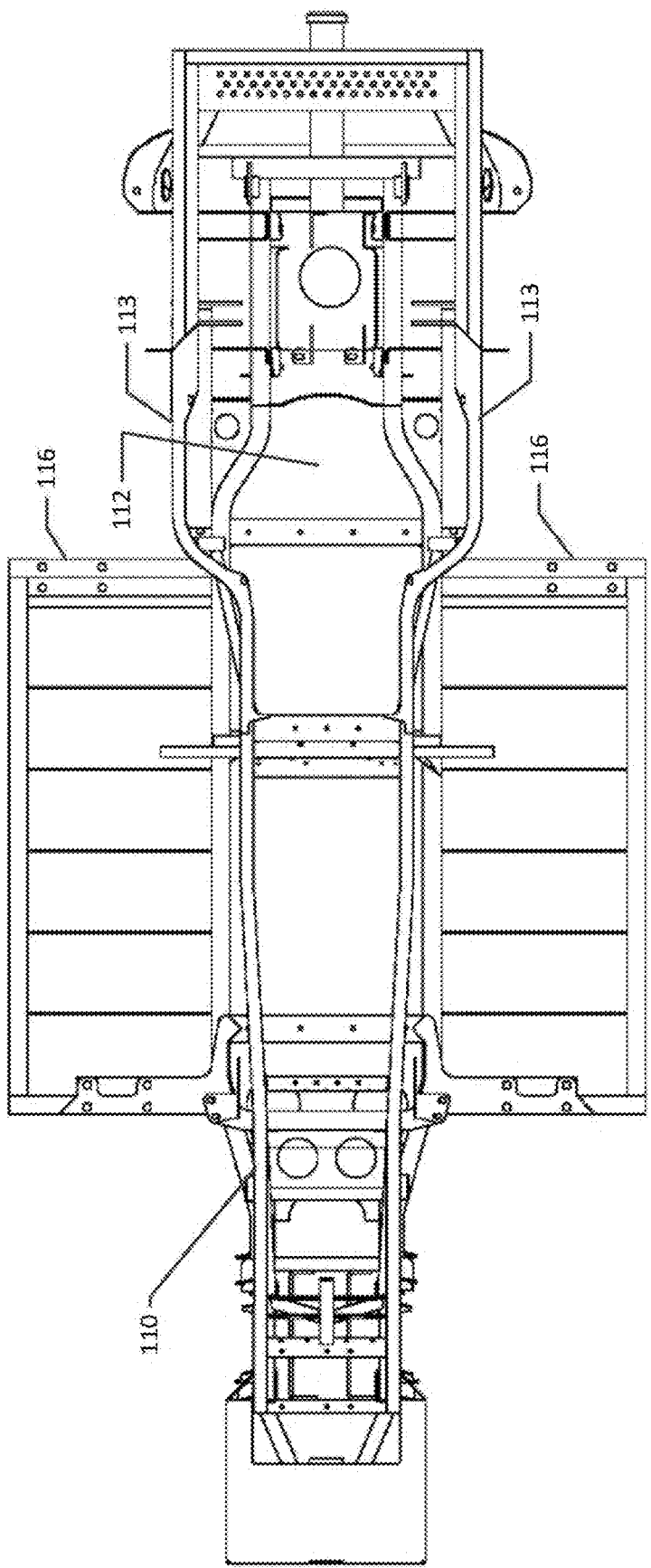
Figure 6:
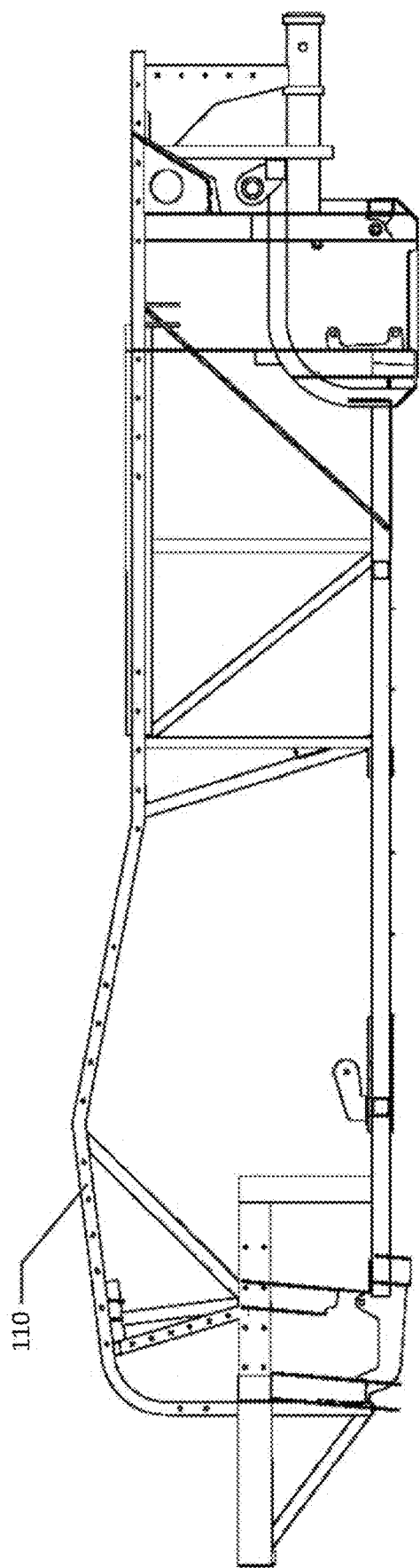
Figure 7:
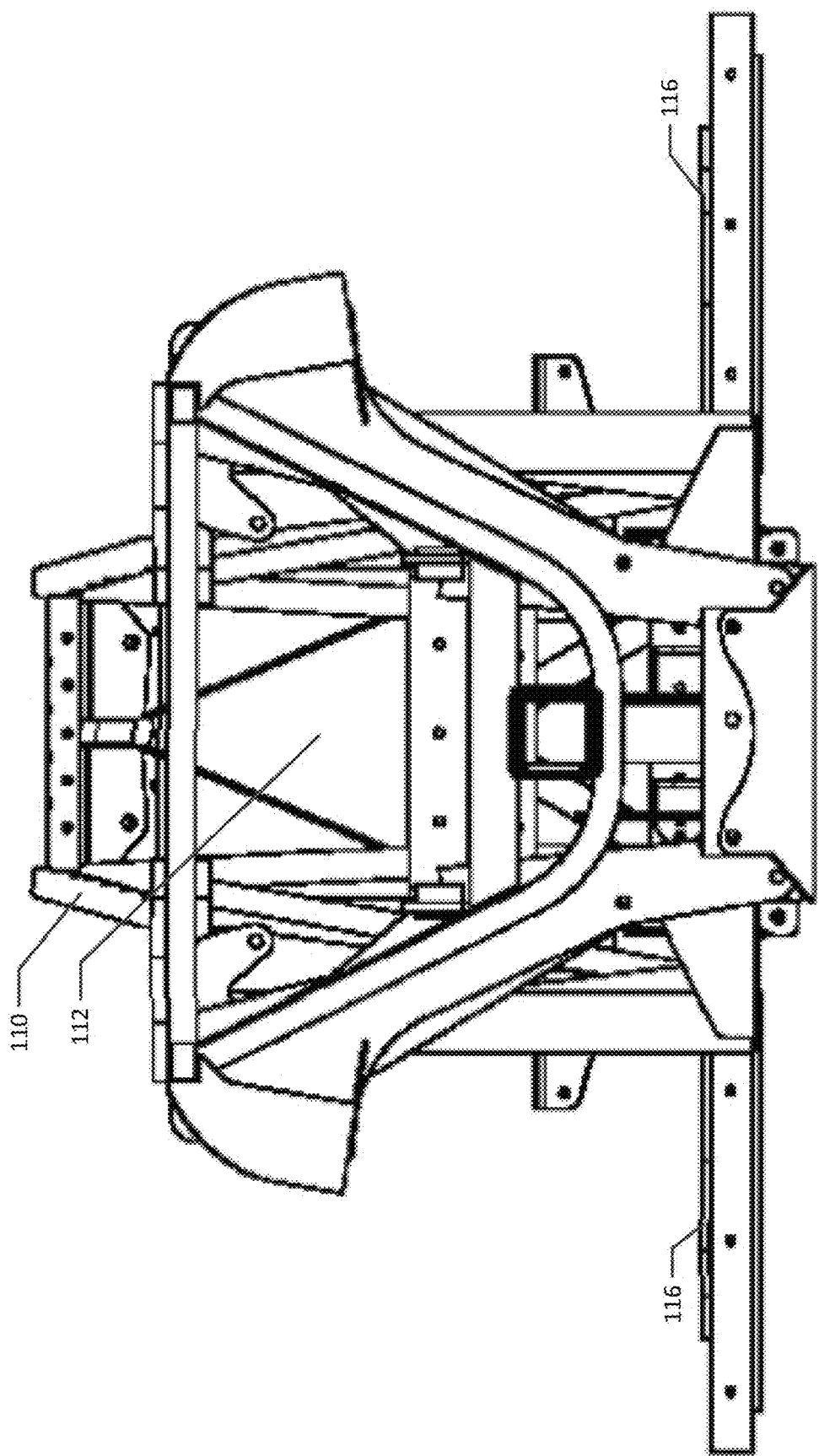

Referring to FIGS. 1 through 3, the ATV 100 of an example embodiment is constructed with a specially configured frame 110 that not only accepts a wheel-driving engine 115 as any ATV does; but additionally, the ATV of an example embodiment also accepts a PTO module 120 and PTO driving engine, separate from the wheel-driving engine 115. As such, the ATV of an example embodiment can be configured with two engines: one to drive the wheels, and a second engine to drive the PTO, a hydraulic pump, and any implements or tools attached to the PTO or hydraulics. Because of the unique construction and configuration of the ATV frame 110, the PTO module 120 (including the PTO engine, hydraulic pump, and PTO shaft) can be readily installed or removed depending on the needs of the manufacturer or end user. As such, the ATV frame 110 accommodates the installation and removal of the PTO module 120 from the rear portion of the ATV 100 as shown in FIG. 3. With the PTO module 120 installed, the ATV 100 of an example embodiment supports the attachment and use of a variety of implements, tools, and hydraulic power systems to support a variety of application including construction, agriculture, ranching, and the like.

Referring still to FIGS. 1 through 3, the ATV 100 of an example embodiment provides the unique construction and configuration of the ATV frame 110, which also accommodates the installation of a multi-function cargo bed 130 on the rear portion of the ATV 100. The ATV frame 110 also accommodates the installation and removal of the multi-function cargo bed 130 from the rear portion of the ATV 100 as shown in FIG. 2. The cargo bed 130 is configured with a scissor lift to lift the bed to a considerable height (e.g., 6'). Moreover, the cargo bed 130 is configured with unique locking and pivoting structures enabling the cargo bed 130 to tilt to the left, right, or rear of the ATV 100. This tilting action enables the cargo bed 130 to be used for dumping material to the sides or behind the ATV 100 while the ATV 100 is moving or at a standstill. Another feature provided by the multi-function cargo bed 130 of an example embodiment is the highly configurable railing provided around three sides of the cargo bed. These railings provide locking and hinge structures enabling the railing to be raised, lowered, partially raised, dropped completely downward, or removed entirely on each or any of the three sides. As such, the cargo bed railing can be configured and adapted for a variety of uses and for a variety of different loads. Additionally, in a particular embodiment, the cargo bed 130 can be configured with a camping kit having a tent. In a unique departure from the conventional ATV camping systems, the camping kit of an example embodiment enables the setup of the tent from the cargo bed 130 of the ATV 100 while enabling the ATV 100 to be detached from the tent, which can be left freestanding. As a result, the ATV 100 is free to venture away from the tent while the tent provides shelter for campers. Further details of the unique construction and configuration of the ATV multi-function cargo bed system 130 of an example embodiment are provided below in the section labeled Multi-Function Cargo Bed.

Referring now to FIGS. 4 through 7, the drawings illustrate various views of a bare ATV chassis or frame 110 of an example embodiment. Frame 110 can be fabricated from metal members (e.g., steel support members), which are interconnected to form the frame 110 of the example embodiment shown in FIG. 4. Individual support members are welded or bolted together. In the example embodiment shown in FIGS. 4 through 7, a void 112 is provided in the rear portion of the frame 110 to accommodate the installation of the PTO module 120. Side rails 113 can be widened to create the void 112. When installed, the PTO module 120, and a cradle in which and to which the PTO module 120 is attached, can be bolted to attach points provided in the support members of frame 110. Similarly, the cargo bed 130 can be installed and coupled to attach points provided in the support members of frame 110. Frame 110 of an example embodiment can also be configured with side platform supports 116, which can serve as a footrest for an operator or a surface to support fuel tanks, a storage locker, or the like.

Figure 8:
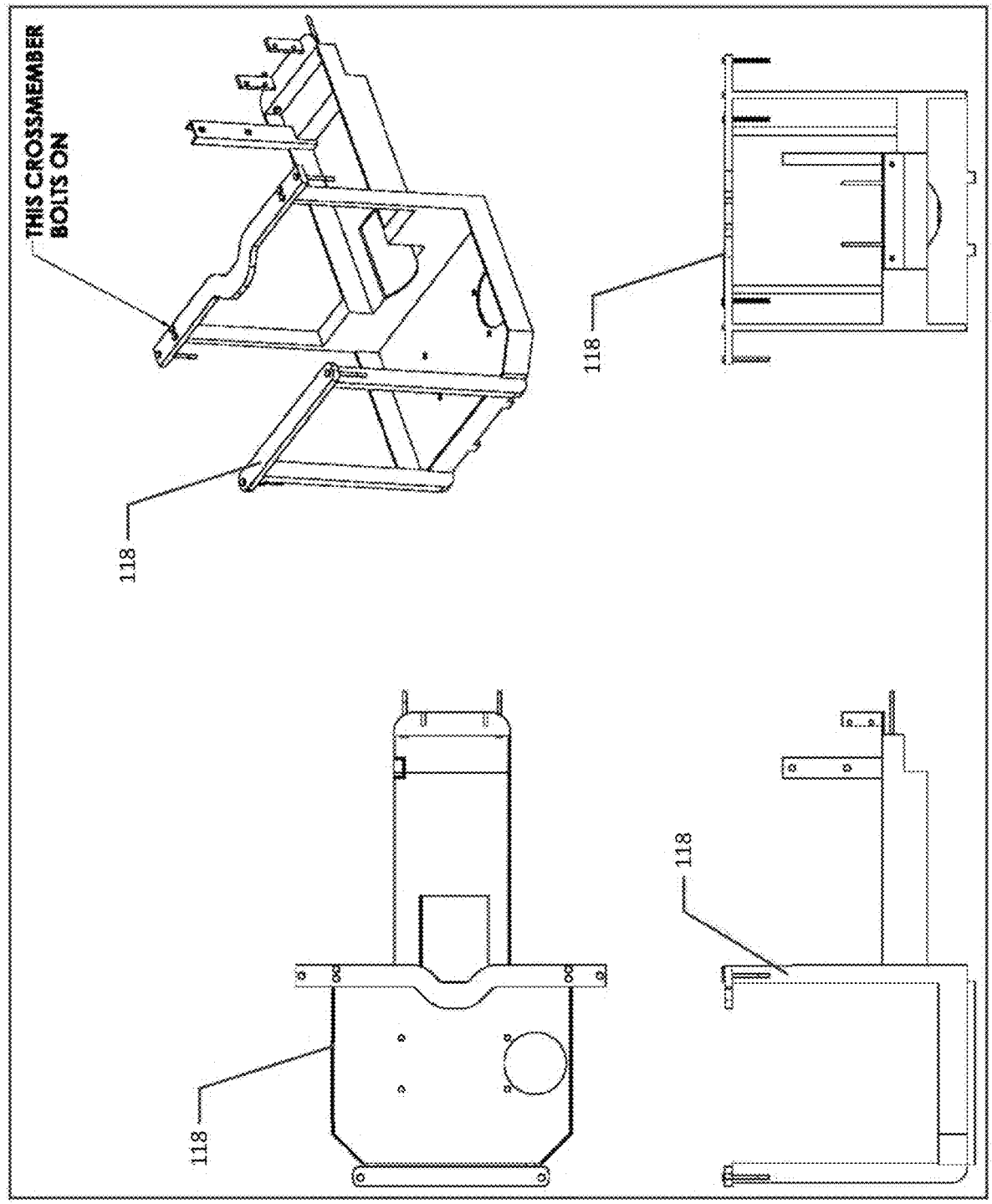
FIG. 8 illustrates various views of an example embodiment showing a modular PTO system cradle.
Figure 9:
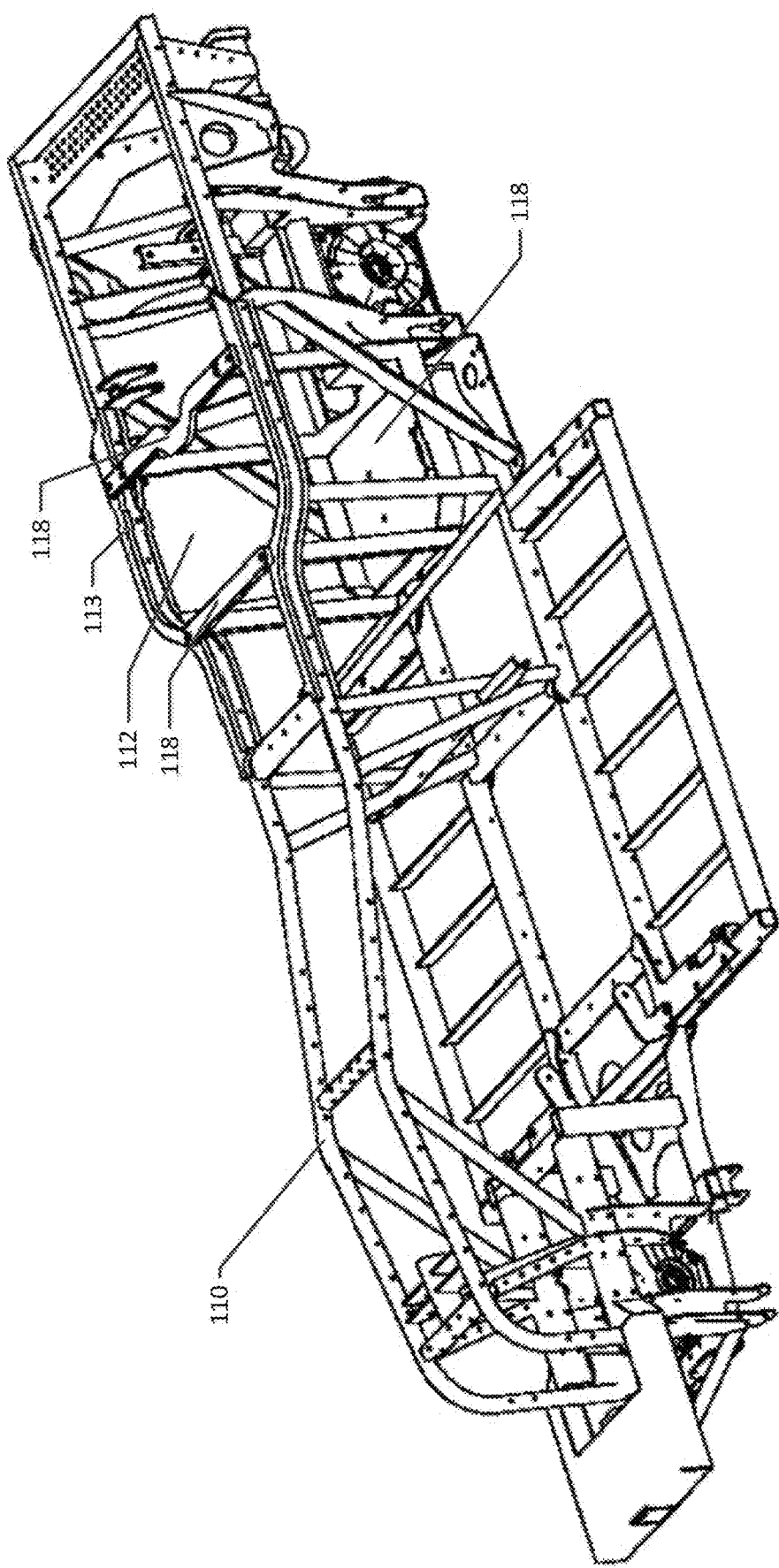
FIGS. 9 through 12 illustrate various views of a bare ATV chassis or frame of an example embodiment with a modular PTO system cradle (without the modular PTO system) installed in the frame.
Figure 10:
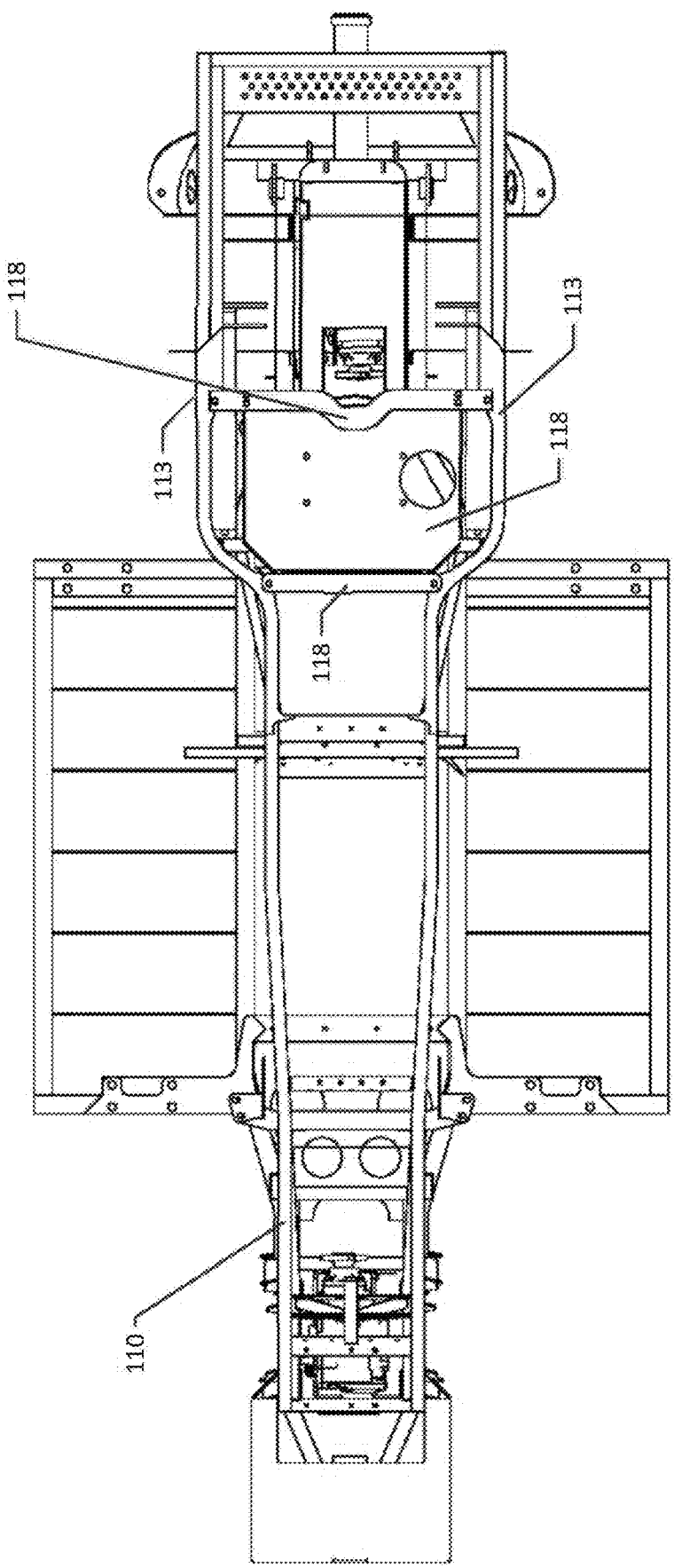
Figure 11:
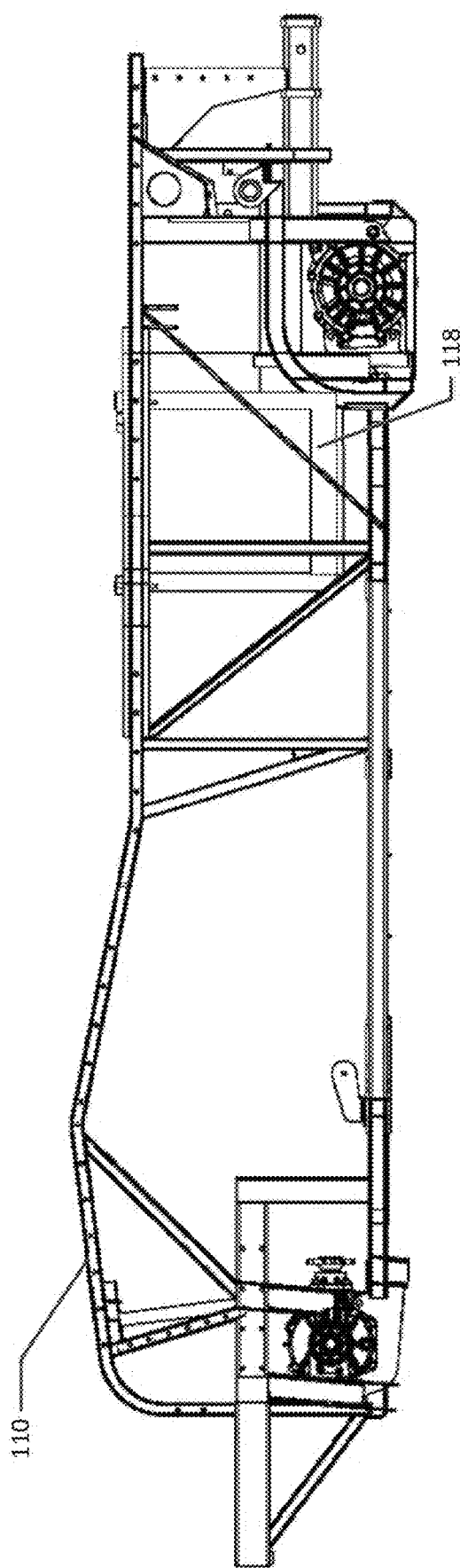
Figure 12:
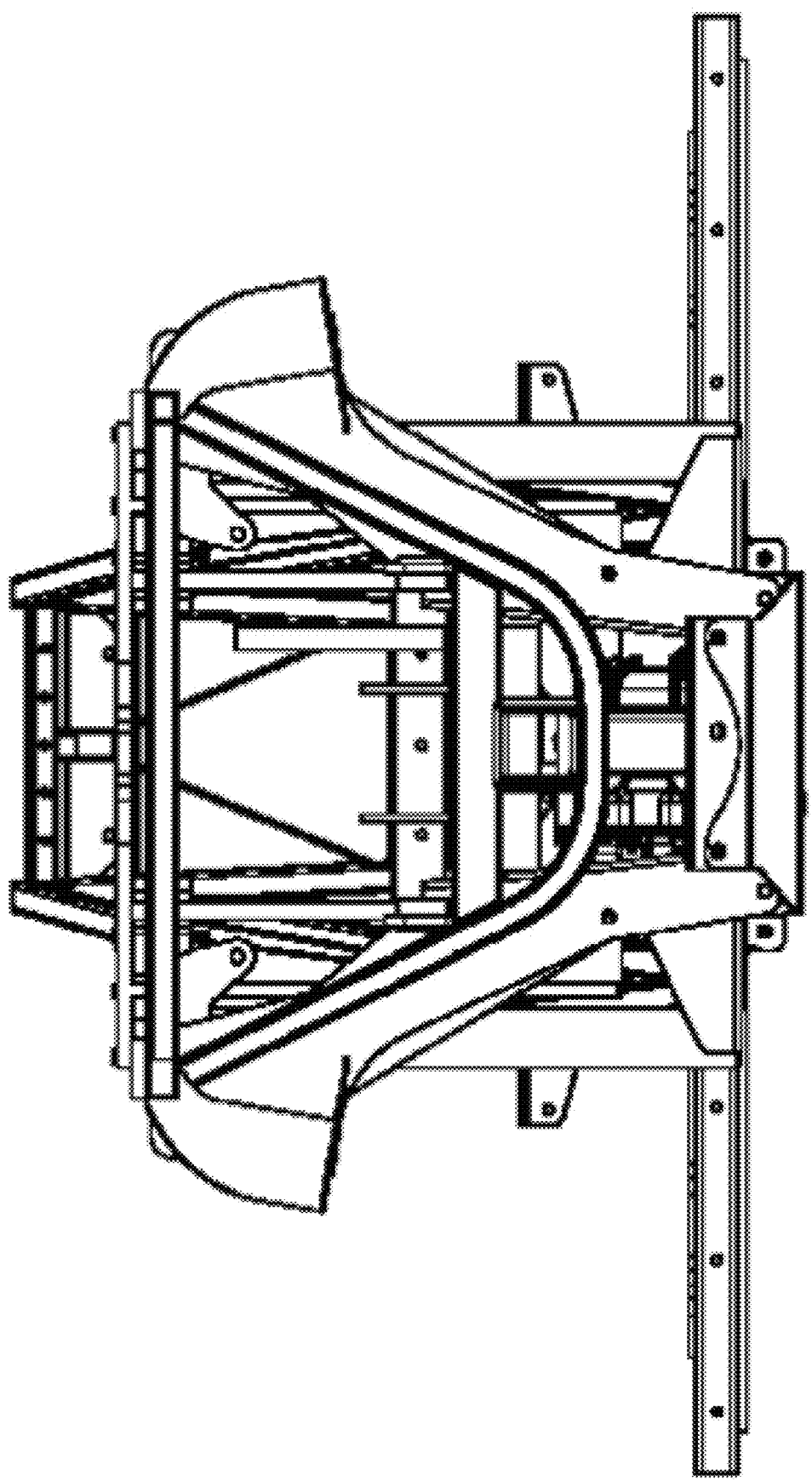
Figure 13:
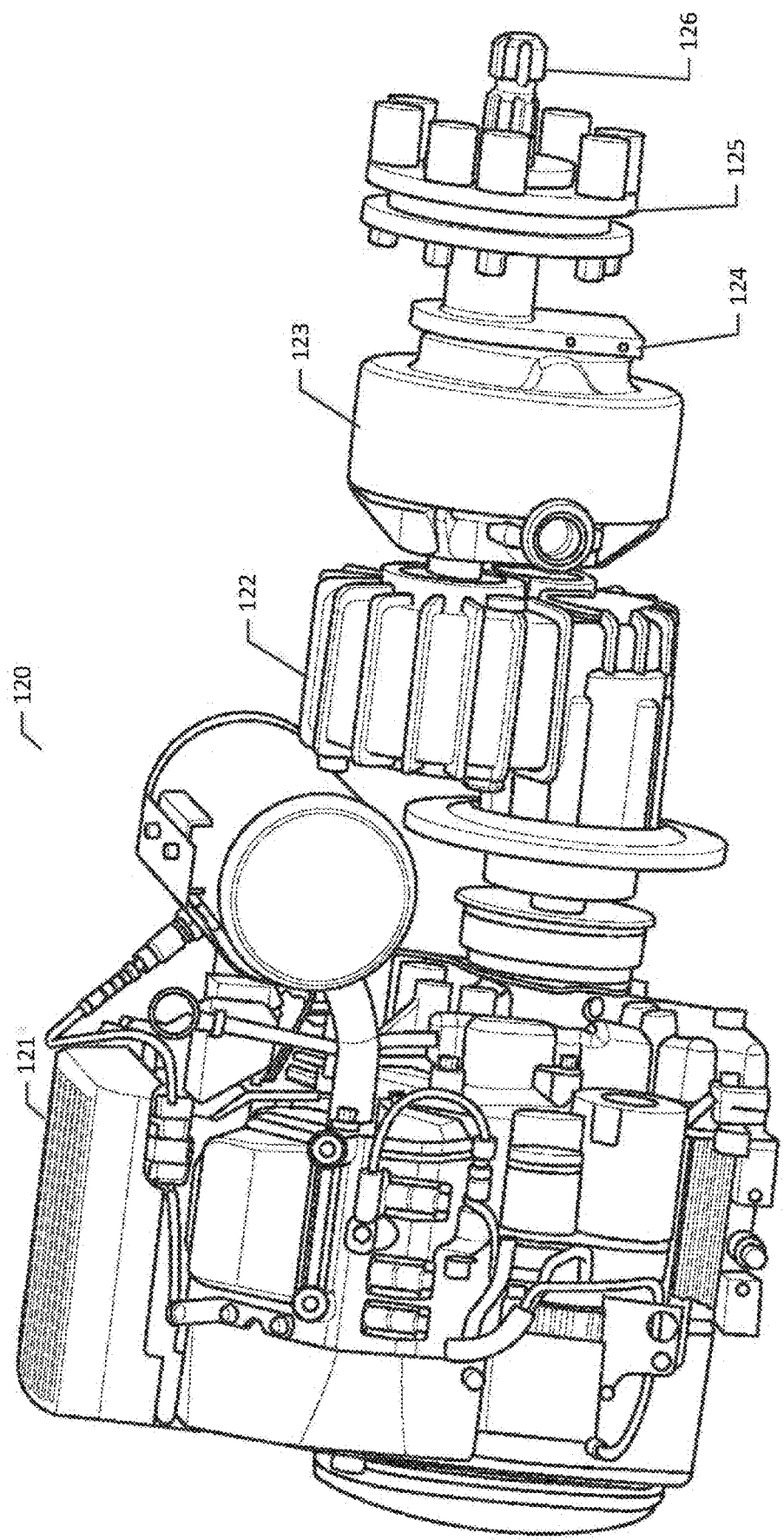
FIGS. 13 through 17 illustrate various views of an uninstalled modular PTO system of an example embodiment.
Figure 14:
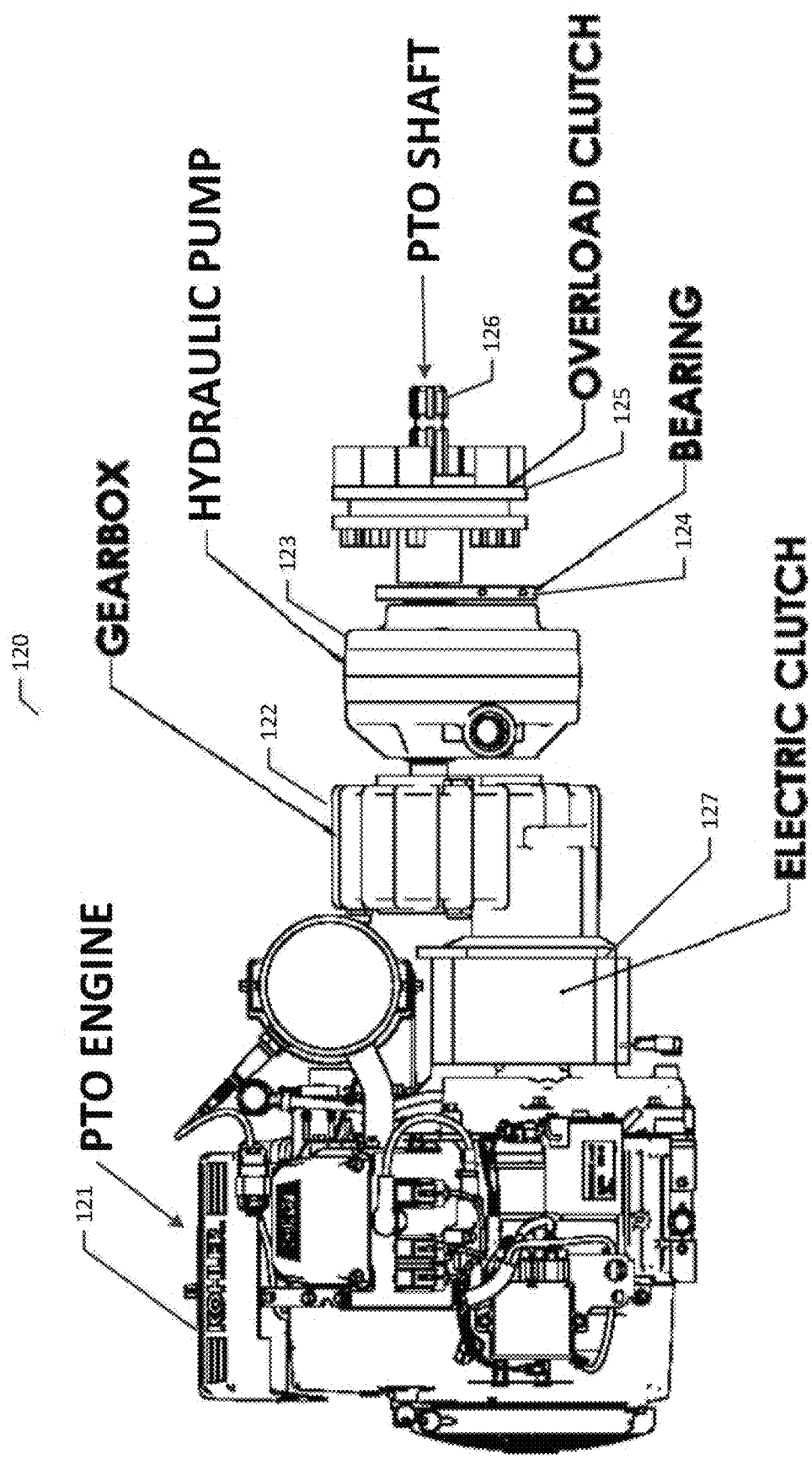
Figure 15:
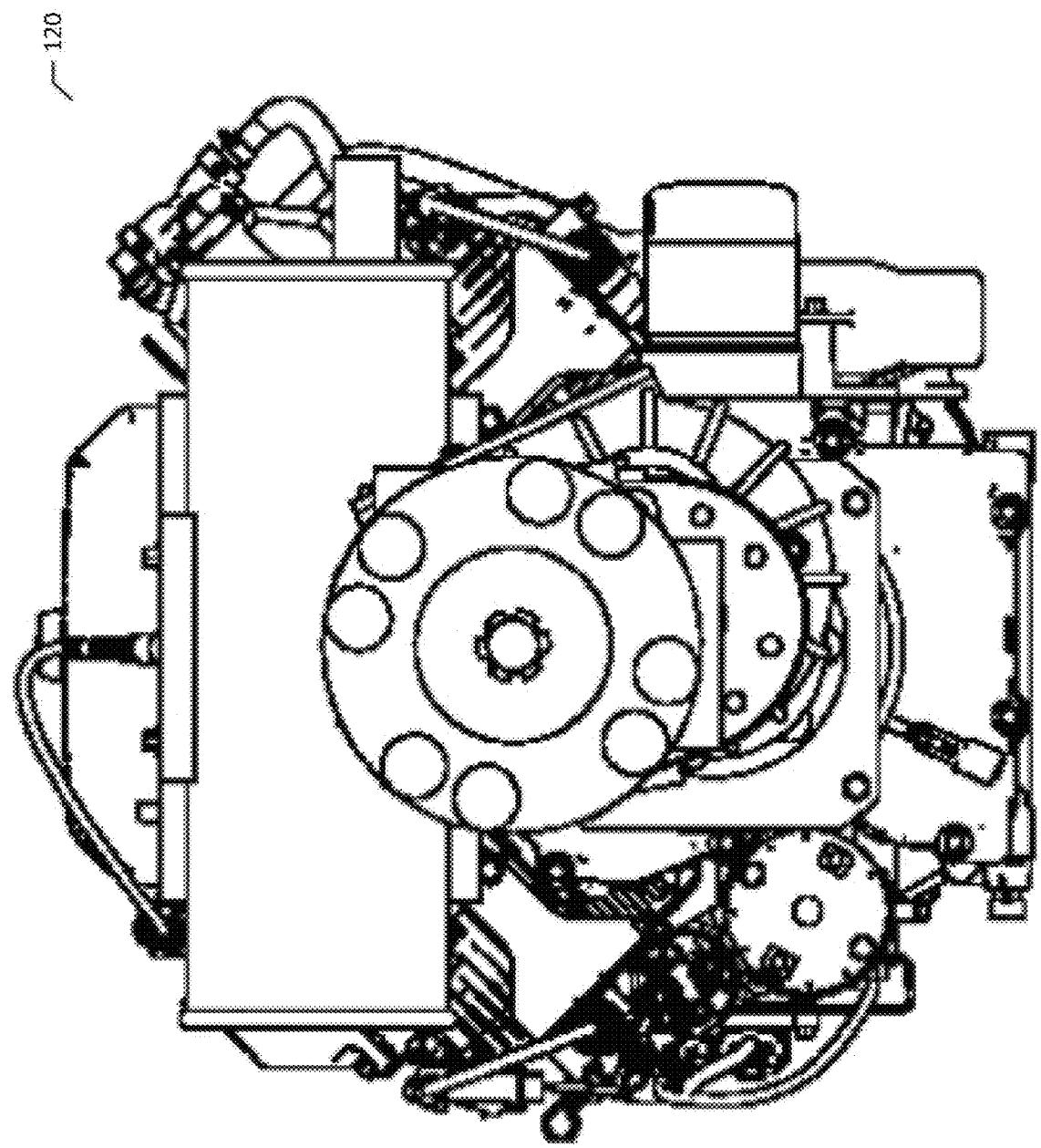
Figure 16:
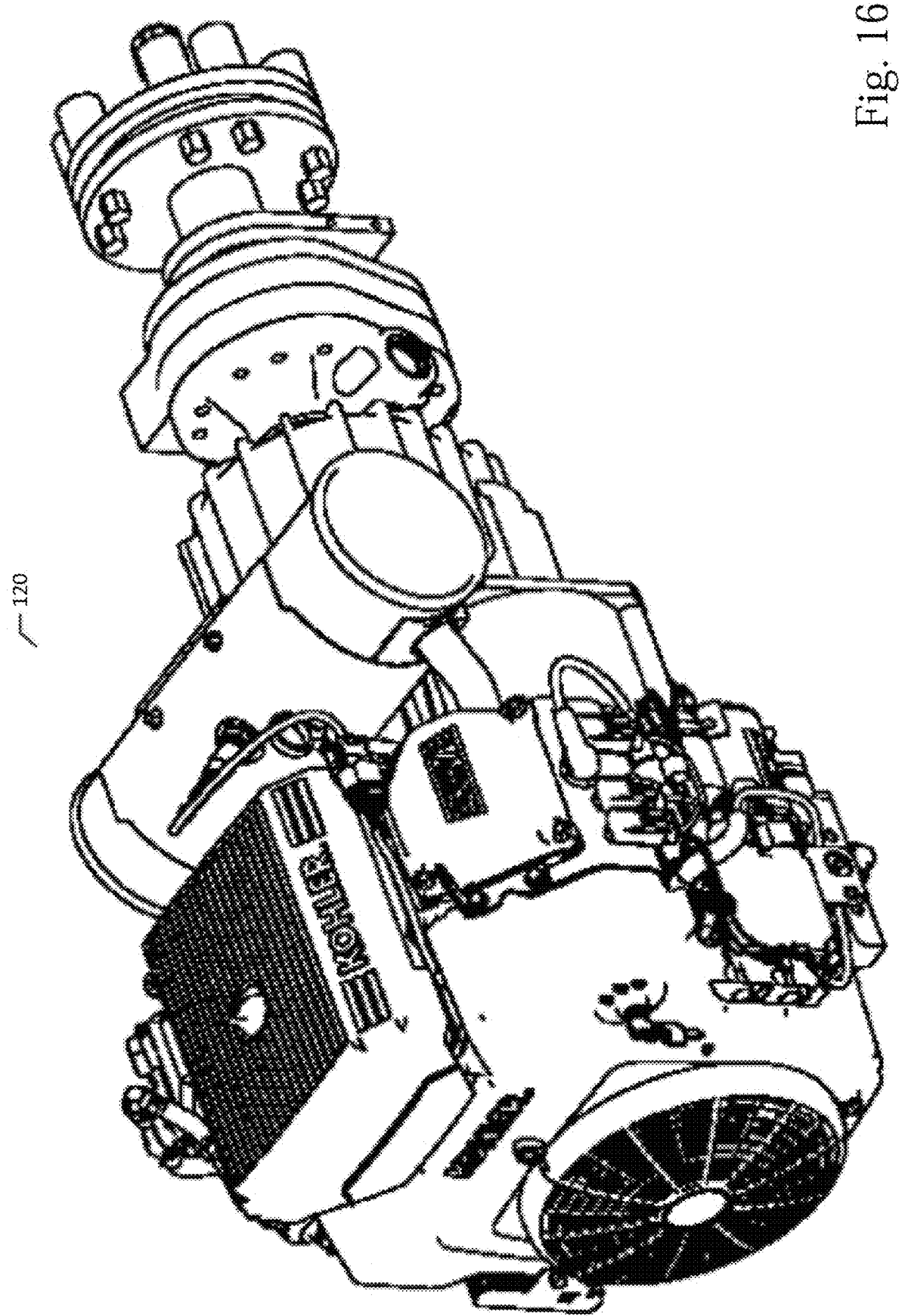
Figure 17:
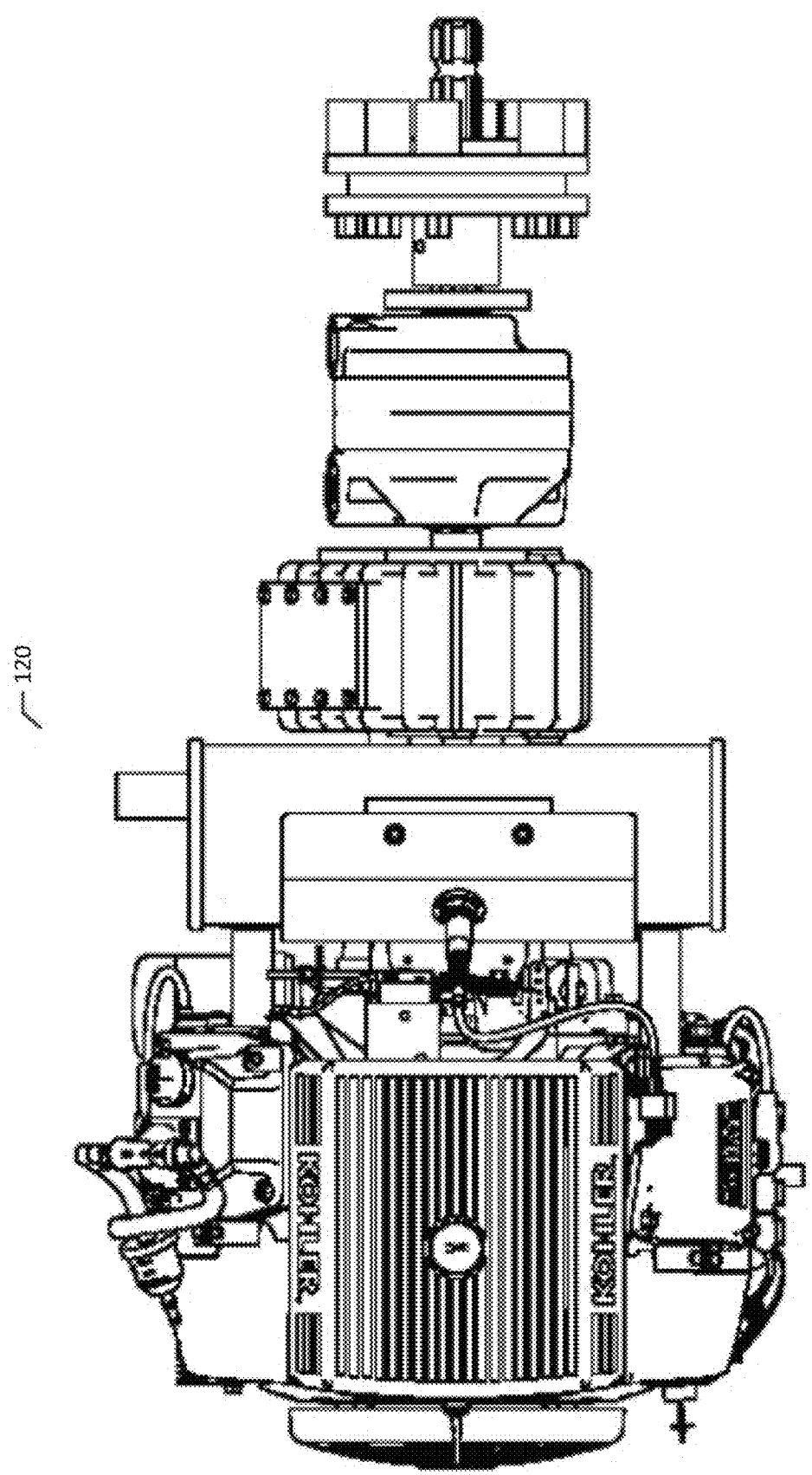

FIG. 8 illustrates various views of an example embodiment showing a PTO module cradle 118. In the example embodiment, the PTO module 120 is encased in the cradle 118 to support the PTO module 120, to protect the PTO module 120, and to provide support members configured to couple with attach points in the void 112 of frame 110. The cradle 118 provides a convenient and sturdy way to facilitate installation and/or removal of the PTO module 120 to/from the frame 110.

FIGS. 9 through 12 illustrate various views of a bare ATV chassis or frame 110 of an example embodiment with a PTO cradle 118 (without the PTO module 120) installed in the frame 110. As shown, the PTO cradle 118 can be inserted into void 112 and coupled to attach points provided in the rails 113 and lower support members of frame 110. Typically, the PTO module 120 is encased in the PTO cradle 118 prior to installation into the frame 110. However, the PTO cradle 118 (without the PTO module 120) is shown installed in the chassis 110 for illustrative purposes.

FIGS. 13 through 17 illustrate various views of an uninstalled PTO module 120 of an example embodiment. As shown the example embodiment includes a PTO engine 121, a gearbox 122, a hydraulic pump 123, a bearing 124, an overload clutch 125, and a PTO shaft 126. In an example embodiment, the PTO module 120 can also include an electric clutch 127. In operation, the PTO engine 121, independently from the wheel-driving engine 115, drives the hydraulic pump 123 and the PTO shaft 126. As described in more detail below, a variety of implements and tools can be attached to the ATV 100 via the PTO shaft 126 and hydraulic hoses connected to ports on the hydraulic pump 123. As a result, the ATV 100 can provide both mechanical and fluid force to drive a variety of attachable and detachable tools and implements and various hydraulic power implements, such as: a front loader, backhoe, trencher, forklift, post hole digger/auger, front end flail mower, boom winch, and front-end winch. The gearbox 122, overload clutch 125, and electric clutch 127 are provided to configure the PTO shaft 126 to turn at the desired rate at the desired time. The clutches also enable the PTO engine 121 to run while the PTO shaft remains idle. The overload clutch 125 serves to protect the PTO engine 121 from damage caused by excessive loads.

Figure 18:
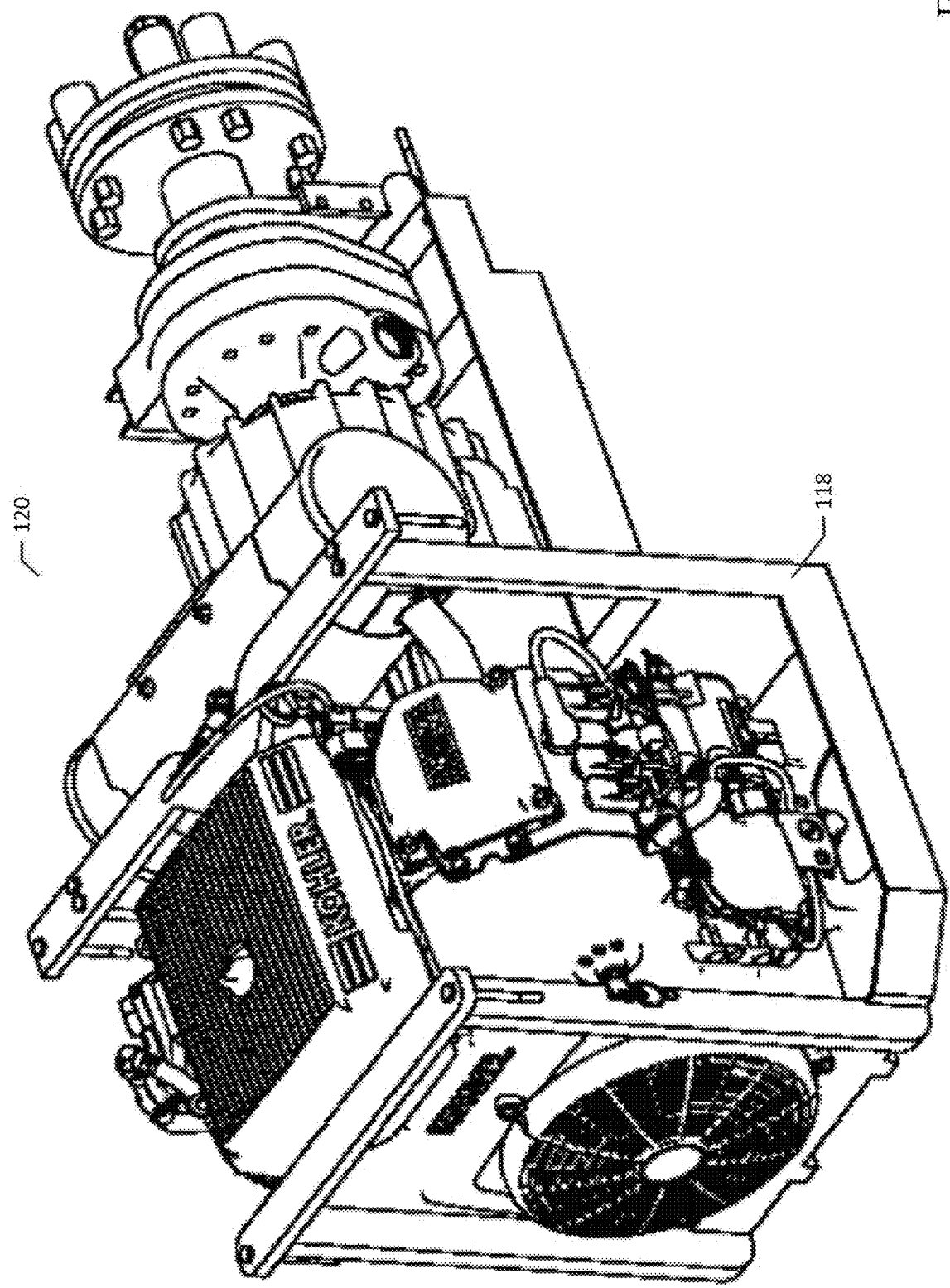
FIGS. 18 through 20 illustrate various views of a modular PTO system installed in a cradle of an example embodiment prior to being installed in the frame.
Figure 19:
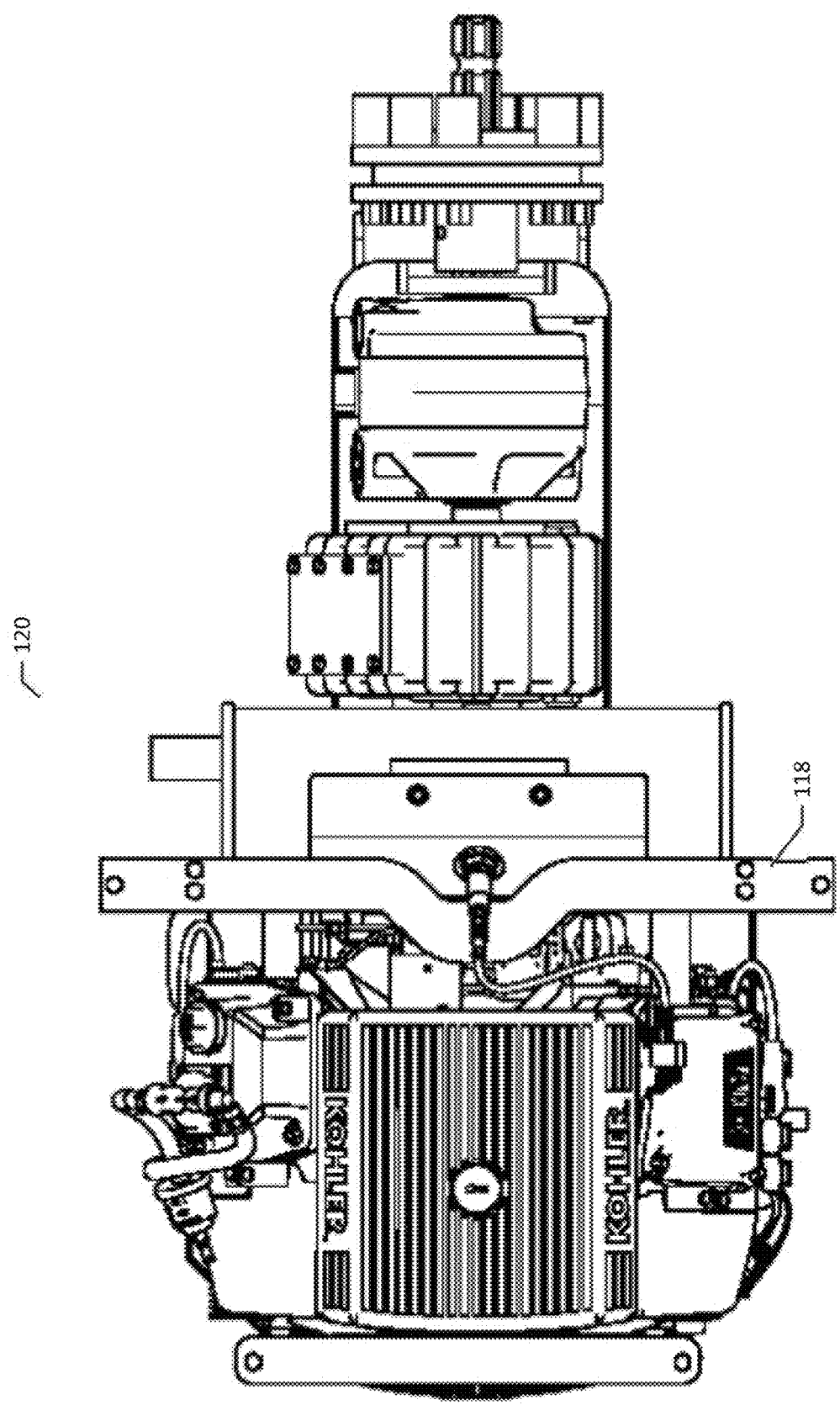
Figure 20:
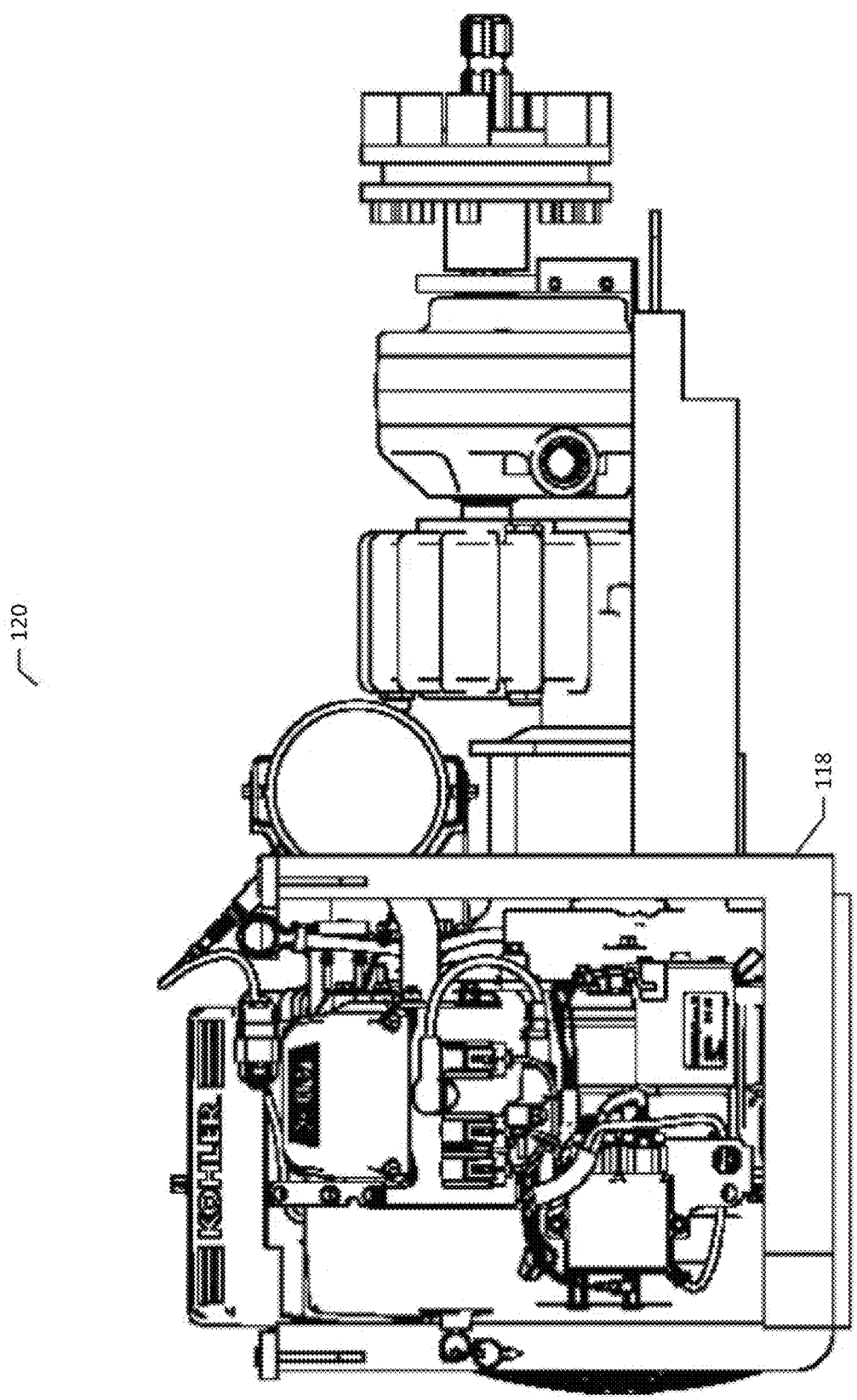
Figure 21:
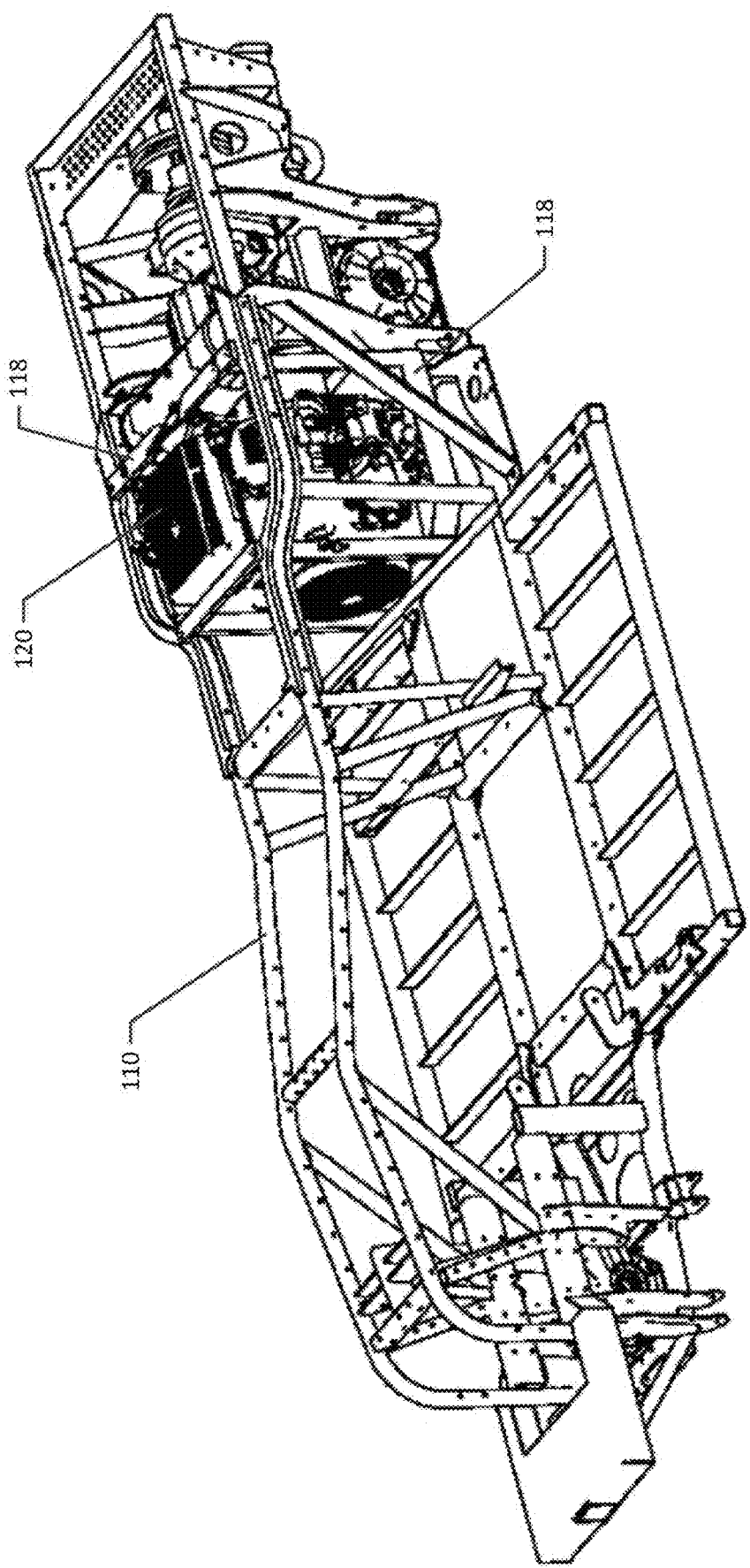
FIGS. 21 through 24 illustrate various views of a modular PTO system installed in a cradle of an example embodiment after the cradle and modular PTO system are installed in the frame.
Figure 22:
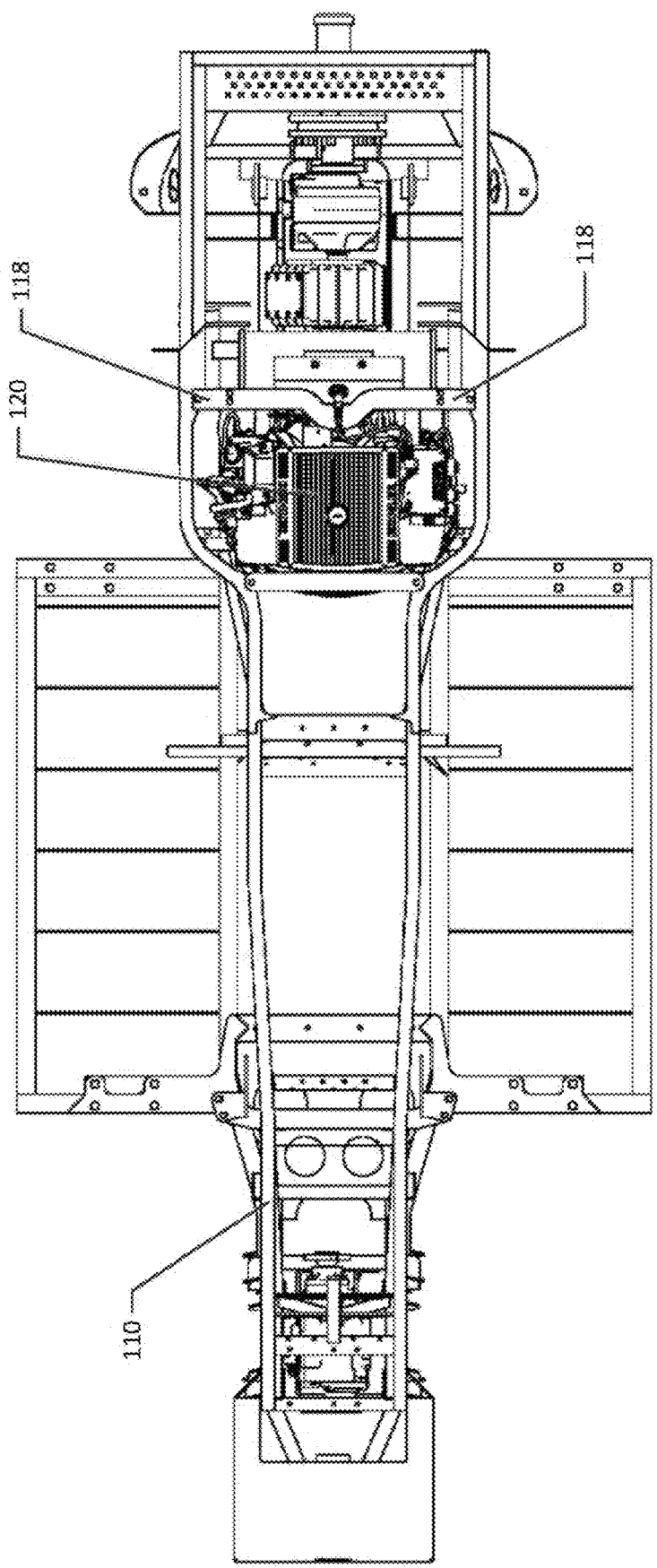
Figure 23:
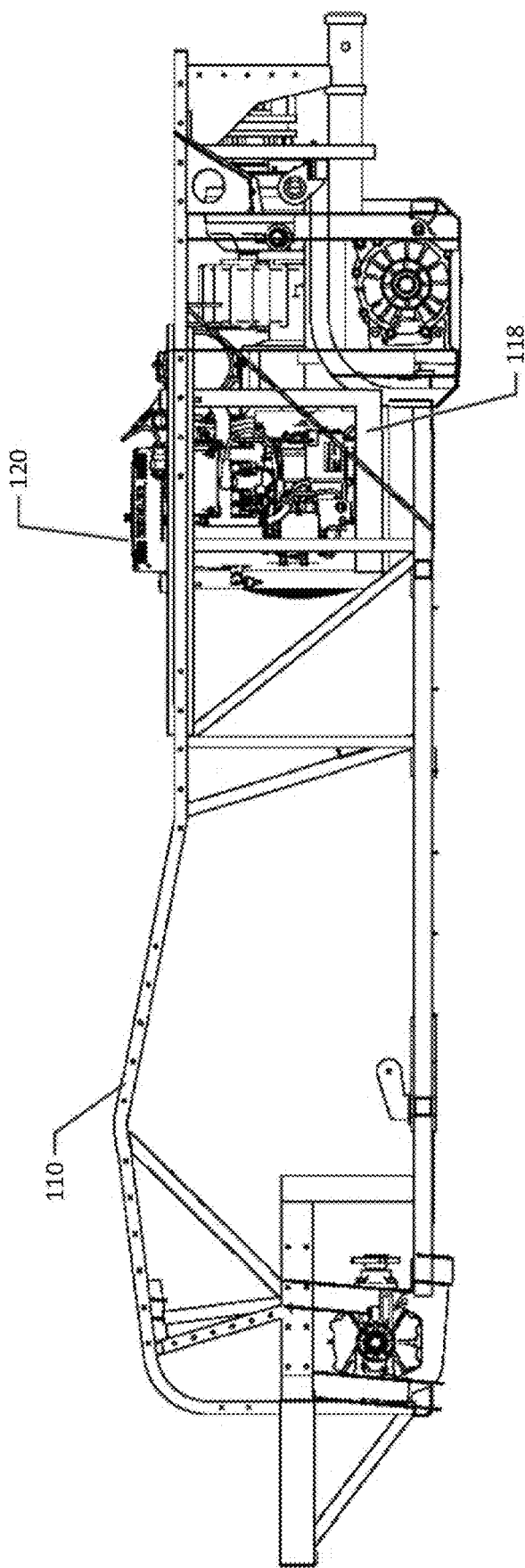
Figure 24:
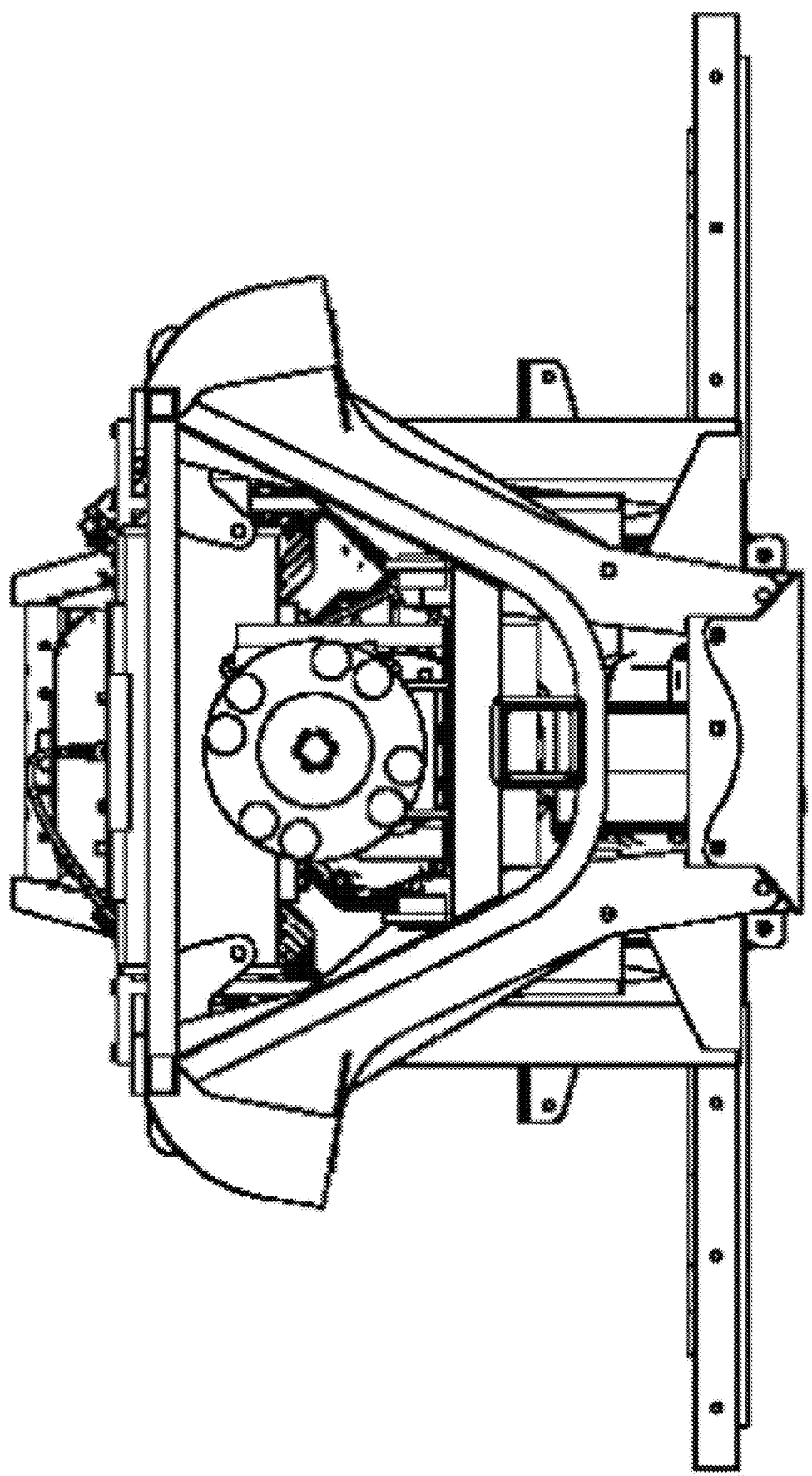

FIGS. 18 through 20 illustrate various views of a PTO module 120 installed in cradle 118 of an example embodiment prior to being installed in the frame 110. The PTO cradle 118 (with the PTO module 120) can be installed in the frame 110. As described above, the PTO cradle 118 can be inserted into void 112 and coupled to attach points provided in the rails 113 and lower support members of frame 110. In the example embodiment, the PTO module 120 is encased in the cradle 118 to support the PTO module 120, to protect the PTO module 120, and to provide support members configured to couple with attach points in the void 112 of frame 110. The cradle 118 provides a convenient and sturdy way to facilitate installation and/or removal of the PTO module 120 to/from the frame 110.

FIGS. 21 through 24 illustrate various views of a PTO module 120 installed in cradle 118 of an example embodiment after the cradle 118 and PTO module 120 are installed in the frame 110. As shown, the PTO cradle 118 can be inserted into void 112 and coupled to attach points provided in the rails 113 and lower support members of frame 110.

Figure 25:
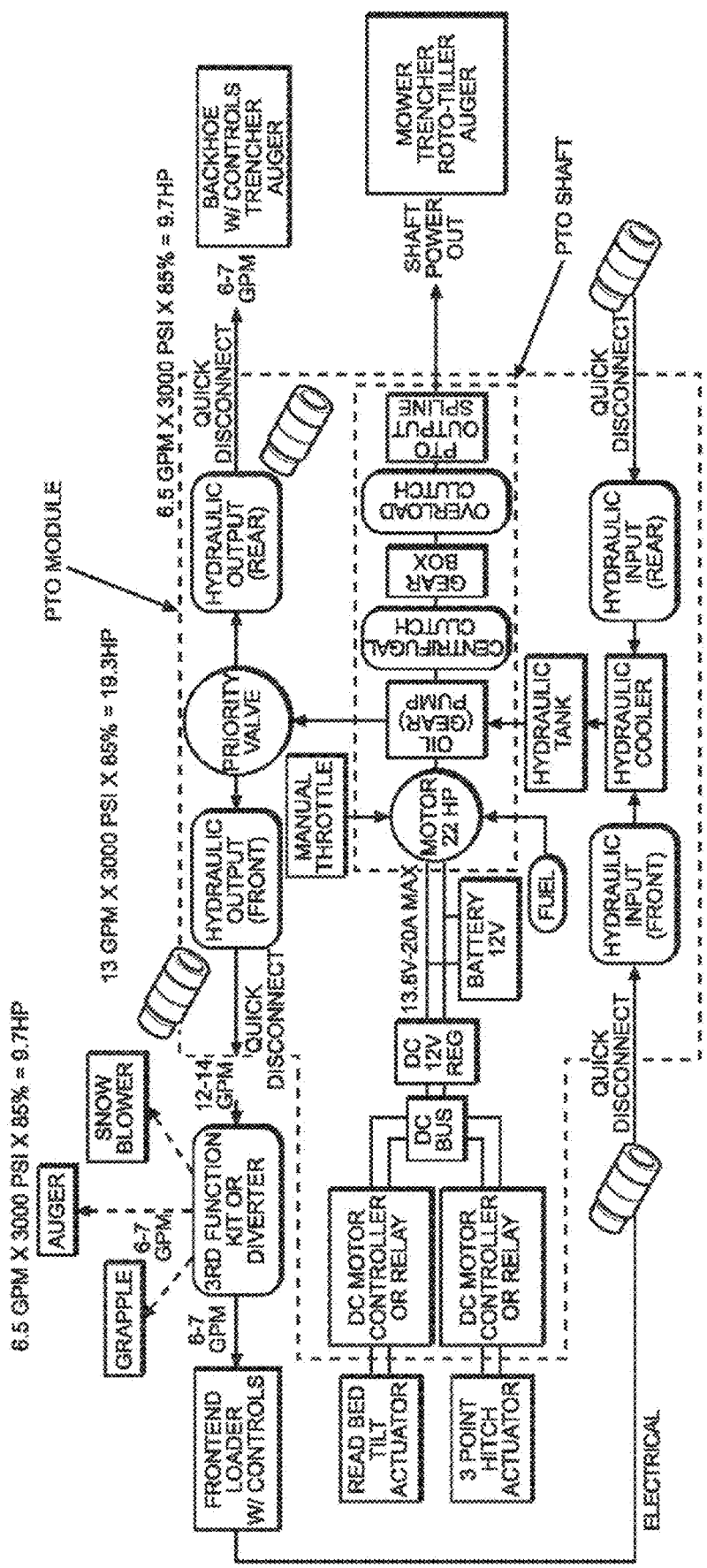
FIG. 25 is a functional block diagram illustrating the main functional components and system layout of the removable modular PTO system or PTO module of an example embodiment.
Figure 26:
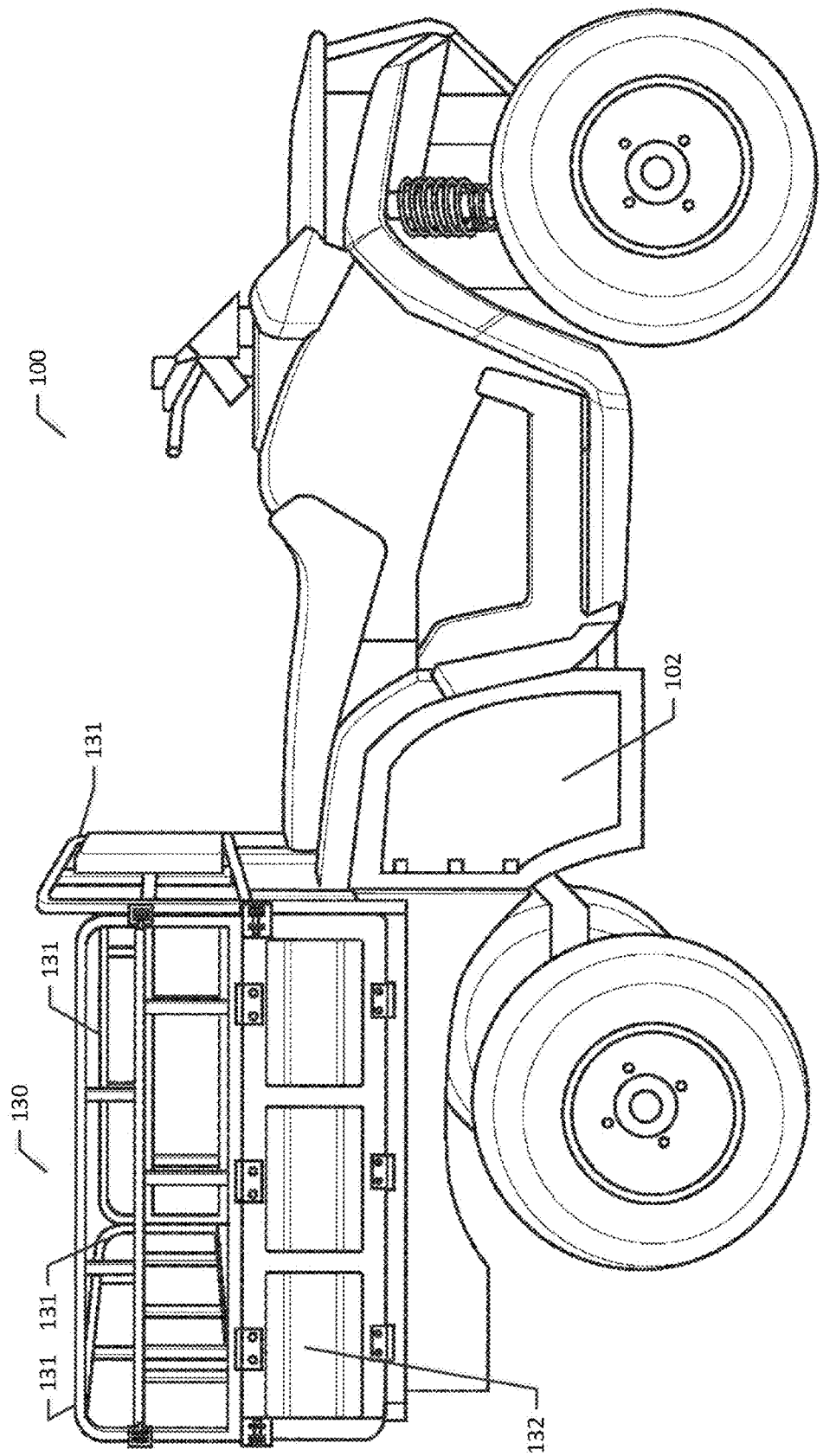
FIGS. 26 through 29 illustrate various views of an ATV of an example embodiment with a cargo bed installed on the frame of the ATV.
Figure 27:
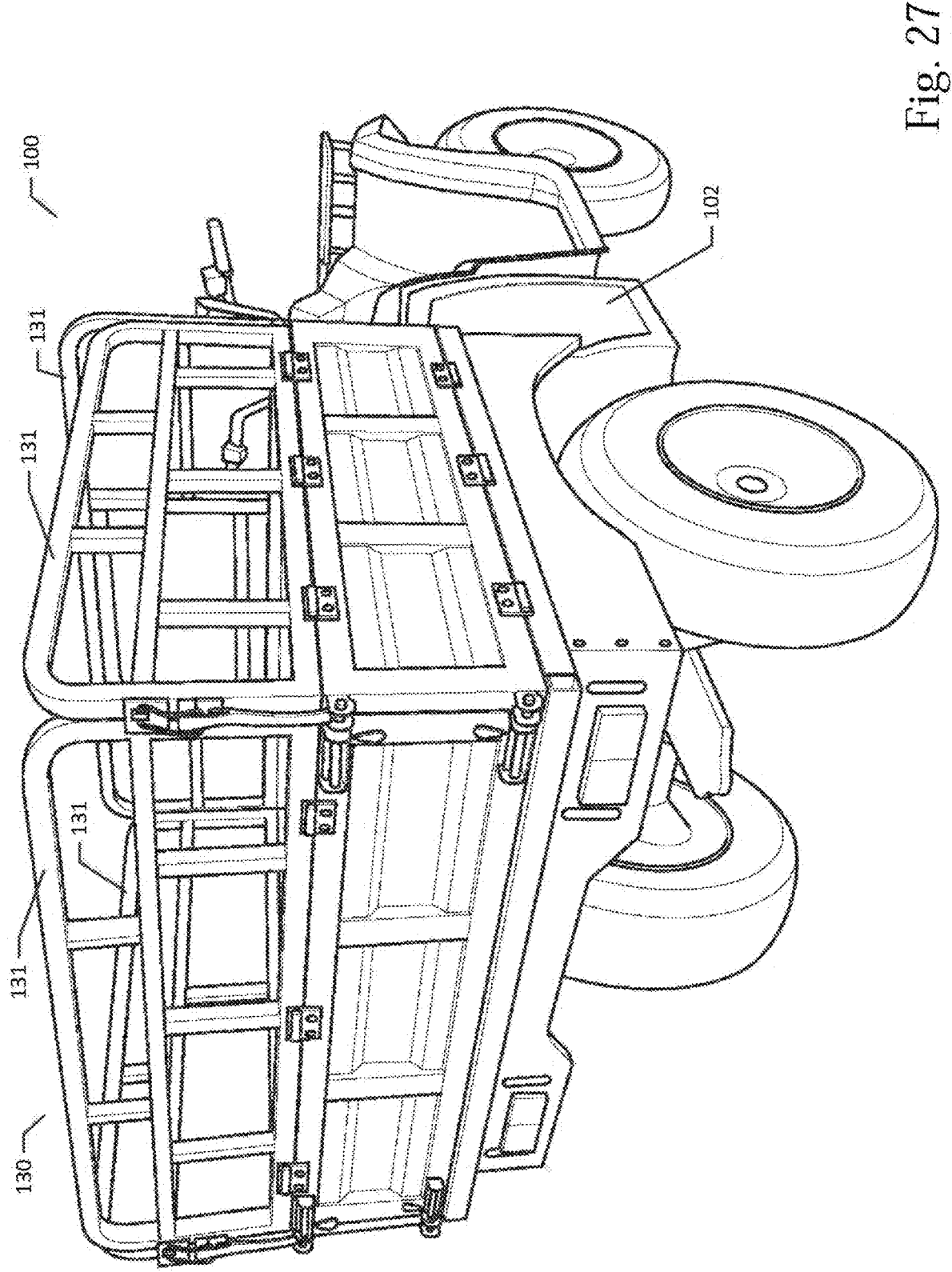
Figure 28:
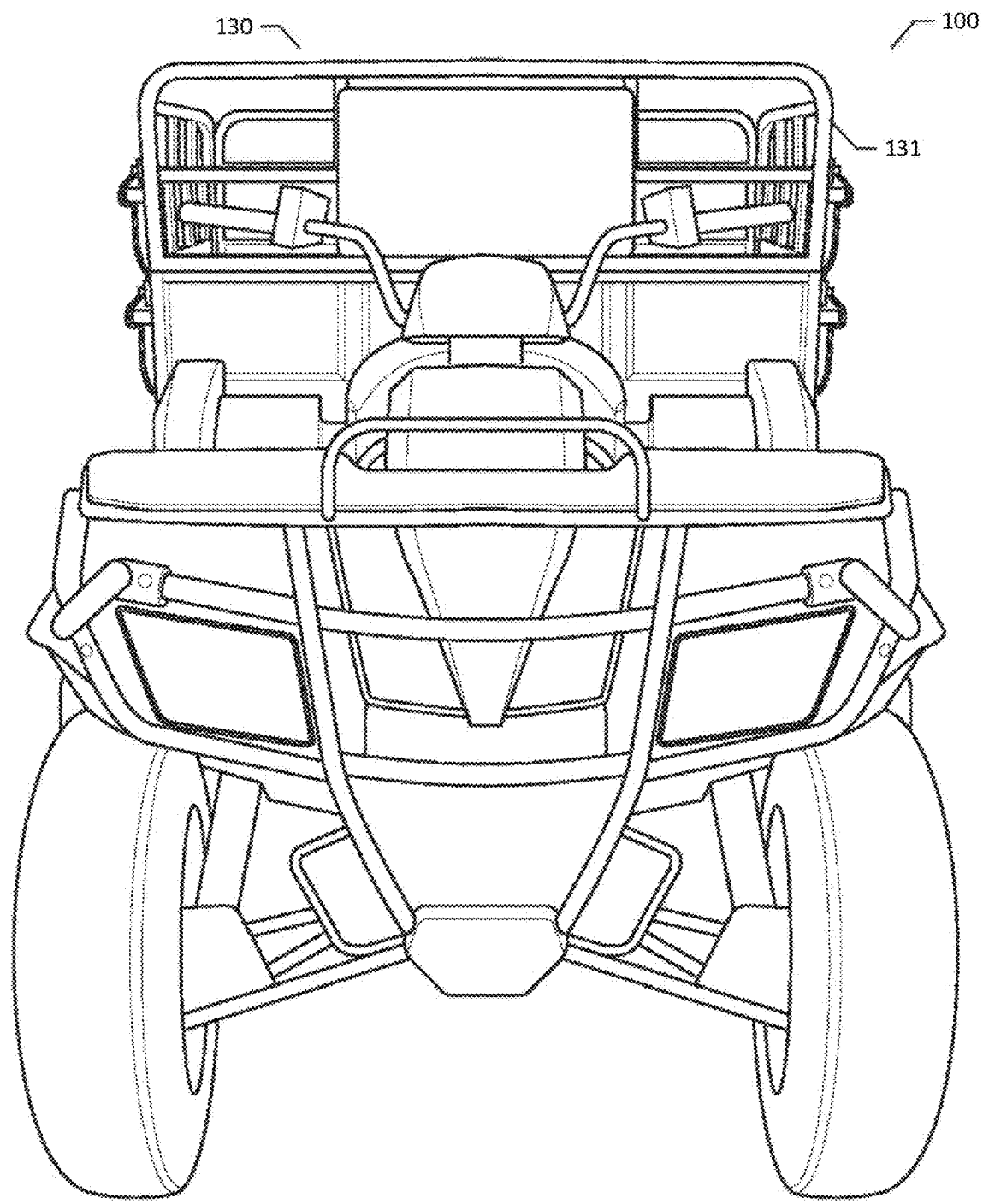
Figure 29:
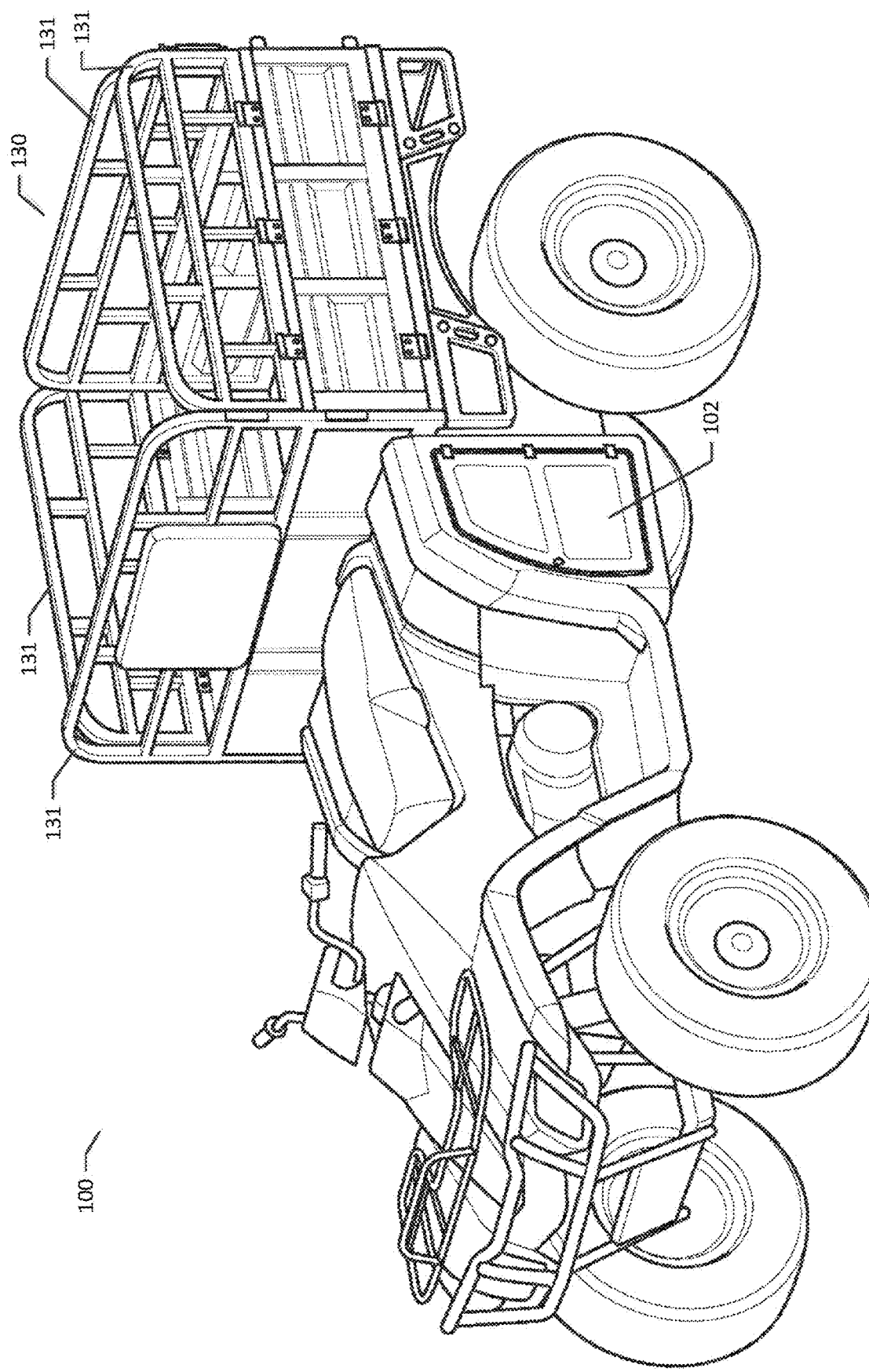

FIG. 25 is a functional block diagram illustrating the main functional components and system layout of the removable modular PTO system or PTO module 120 of an example embodiment. As shown, the PTO module 120 of an example embodiment includes PTO shaft power, quick disconnect hydraulic ports for fluid power, and electrical connections for controlling various actuators and control signals for connected implements and tools.

FIGS. 26 through 29 illustrate various views of an ATV 100 of an example embodiment with a cargo bed 130 installed on the frame 110 of the ATV 100. If an operator wants to use the PTO module 120 (for example, to drive an implement or tool), the operator can install the PTO module 120 into the frame 110 as described above. Then, the cargo bed 130 can be installed on the frame 110 and attached to the frame 110 via attach points provided on structural members of the frame 110. Alternatively, the operator may not want to use the PTO module 120; and therefore, does not need to install the PTO module 120 into the frame 110. In this case, the cargo bed 130 can still be installed on the frame 110 and attached to the frame 110 via frame attach points, even without the PTO module 120 being installed.

As also shown in FIGS. 26 through 29 and FIG. 116, the cargo bed 130 includes side panels 131 on all four sides of the cargo bed 130. As described in more detail below, the side panels 131 on at least three sides can be raised, lowered, partially raised, dropped completely downward, or removed entirely. Additionally, side storage lockers 102 can also be provided on each side of the ATV 100. Additional storage lockers or tool boxes 132 are provided on each side of the ATV 100 under the cargo bed 130.

Figure 30:
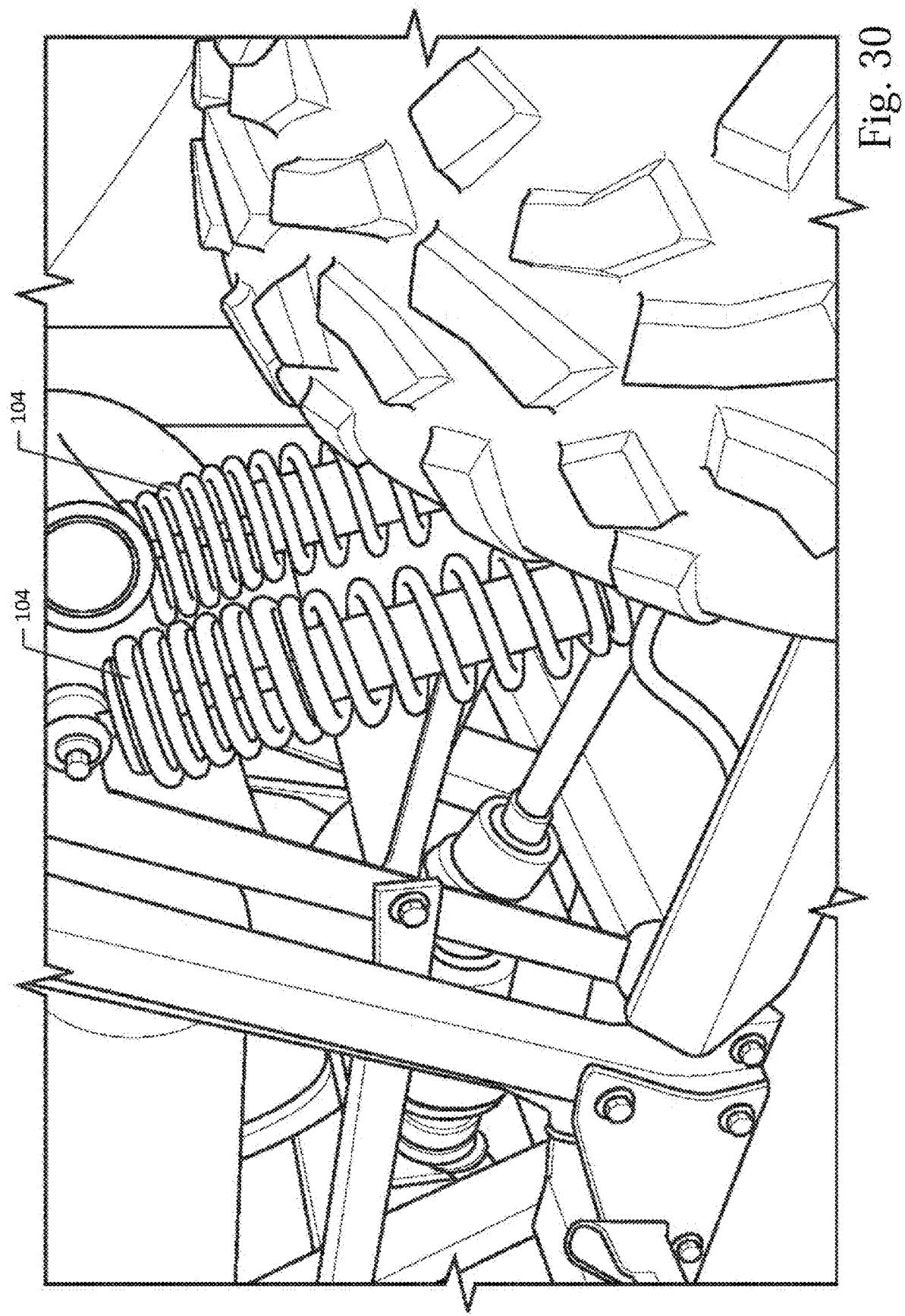
FIG. 30 illustrates the dual shock suspension system for each wheel of the ATV of an example embodiment.

FIG. 30 illustrates the dual shock suspension system for each wheel of the ATV 100 of an example embodiment. In an example embodiment, the ATV 100 provides several suspension system features including: 1) quad shocks in the back and front, 2) a bolt on suspension system for the front to add quad air shocks, 3) automatic shock adjusting and auto-leveling features (e.g., four front shocks, four rear shocks with two of the rear shocks being adjustable with air lift suspension); some embodiments include heavy-duty, off road tires and a track system for use in the snow, and 4) an automatic suspension lockout feature providing a front and rear suspension lock out feature, thereby causing the shock springs to not compress, like the suspension on a tractor. In an example embodiment, the automatic suspension lockout feature provides a suspension locking frame to interlock the suspension mechanism of a pair of front/rear wheels of the ATV 100. The locking frame comprises a rigid frame member having opposed extendable arms. The extendable arms are telescopically coupled to the rigid frame member. Releasable locking means is provided to interlock the extendable arms at a desired position with the rigid frame member. Each of the extendable arms have an abutment means at a free end thereof for abutting engagement with an opposed end member of the suspension to lock the suspension mechanism and prevent pivotal displacement thereof.

Figure 31:
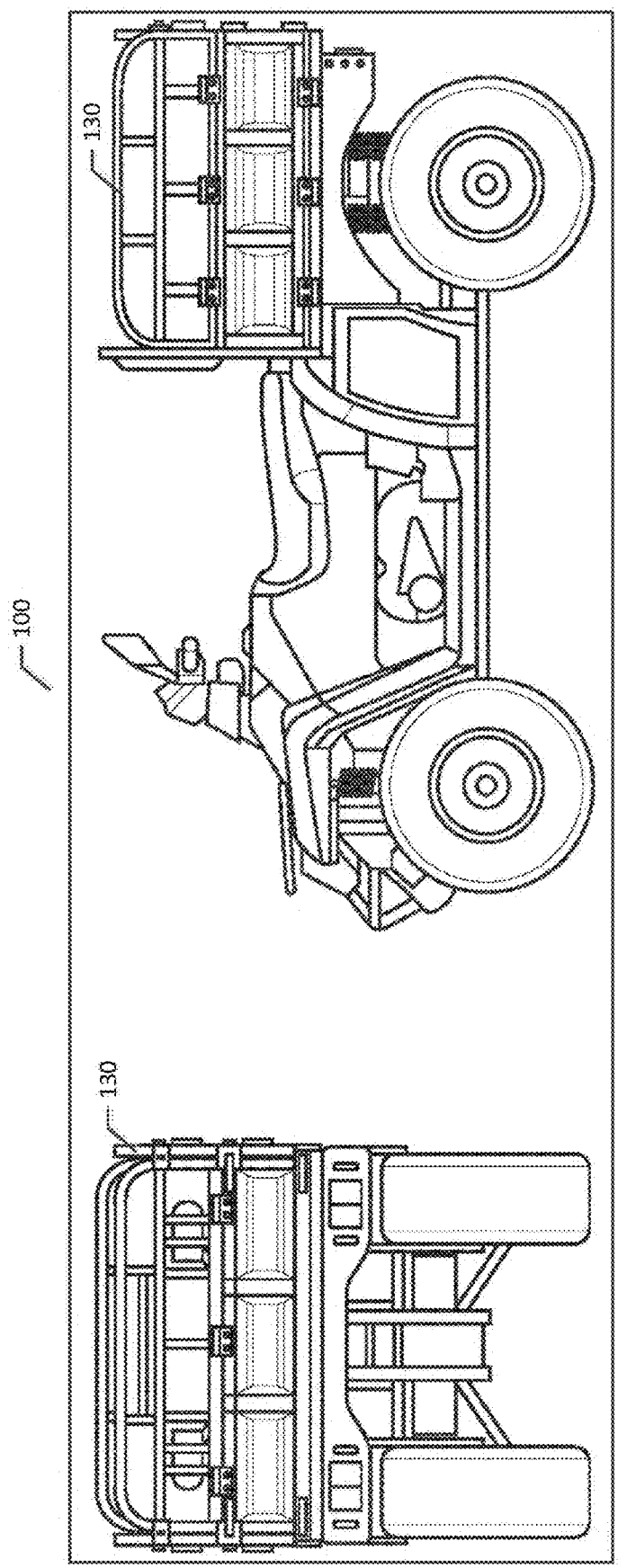
FIGS. 31 and 32 illustrate additional views of an ATV of an example embodiment with a cargo bed installed on the frame of the ATV.
Figure 32:
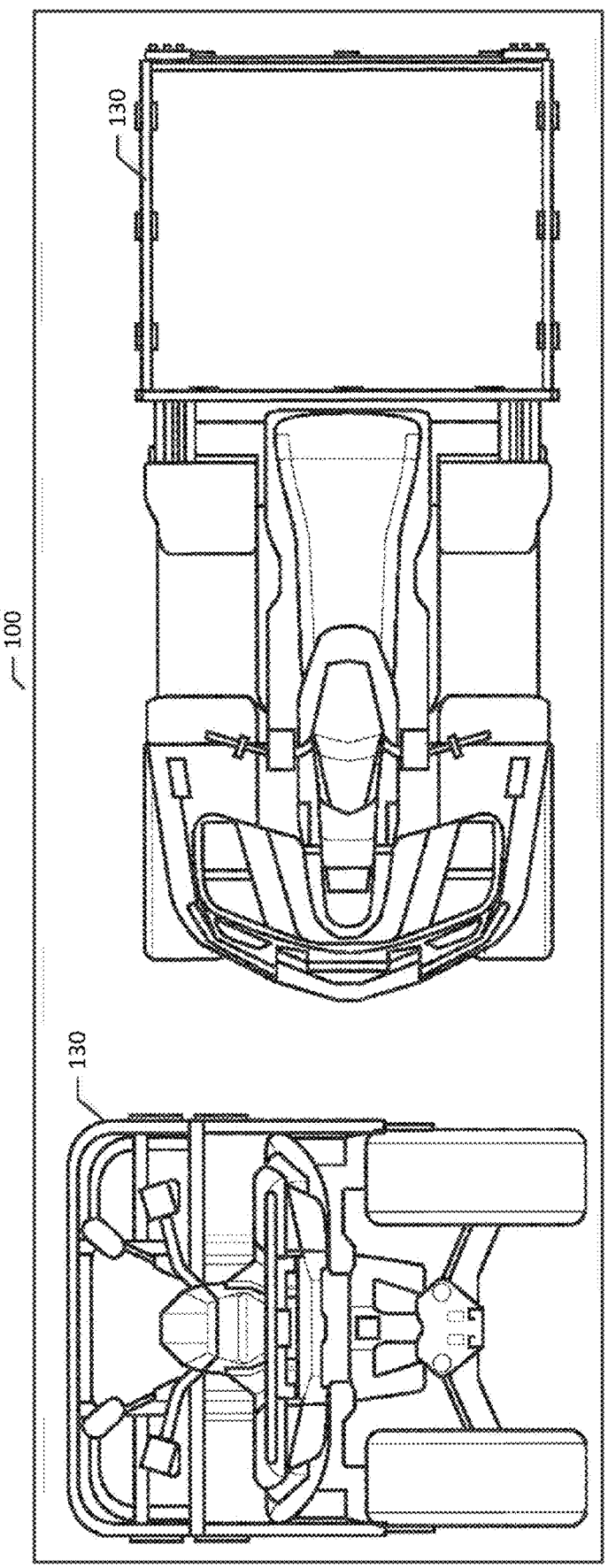
Figure 33:
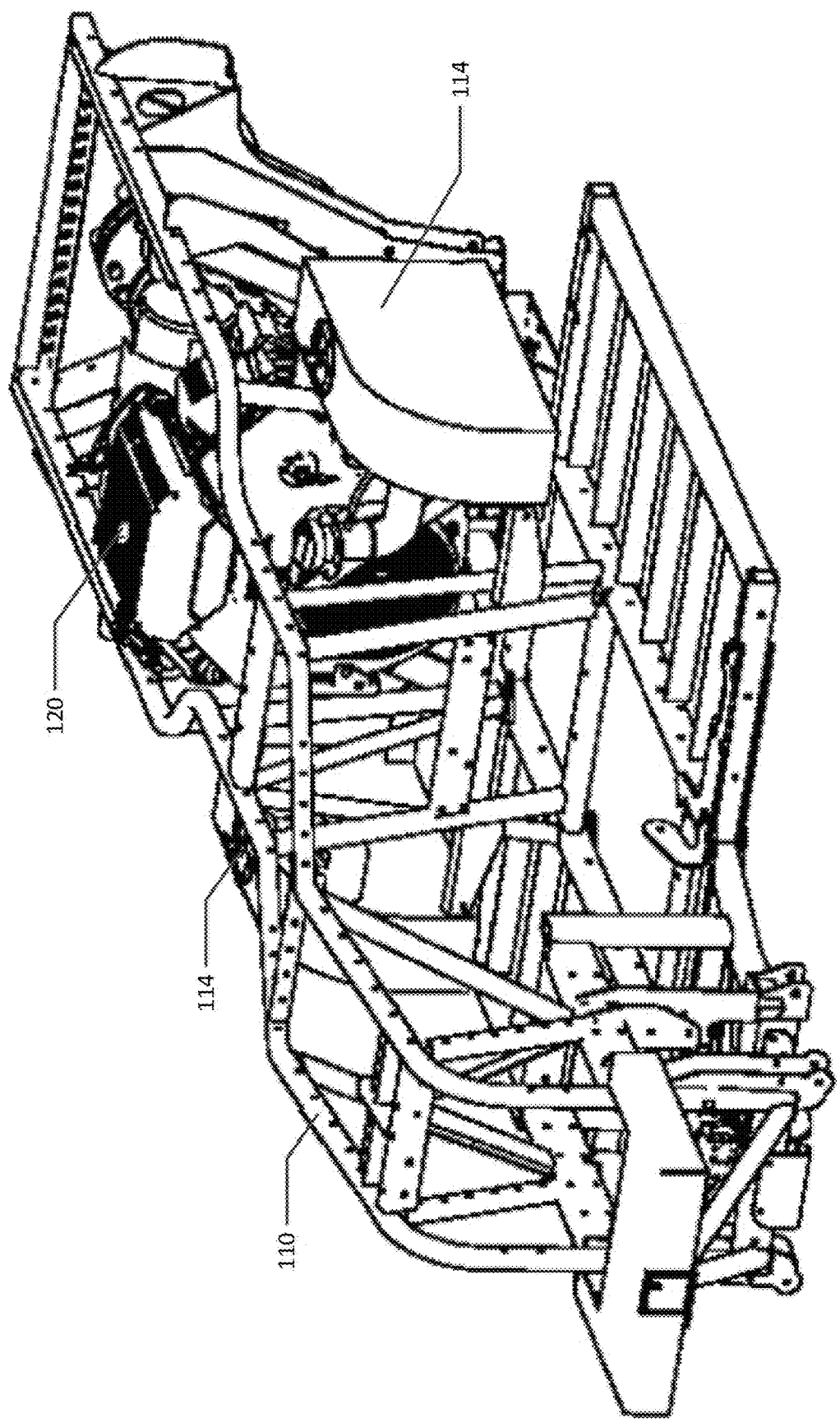
FIGS. 33 through 36 illustrate various views of an ATV frame of an example embodiment wherein configurably positioned fuel tanks can be moved to a position outside of the frame when a PTO module is installed in the frame.
Figure 34:
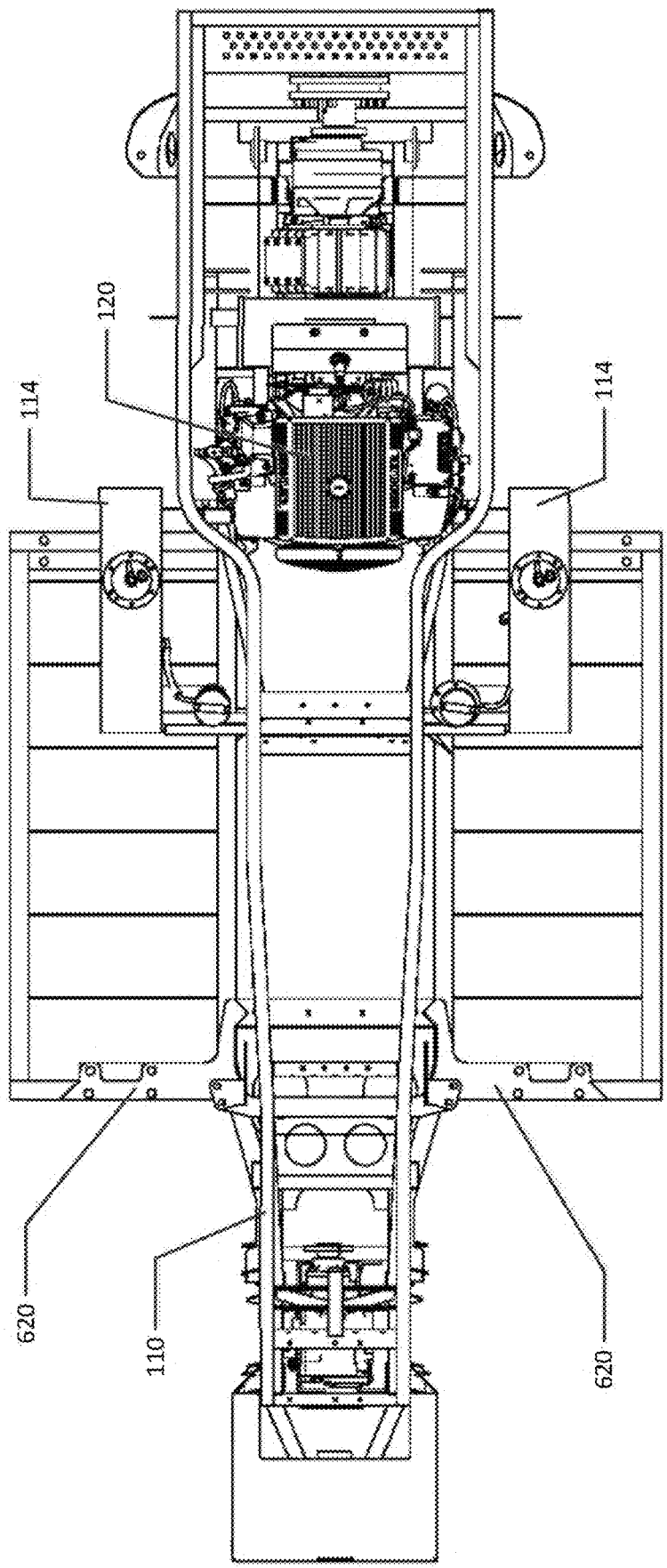
Figure 35:
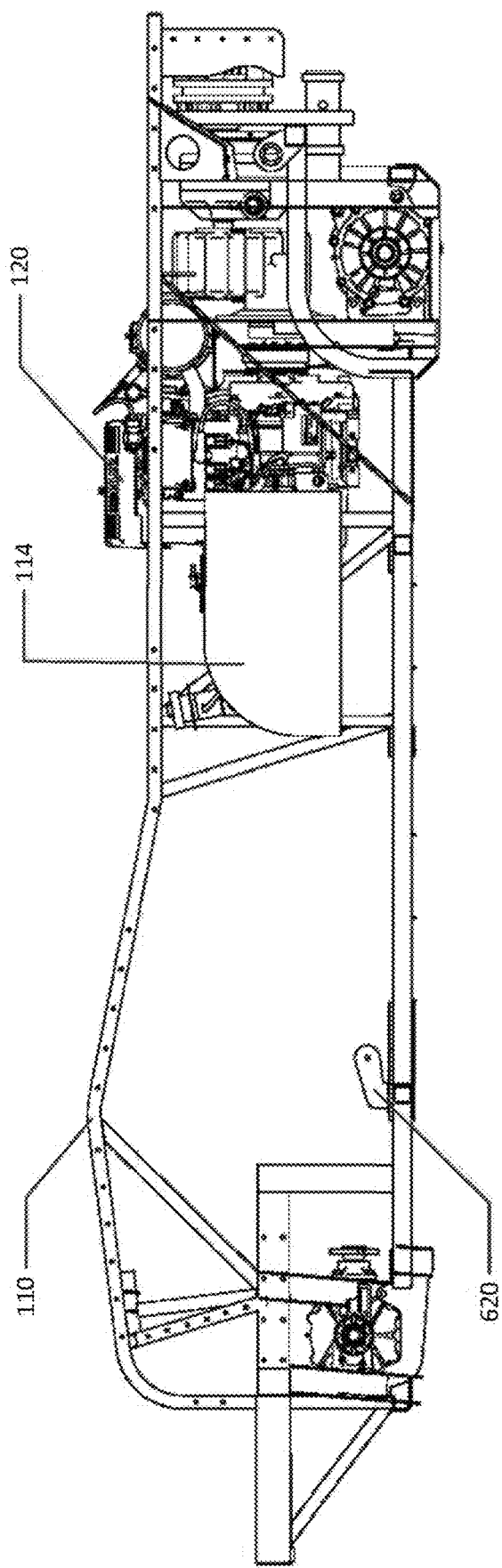
Figure 36:
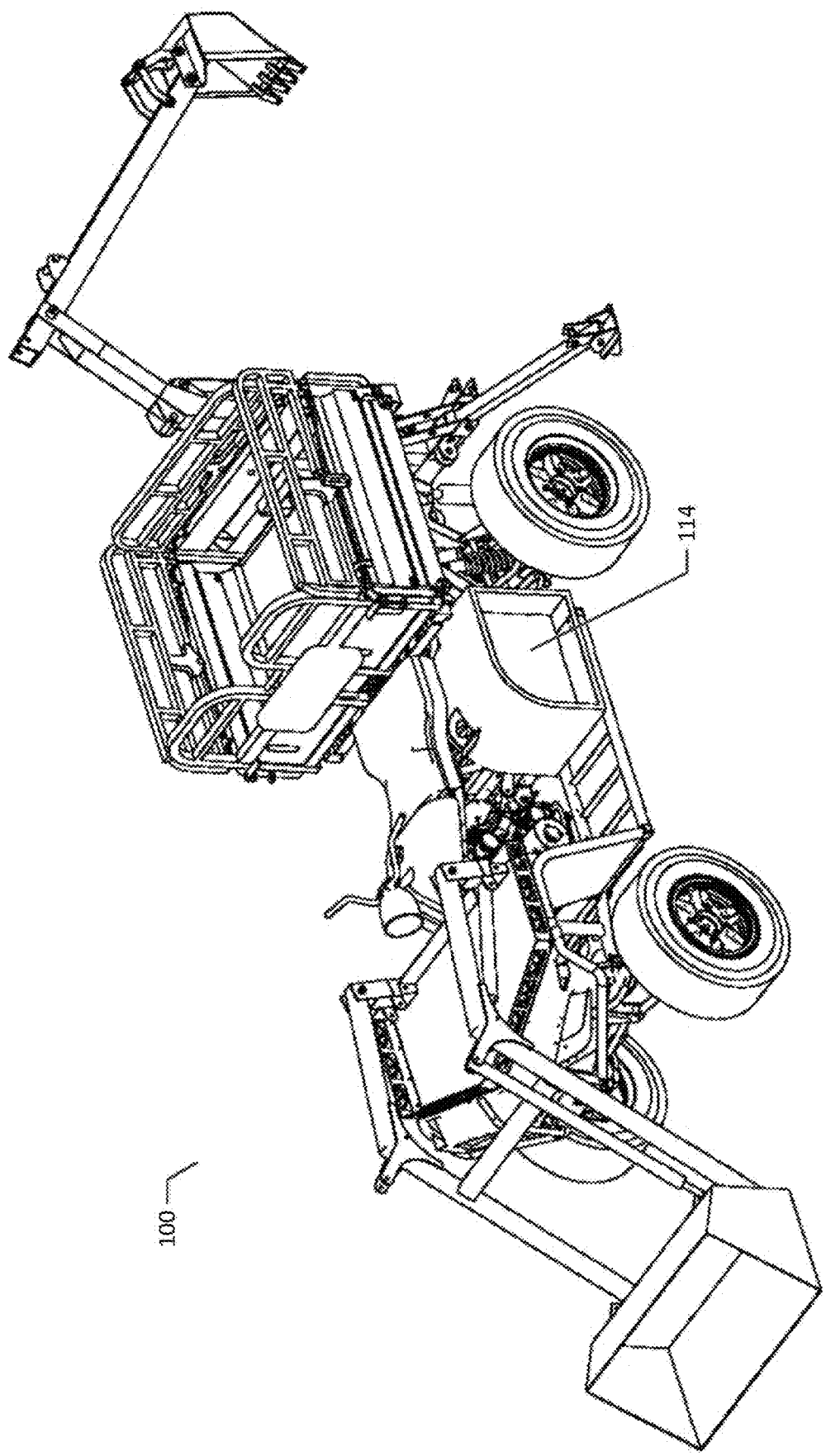
Figure 37:
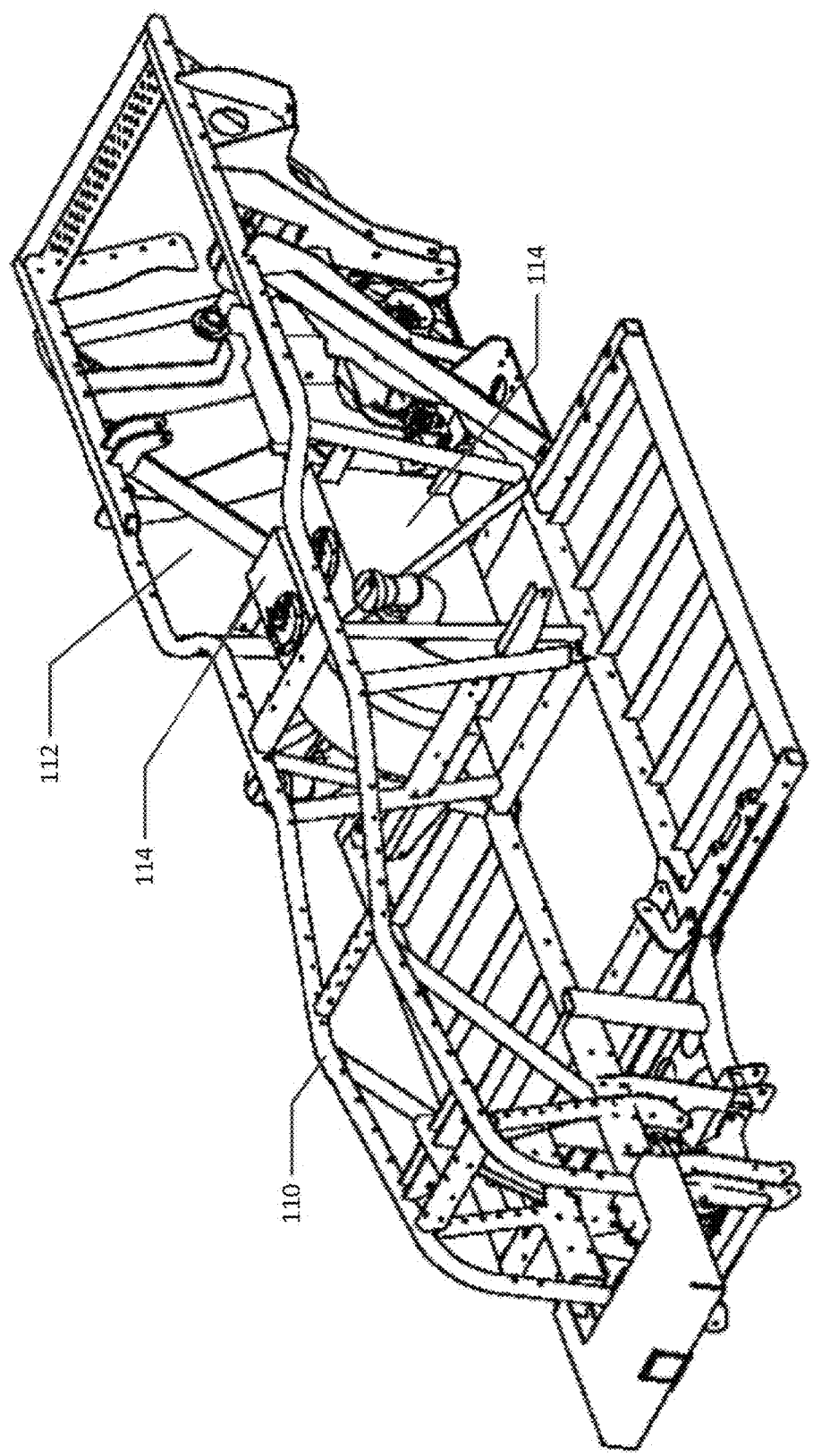
FIGS. 37 through 40 illustrate various views of an ATV frame of an example embodiment wherein configurably positioned fuel tanks can be moved to a position inside of the frame when a PTO module is not installed in the frame.
Figure 38:
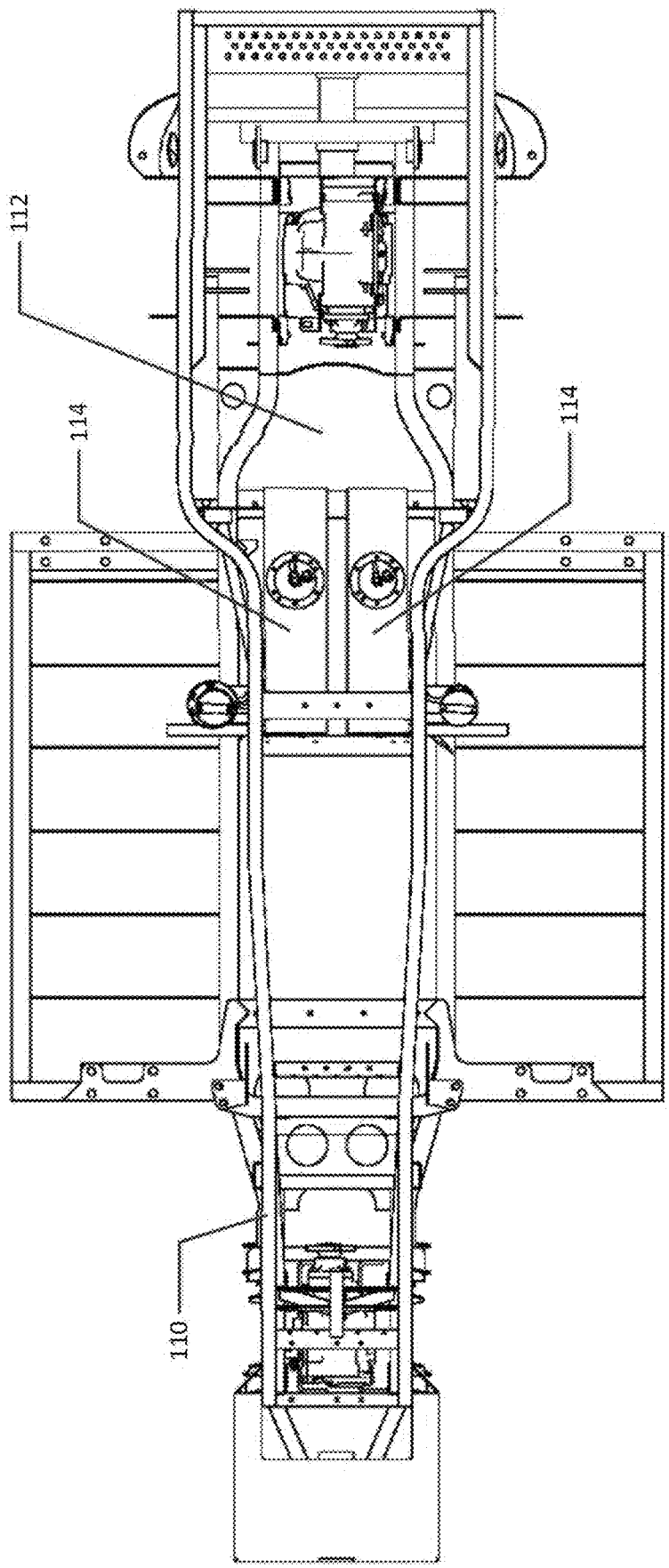
Figure 39:
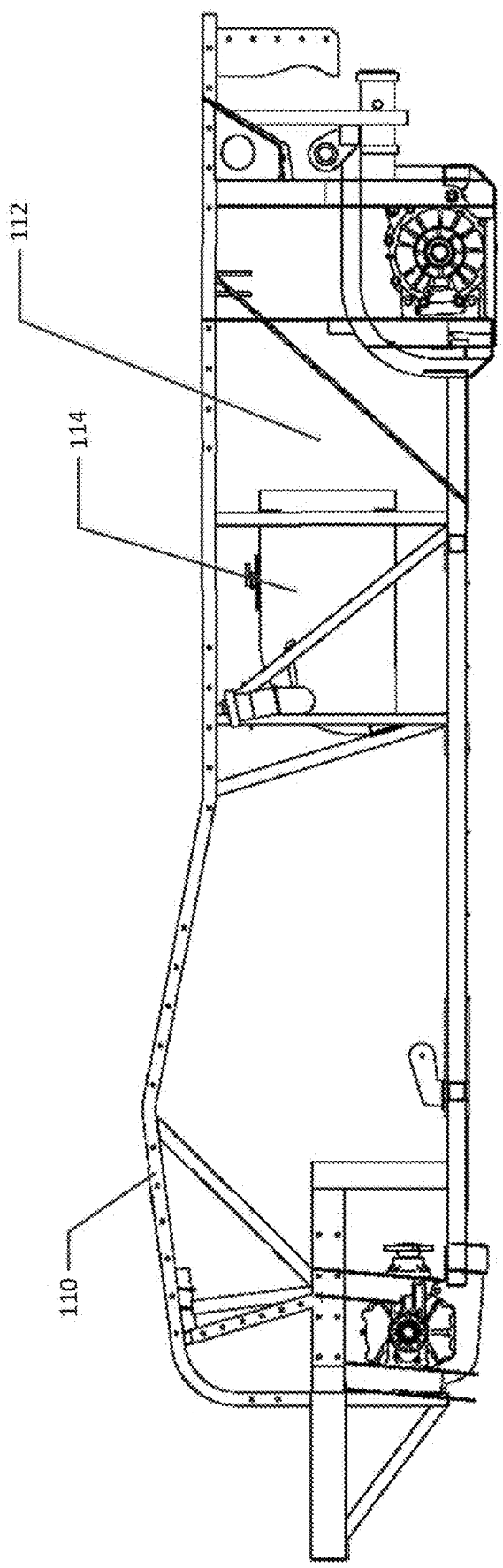

FIGS. 31 and 32 illustrate additional views of an ATV 100 of an example embodiment with a cargo bed 130 installed on the frame 110 of the ATV 100.

FIGS. 33 through 36 illustrate various views of an ATV frame 110 of an example embodiment wherein configurably positioned fuel tanks 114 can be moved to a position outside of the frame 110 when a PTO module 120 is installed in the frame 110. As shown in FIGS. 33 through 36, a PTO module 120 is installed in the frame 110 as described above. In this case, external fuel tanks 114 can be moved to a position outside of the frame 110 and attached to the frame 110 via attach points provided on structural members of the frame 110. The proximity of the fuel tanks 114 to the installed PTO module 120 and the wheel-driving engine 115 enables the PTO module 120 and the wheel-driving engine 115 to draw fuel from fuel tanks 114 via fuel lines when the fuel tanks are positioned outside of the frame 110.

Figure 40:
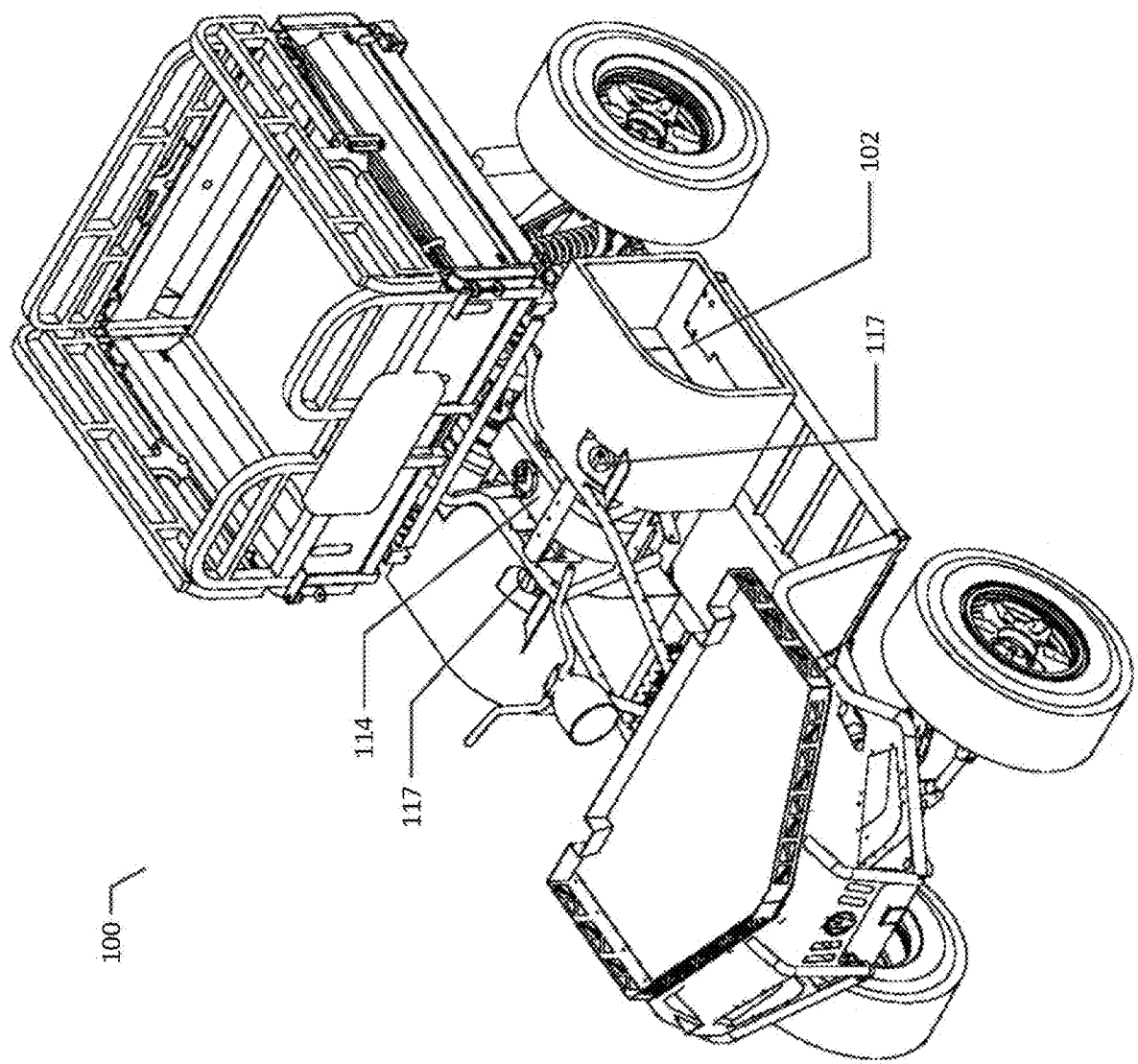

FIGS. 37 through 40 illustrate various views of an ATV frame of another example embodiment wherein configurably positioned fuel tanks 114 can be moved to a position inside of the frame 110 when a PTO module 120 is not installed in the frame 110. As shown in FIGS. 37 through 40, the ATV 100 is configured without a PTO module 120 installed in the frame 110. As such, the void 112 is not occupied by PTO module 120 and therefore remains empty space. In this case, fuel tanks 114 can be moved to a position inside of the frame 110 and attached to the frame 110 via attach points provided on structural members of the frame 110. Because there is no PTO module 120 installed in the frame 110, there is room in part of void 112 to accommodate the fuel tanks 114. Installing the fuel tanks 114 inside of the frame allows the fuel tanks 114 to be centered in the frame for better balancing while the ATV 100 is used for recreational purposes. The proximity of the fuel tanks 114 to the wheel-driving engine 115 enables the wheel-driving engine 115 to draw fuel from fuel tanks 114 via fuel lines when the fuel tanks are positioned inside of the frame 110. When the fuel tanks 114 are installed in a position inside of the frame 110, fuel tank fill openings 117 can be accessed through holes provided in the top of side storage lockers 102 as shown in FIG. 40.

Figure 41:
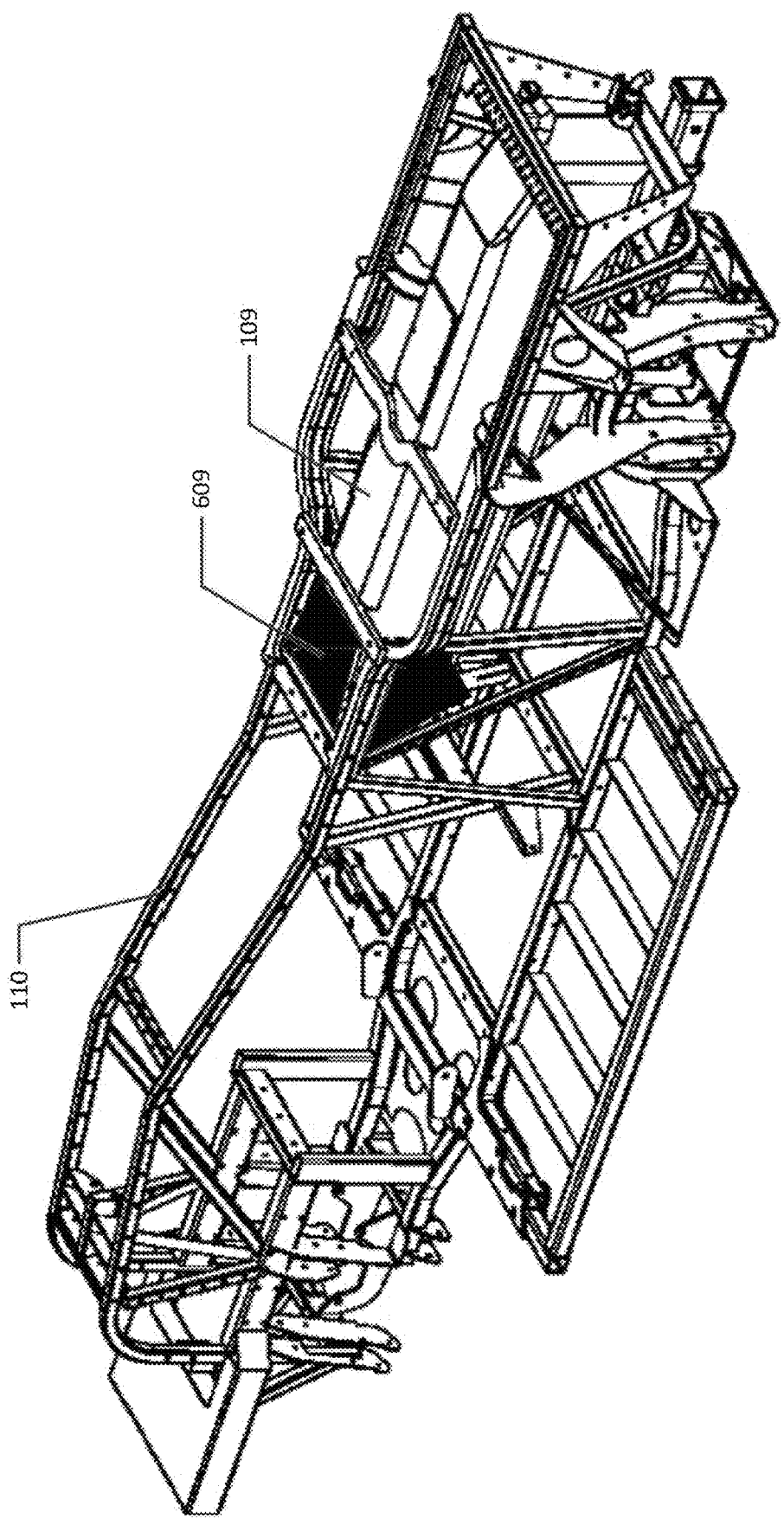
FIGS. 41 through 45 illustrate various views of an ATV frame of an example embodiment wherein a removable water tank can be positioned inside of the frame when a PTO module is not installed in the frame.
Figure 42:
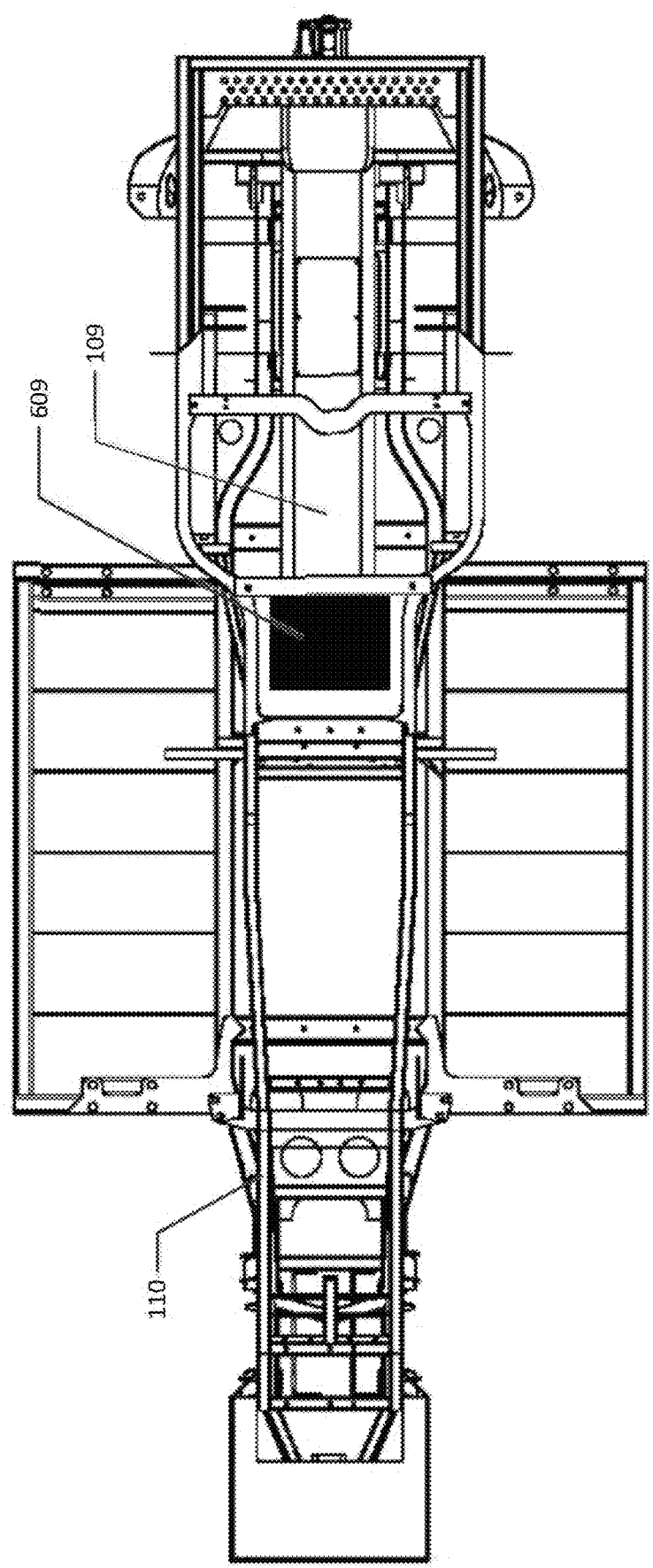
Figure 43:
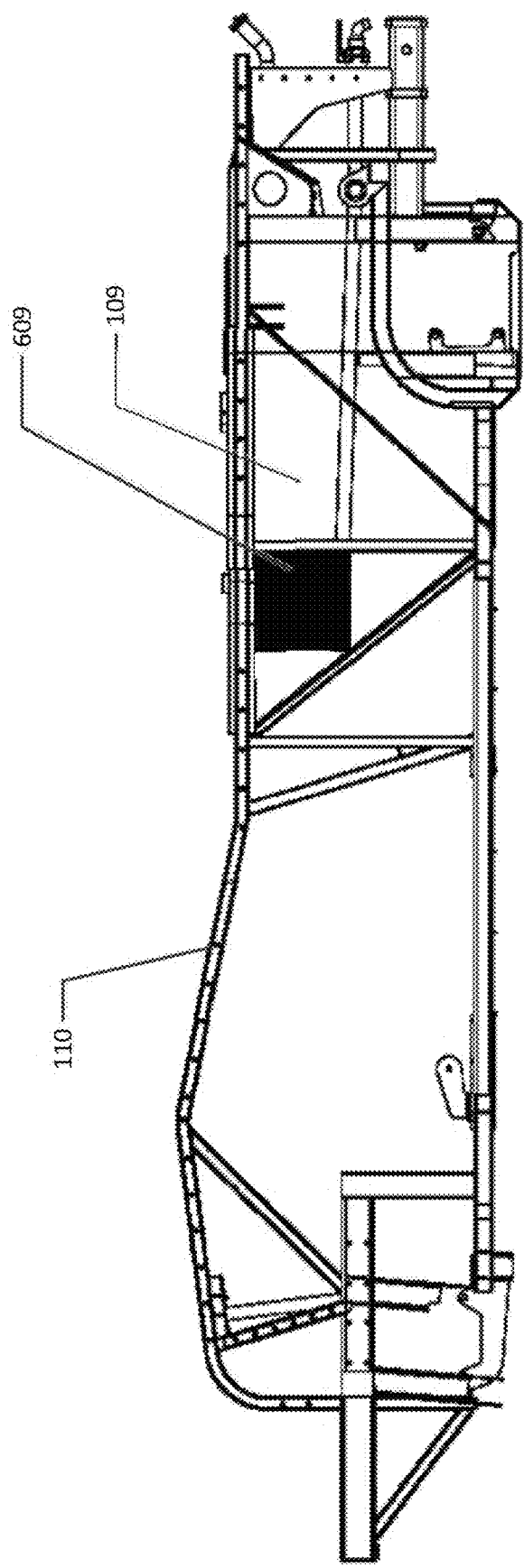
Figure 44:
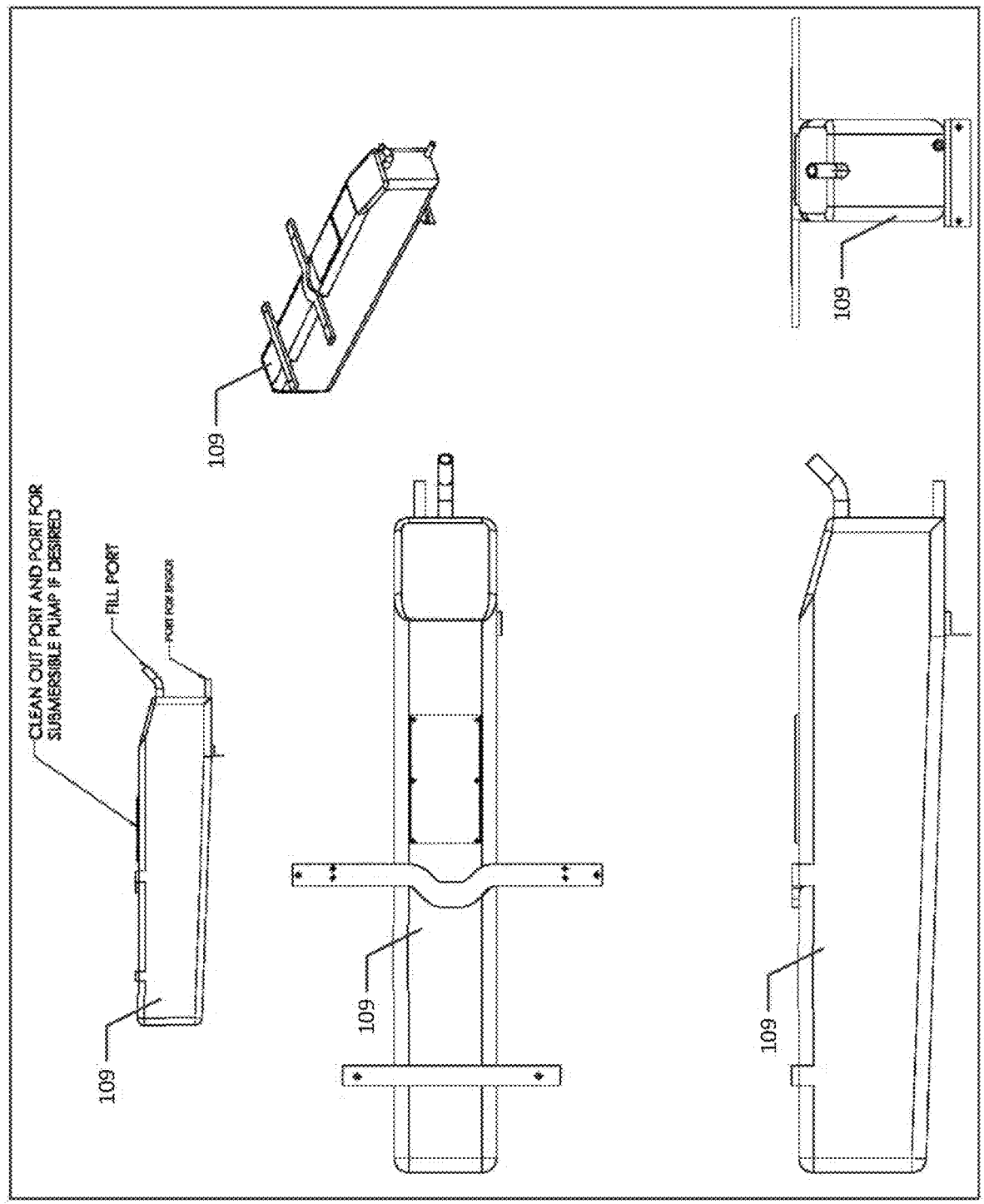
Figure 45:
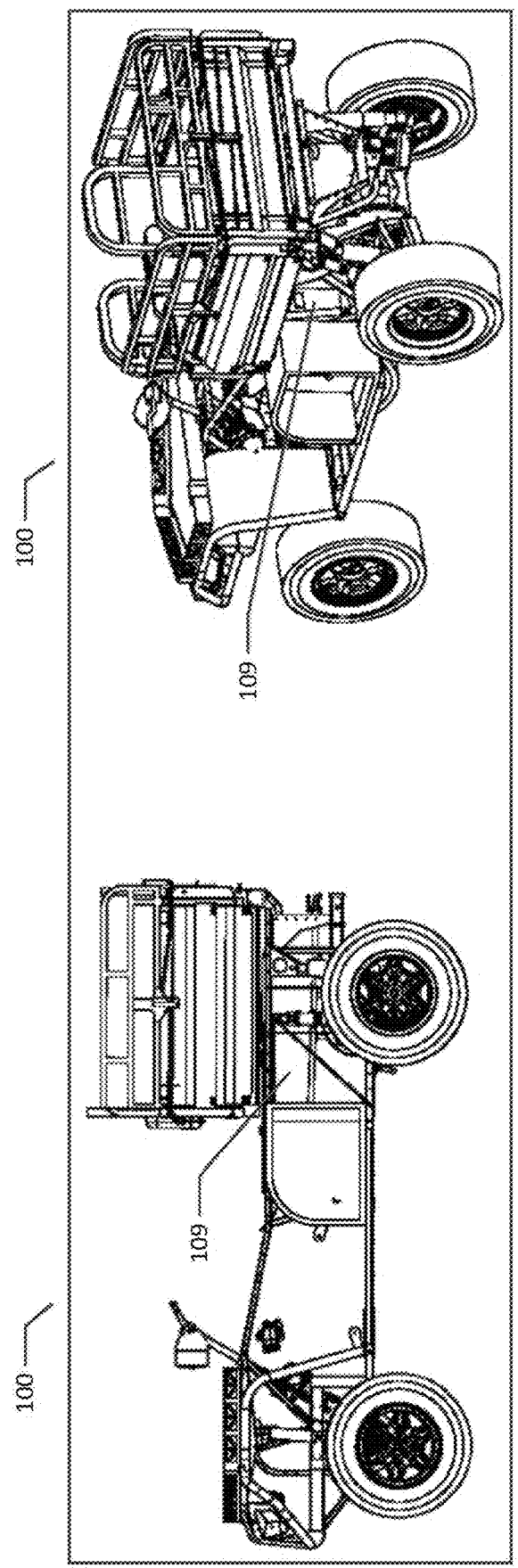

FIGS. 41 through 45 illustrate various views of an ATV frame 110 of an example embodiment wherein a removable water tank and water pump 109 can be positioned inside of the frame 110 when a PTO module 120 is not installed in the frame 110. As shown in 41 through 45, the ATV 100 is configured without a PTO module 120 installed in the frame 110. As such, the void 112 is not occupied by PTO module 120 and therefore remains empty space. In this case, a removable water tank and water pump 109 can be installed in a position inside of the frame 110 and attached to the frame 110 via attach points provided on structural members of the frame 110. Because there is no PTO module 120 installed in the frame 110, there is room in part of void 112 to accommodate the removable water tank and water pump 109. The removable water tank and water pump 109 can include a water fill opening or fill port at a rear end of the water tank 109. Additionally, FIGS. 41 through 43 illustrate a fuel tank 609, which can be installed inside of the frame 110 adjacent to the water tank 109. Thus, both the fuel tank 609 and the water tank 109 can be present in the frame 110 at the same time. Installing the fuel tank 609 inside of the frame allows the fuel tank 609 to be centered in the frame for better balancing while the ATV 100 is used for recreational purposes. FIG. 44 illustrates various views of the removable water tank and water pump 109 isolated from the ATV 100. FIG. 45 illustrates various views of the removable water tank and water pump 109 installed in the ATV 100 for an example embodiment.

Multi-Function Cargo Bed

An important advantage of the unique construction and configuration of the ATV frame 110 of an example embodiment is its ability to accommodate the installation of a multi-function cargo bed 130 on the rear portion of the ATV 100. The cargo bed 130 is configured with a scissor lift 133 to lift the bed to a considerable height (e.g., 6'). Moreover, the cargo bed 130 is configured with unique locking and pivoting structures enabling the cargo bed 130 to tilt to the left, right, or rear of the ATV 100. This tilting action enables the cargo bed 130 to be used for dumping material to the sides or behind the ATV 100 while the ATV 100 is moving or at a standstill. Another feature provided by the multi-function cargo bed 130 of an example embodiment is the highly configurable railing 131 provided around all four sides of the cargo bed 130. These railings 131 provide locking and hinge structures enabling the railing 131 to be raised, lowered, partially raised, dropped completely downward, or removed entirely on each or any of at least three of the four sides. As such, the cargo bed railing 131 can be configured and adapted for a variety of uses and for a variety of different loads. Additionally, in a particular embodiment, the cargo bed 130 can be configured with a camping kit 139 having a tent. In a unique departure from the conventional ATV camping systems, the camping kit 139 of an example embodiment enables the setup of the tent from the cargo bed 130 of the ATV 100 while enabling the ATV 100 to be detached from the tent, which can be left free-standing. As a result, the ATV 100 is free to venture away from the tent while the camping kit 139 provides shelter for campers.

Figure 46:
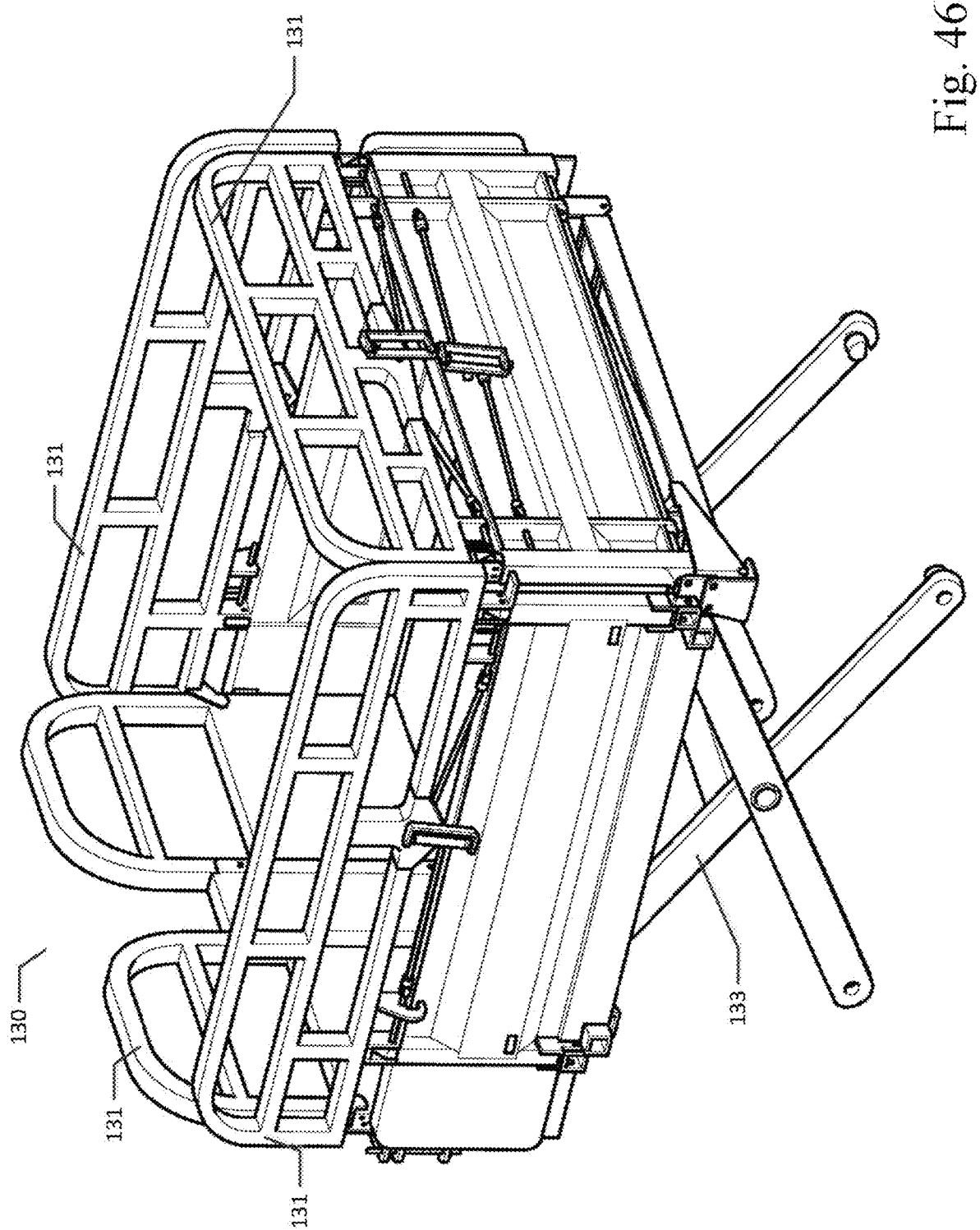
FIG. 46 illustrates a perspective view of an example embodiment showing a removable cargo bed for an ATV, the sides of the cargo bed being in a full upright position.
Figure 47:
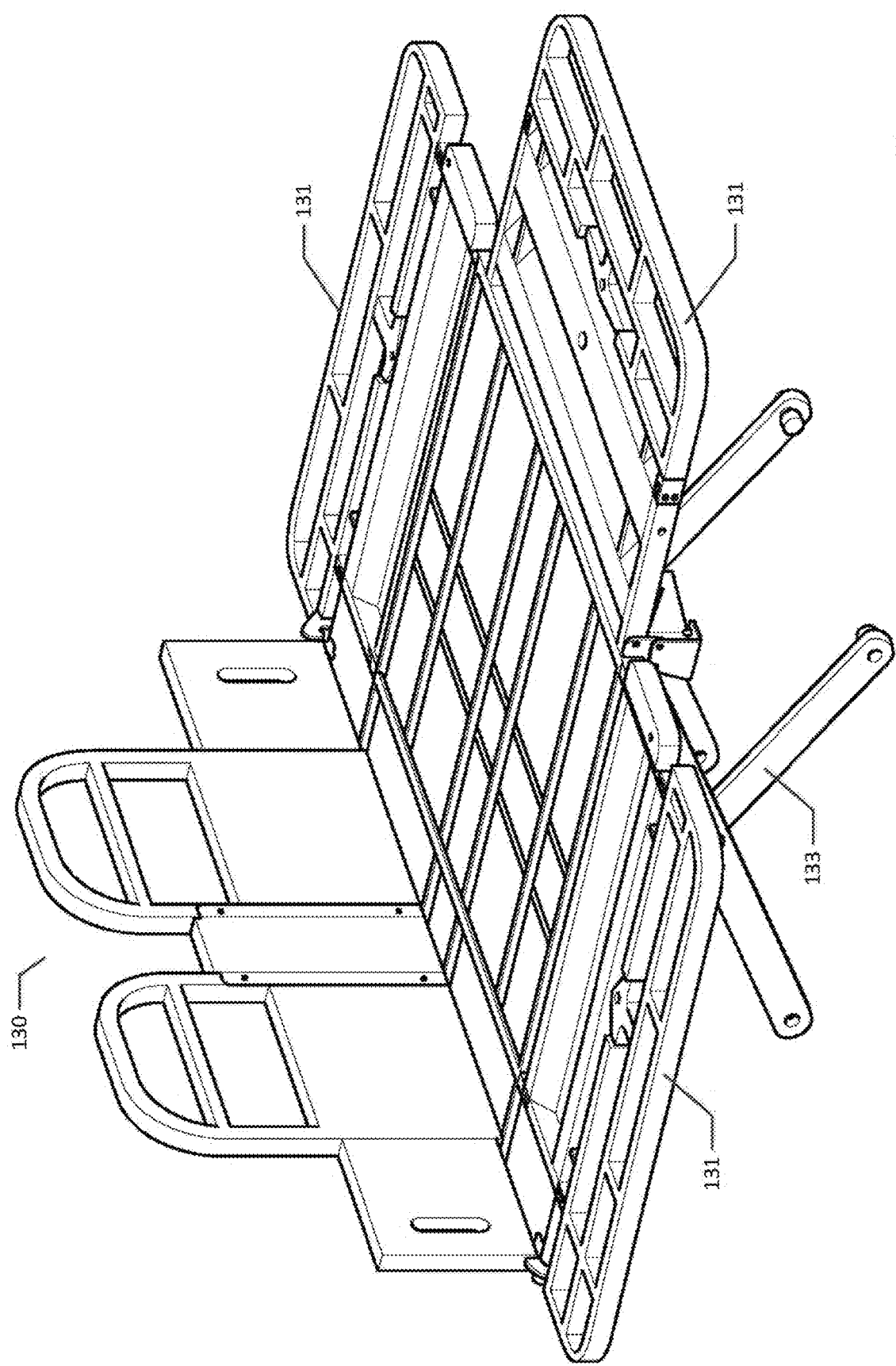
FIG. 47 illustrates a perspective view of an example embodiment showing a removable cargo bed for an ATV, the three sides of the cargo bed being in a full downward position.
Figure 48:
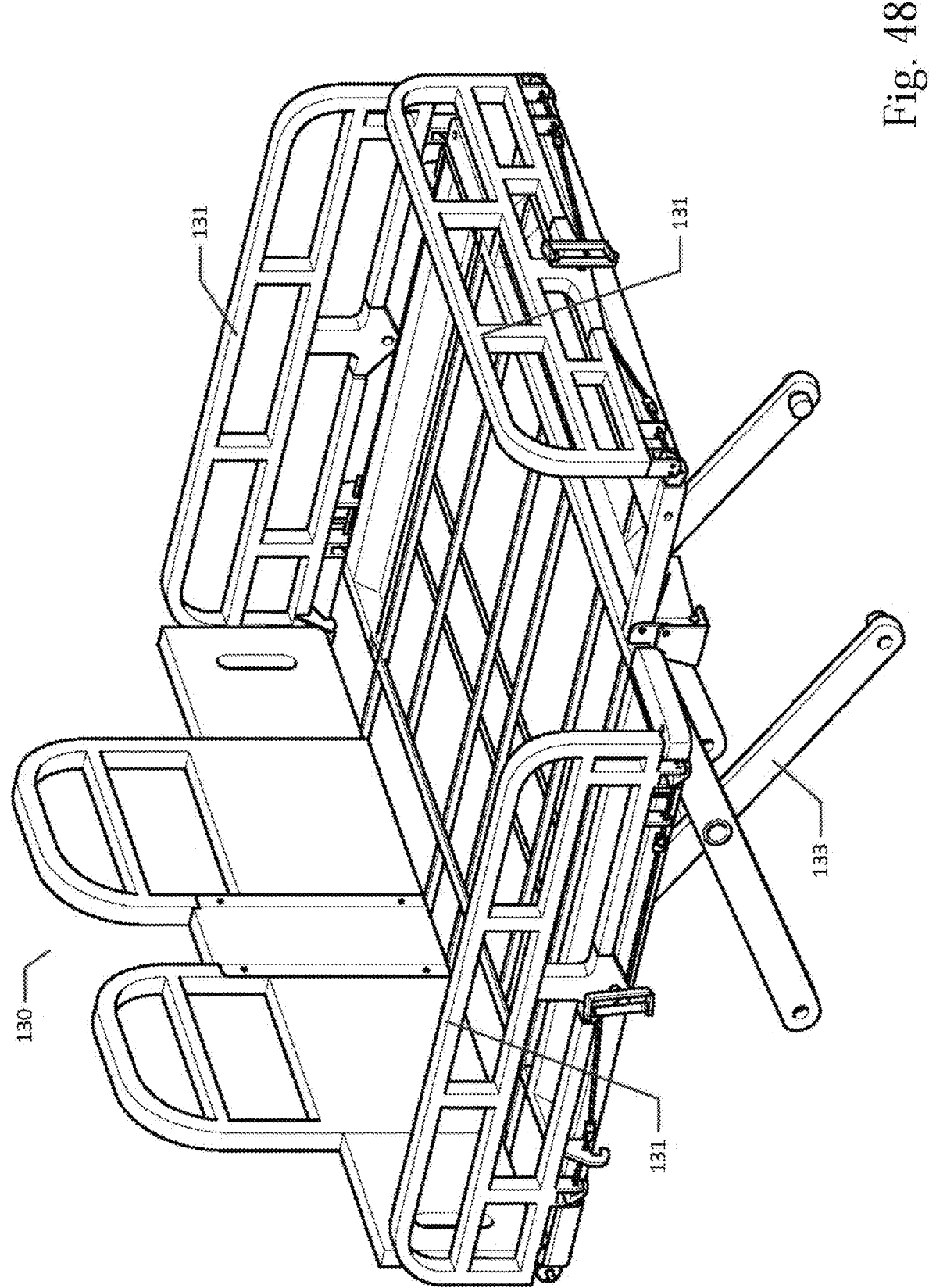
FIG. 48 illustrates a perspective view of an example embodiment showing a removable cargo bed for an ATV, the three sides of the cargo bed being in a partially upright position.

FIG. 46 illustrates a perspective view of an example embodiment showing a removable cargo bed 130 for an ATV 100, the sides or railings 131 of the cargo bed 130 being in a full upright position. Lower releasable latches on each side of the cargo bed 130 can be secured in a latched position to keep the sides 131 in the full upright position. FIG. 47 illustrates a perspective view of an example embodiment showing a removable cargo bed 130 for an ATV 100, the three sides or railings 131 of the cargo bed 130 being in a full downward position. Lower hinges are provided on each of the three sides to enable the three sides or railings 131 of the cargo bed 130 to be configured in a full downward position. The lower releasable latches on each side of the cargo bed 130 can be released from a latched position to allow the sides 131 to assume the full downward position. Alternatively, any of the three sides 131 can be independently raised to the full upright position or lowered to the full downward position. FIG. 48 illustrates a perspective view of an example embodiment showing a removable cargo bed 130 for an ATV 100, the three sides or railings 131 of the cargo bed 130 being in a partially upright position. Upper hinges are provided on each of the three sides to enable the three sides or railings 131 of the cargo bed 130 to be configured in a partially upright position. Upper releasable latches on each side of the cargo bed 130 can be secured in a latched position to keep the sides 131 in the partially upright position. Alternatively, any of the three sides 131 can be independently raised to the full upright position, partially raised to the partially upright position, or lowered to the full downward position.

Figure 49:
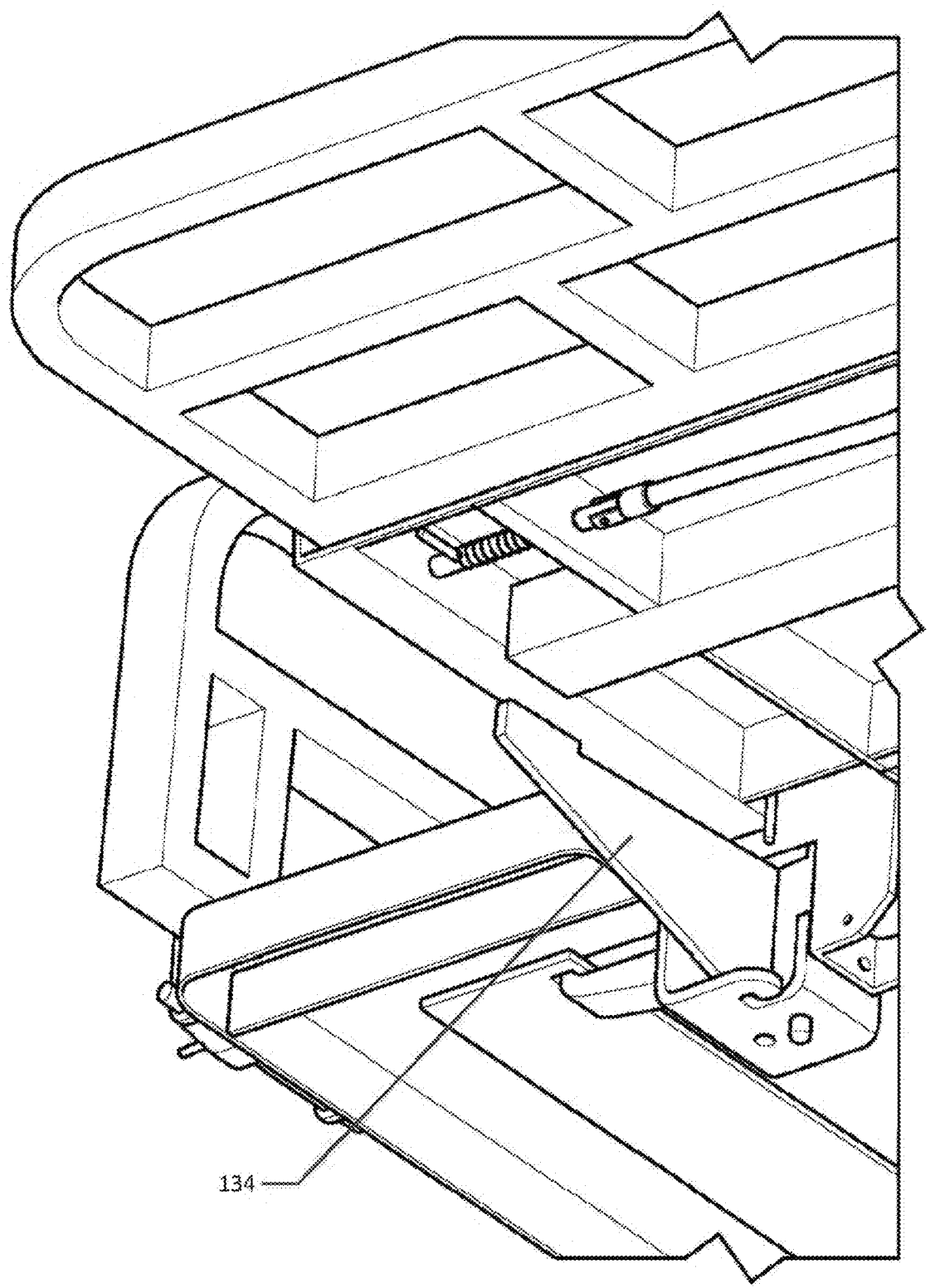
FIGS. 49 through 55 illustrate an example embodiment of a removable cargo bed for an ATV, including support and locking mechanisms for the three sides of the cargo bed to enable configuration of the sides of the cargo bed in a full upright position, a partially upright position, or a full downward position.
Figure 50:
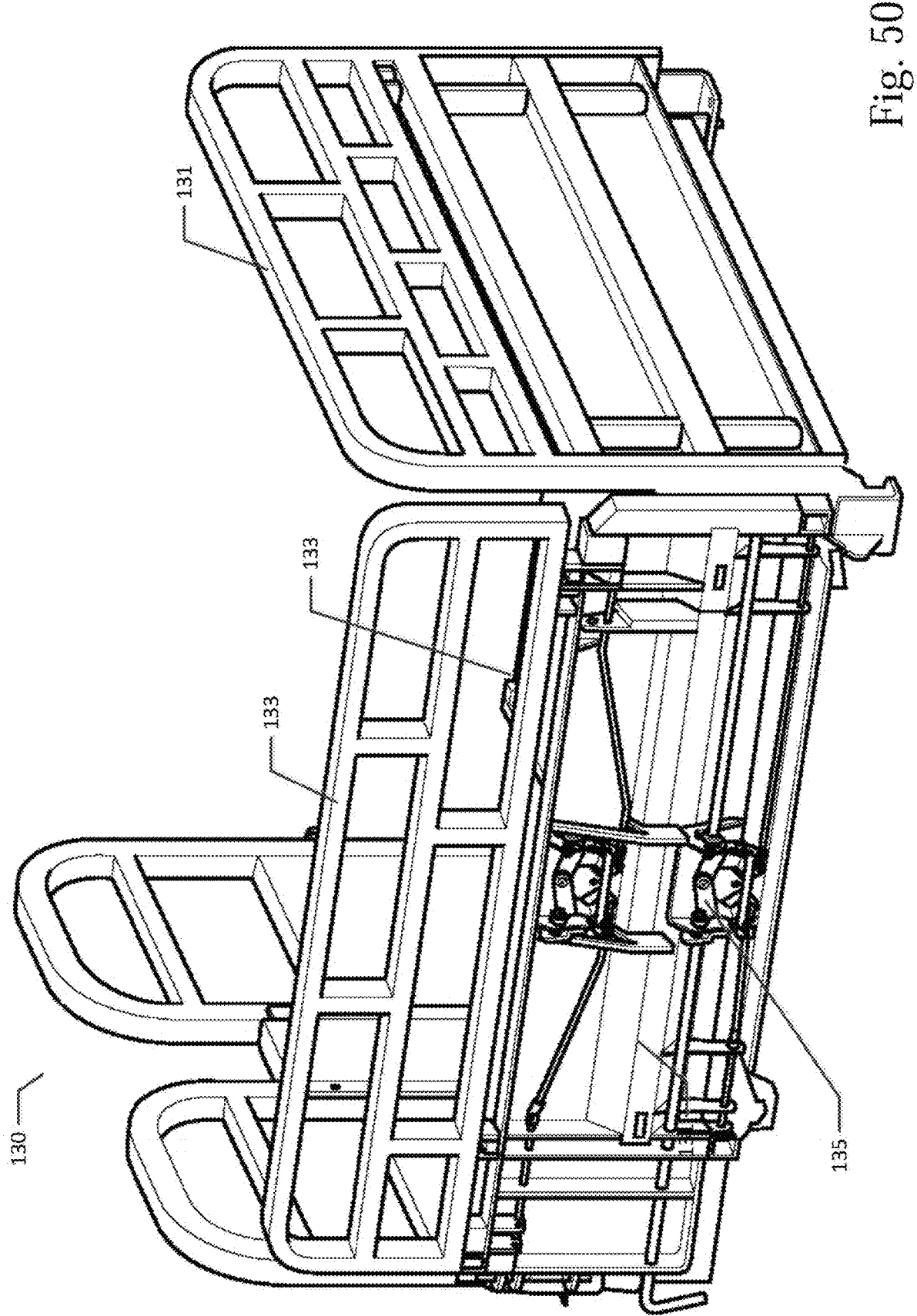
Figure 51:
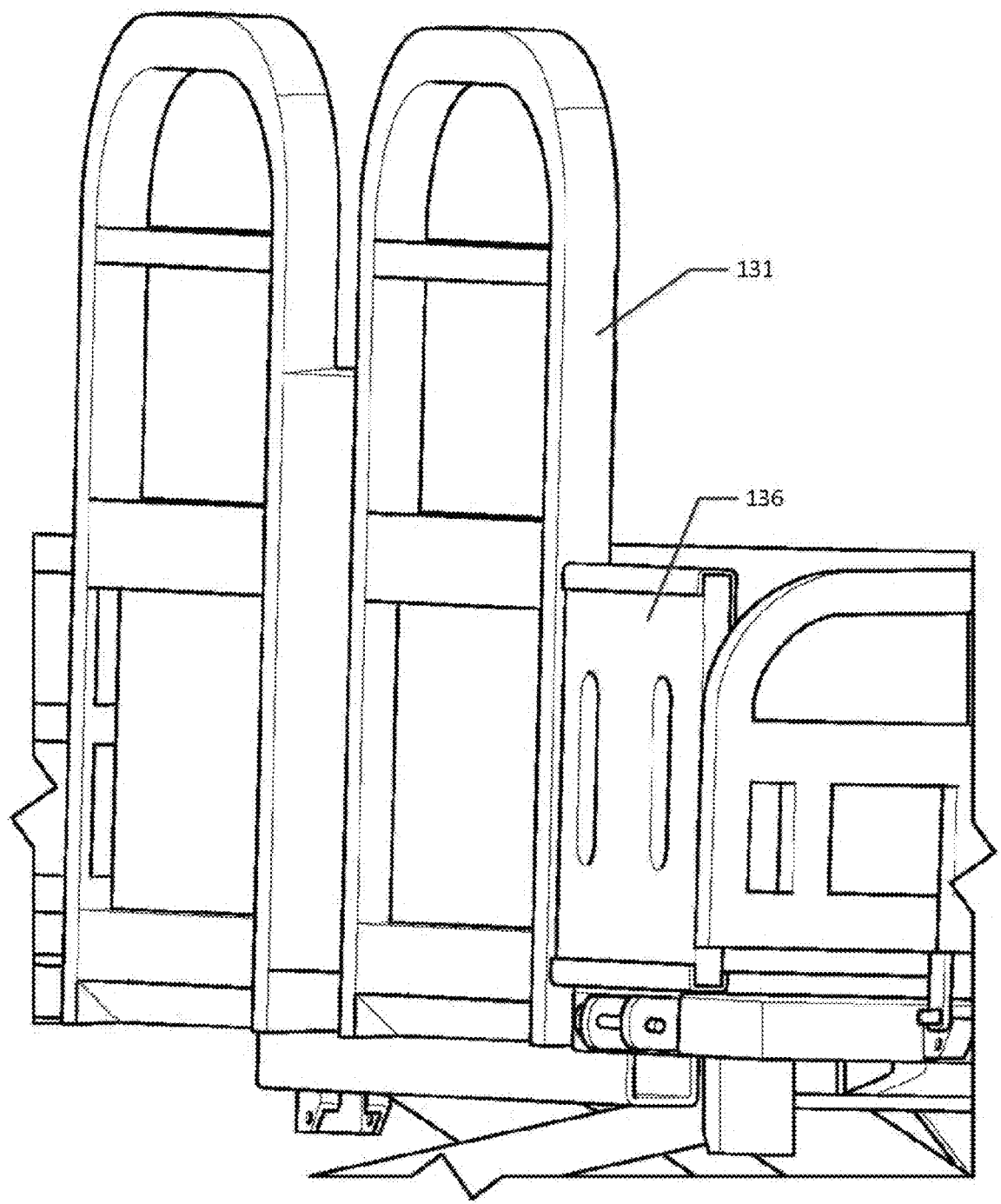
Figure 52:
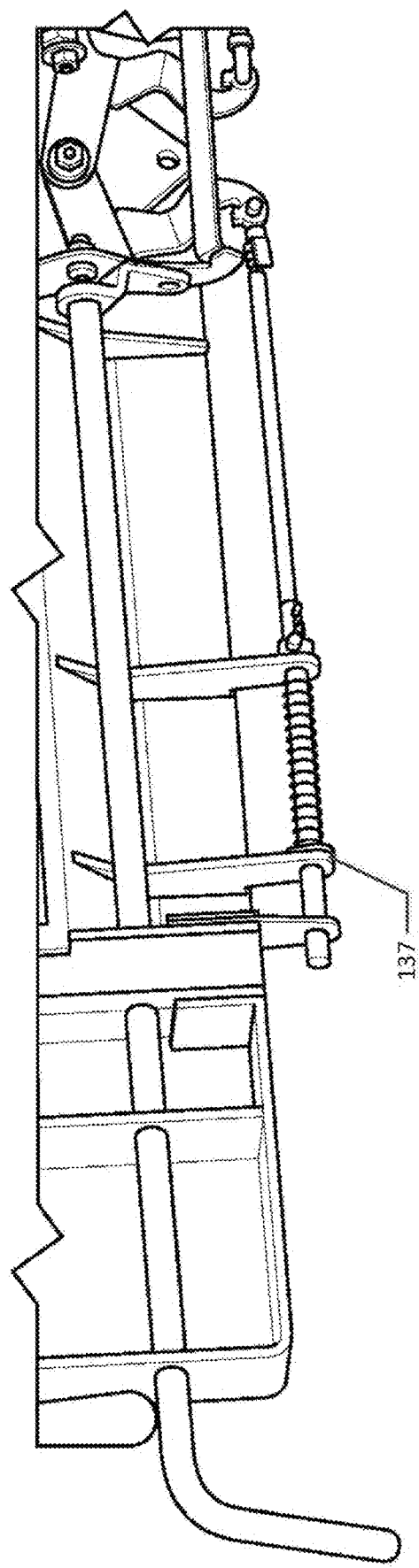
Figure 53:
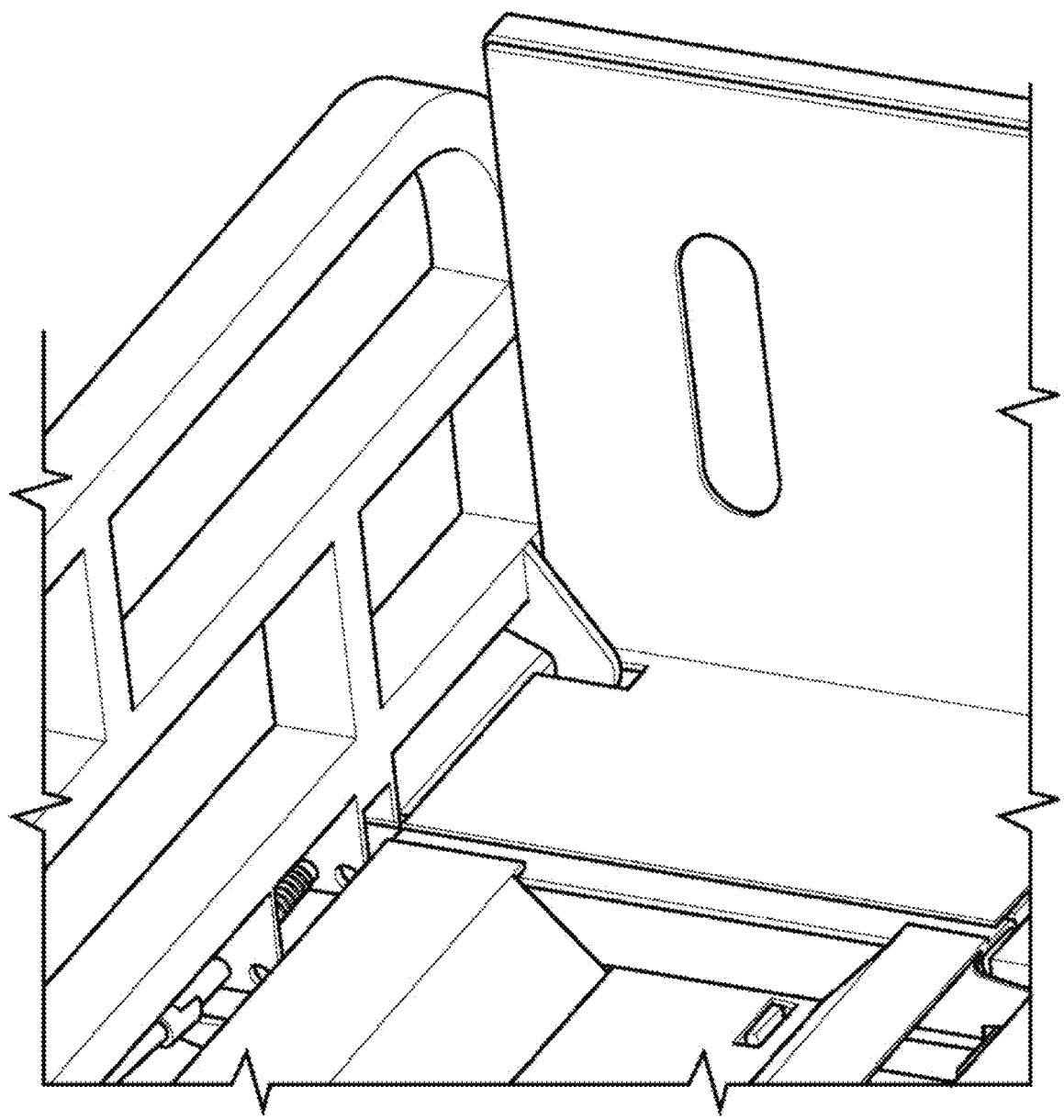
Figure 54:
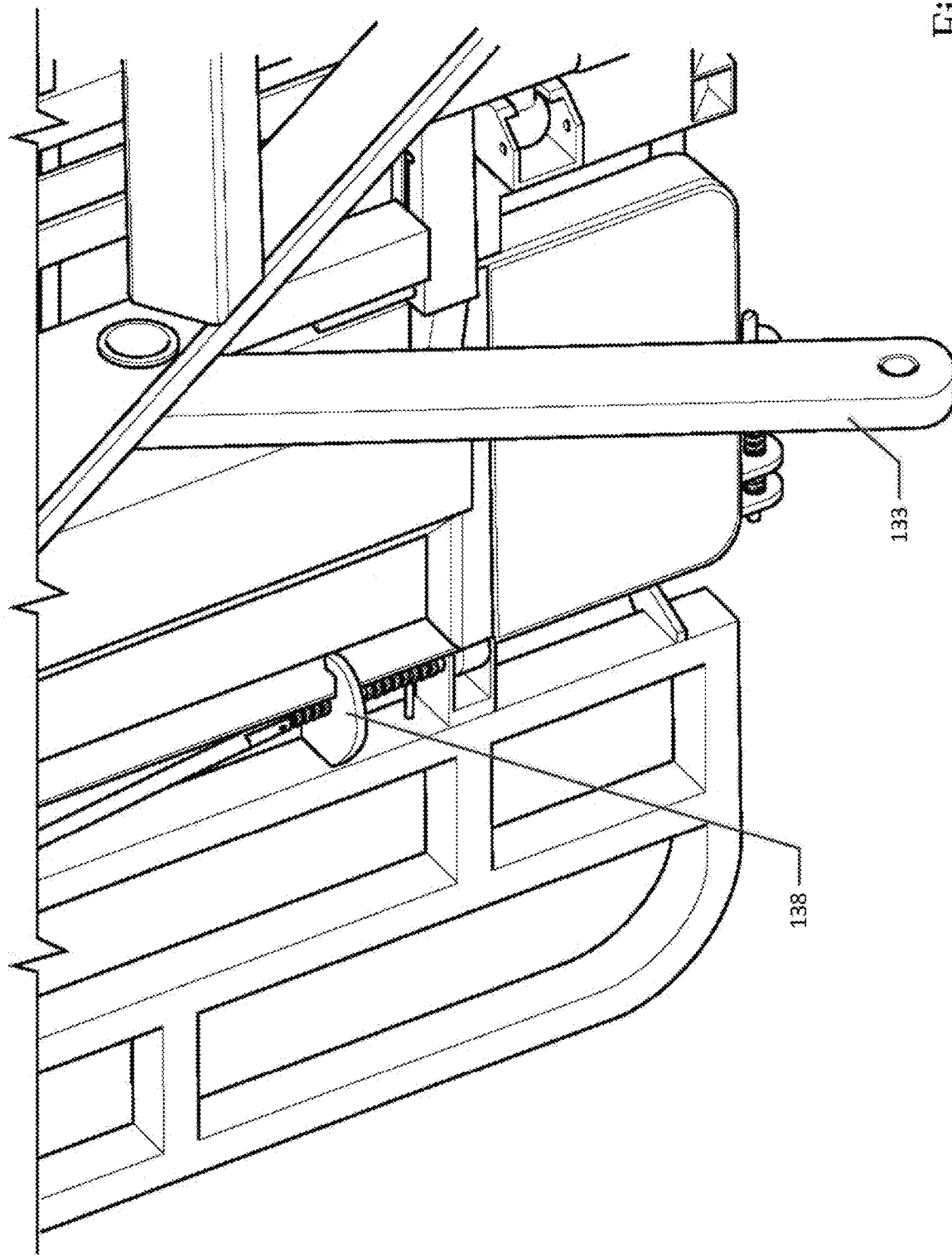
Figure 55:
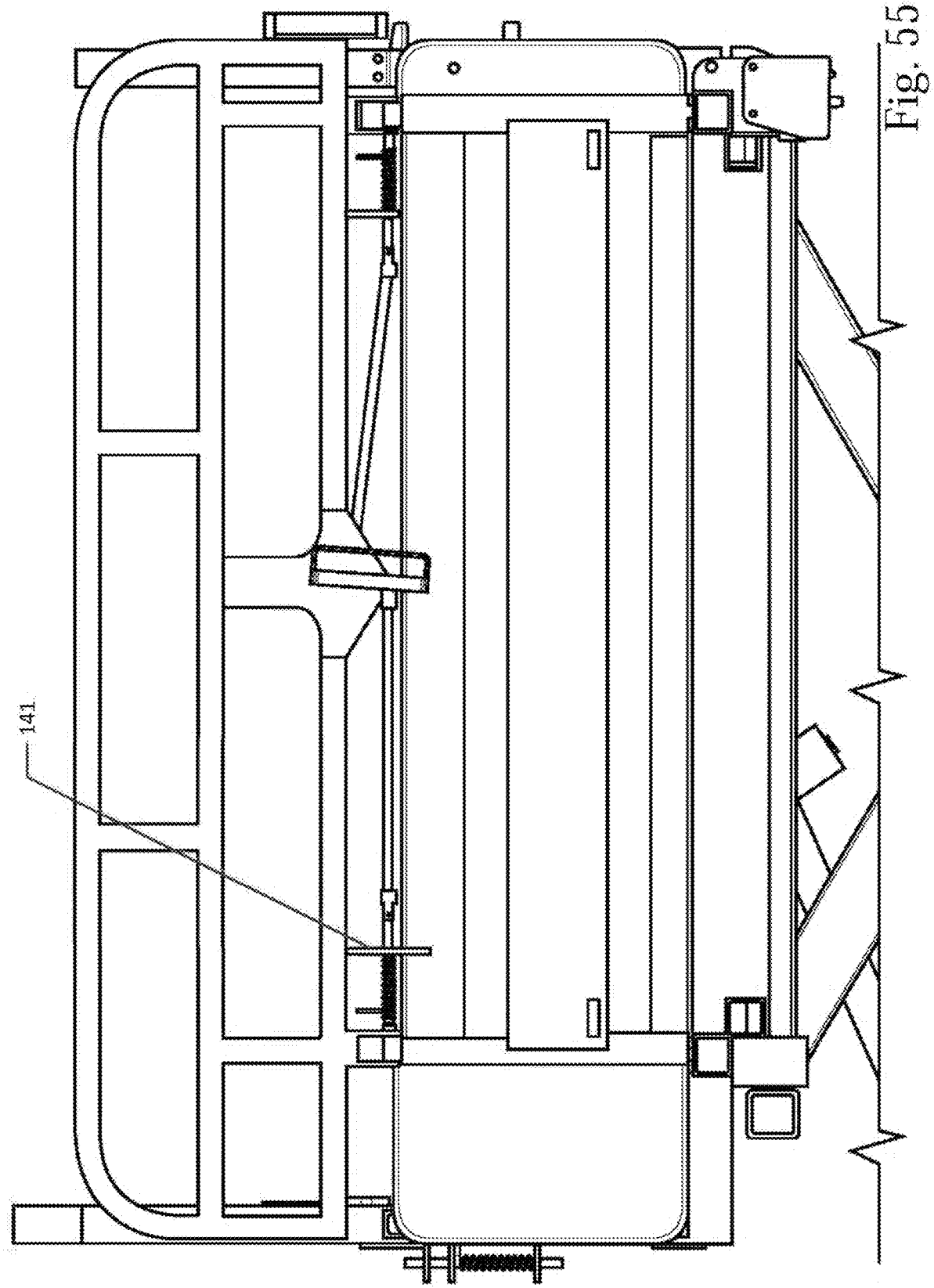

FIGS. 49 through 55 illustrate an example embodiment of a removable cargo bed 130 for an ATV 100, including support and locking mechanisms for the three sides or railings 131 of the cargo bed 130 to enable configuration of the sides of the cargo bed in a full upright position, a partially upright position, or a full downward position. FIG. 49 illustrates a support arm 134 provided to support sides or railings 131 when in the full downward position. FIG. 50 illustrates a lower releasable latch 135 with a handle to release the lower hinge. FIG. 51 illustrates a slide plate 136 provided in a front railing 131 of the cargo bed 130. The slide plate 136 enables an operator to slide the slide plate 136 open to obtain access or a view of the interior of the cargo bed 130. Alternatively, the operator can slide the slide plate 136 closed to remove access or view of the interior of the cargo bed 130. FIG. 52 illustrates a latch mechanism 137 and handle enabling an operator to open or close a lower portion of a railing 131 of cargo bed 130 from an operator seated position. FIG. 53 illustrates another support arm provided to support sides or railings 131. FIG. 54 illustrates a support arm 138 provided to support sides or railings 131 when in the downward position. FIG. 55 illustrates an upper releasable latch 141 with a handle to release the upper hinge of a railing 131 of cargo bed 130.

Figure 56:
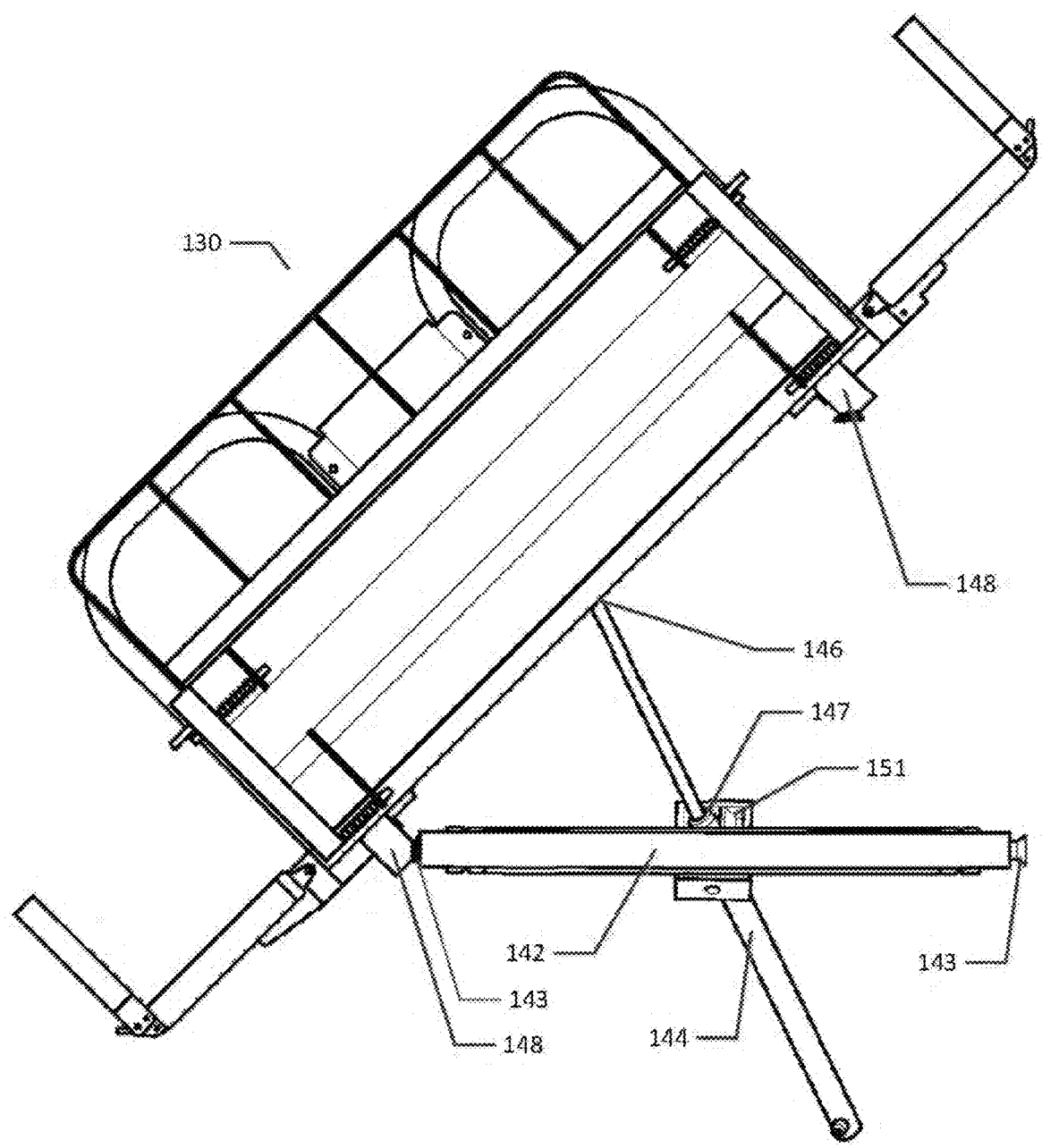
FIGS. 56 and 57 illustrate an example embodiment of a removable cargo bed for an ATV, including support, pivot, and lifting mechanisms for the cargo bed to enable the cargo bed to be tilted to the left, right, or rearward for multi-directional cargo bed tipping/dumping.
Figure 57:
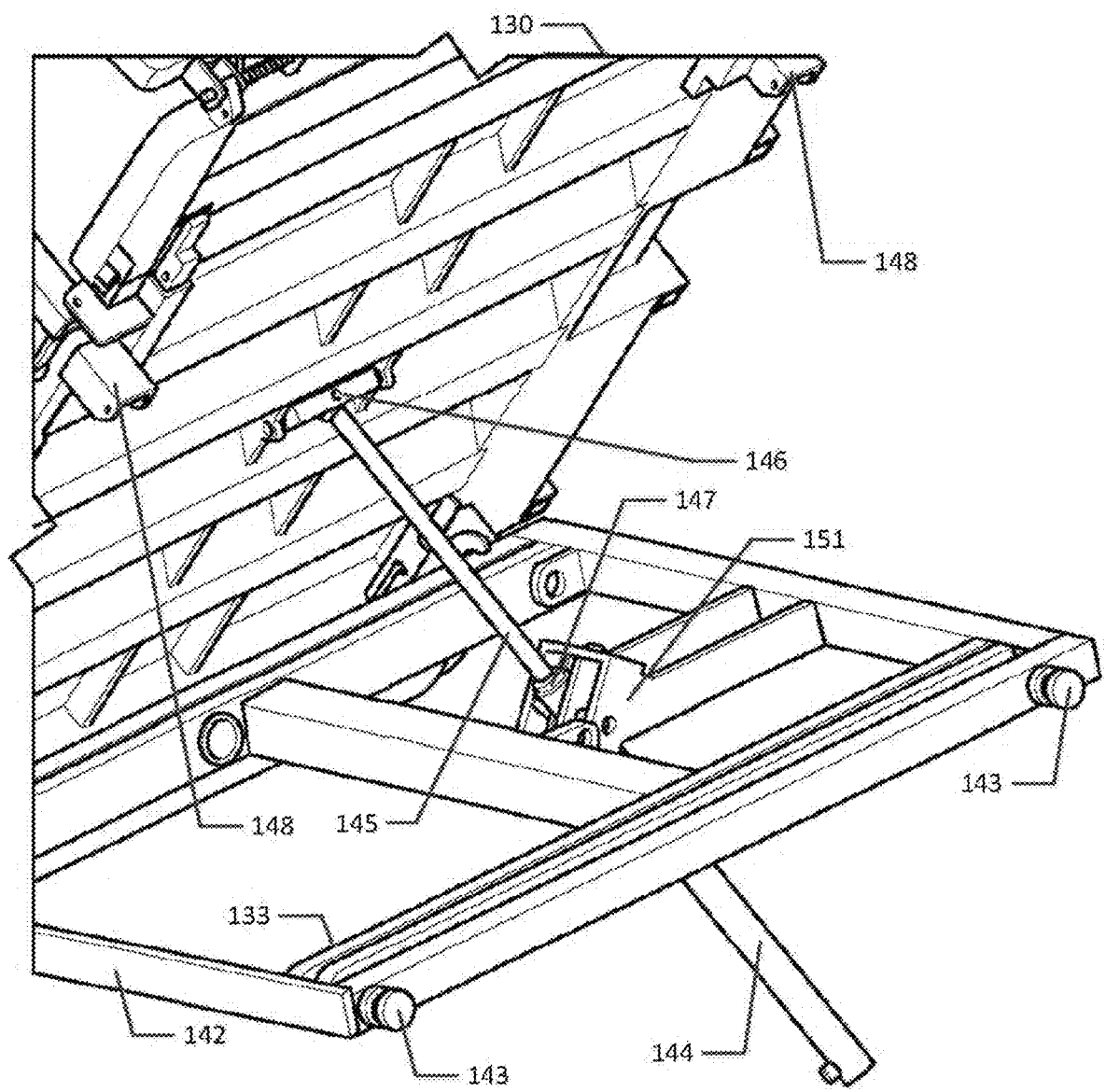
Figure 58:
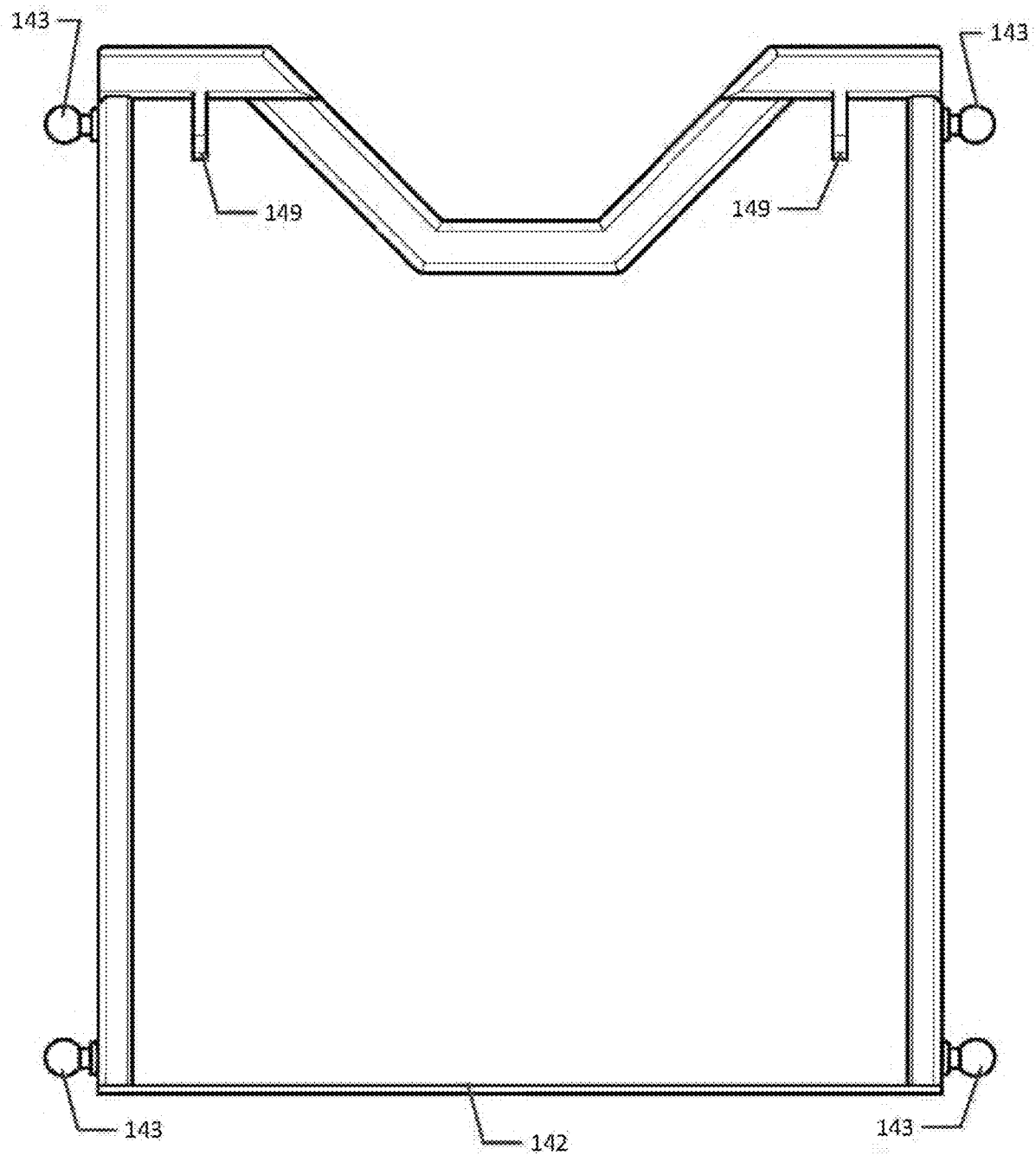
FIG. 58 illustrates an example embodiment showing a cargo bed base frame with ball joint pivot points for multi-directional cargo bed tipping/dumping.

FIGS. 56 and 57 illustrate an example embodiment of a removable cargo bed 130 for an ATV 100, including support, pivot, and lifting mechanisms for the cargo bed 130 to enable the cargo bed 130 to be tilted to the left, right, or rearward for multi-directional cargo bed tipping/dumping. FIG. 56 shows the cargo bed base frame 142 with ball joint pivot points 143 on each of the four corners of the generally rectangular cargo bed base frame 142. The lifting mechanisms for the cargo bed 130 includes a hydraulic cylinder 144 with a lift rod 145 coupled to an underside of the cargo bed 130 at a four-directional rocking ball joint connection point 146. The hydraulic cylinder 144 is coupled to the base frame 142 at lift point 147 and held in rotatable position via a hydraulic cylinder bracket 151. These structural elements enable the cargo bed 130 to be tilted to the left, right, or rearward by action of the hydraulic cylinder 144 pushing up the underside of the cargo bed at connection point 146. The cargo bed 130 further includes ball joint capture locks 148 on a lower side of the cargo bed 130 in a position to fit over and selectively capture the ball joint pivot points 143 when the cargo bed 130 is in a lowered horizontal position. The ball joint capture locks 148 further include releasable locking latches to selectively lock a pair of ball joint pivot points 143 into corresponding ball joint capture locks 148 on a desired side of the cargo bed 130. As a result, desired side of the cargo bed 130 (e.g., a left, right, or rear side) can be selectively locked into the ball joint pivot points 143 via corresponding ball joint capture locks 148. After a selected side of the cargo bed 130 is locked as described, the hydraulic cylinder 144 can be activated to push up the underside of the cargo bed at connection point 146. Because the desired side of the cargo bed 130 is selectively locked into the corresponding ball joint pivot points 143, the cargo bed 130 will tip in the desired direction as shown in FIG. 56 (e.g., a side tip view is shown in FIG. 56). FIG. 58 illustrates an example embodiment showing a cargo bed base frame 142 with ball joint pivot points 143 for multi-directional cargo bed tipping/dumping. FIG. 58 also shows the cargo bed base frame 142 with scissor lift connection brackets 149 for connecting the scissor lift 133 to the cargo bed base frame 142.

Figure 59:
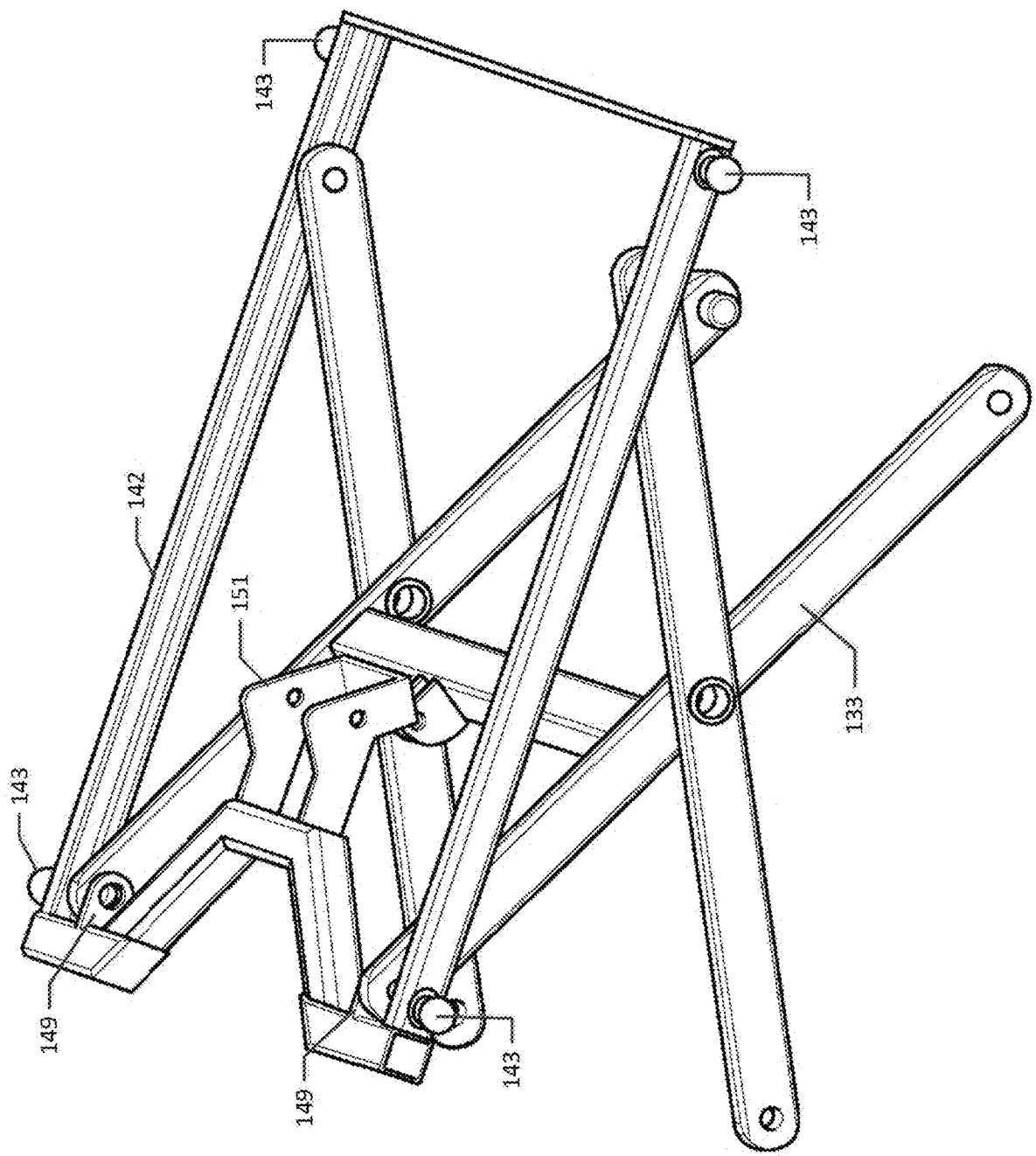
FIG. 59 illustrates an example embodiment showing a cargo bed base frame with an attached scissor lift.
Figure 60:
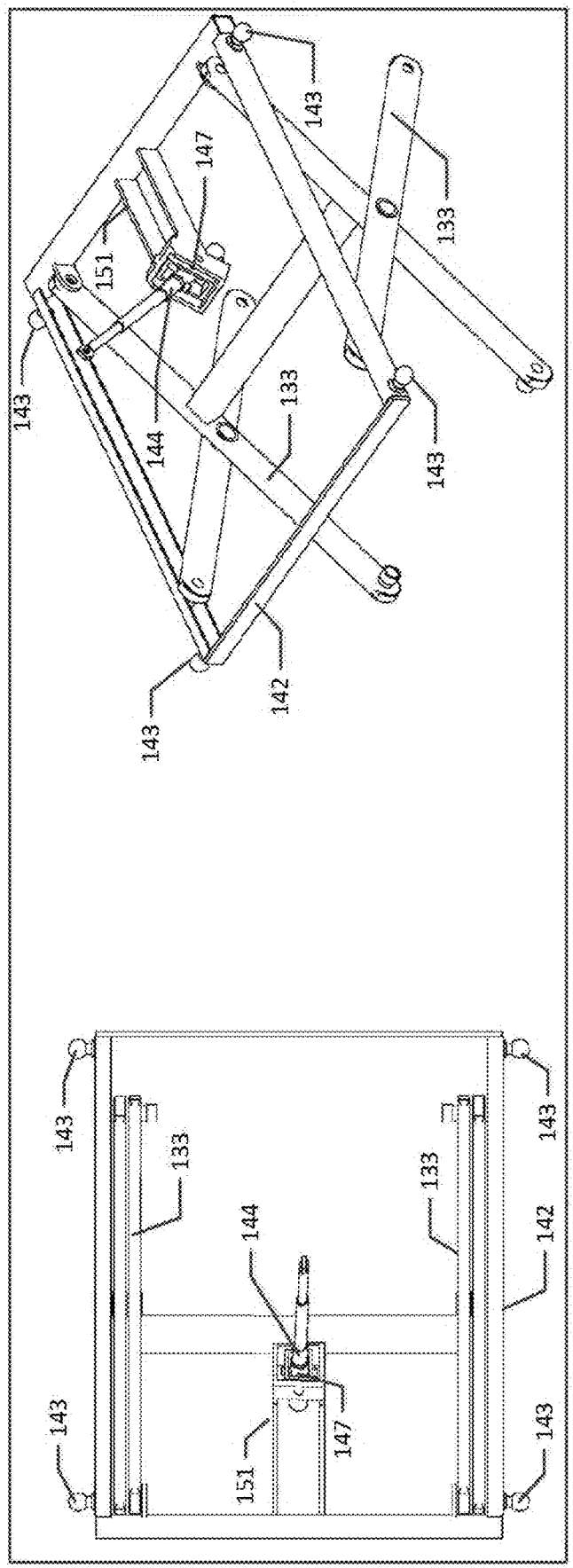
FIGS. 60 and 61 illustrate an example embodiment showing a cargo bed base frame with an attached scissor lift, attached hydraulic cylinder, and ball joint pivot points for multi-directional cargo bed tipping/dumping.
Figure 61:
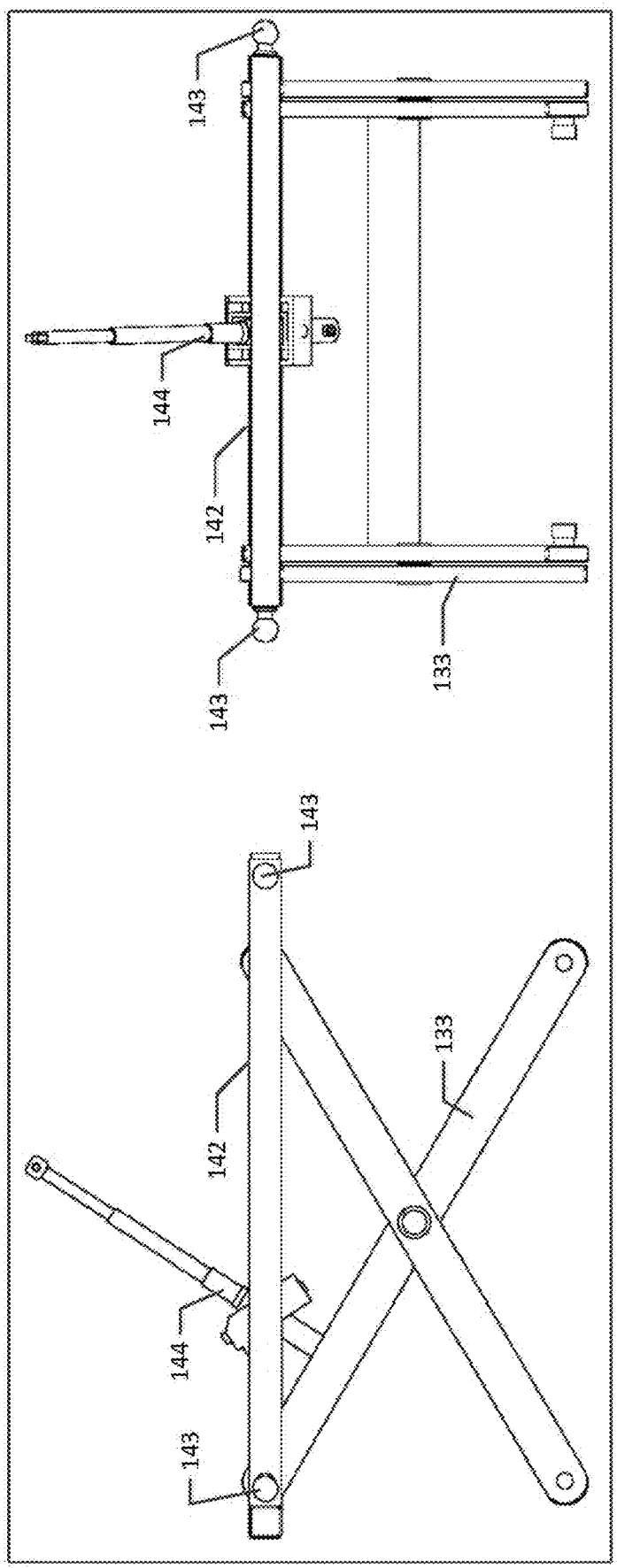

FIGS. 59 through 61 illustrate an example embodiment showing a cargo bed base frame 142 with an attached scissor lift 133, the cargo bed base frame 142 including ball joint pivot points 143 for multi-directional cargo bed tipping/dumping. FIG. 59 also shows the hydraulic cylinder bracket 151 to couple the hydraulic cylinder 144 in rotatable position to the base frame 142 at lift point 147.

Figure 62:
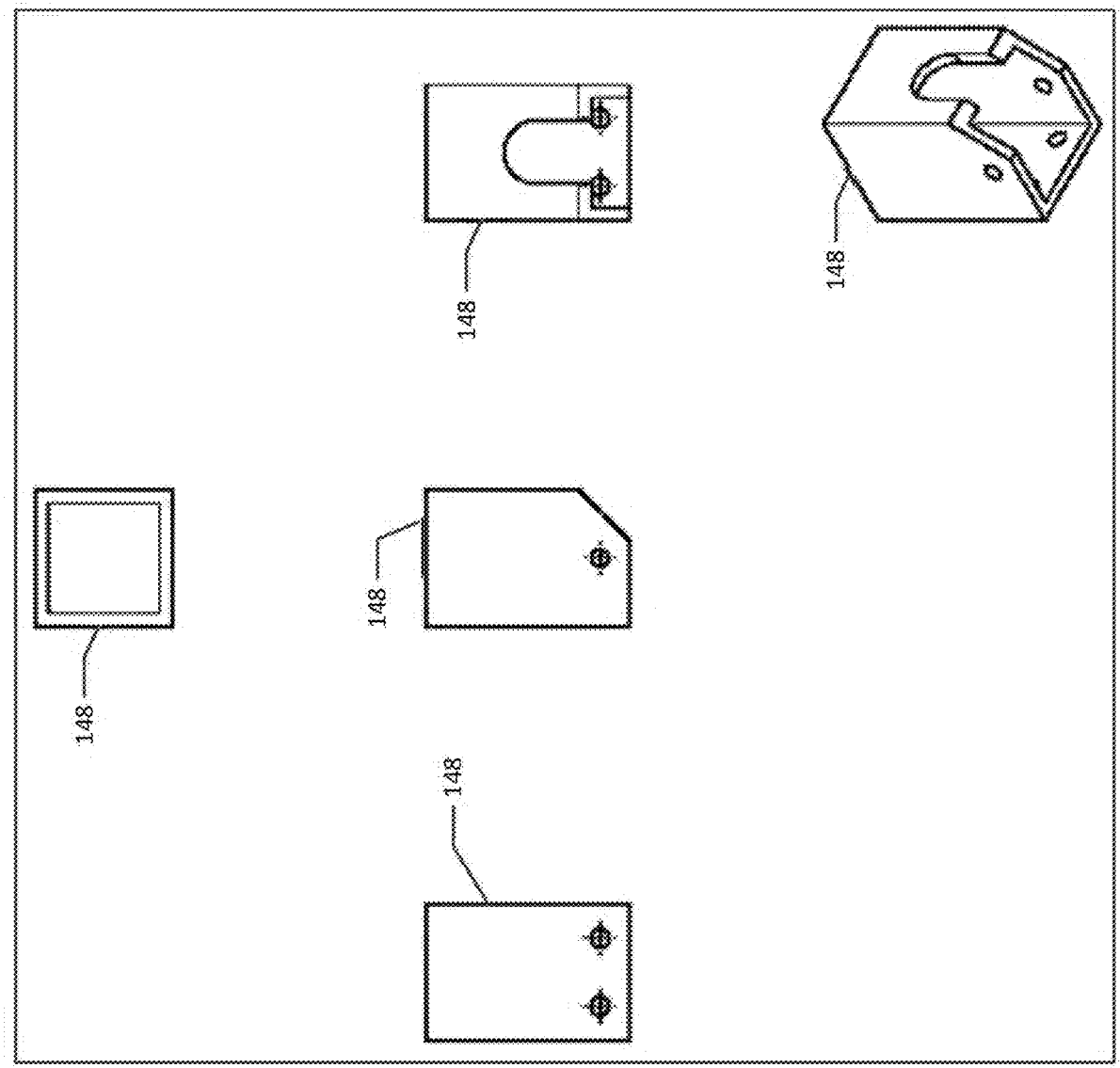
FIG. 62 illustrates an example embodiment showing a ball joint capture lock to enable pivot points for multi-directional cargo bed tipping/dumping.

FIG. 62 illustrates an example embodiment showing a ball joint capture lock 148 to enable the capture of ball joint pivot points 143 for multi-directional cargo bed tipping/dumping.

Figure 63:
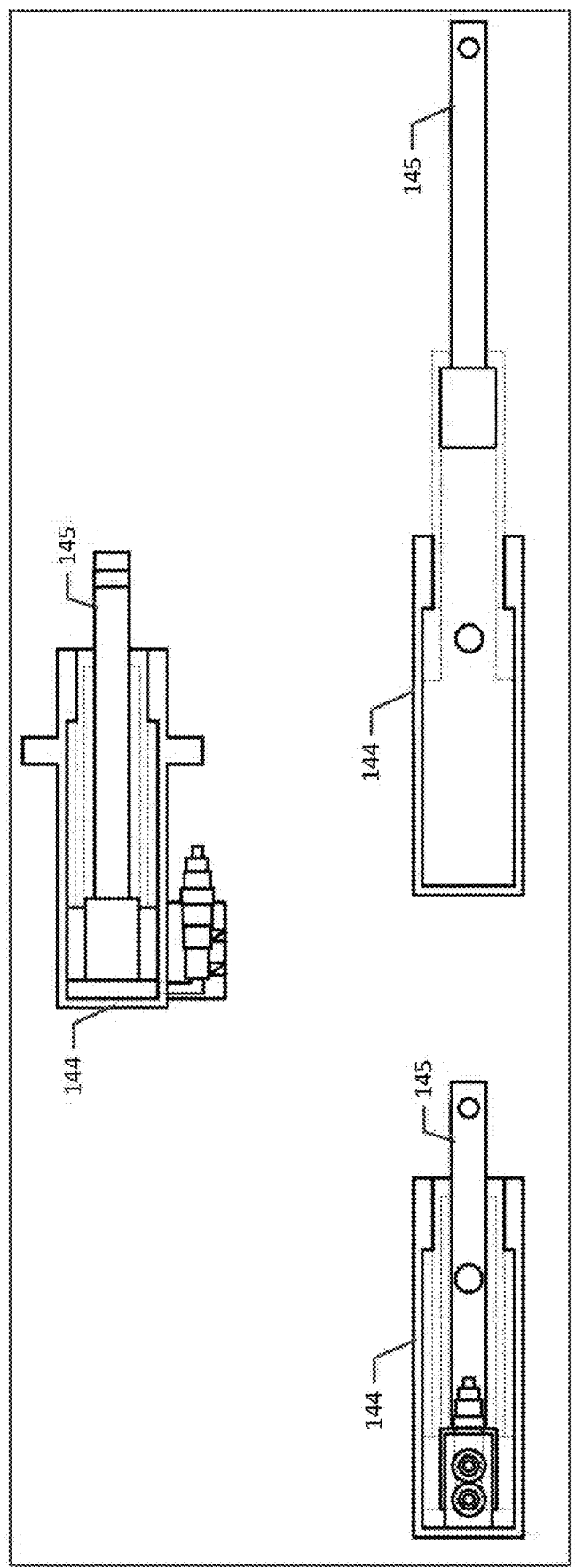
FIG. 63 illustrates an example embodiment showing a two stage hydraulic cylinder for cargo bed lifting and multi-directional tipping/dumping.

FIG. 63 illustrates an example embodiment showing a two stage hydraulic cylinder 144 with a lift rod 145 for cargo bed lifting and multi-directional tipping/dumping. It will be apparent to one of ordinary skill in the art in view of the disclosure herein that the hydraulic cylinder 144 can vary in size and the number of hydraulic cylinder stages to achieve a desired lift capacity and height.

Figure 64:
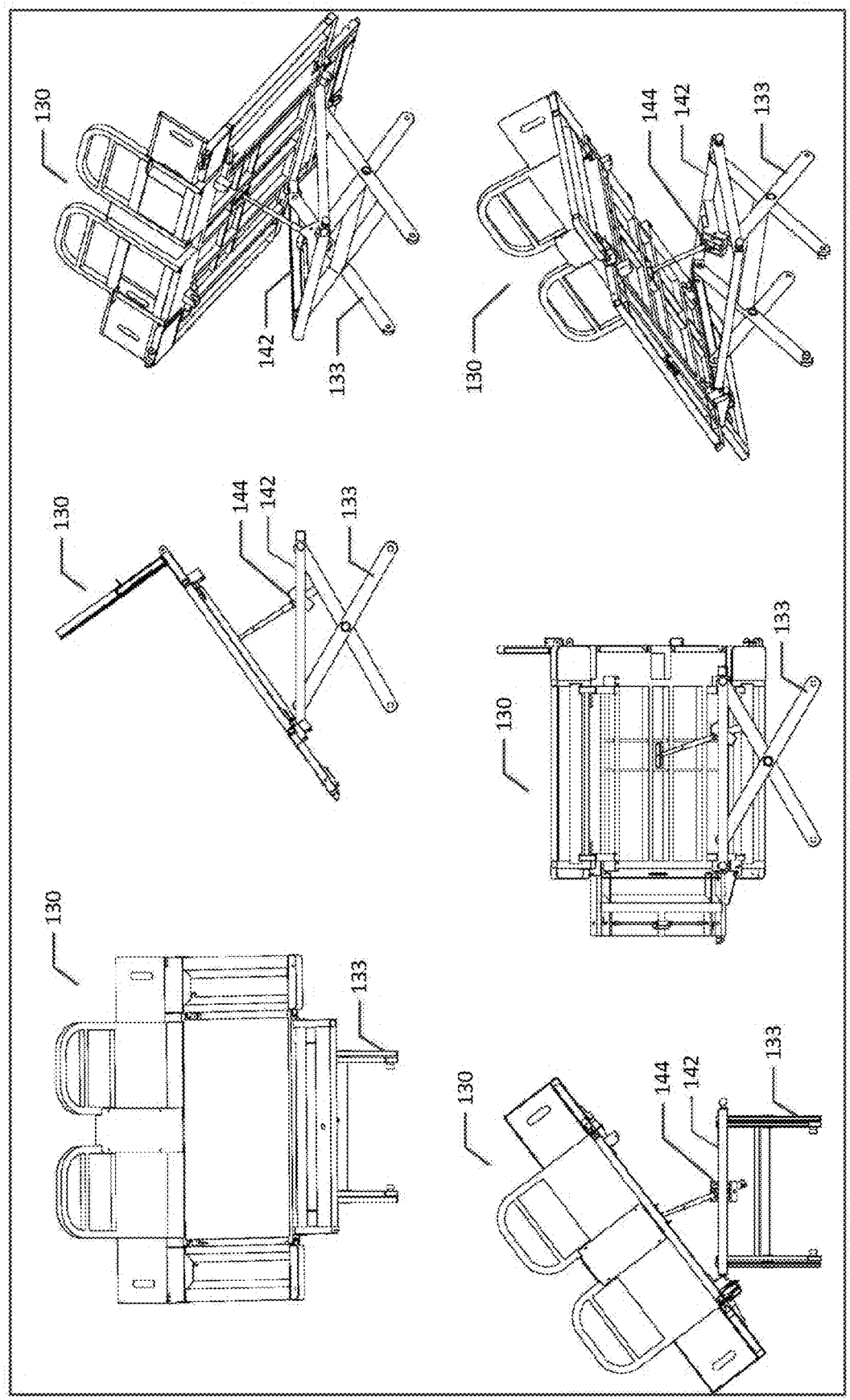
FIGS. 64 and 65 illustrate example embodiments showing an ATV cargo bed configured for tipping/dumping to the left, right, and rearward.
Figure 65:
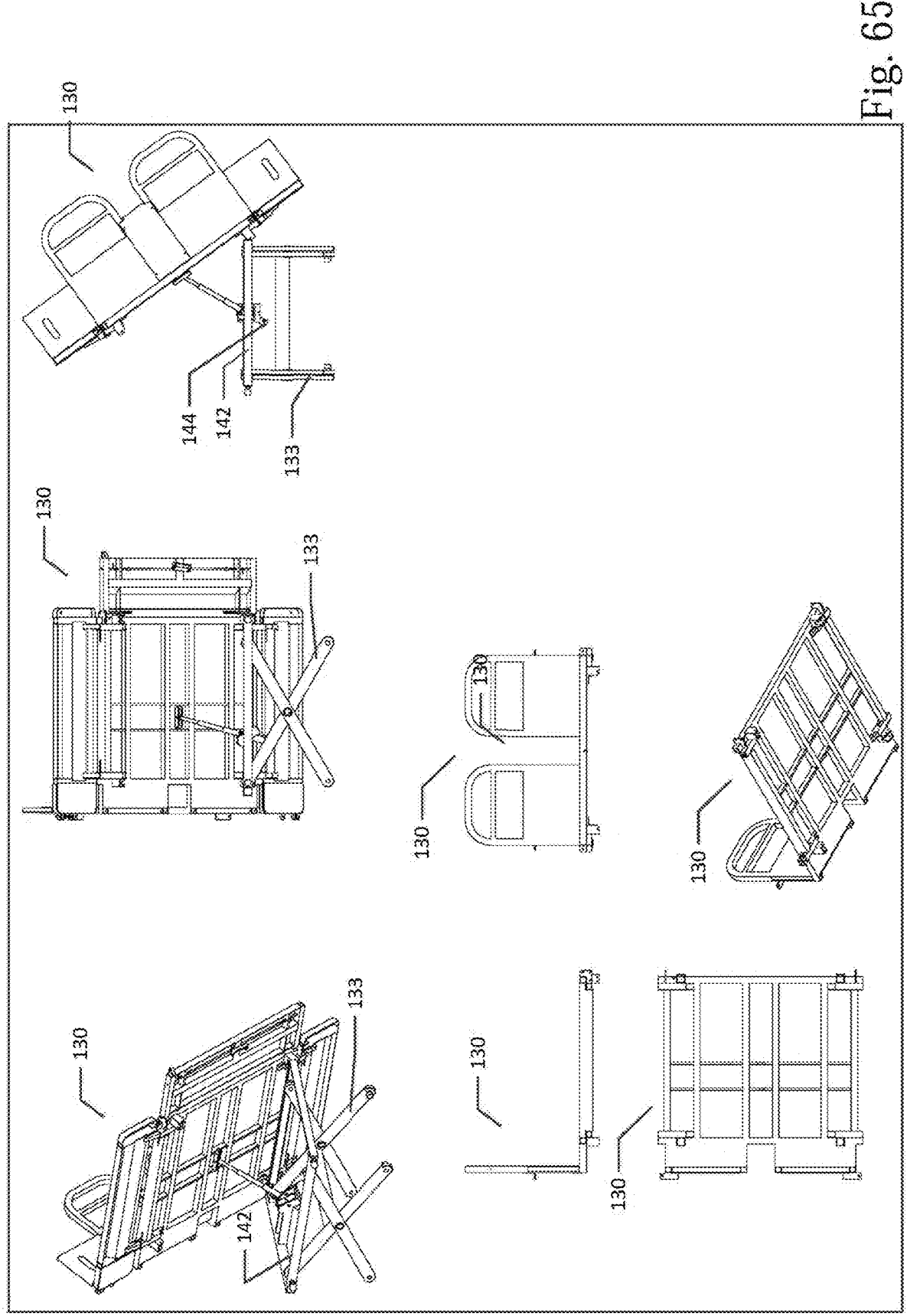

FIGS. 64 and 65 illustrate example embodiments showing an ATV cargo bed 130 configured for lifting and tipping/dumping to the left, right, and rearward. In view of the cargo bed 130 structure and the lifting and tilting structures described above, the cargo bed 130 can be lifted via the scissor lift 133, the base frame 142, and the hydraulic cylinder 144 in the manner described above. Similarly, the cargo bed 130 can be tilted to the left, right, and rearward via the base frame 142, the ball joint pivot points 143, corresponding ball joint capture locks 148 on a desired side of the cargo bed 130, and the hydraulic cylinder 144 in the manner described above.

Figure 66:
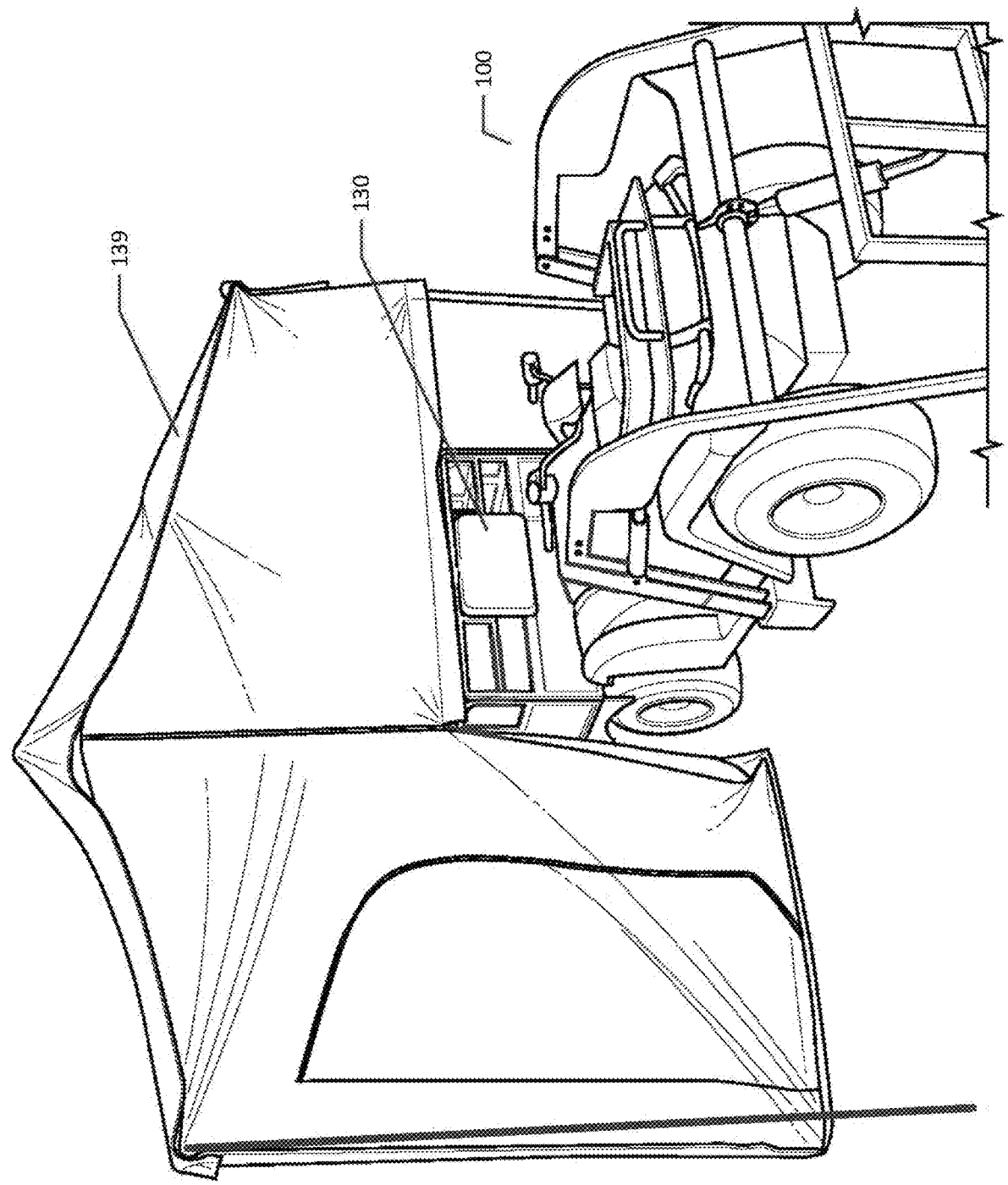
FIG. 66 illustrates an example embodiment showing a camping kit including a tent deployed from an ATV cargo bed.

FIG. 66 illustrates an example embodiment showing a camping kit including a tent deployed from an ATV cargo bed 130. Example embodiments of the present technology enable the disclosed ATV 100 to include a unique tent/camper kit that includes, for example: a pop open tent camper kit 139 that can be attached to the top of the cargo bed 130, leaving space below for storage of supplies. The cargo bed 130 can be configured with a camping kit 139 having a tent. The tent camper kit 139 is detached from the cargo bed 130 and can be used independently of the ATV 100. The tent/camper kit 139 provides a fold-out camper and tent system with a large stand up living room and separate sleeping room. The tent/camper kit 139 has two rigid panels that fold up like a book, wherein the fabric of the tent can be stowed inside the book (i.e., the rigid panels). Release hooks can release the tent from ATV 100. This embodiment is shown in more detail in FIGS. 108 through 110. In a unique departure from the conventional ATV camping systems, the camping kit 139 of an example embodiment enables the setup of the tent from the cargo bed 130 of the ATV 100 while enabling the ATV 100 to be detached from the tent, which can be left free-standing. As a result, the ATV 100 is free to venture away from the tent while the camping kit 139 provides shelter for campers.

In another example embodiment, the cargo bed 130 can further provide a weight measurement or scale system for the cargo bed 130. The cargo bed weight measurement or scale system can be used to prevent cargo bed overloading and for customer convenience. This embodiment is shown in more detail in FIGS. 102 through 107.

Quad Tools

An important advantage of the unique construction and configuration of the ATV frame and modular PTO system of an example embodiment is the ability of the ATV to provide a platform for the attachment and use of a variety of hydraulic power implements or tools, including a front loader, a backhoe, post hole digger, trencher, forklift, front-end flail mower, boom winch, and front end winch, among other tools. In each case, the PTO module and the second engine therewith provides a separately powered PTO for the attached hydraulic power tools. The specially designed ATV frame also provides structures, reinforcement, attach points, pivot points, configurable suspension, and the like to support the attachment and use of the hydraulic power tools with the ATV. Additionally, an example embodiment of the specially designed ATV and modular PTO system can also be configured for the attachment and use of electrical power implements or tools. The ATV can support attachment and use of non-powered tools, such as scrapers or plows.

Figure 67:
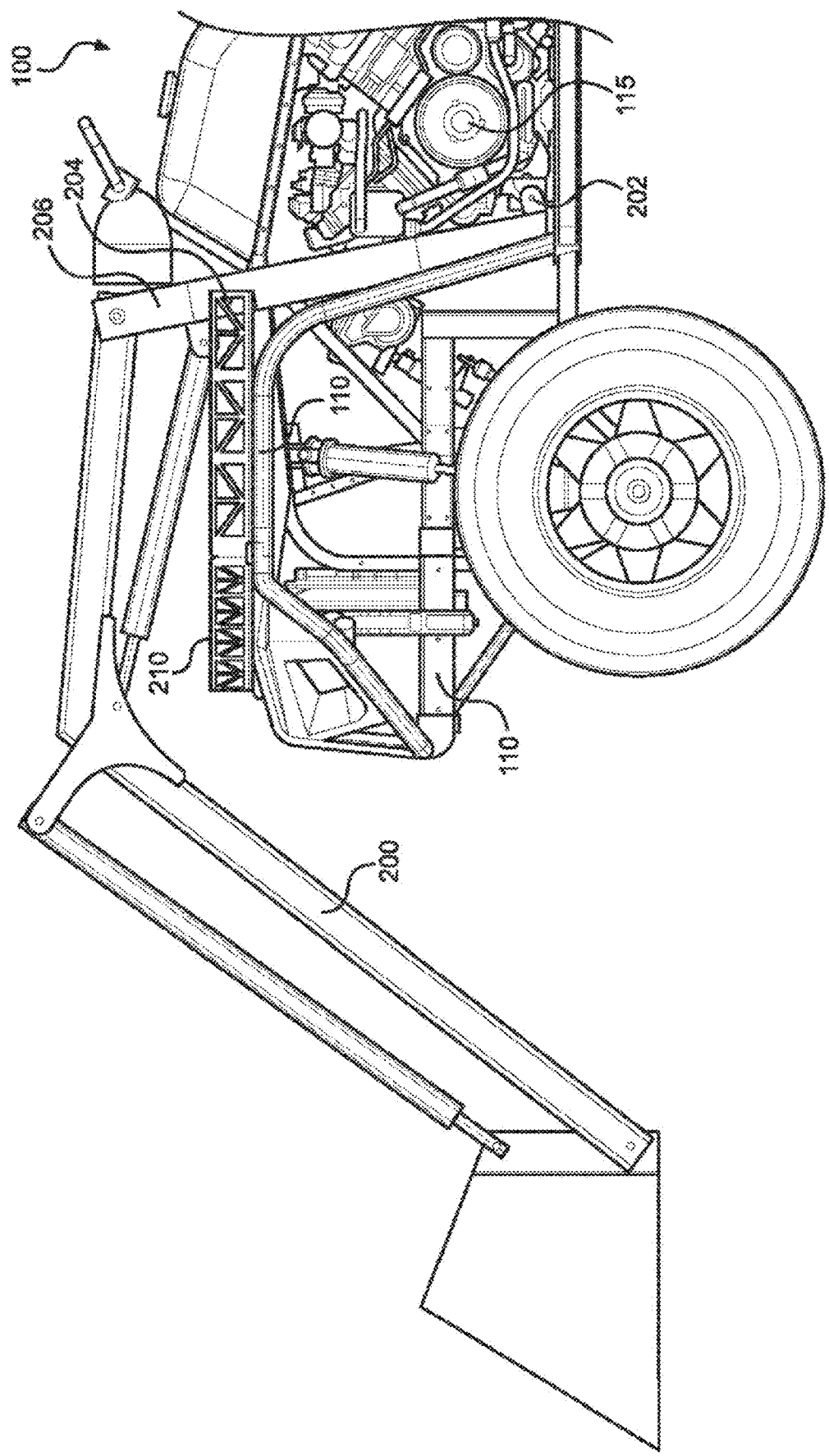
FIGS. 67 and 68 illustrate example embodiments showing a front loader attached to an ATV.
Figure 68:
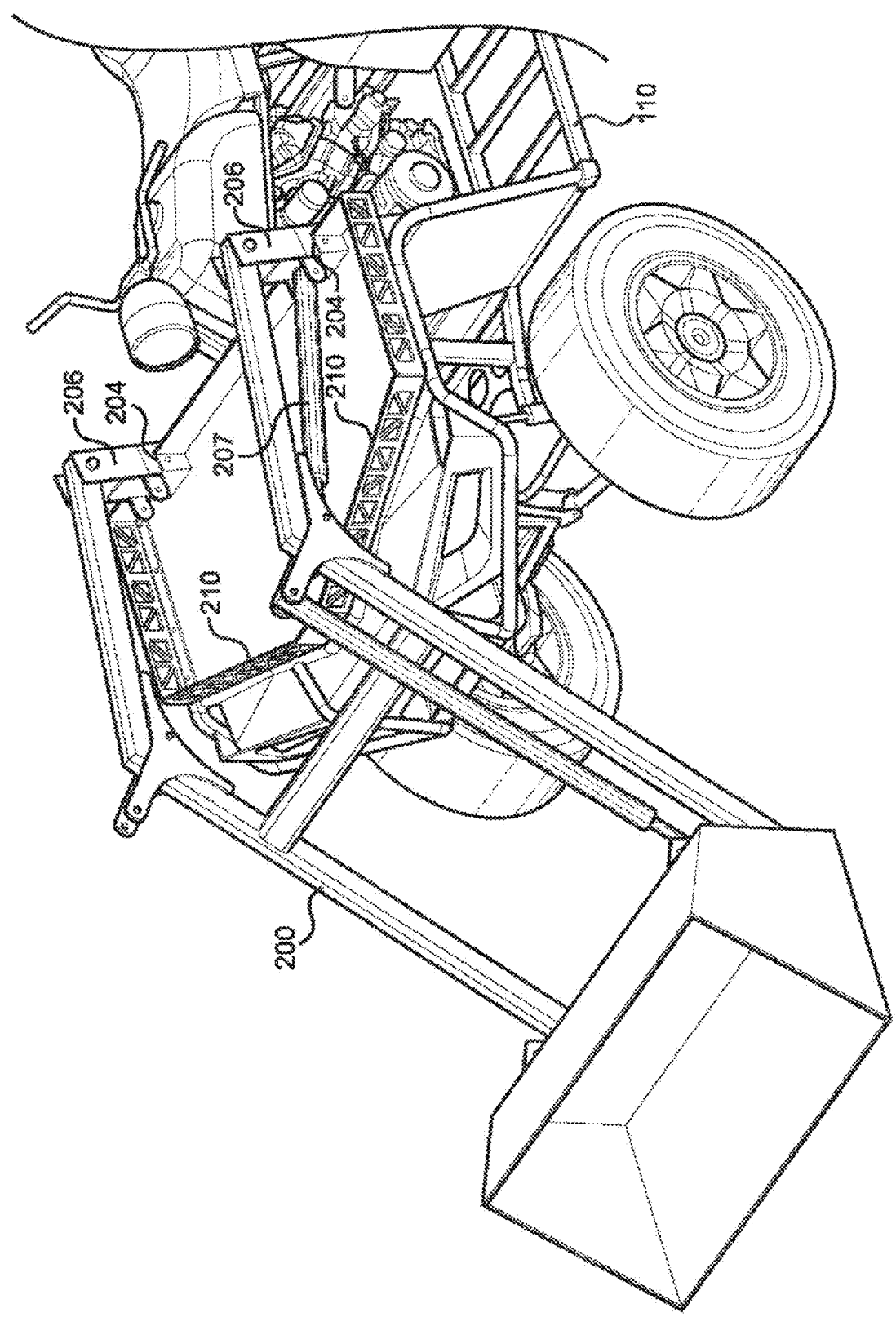

Referring now to FIGS. 67 and 68, the diagrams illustrate example embodiments showing a front loader 200 attached to an ATV 100. In an example embodiment, the ATV 100 includes a support and storage platform 210 mounted on the front of the ATV 100 generally in front of wheel-driving engine 115 and above the front wheels. The support and storage platform 210 can be securely mounted and coupled to the ATV frame 110 at several points on support members of the frame 110. The support and storage platform 210 provides at least three functions: 1) the support and storage platform 210 provides upper attach points 204 for coupling the support arms 206 of the loader 200 to the ATV 100; 2) the support and storage platform 210 provides an enclosable storage area within side panels of the platform 210, and 3) the support and storage platform 210 provides an attachable tie down rack or tie down bar for securing gear to the front of the ATV 100. When the front loader 200 is not attached to the ATV 100, the upper attach points 204 can be used to attach a cover that encloses the support and storage platform 210 and provides a storage area within the platform 210. This embodiment is shown in more detail in FIGS. 97 through 101. In the embodiment shown in FIGS. 67 and 68, the support arms 206 of the loader 200 can be coupled to the ATV 100 at upper attach points 204 of the support and storage platform 210 and also at lower attach points 202 on the frame 110. Hydraulic actuators 207 can also be attached at upper attach points 204. Given the coupling of the support arms 206 of the front loader 200 at upper and lower attach points 204/202, the front loader 200 can support a significantly greater amount of weight in comparison to conventional loaders coupled at only a single attach point. Moreover, the support and storage platform 210 serves to spread forces on the loader 200 structure across the surface area of the platform 210 and serves to stabilize and support sideways or twisting forces between the support arms 206 of the front loader 200.

In an example embodiment, the lower attach points 202 can be further reinforced using dual sandwiched reinforcing plates 620 that further spread the forces of the loader arms 206 across the frame 110. For example, referring to FIGS. 34, 35, and 90, lower attach points 202 are shown to be connected to the frame 110 via a sandwiched reinforcing plate 620. The sandwiched reinforcing plate 620 provides multiple connection points and sandwiches portions of the frame members between steel plates to strengthen the lower attach points 202. As a result, the ATV 100 can support a front loader with a significantly greater amount of frame support. The combination of the upper and lower attach points 204/202 and the dual sandwiched reinforcing plates 620 ties the frame structure together for better front loader support.

Figure 69:
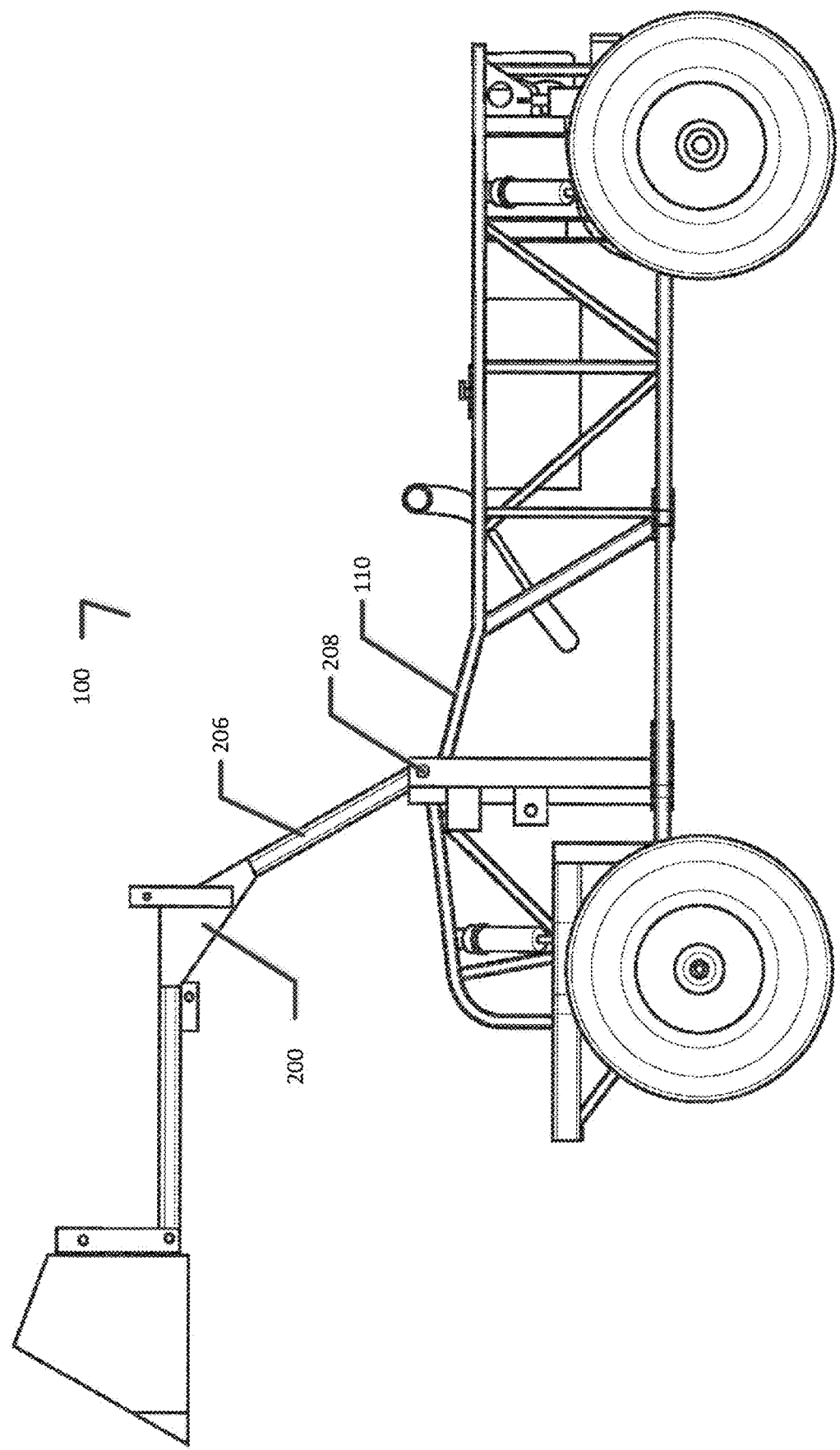
FIGS. 69 through 71 illustrate an alternative example embodiment showing a front loader attached to an ATV.
Figure 70:
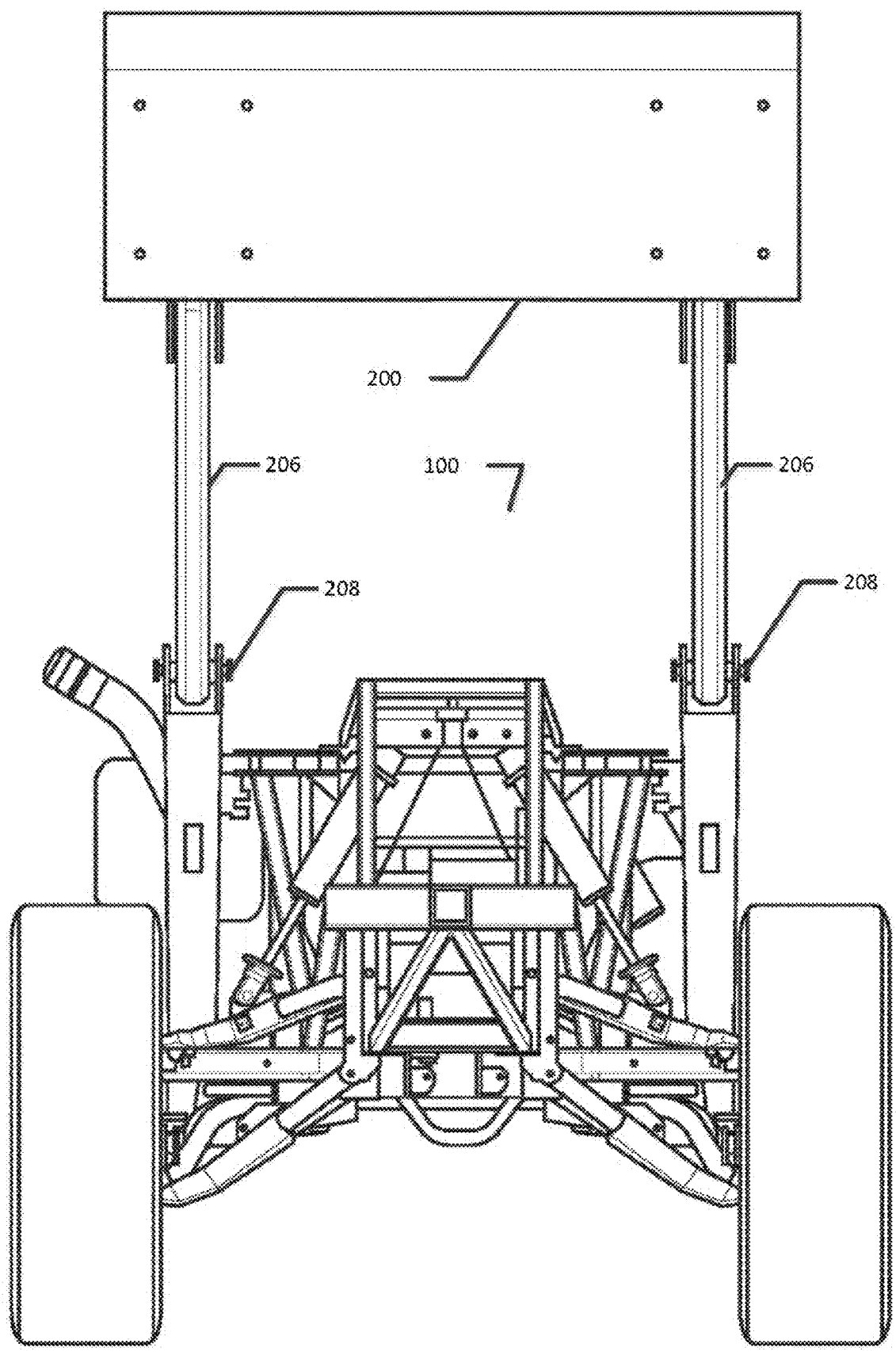
Figure 71:
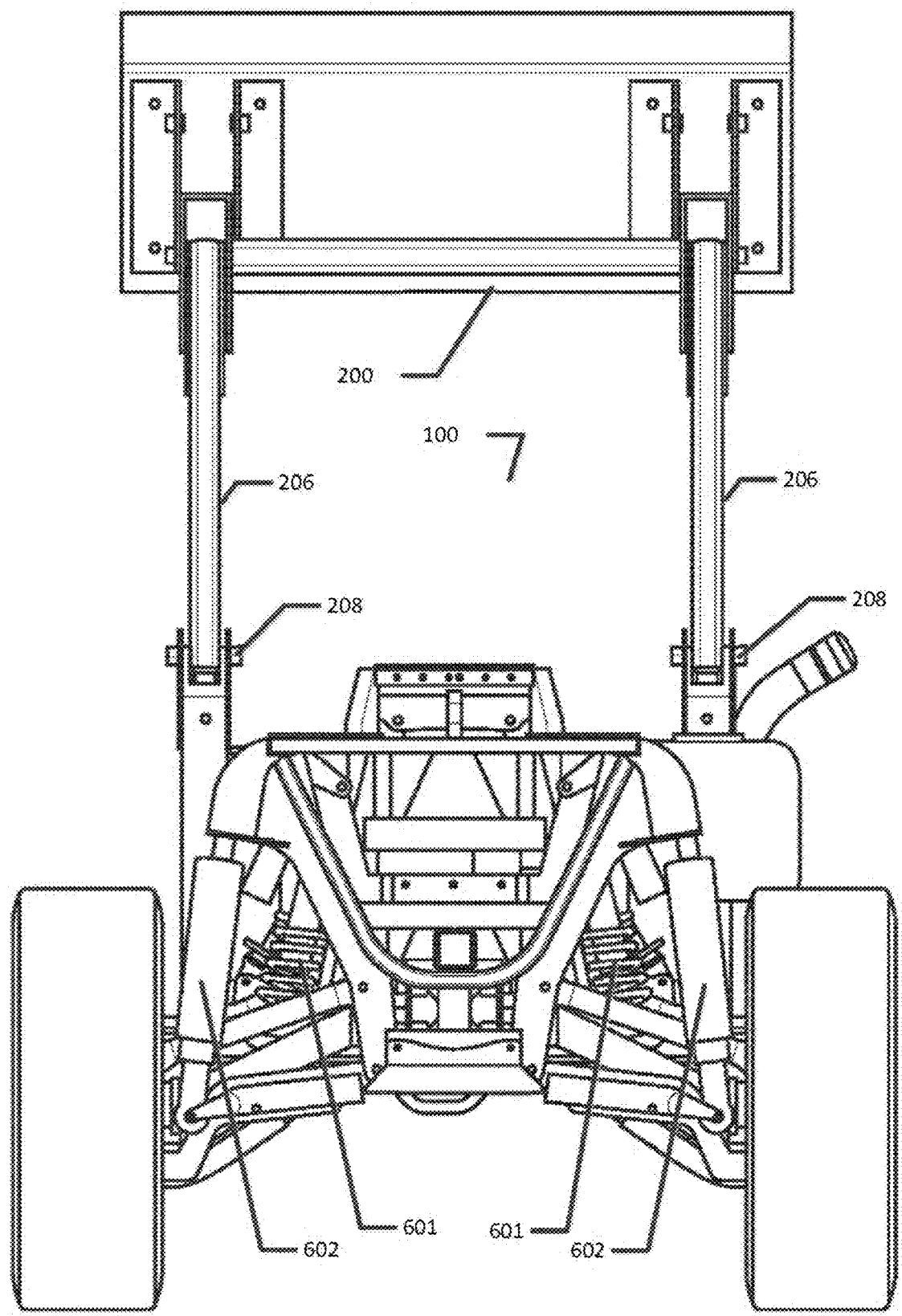

FIGS. 69 through 71 illustrate an alternative example embodiment showing a front loader 200 attached to an ATV 100. In the embodiment shown, the support arms 206 of the loader 200 can be coupled to the ATV 100 at upper attach points 208. The upper attach points 208 can be supported by frame 110.

FIG. 71 also shows an example embodiment with a quad shock suspension system in the rear end of the ATV 100. In this embodiment, the rear wheels of the ATV 100 can each include a spring shock 601 and an adjustable air lift shock 602. Similarly, the front wheels of the ATV 100 can each include a spring shock 601 and an adjustable air lift shock 602 as well, thus providing the quad suspension system. In another example embodiment, the spring shock 601 and the adjustable air lift shock 602 on each of the front wheels of the ATV 100 can be configured as an attachable/removable (e.g., bolt on) front suspension system for providing a customizable front suspension system comprising four front shocks with two of the front shocks being adjustable air lift suspension shocks. In this manner, the ATV 100 can be customized for various use and loading cases. The suspension system of the example embodiments provides improved load balancing and better handling of heavy loads.

Figure 72:
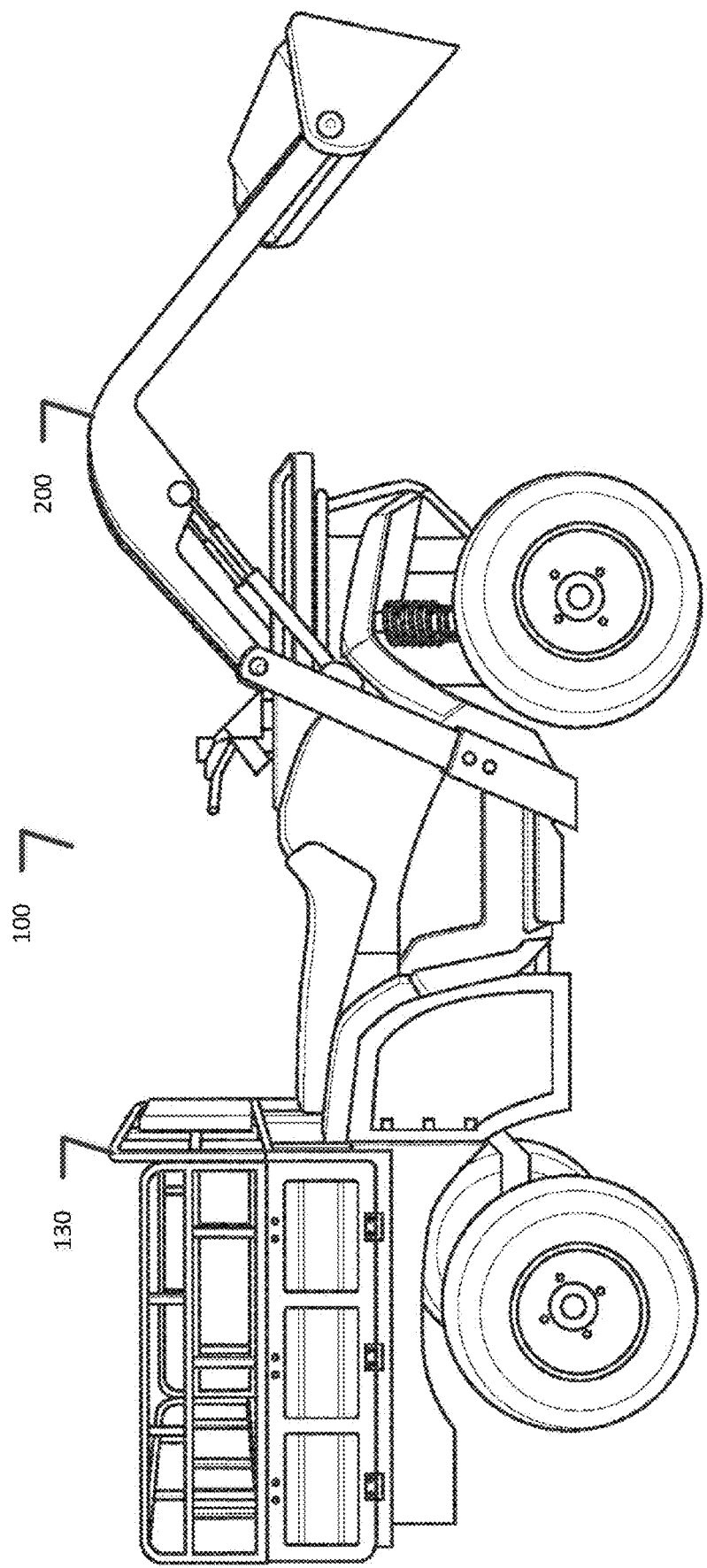
FIG. 72 illustrates another alternative example embodiment showing a front loader attached to an ATV.
Figure 73:
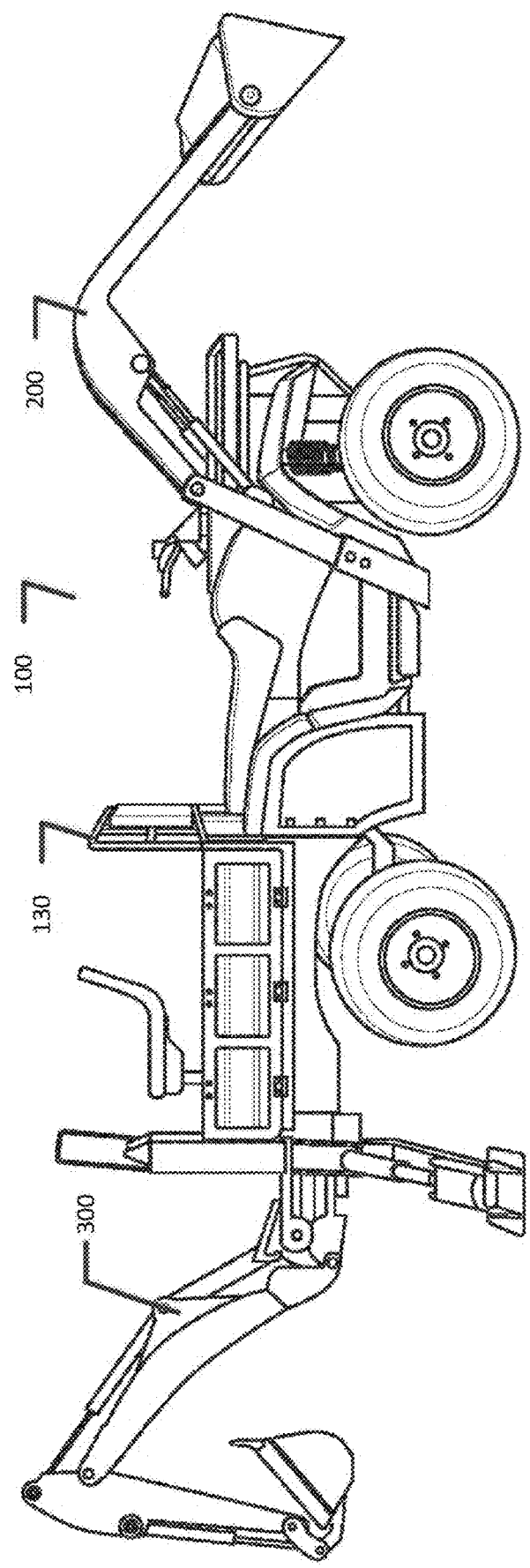
FIG. 73 illustrates another alternative example embodiment showing a front loader and a backhoe attached to an ATV.
Figure 74:
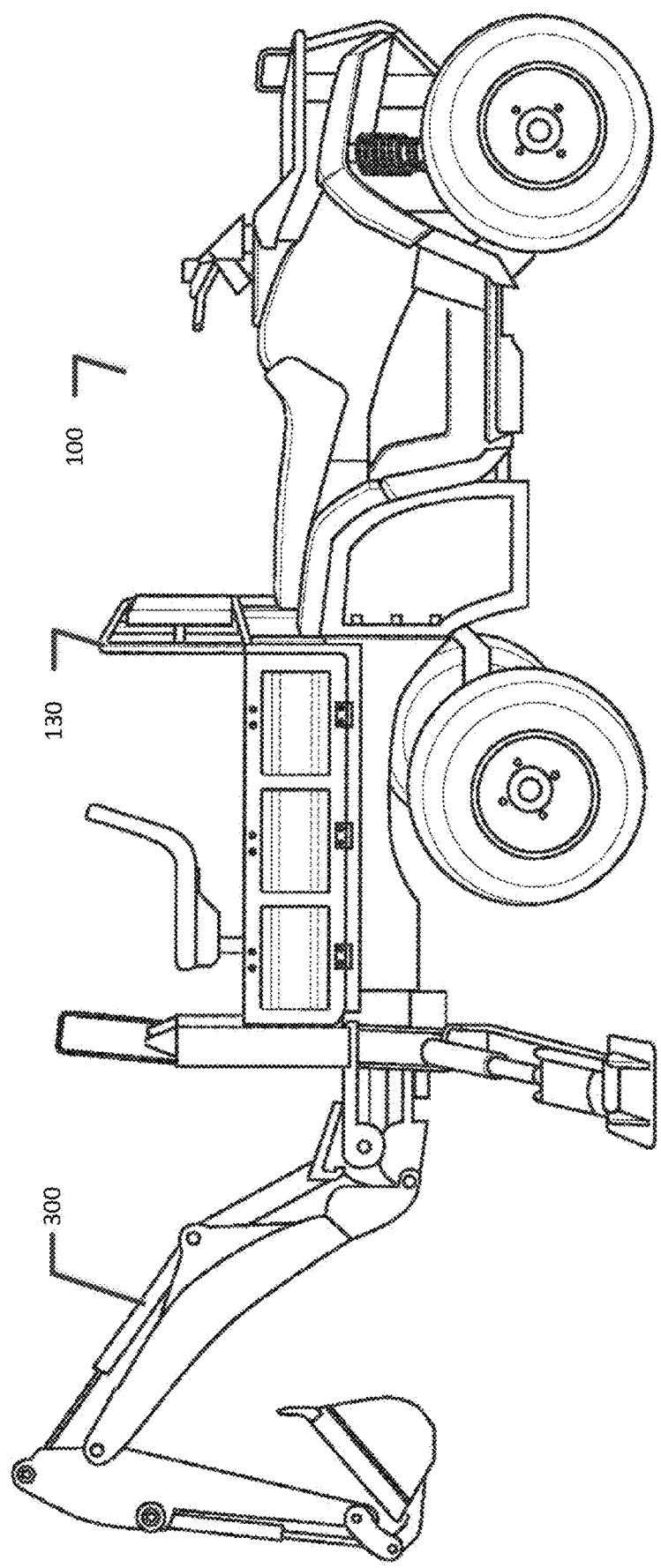
FIG. 74 illustrates another alternative example embodiment showing a backhoe attached to an ATV.

FIG. 72 illustrates another alternative example embodiment showing a front loader 200 attached to an ATV 100, the ATV 100 including a cargo bed 130 as described above. FIG. 73 illustrates another alternative example embodiment showing a front loader 200 and a backhoe 300 attached to an ATV 100, the ATV 100 including a cargo bed 130 as described above. FIG. 74 illustrates another alternative example embodiment showing only a backhoe 300 attached to an ATV 100, the ATV 100 including a cargo bed 130 as described above. As such, various embodiments and configurations of the ATV 100 can provide a highly versatile ATV with a large number of different configuration variations and support for a variety of different implements and tools, some of which can be installed or mounted on the ATV 100 at the same time.

Figure 75:
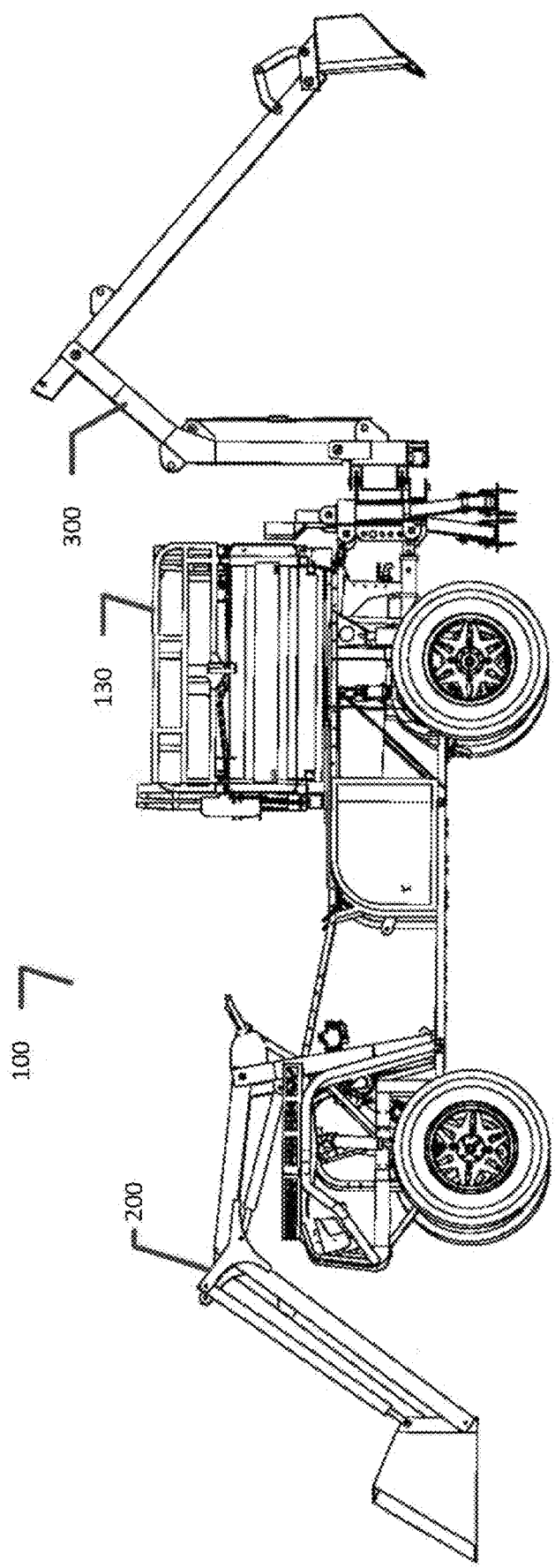
FIGS. 75 through 77 illustrate example embodiments showing a front loader and a backhoe attached to an ATV.
Figure 76:
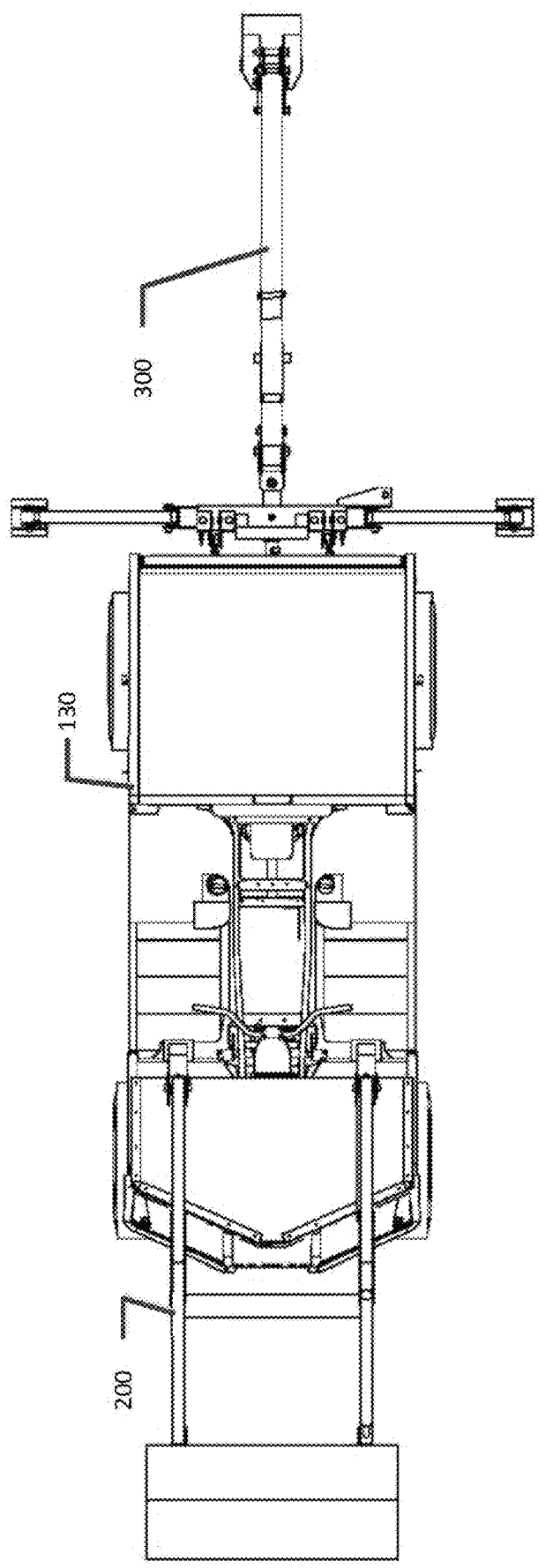
Figure 77:
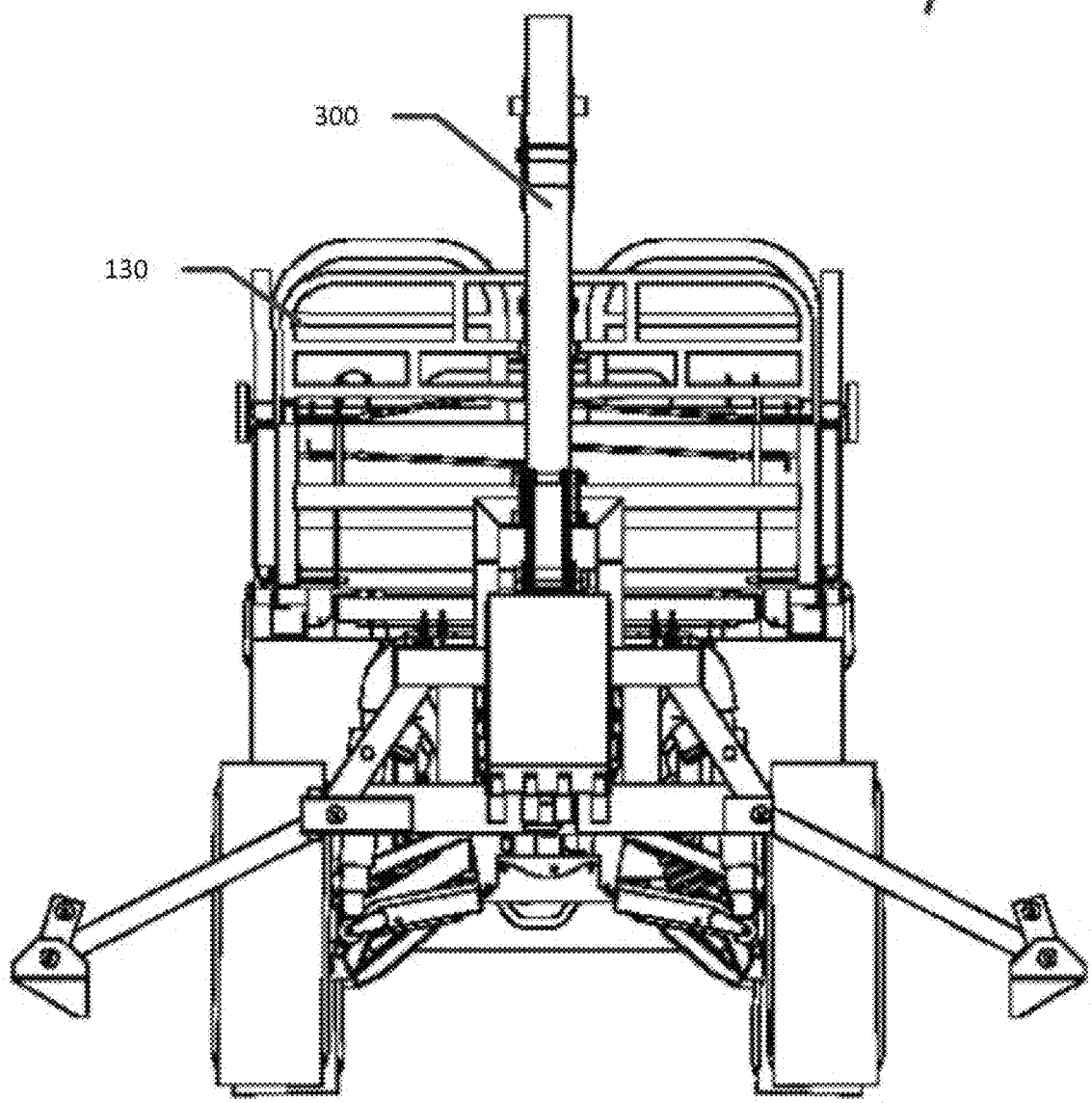
Figure 78:
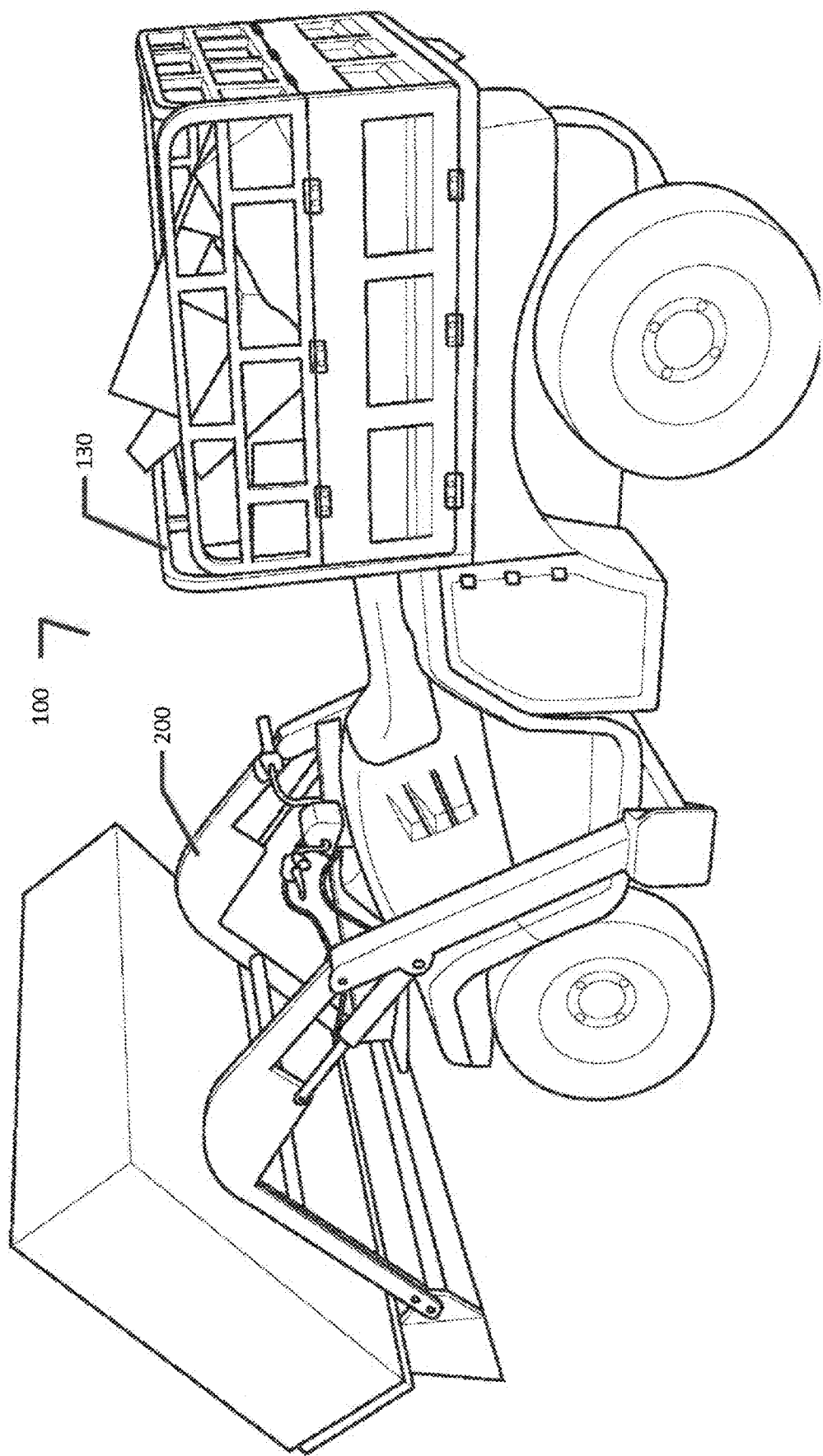
FIGS. 78 through 81 illustrate various alternative example embodiments showing a front loader attached to an ATV with a cargo bed and the various types of front loader attachments that can be used to perform a variety of tasks.
Figure 79:
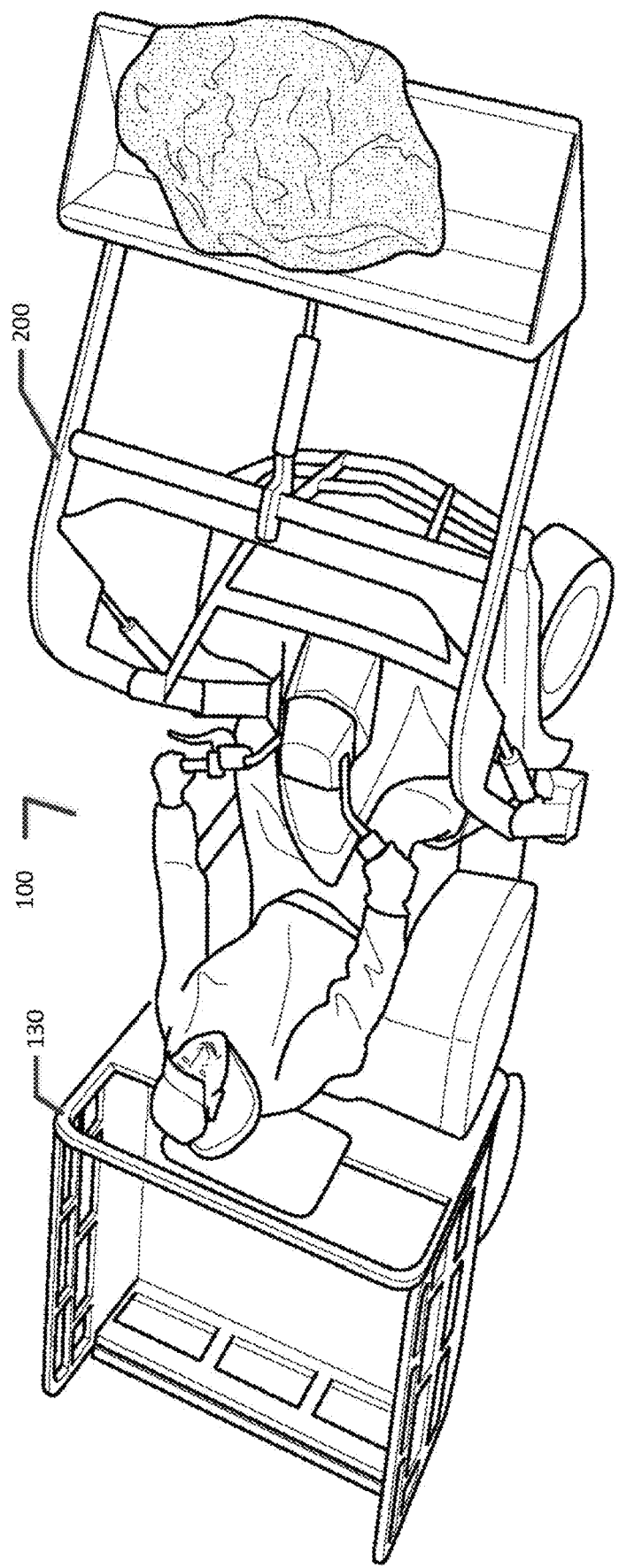
Figure 80:
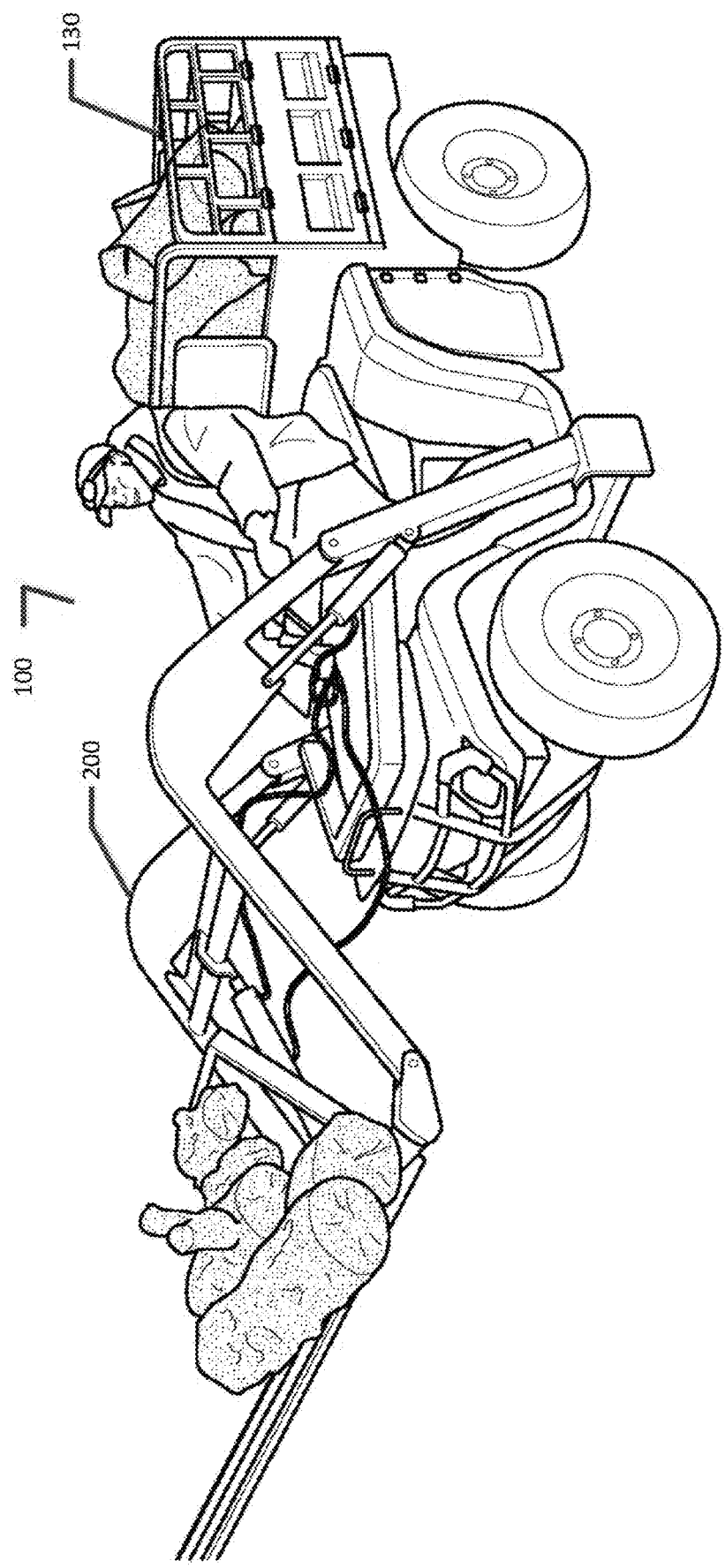
Figure 81:
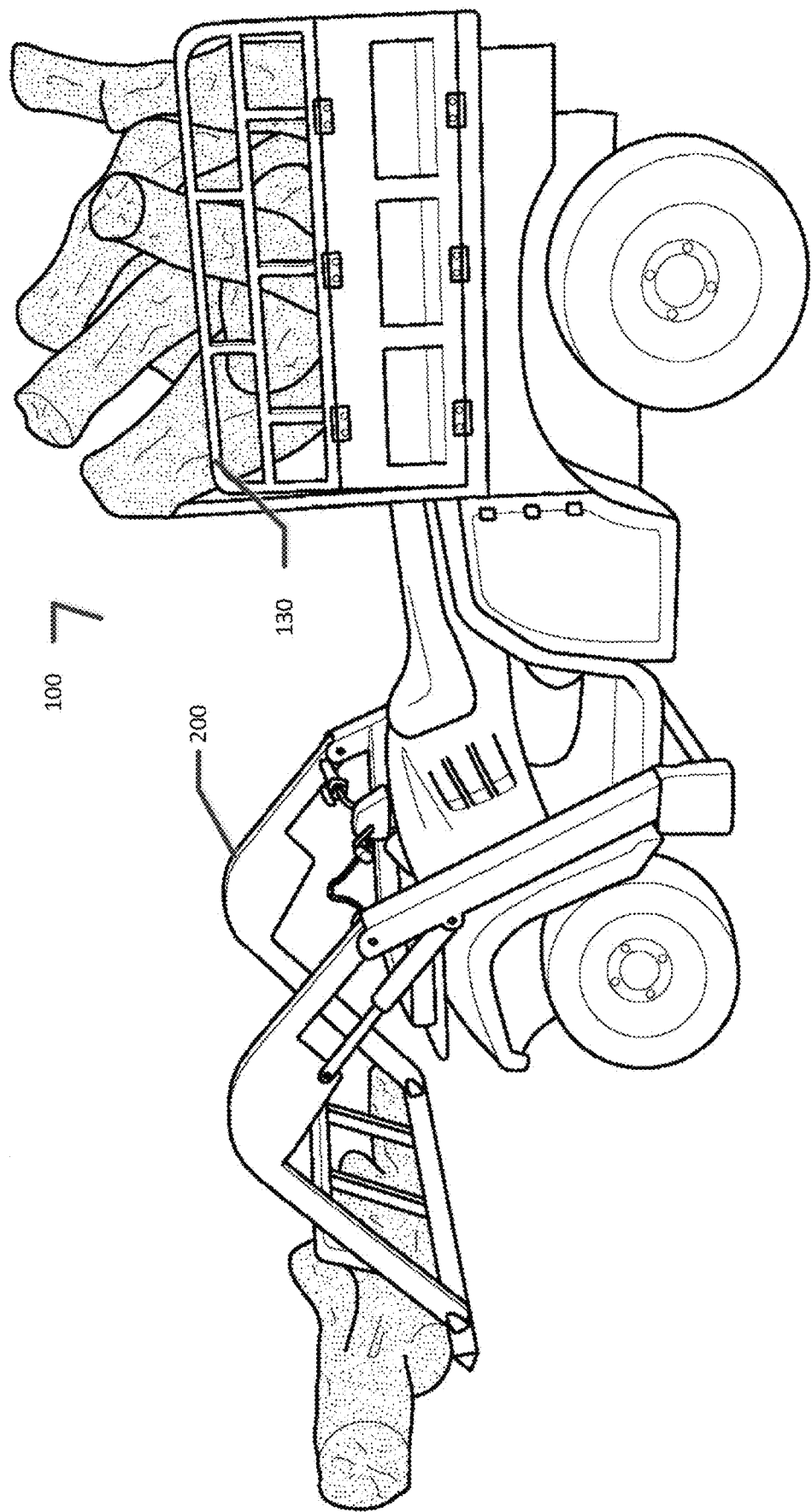
Figure 82:
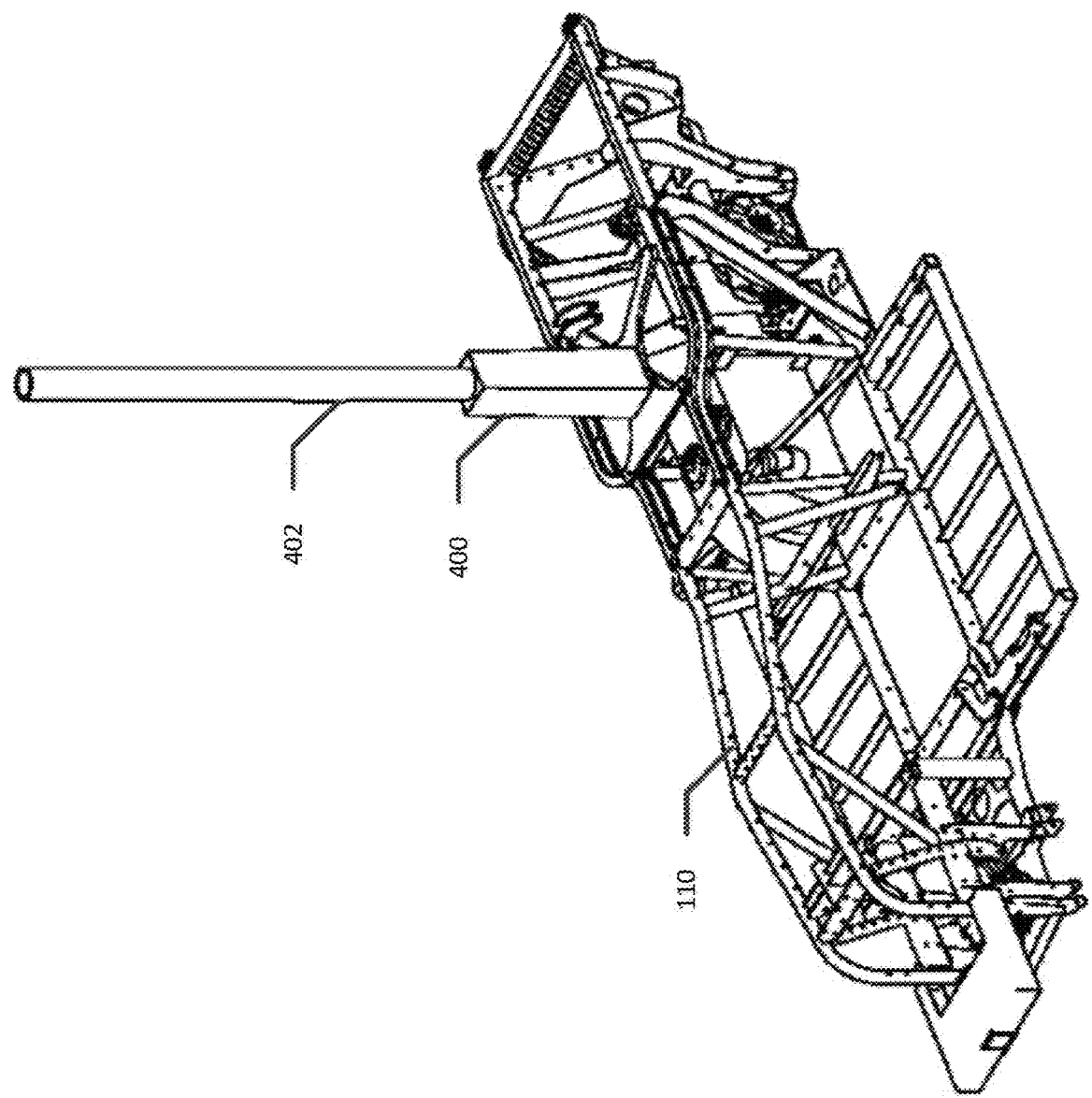
FIGS. 82 through 85 illustrate views of an ATV frame of an example embodiment with a boom winch installed on the frame of the ATV.
Figure 83:
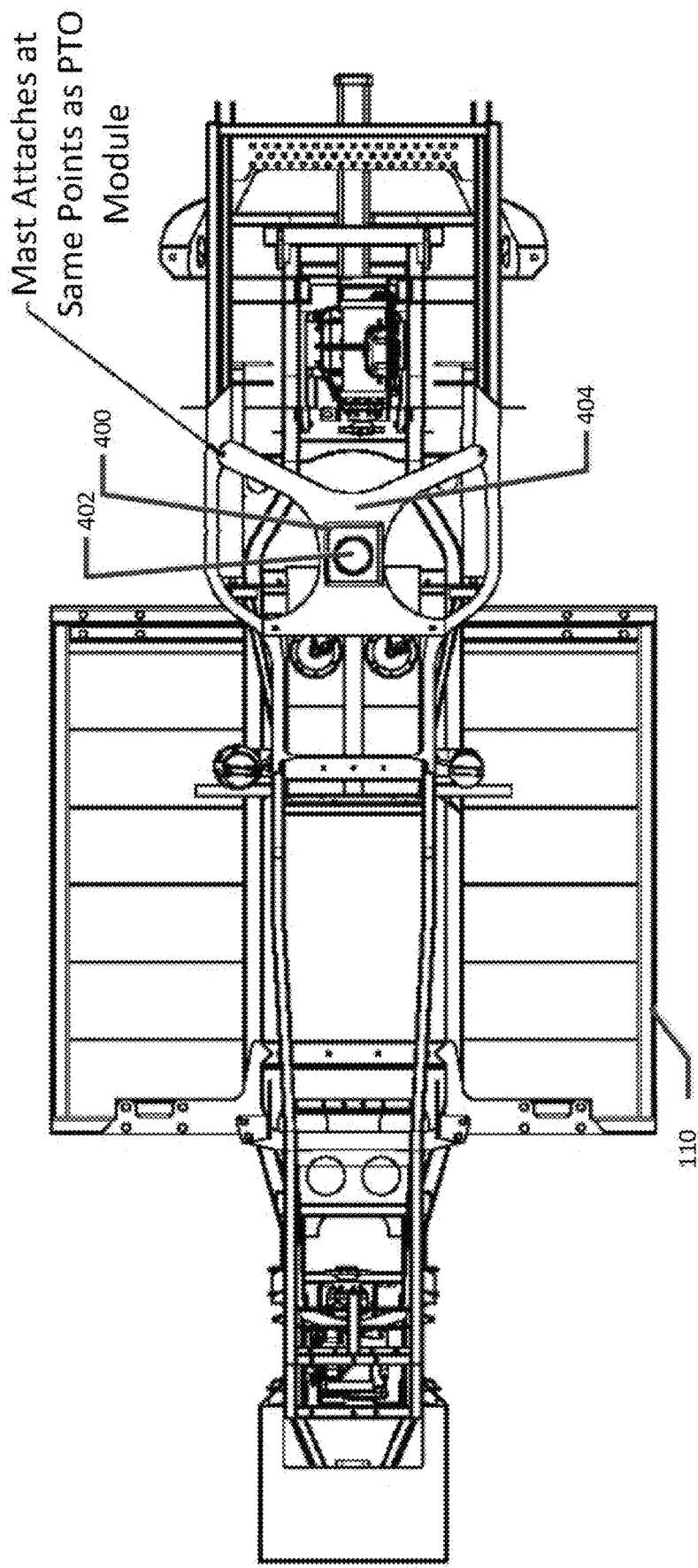
Figure 84:
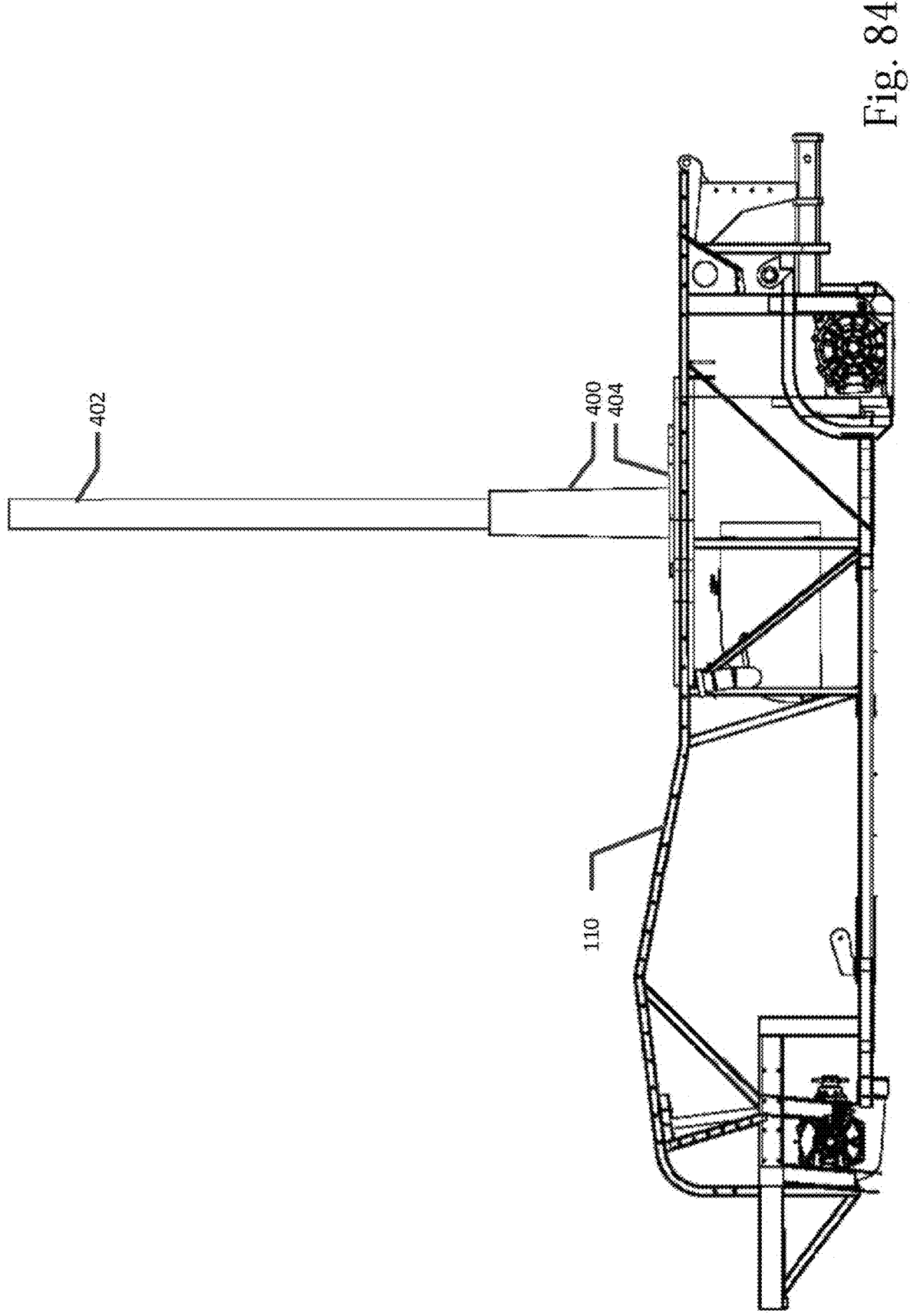
Figure 85:
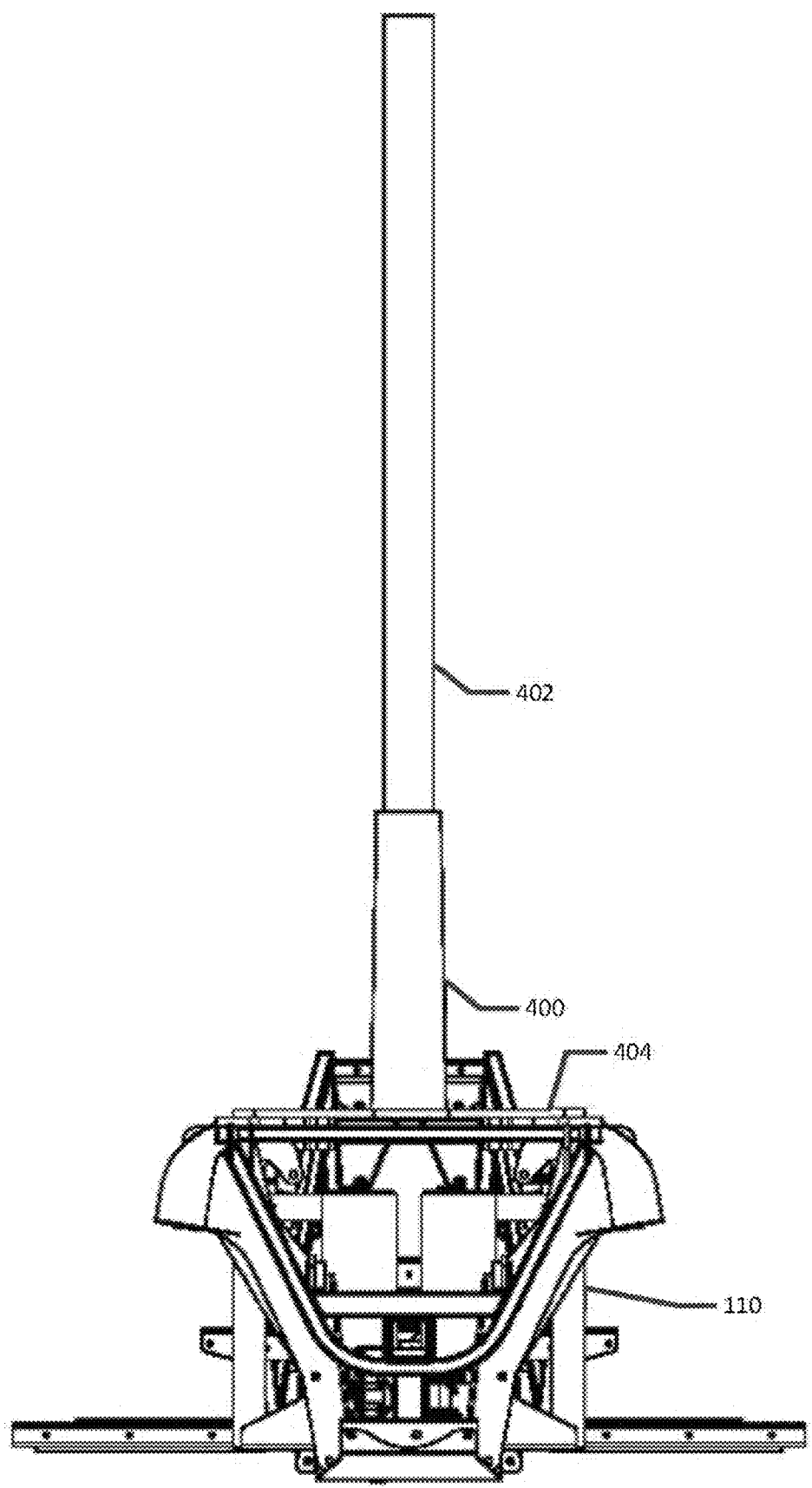

FIGS. 75 through 77 illustrate example embodiments showing a front loader 200 and a backhoe 300 attached to an ATV 100. As shown in FIGS. 75 through 77, top two corners of the backhoe 300 are supported by turnbuckles coupled to attaching eyes on the ATV frame 110. The rear hitch receiver at the bottom center of the ATV frame 110 supports the vertical loads on the backhoe 300. As a result, the backhoe 300 can be readily attached to or disconnected from the rear end of the ATV 100. An example embodiment can include a seat mount for a backhoe operator seat. An example embodiment can also include a PTO shaft and spline connector and hydraulic connections for the backhoe 300.

FIGS. 78 through 81 illustrate various alternative example embodiments showing a front loader 200 attached to an ATV 100 with a cargo bed 130 and the various types of front loader attachments that can be used to perform a variety of tasks. As such, various embodiments and configurations of the ATV 100 can provide a highly versatile ATV with a large number of different configuration variations and support for a variety of different jobs, applications, and working environments.

FIGS. 82 through 85 illustrate views of an ATV frame 110 of an example embodiment with a boom winch 400 installed on the frame 110 of the ATV 100 when the PTO module 120 is not installed in the ATV frame 110. In the example embodiment shown, the boom winch 400 and the mast 402 included therewith attaches to the ATV frame 110 via a boom winch mounting bracket 404 coupled to the frame 110 at the same mounting points of frame 110 as the PTO module 120 as described above. The boom winch mounting bracket 404 provides a plurality of extended legs to attach to the frame 110 with a large footprint, thereby providing a greater level of support for the backhoe 300.

Figure 86:
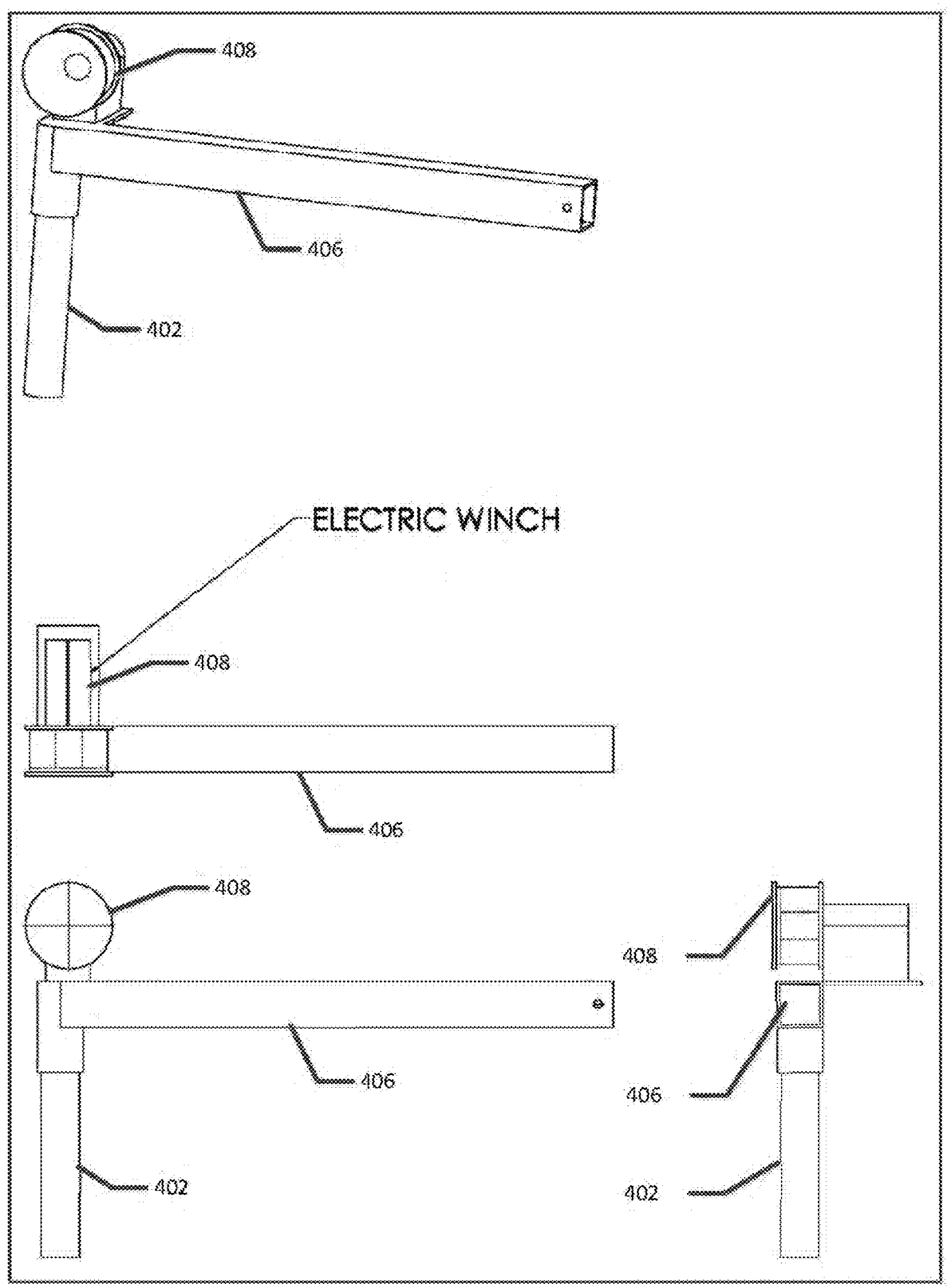
FIG. 86 illustrates detail views of the boom winch of an example embodiment.

FIG. 86 illustrates detail views of the boom winch 400 of an example embodiment. In the example embodiment shown, the boom winch 400 can include a mast 402 to which a boom arm 406 is attached. A winch 408 with wound cable can be attached to the mast 402, the boom arm 406, or the junction there between. In a particular embodiment, the winch 408 can be an electric winch. The winch 408 can include an electric winch motor to pull a steel cable through the boom arm 406 and wind the cable on a spool mounted at the top of the boom mast 402.

Figure 87:
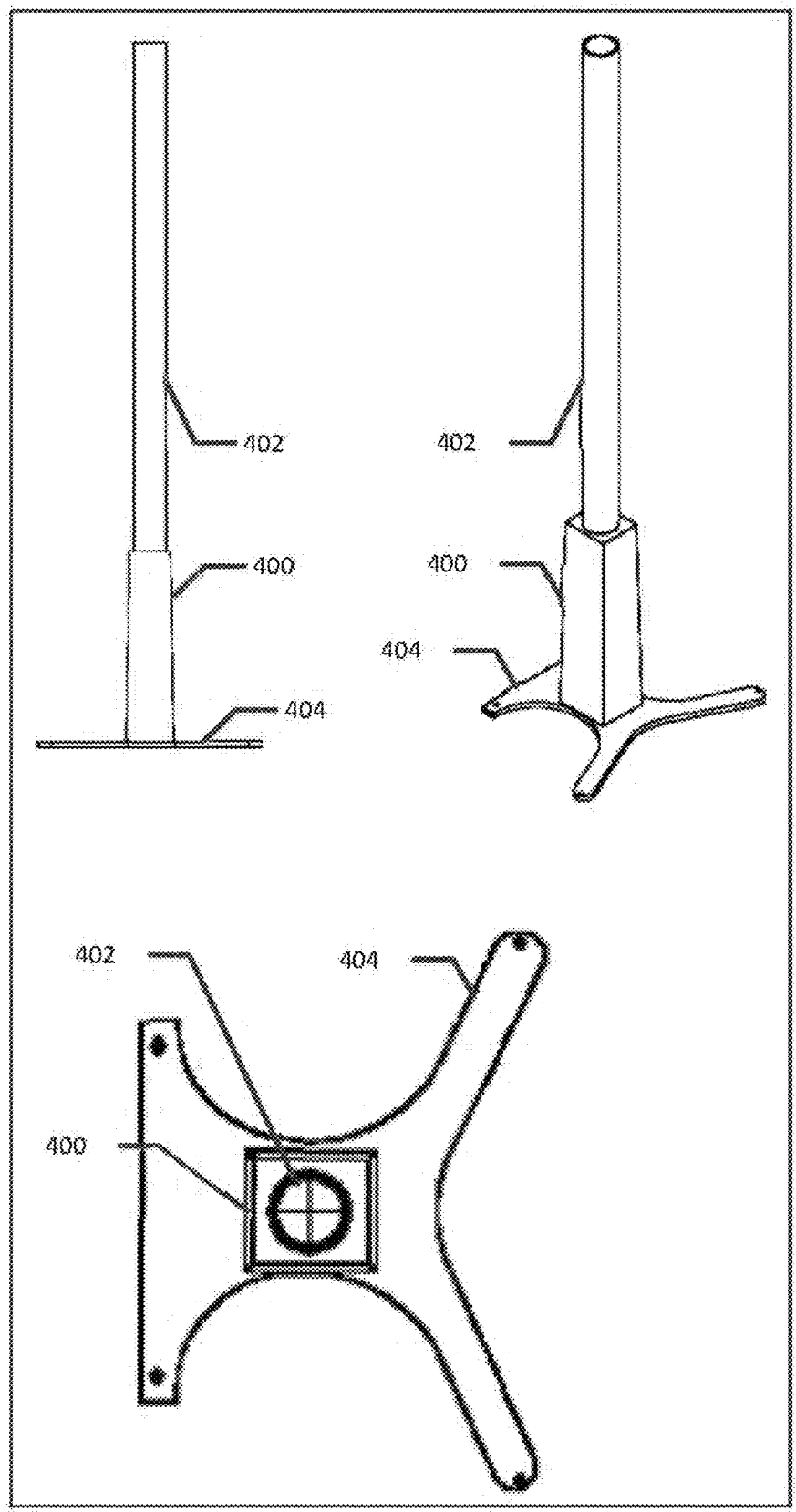
FIG. 87 illustrates detail views of the boom mast and boom winch mounting bracket of an example embodiment.

FIG. 87 illustrates detail views of the boom mast 402 and boom winch mounting bracket 404 of an example embodiment. As described above, the boom winch mounting bracket 404 provides a plurality of extended legs to attach to the frame 110 with a large footprint, thereby providing a greater level of support for the backhoe 300.

Figure 88:
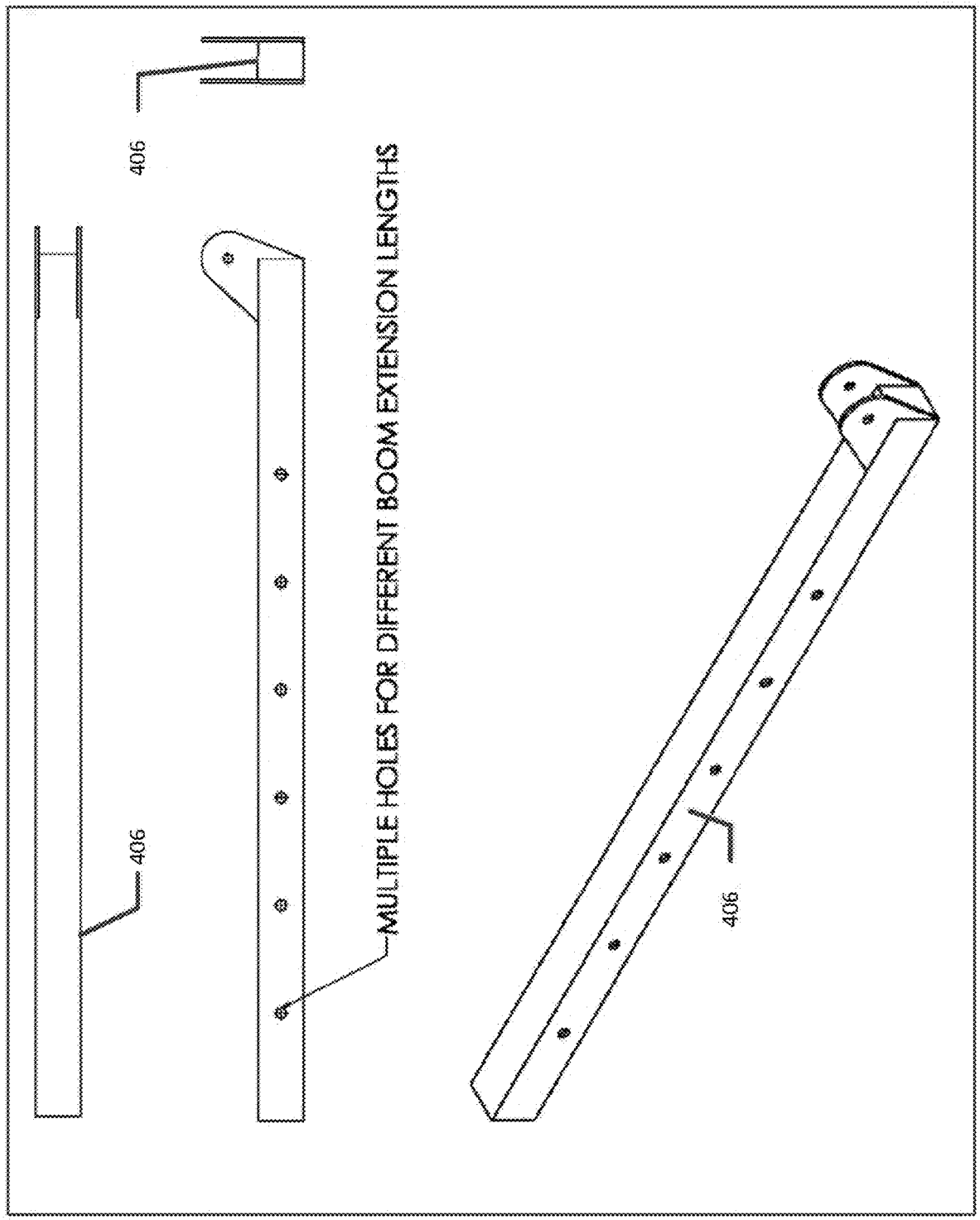
FIG. 88 illustrates detail views of the boom arm of an example embodiment.

FIG. 88 illustrates detail views of the boom arm 406 of an example embodiment. As shown, the boom arm 406 can include a plurality of side holes to accommodate different options for a boom extension length. As such, the boom arm 406 can provide multiple holes along a side of the boom arm 406 to provide for different boom extension lengths.

Figure 89:
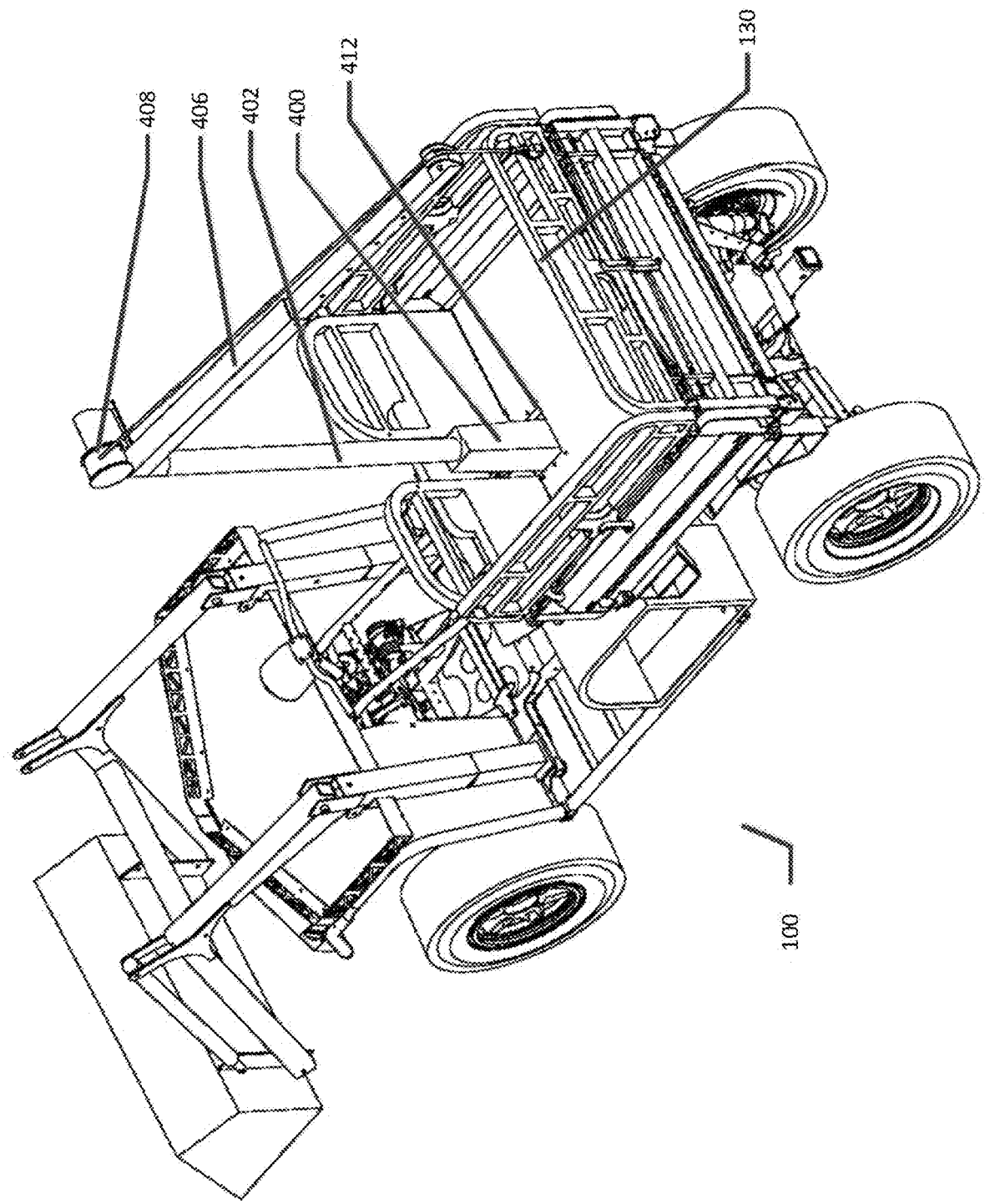
FIGS. 89 through 93 illustrate views of an ATV of an example embodiment with a boom winch installed in the cargo bed of the ATV.
Figure 90:
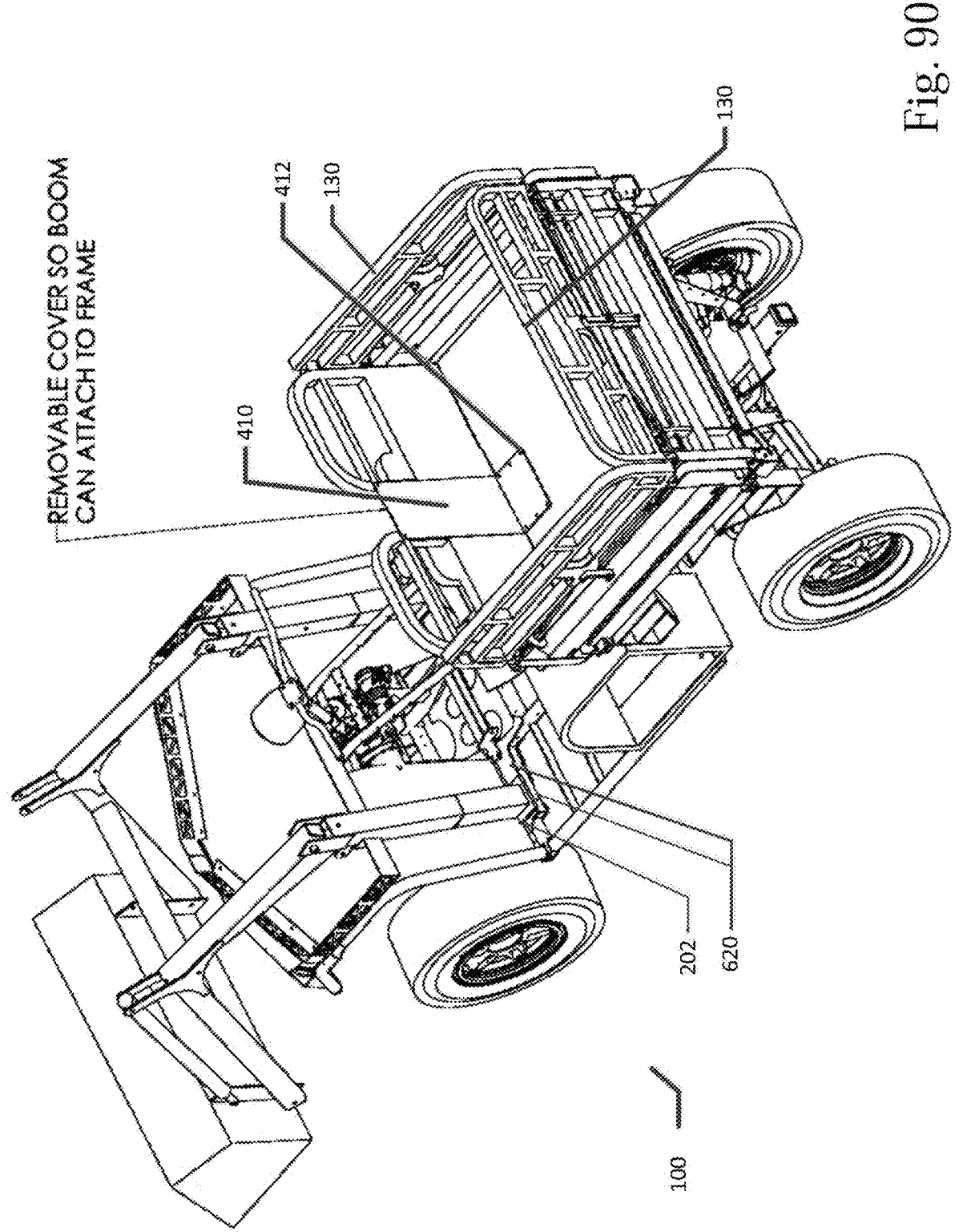
Figure 91:
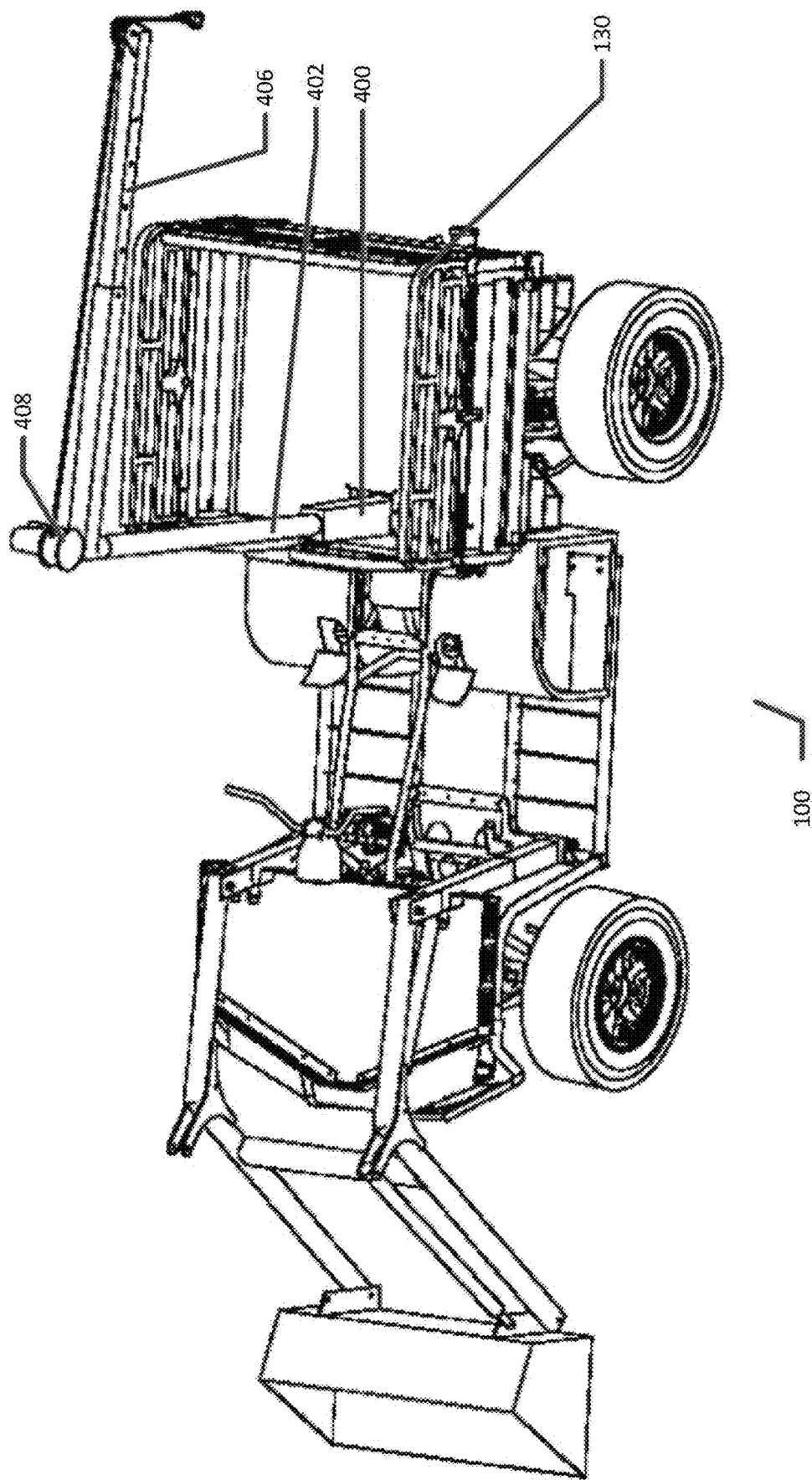
Figure 92:
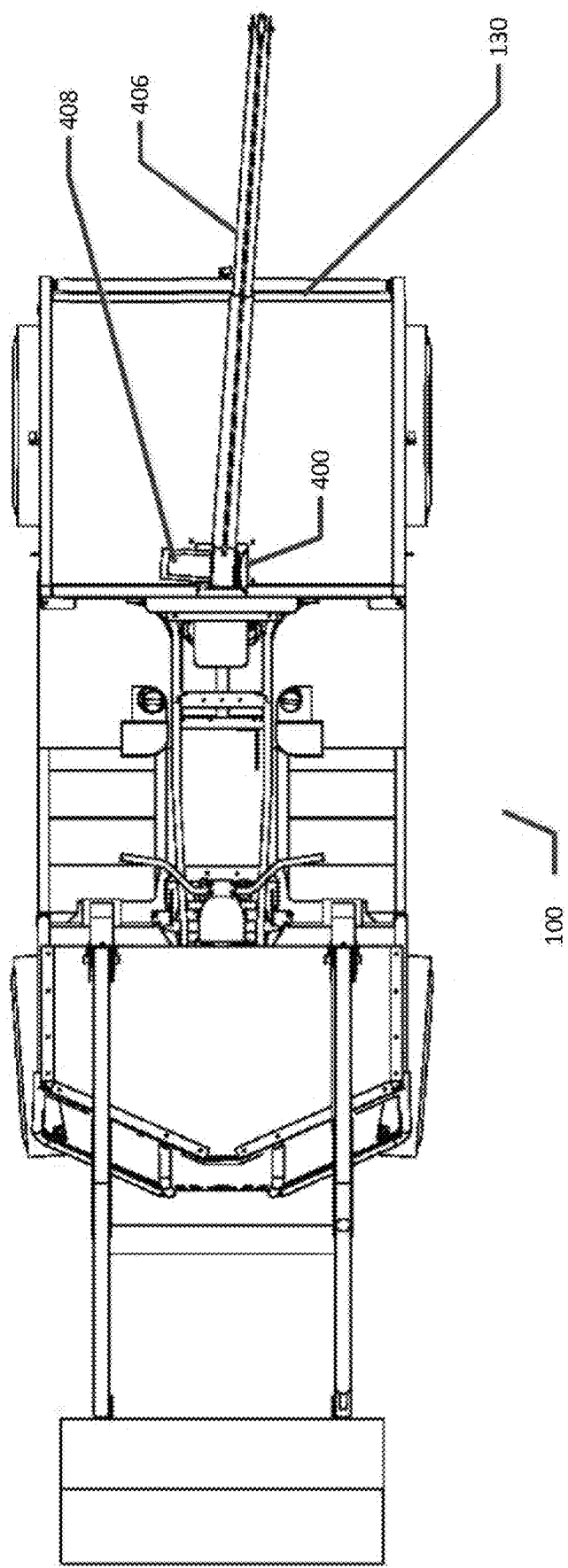
Figure 93:
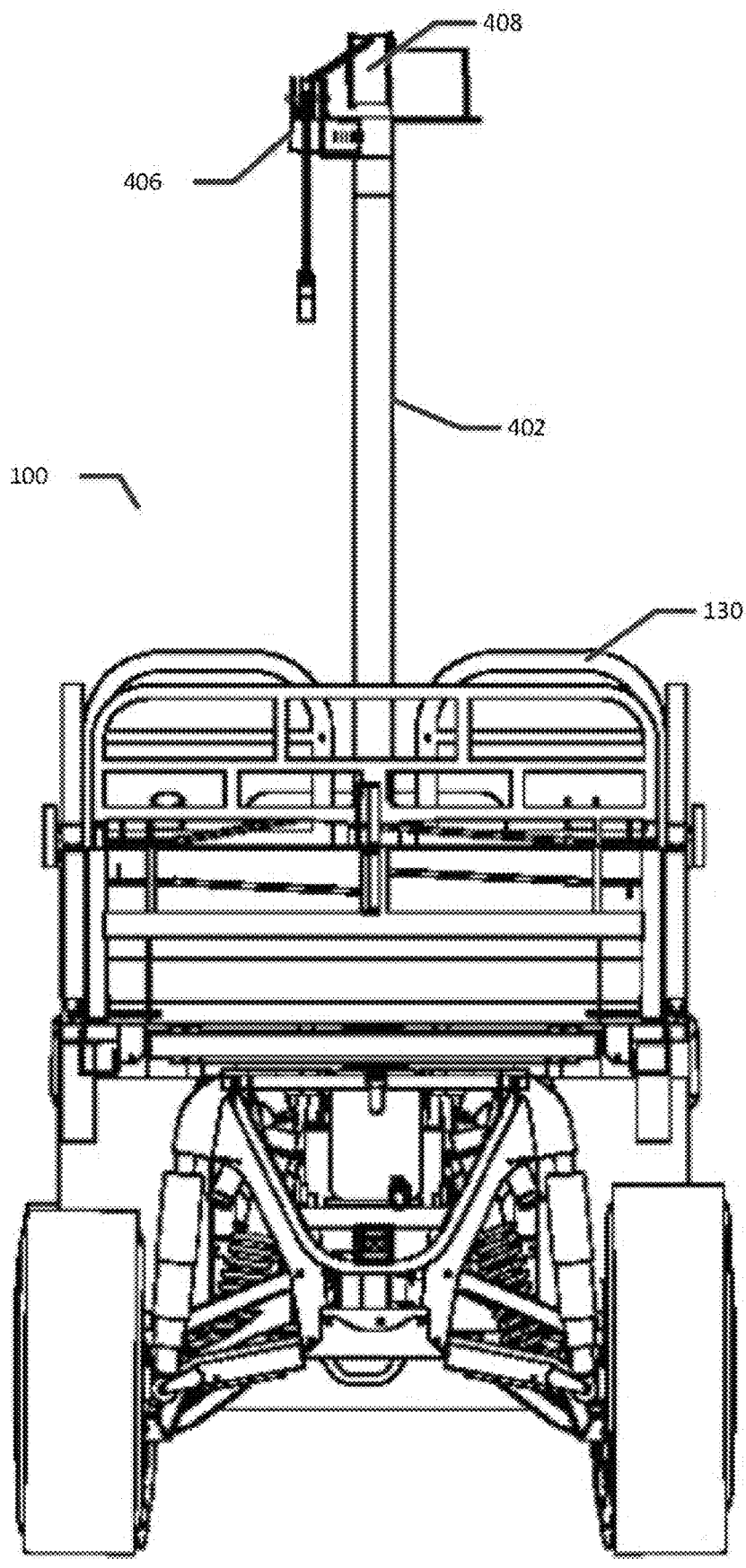

FIGS. 89 through 93 illustrate views of an ATV 100 of an example embodiment with a boom winch 400 installed in the cargo bed 130 of the ATV 100. As shown in FIGS. 89 and 90 for an example embodiment, the cargo bed 130 can include a cut-out portion 412 in a forward panel and floor panel to enable the boom winch to be installed at attach points on the frame 110 of the ATV 100 under the cargo bed 130. A removable cover plate 410 can be used to cover the cut-out portion 412 in the forward and floor panels of the cargo bed 130 when the boom winch 400 is not installed in the cargo bed 130. The cargo bed 130 can be configured with the cut-out portion 412 and a depression for retaining the boom winch 400. As a result, the boom winch 400 can lift loads into and out of the cargo bed 130.

Figure 94:
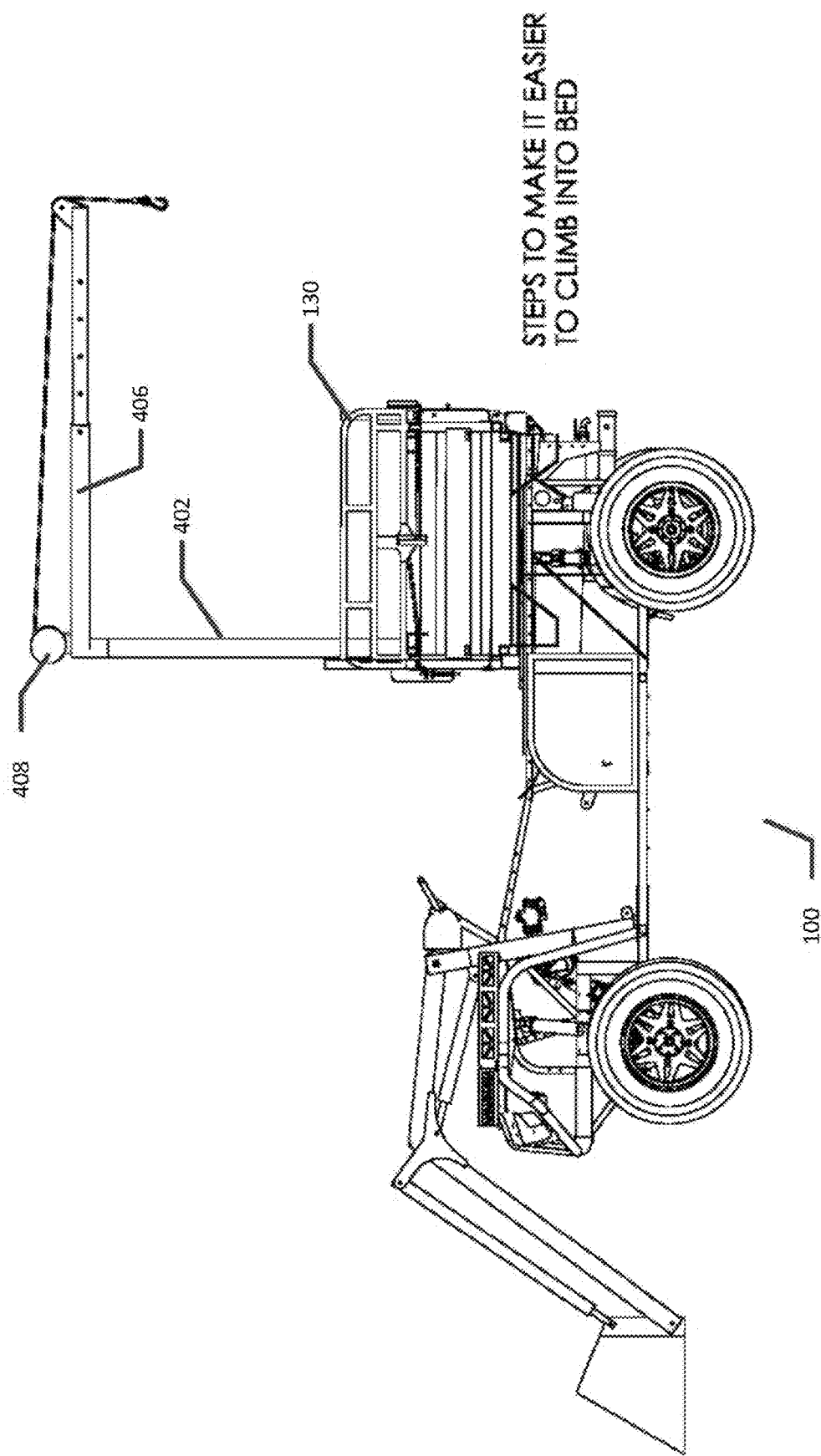
FIG. 94 illustrates an ATV of an example embodiment with a boom winch installed in the cargo bed of the ATV, the cargo bed including steps to facilitate access to the cargo bed and boom winch.

FIG. 94 illustrates an ATV 100 of an example embodiment with a boom winch 400 installed in the cargo bed 130 of the ATV 100, the cargo bed 130 including steps to facilitate access to the cargo bed 130 and the boom winch therein. In an example embodiment, the cargo bed 130 can provide foot step recesses in the cargo bed 130, which can act as steps enabling a user to step up into the cargo bed 130 for customer convenience.

Figure 95:
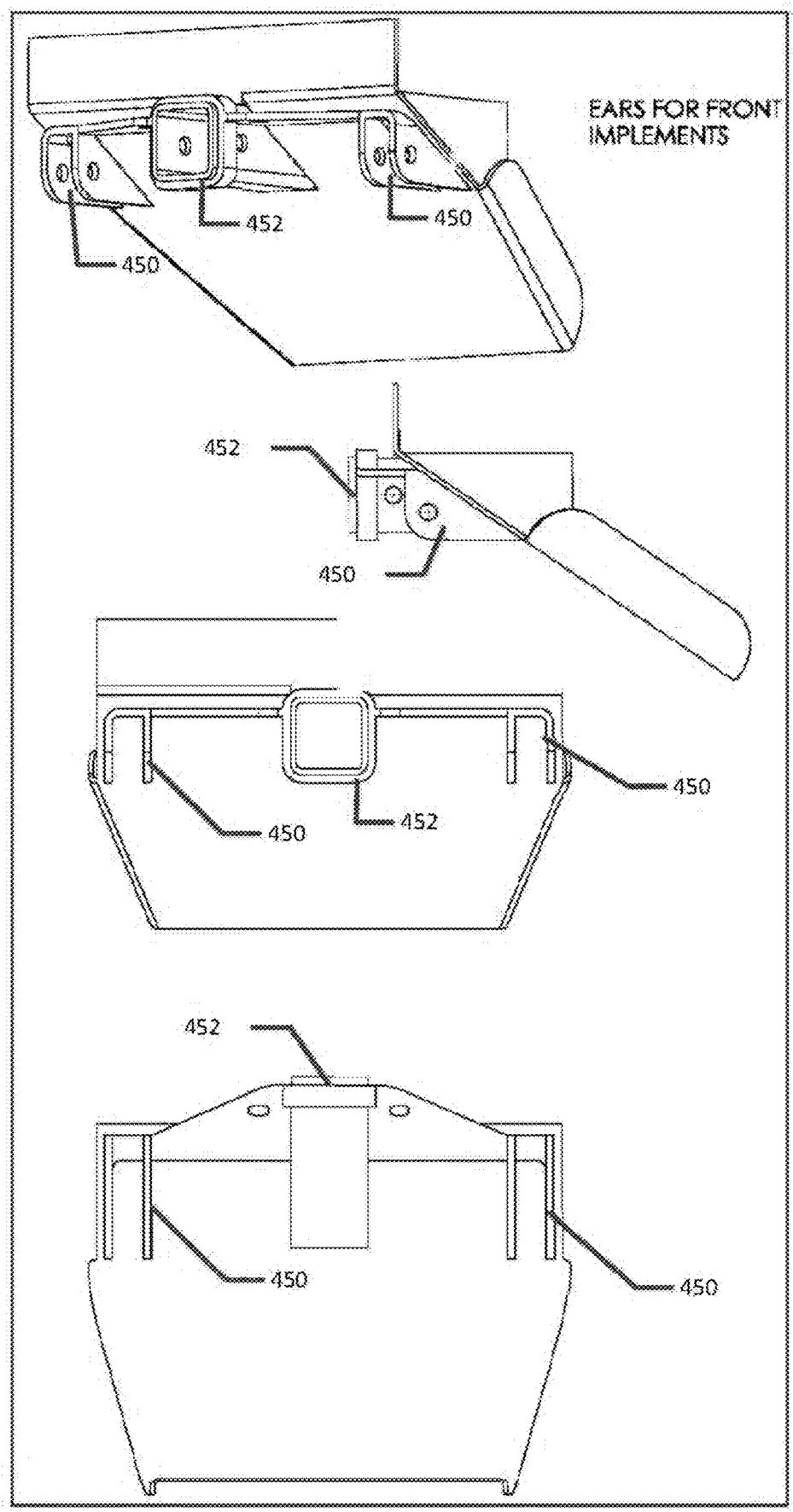
FIGS. 95 and 96 illustrate an ATV of an example embodiment with a set of attachment ears on the front of the ATV for coupling implements or tools to the front of the ATV.
Figure 96:
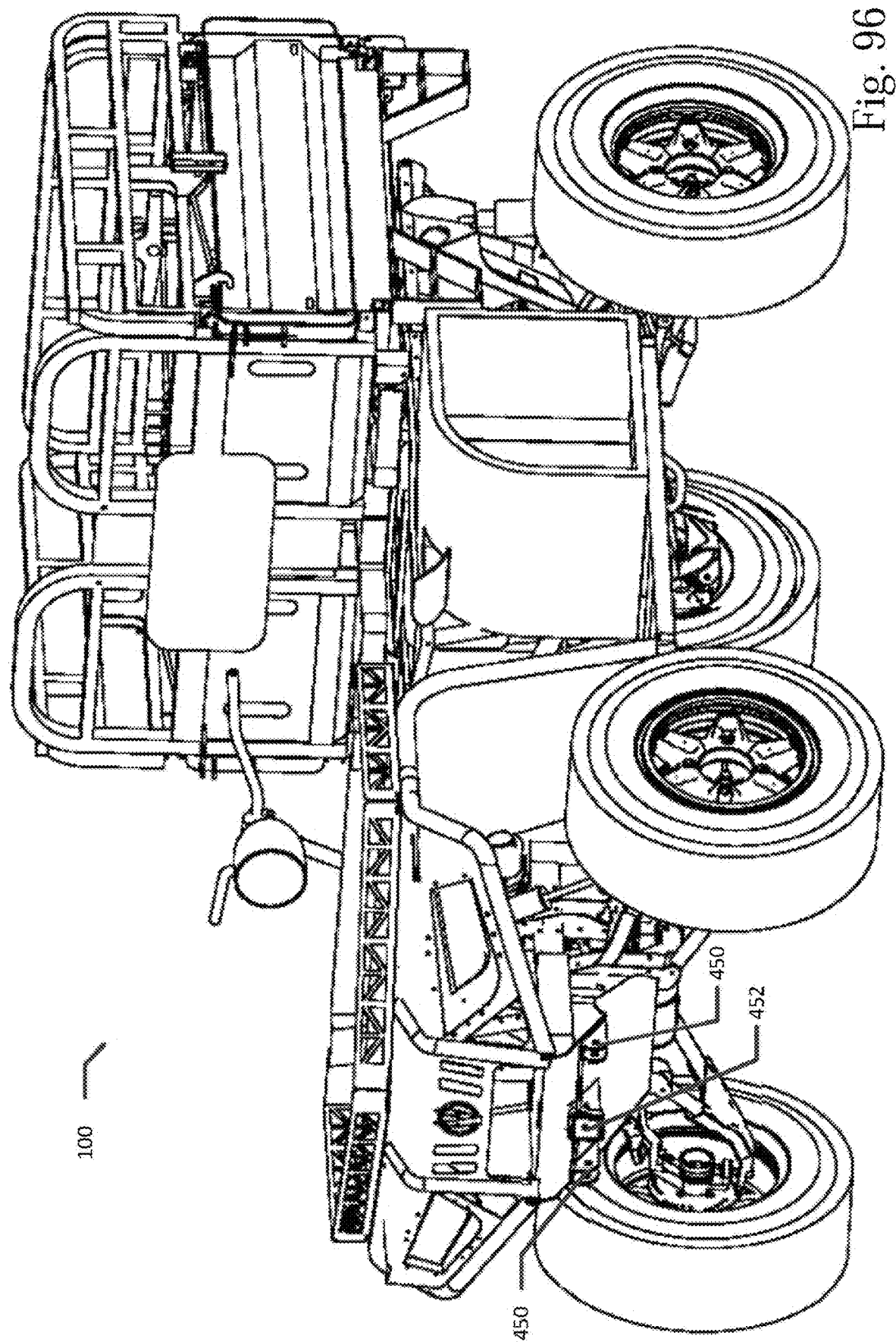
Figure 97:
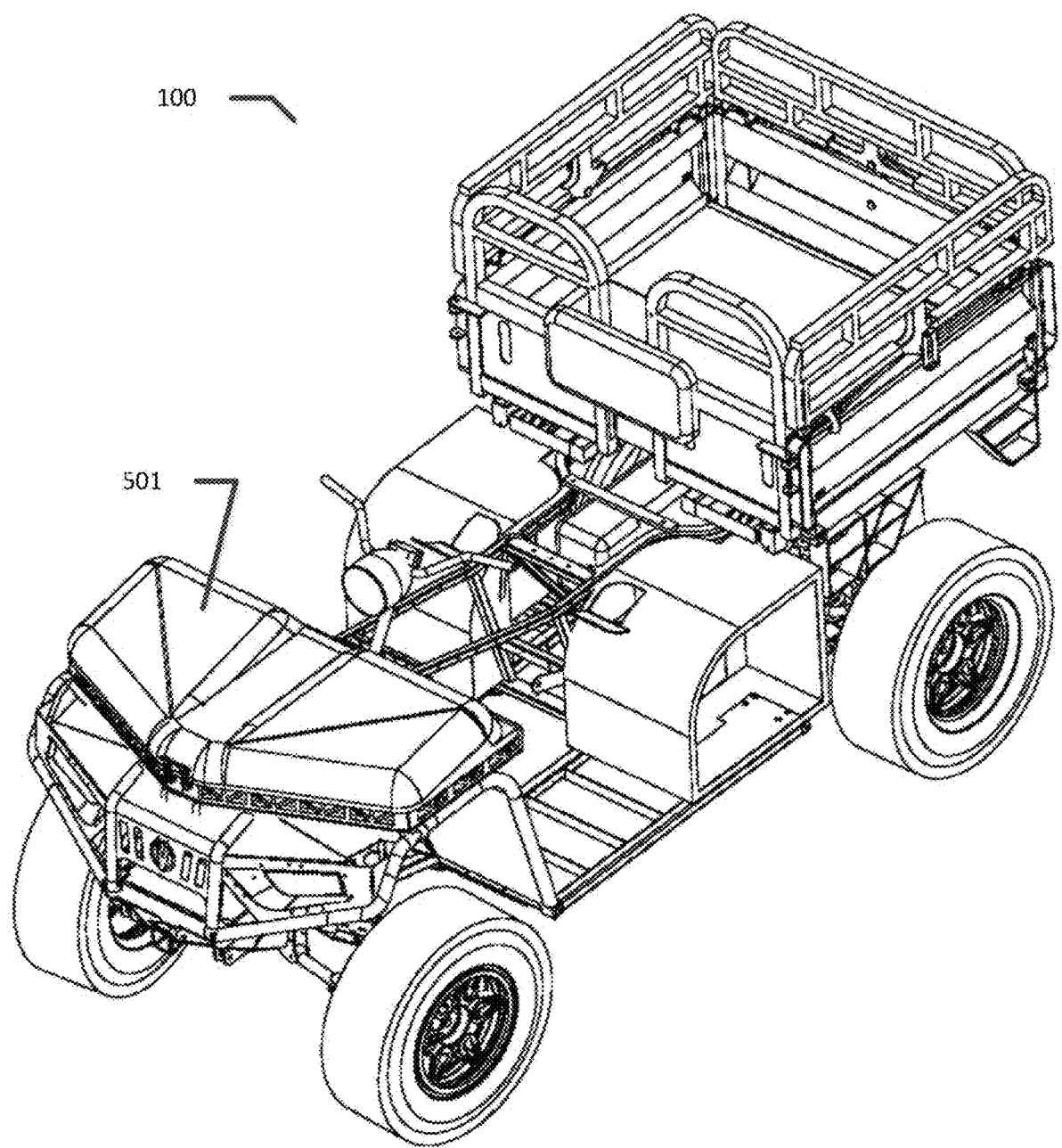
FIGS. 97 through 101 illustrate an example embodiment of an ATV with a front hood and storage area.
Figure 98:
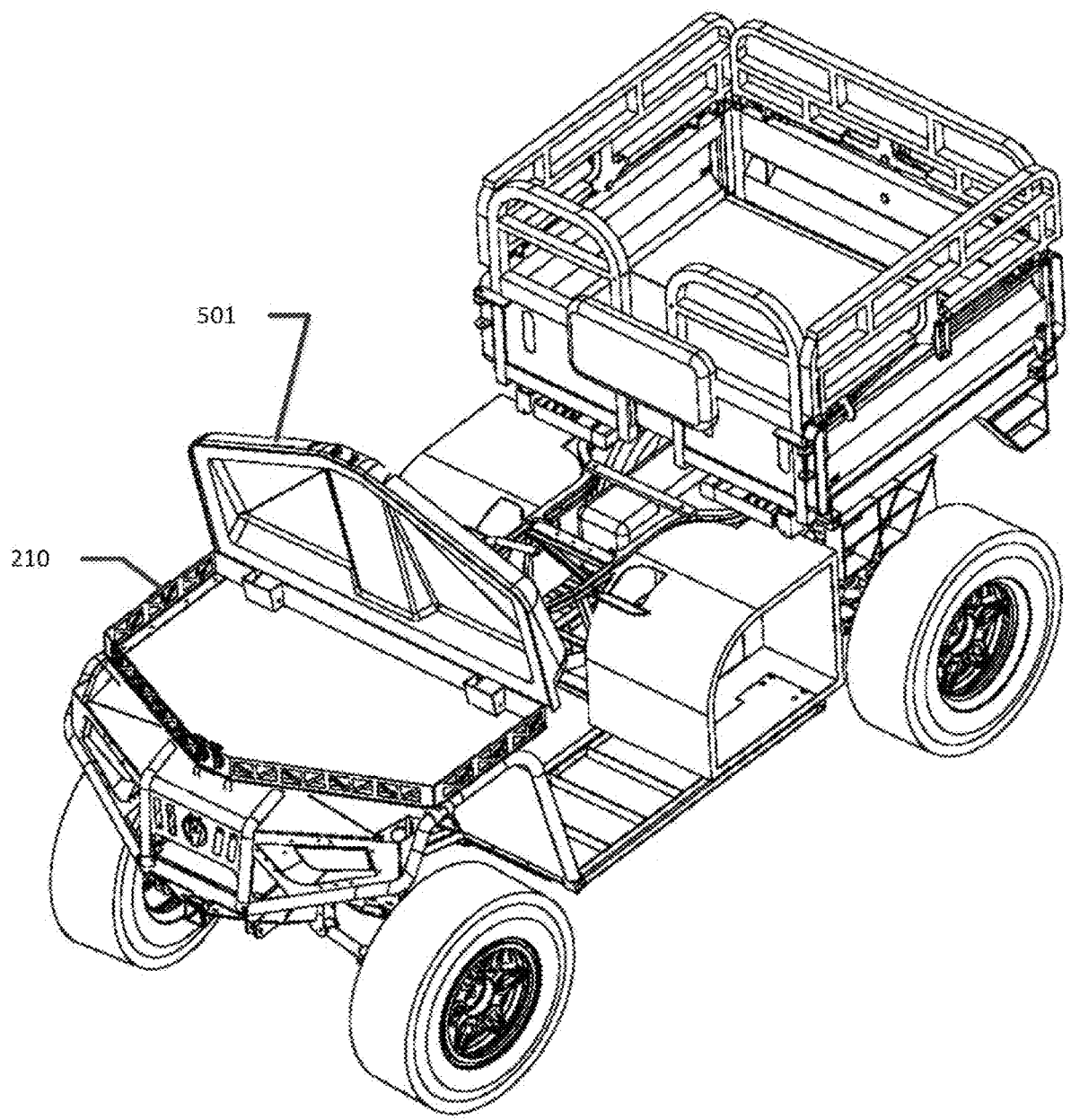
Figure 99:
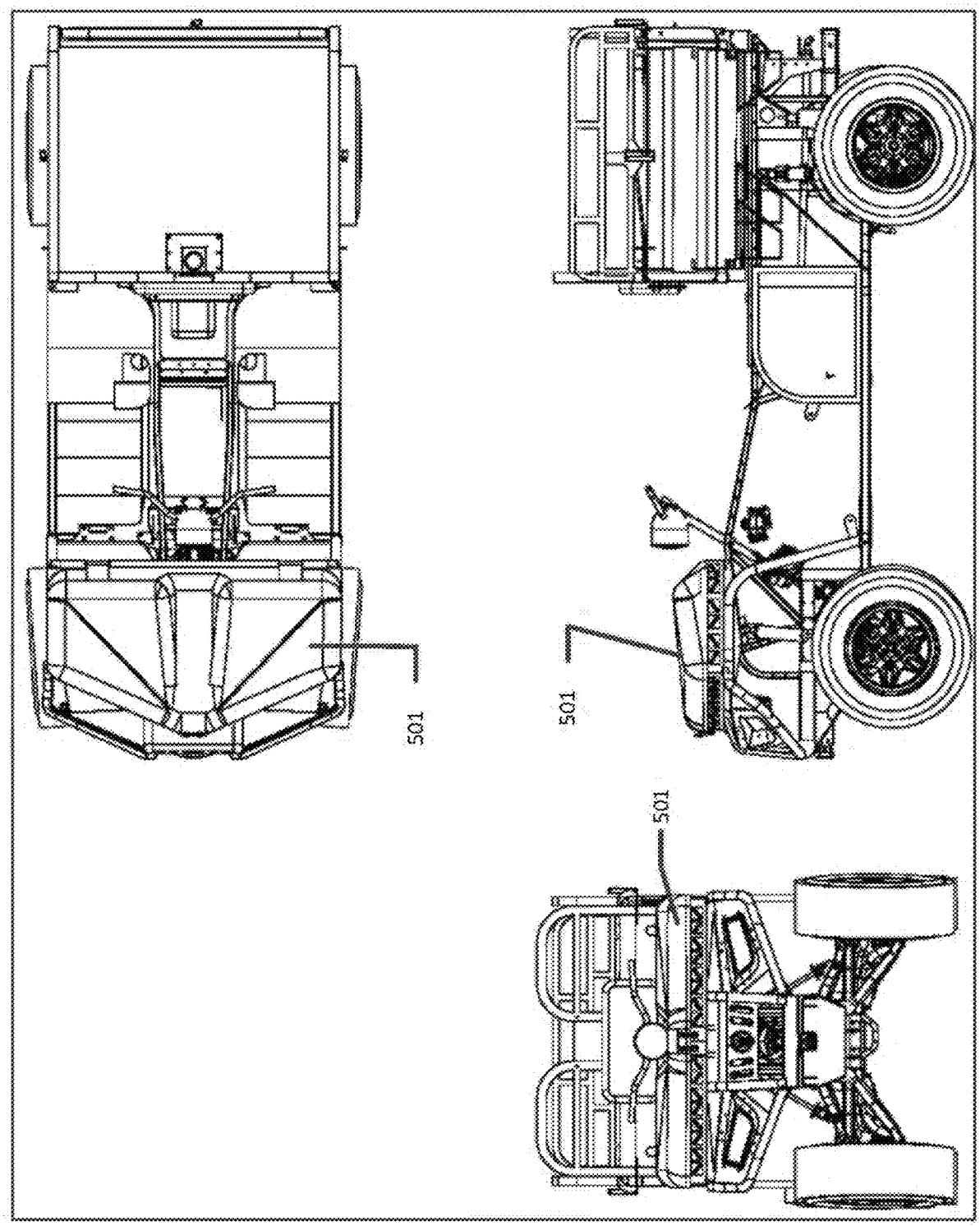
Figure 100:
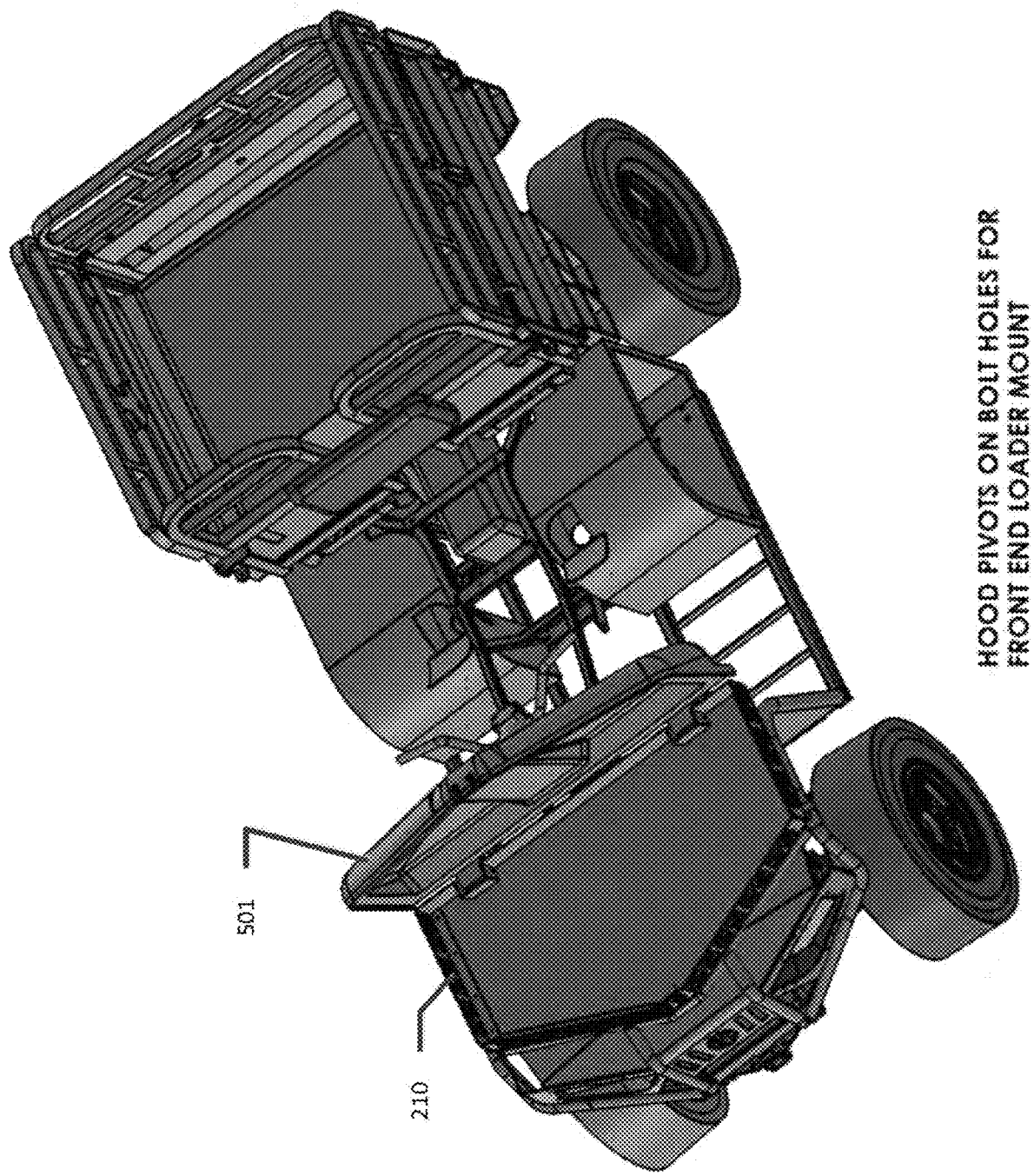
Figure 101:
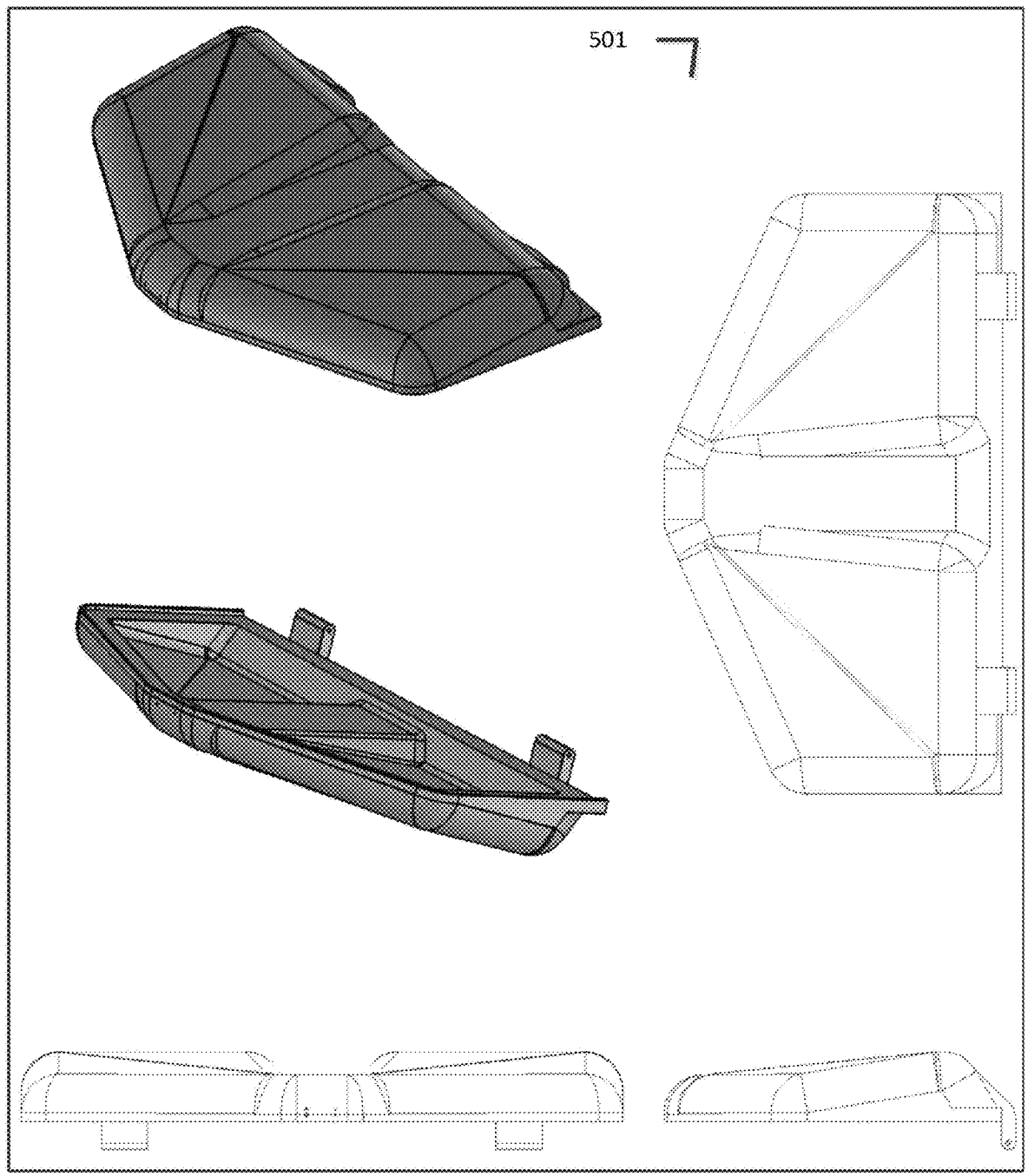
Figure 102:
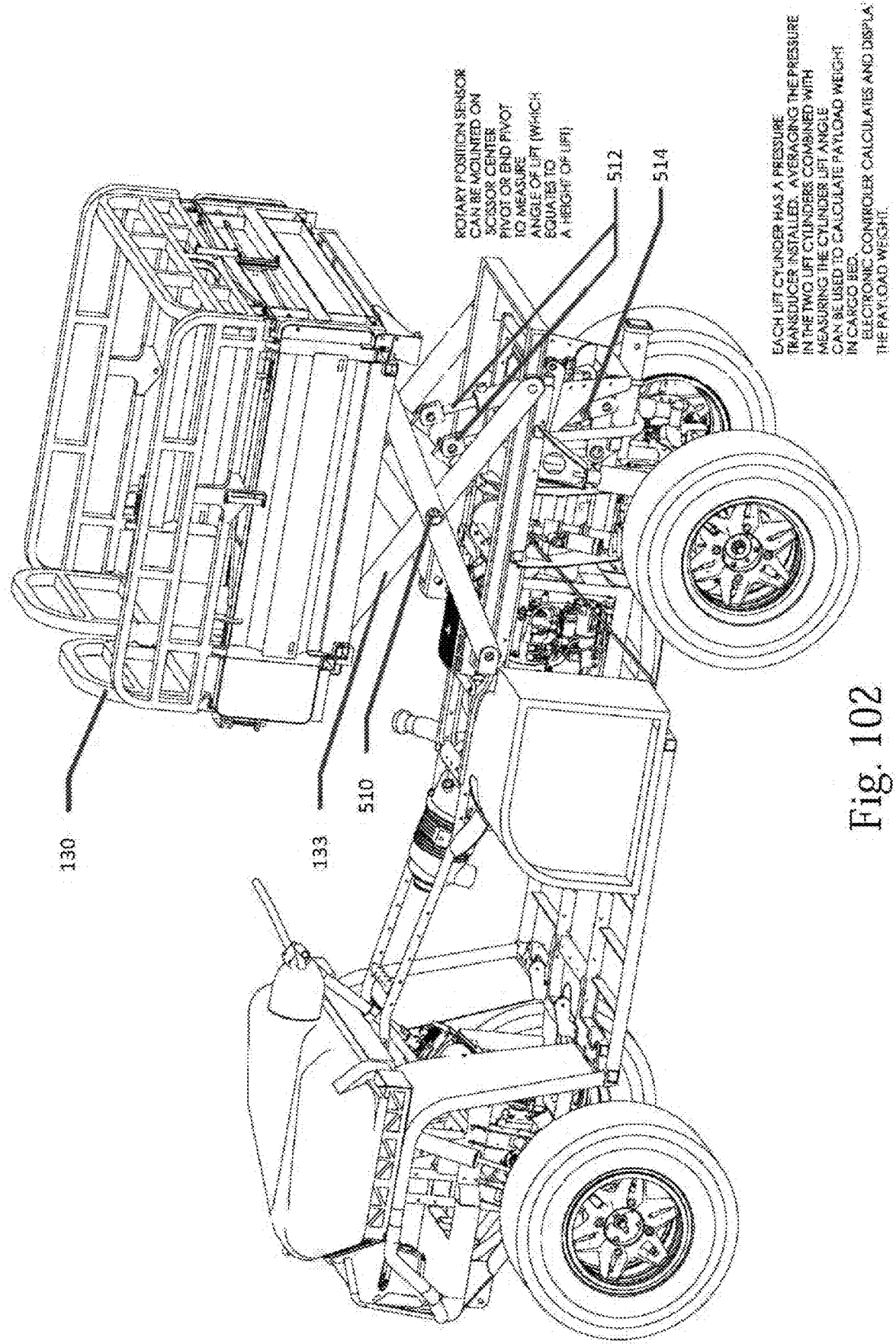
FIGS. 102 through 107 illustrate a cargo bed weight measurement or scale system of an example embodiment.
Figure 103:
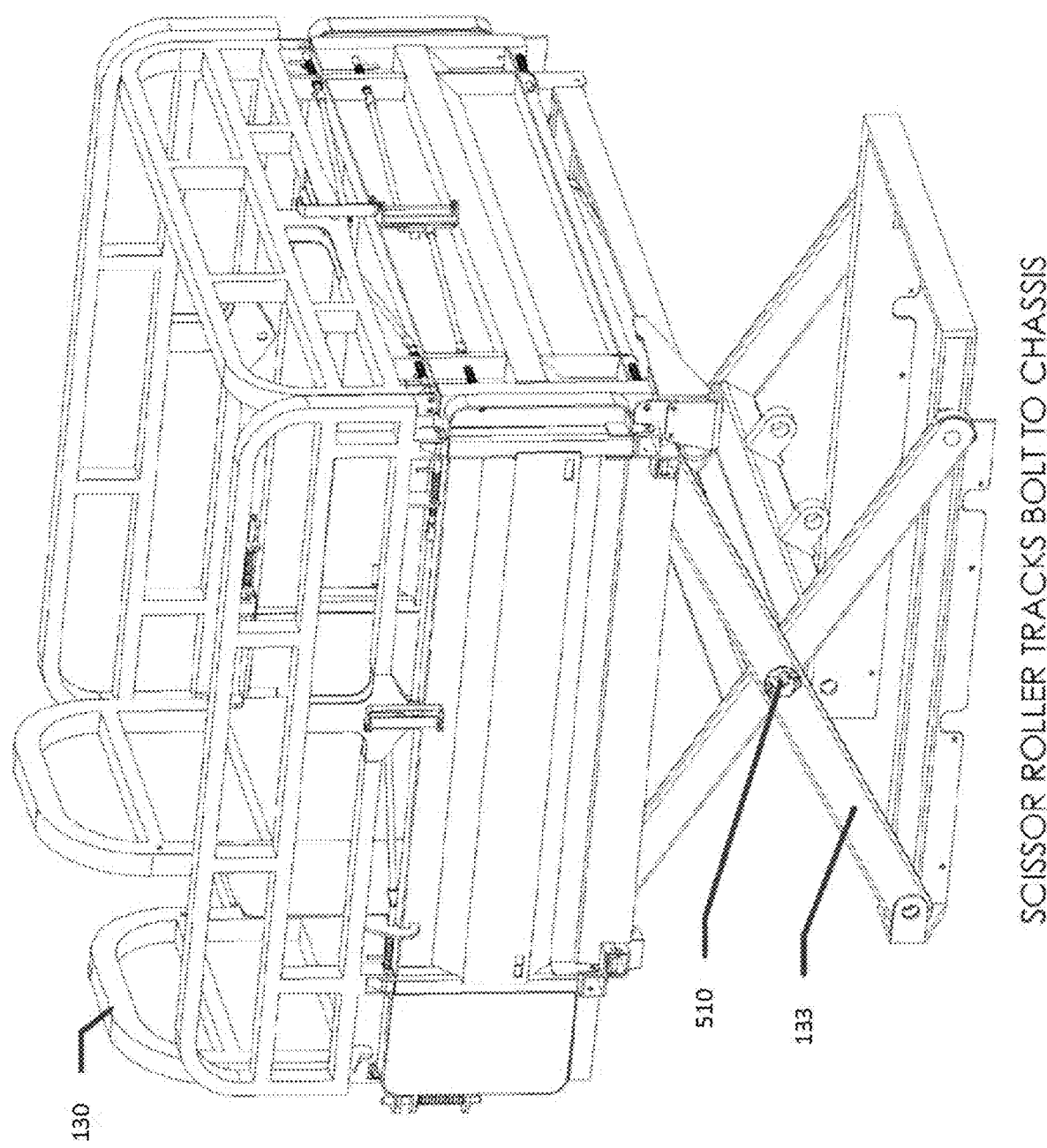
Figure 104:
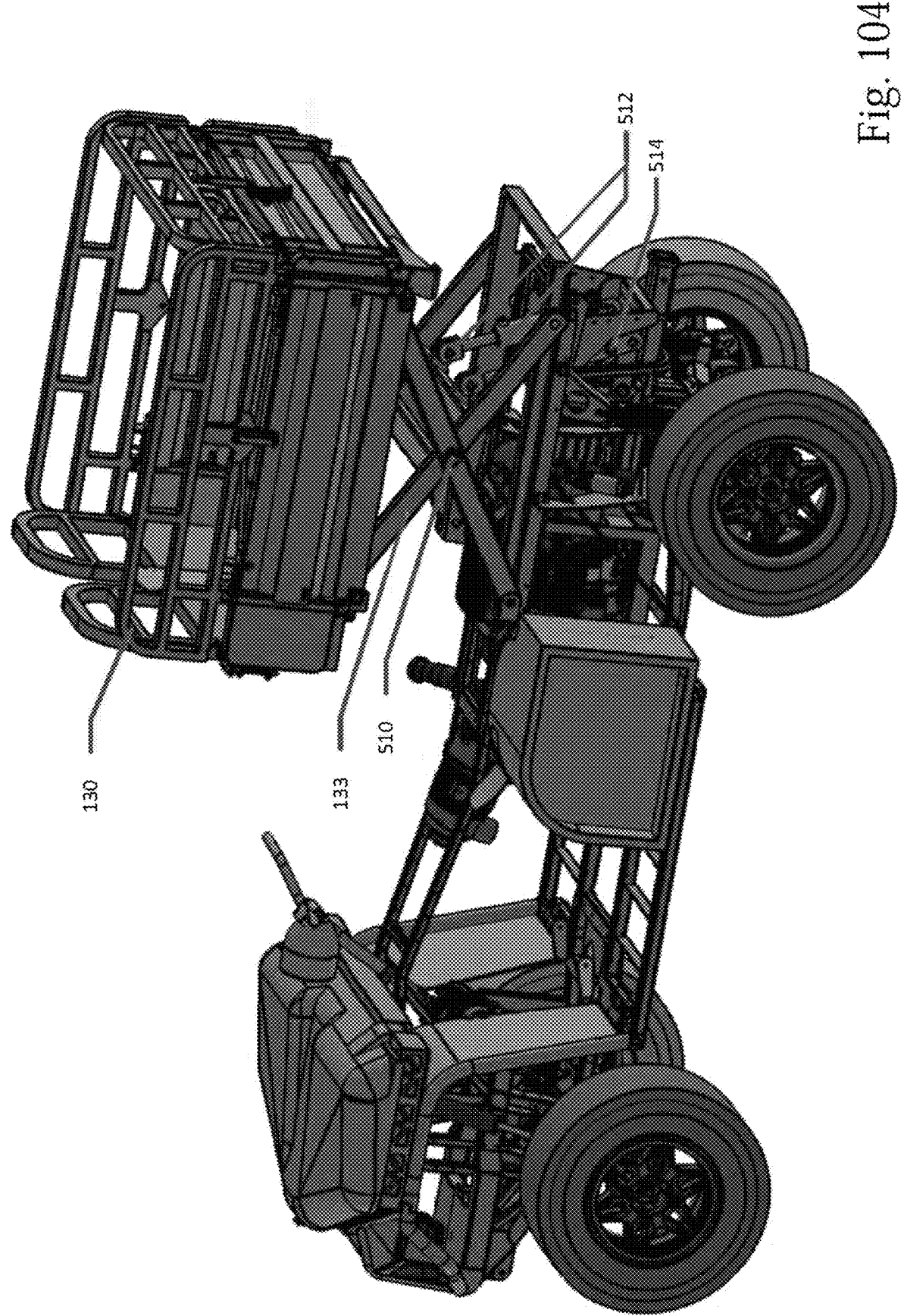
Figure 105:
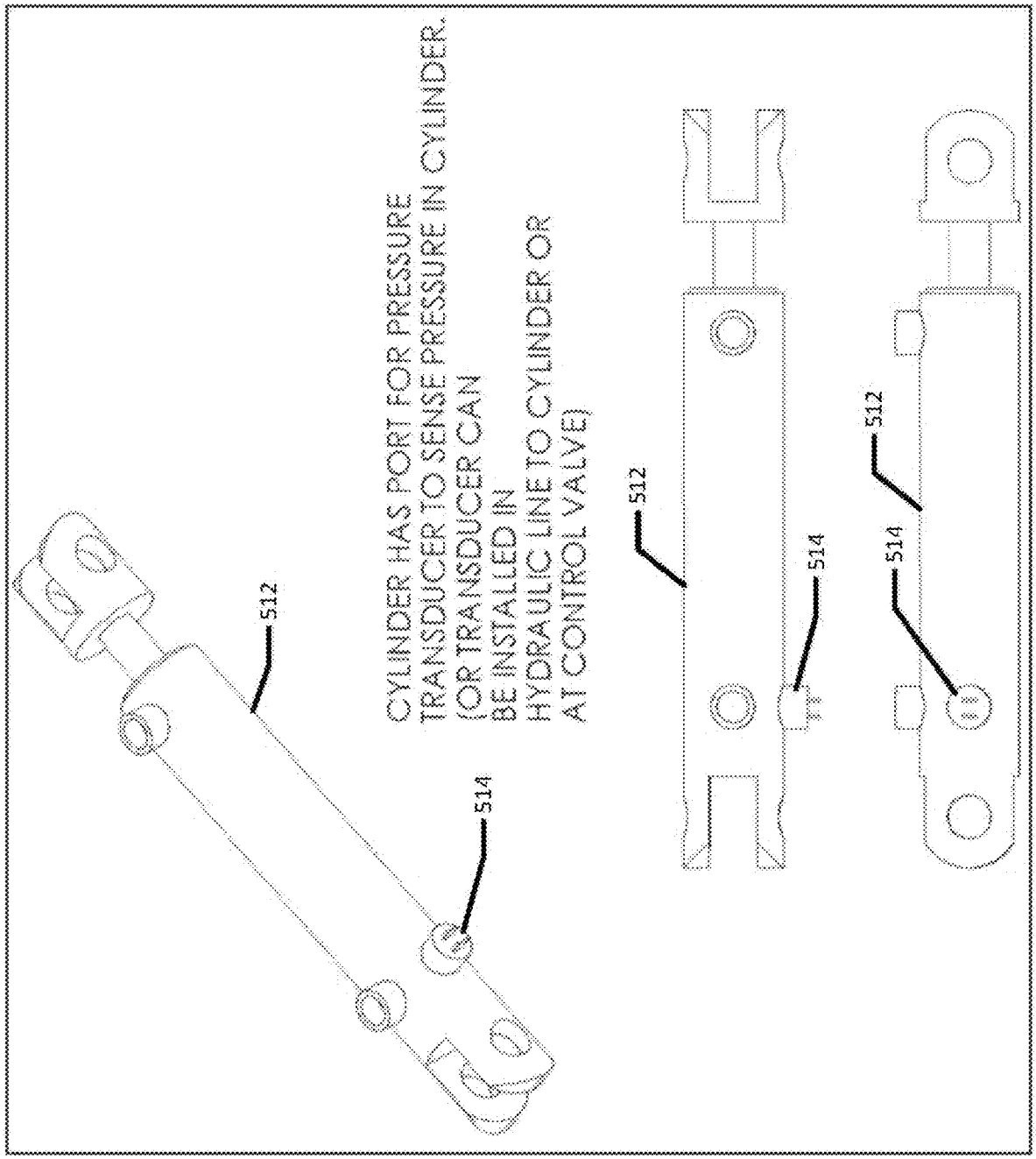
Figure 106:
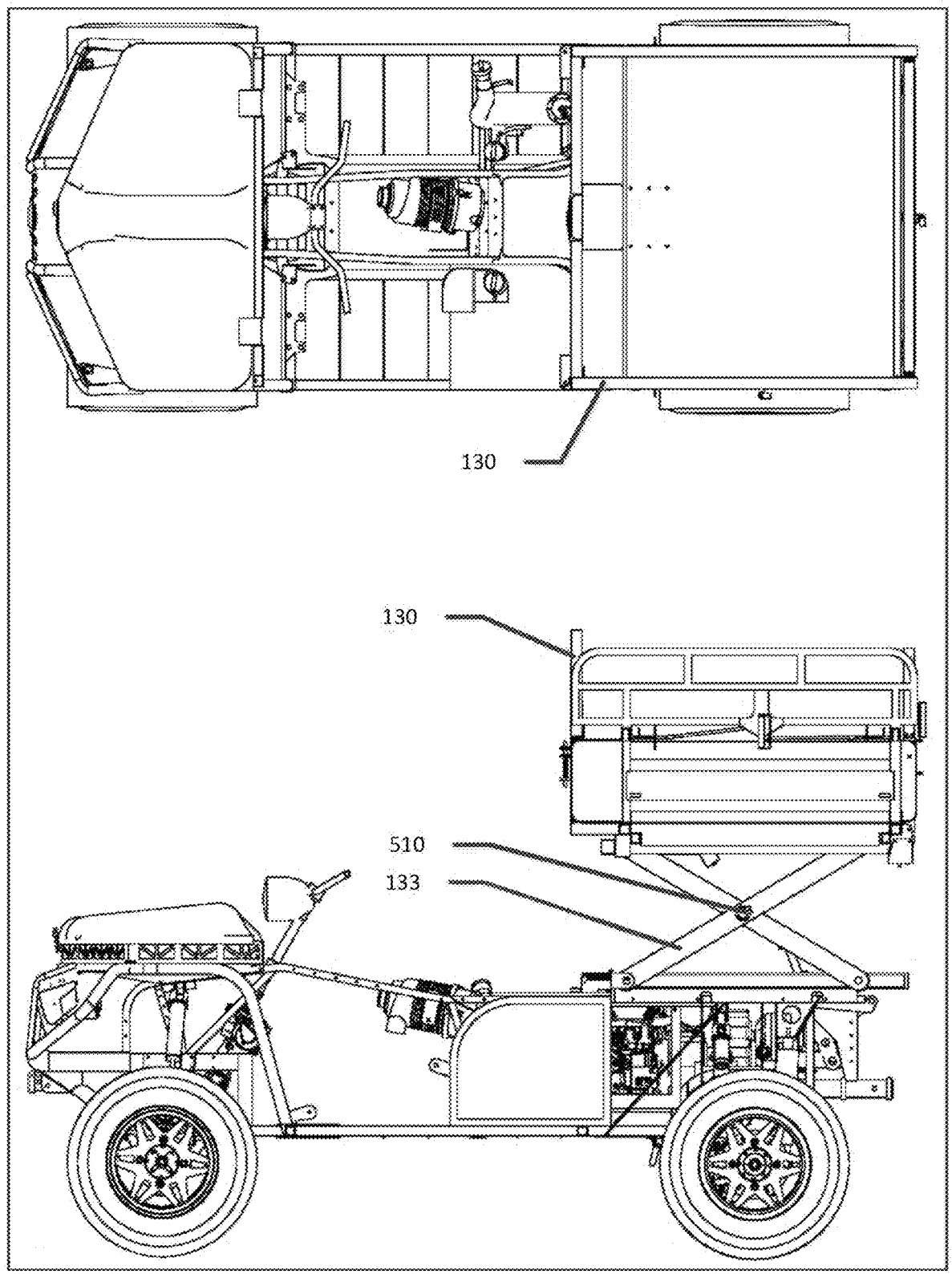
Figure 107:
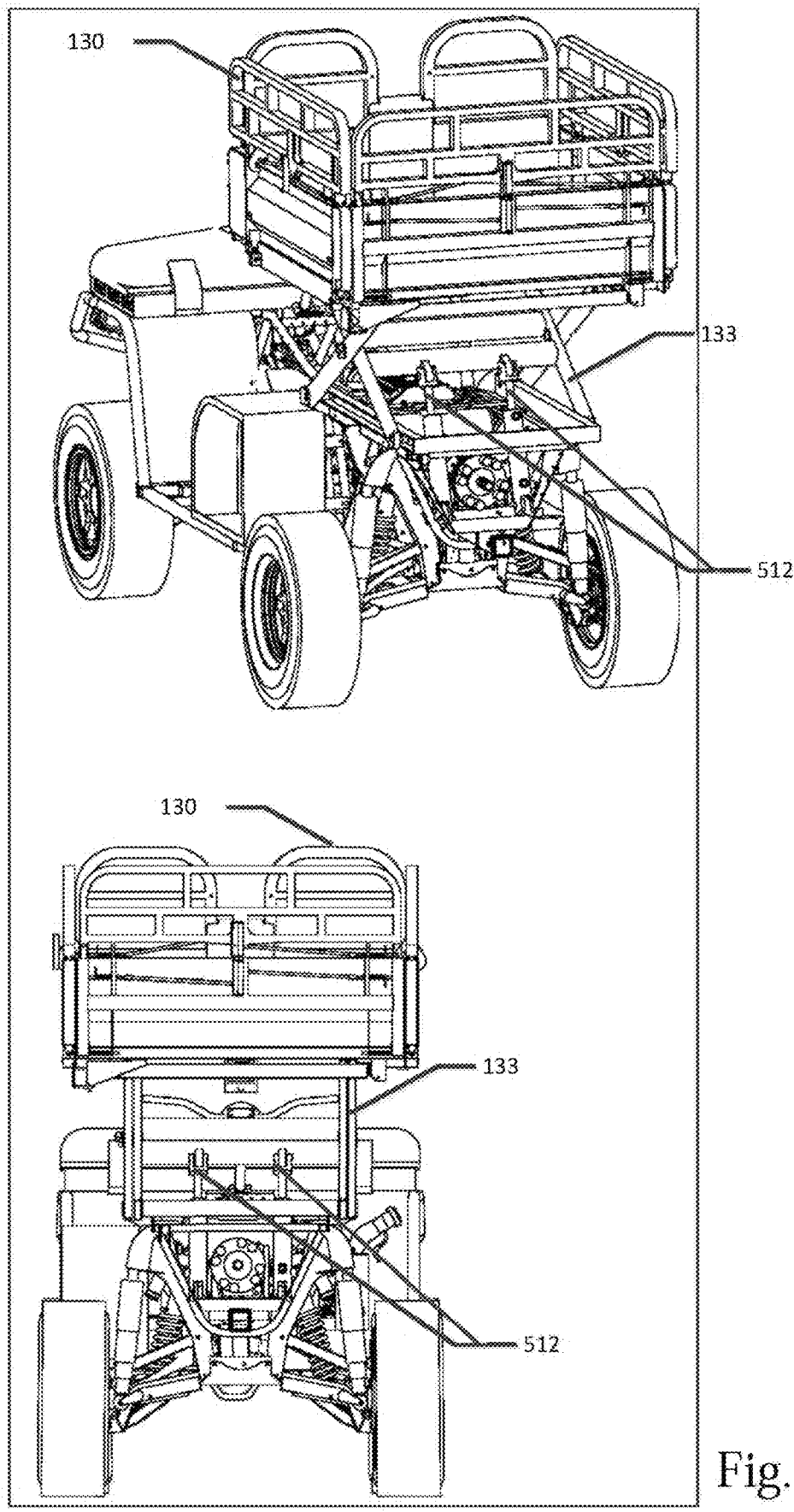

FIGS. 95 and 96 illustrate an ATV of an example embodiment with a component providing a combination of a set of attachment ears 450, a front end hitch receiver 452, and a skid plate for installation on the front of the ATV 100. This component is provided to facilitate the coupling of implements or tools to the front of the ATV 100. The component with the attachment ears 450 and the front hitch receiver 452 can be coupled to the frame 110 in the front of the ATV 100. A user can use the attachment ears 450 for connection of the front of the ATV 100 with support rods of attachable implements.

FIGS. 97 through 101 illustrate an example embodiment of an ATV 100 with a front hood and storage area 501. When the front loader 200 is not attached to the ATV 100, the upper attach points 204 can be used to attach a cover or front hood 501 that encloses the support and storage platform 210 and provides a storage area within the platform 210. This embodiment is shown in more detail in FIGS. 97 through 101.

FIGS. 102 through 107 illustrate a cargo bed weight measurement or scale system of an example embodiment. As shown in FIGS. 102 through 107, a rotary position sensor 510 can be mounted on the center pivot point or an end pivot point of scissor lift 133. The rotary position sensor 510 can measure the angle of lift of the cargo bed 130. The angle of lift of the cargo bed 130 has a direct relation to the height of the cargo bed 130 and the height of the scissor lift 133. The example embodiment shown in FIGS. 102 through 107 can include dual lift cylinders 512, which can be used to raise or lower the cargo bed 130 via the scissor lift 133. Each of the dual lift cylinders 512 can include a pressure transducer 514, which can measure a level of pressure in the lift cylinder 512. The measured level of pressure in each lift cylinder 512 can be averaged and combined with the measured angle of lift of the cargo bed 130 to calculate a payload weight in the cargo bed 130. An electronic controller and display device installed in the ATV 100 can be used to calculate the payload weight and to display the payload weight to the user via the display device.

Figure 108:
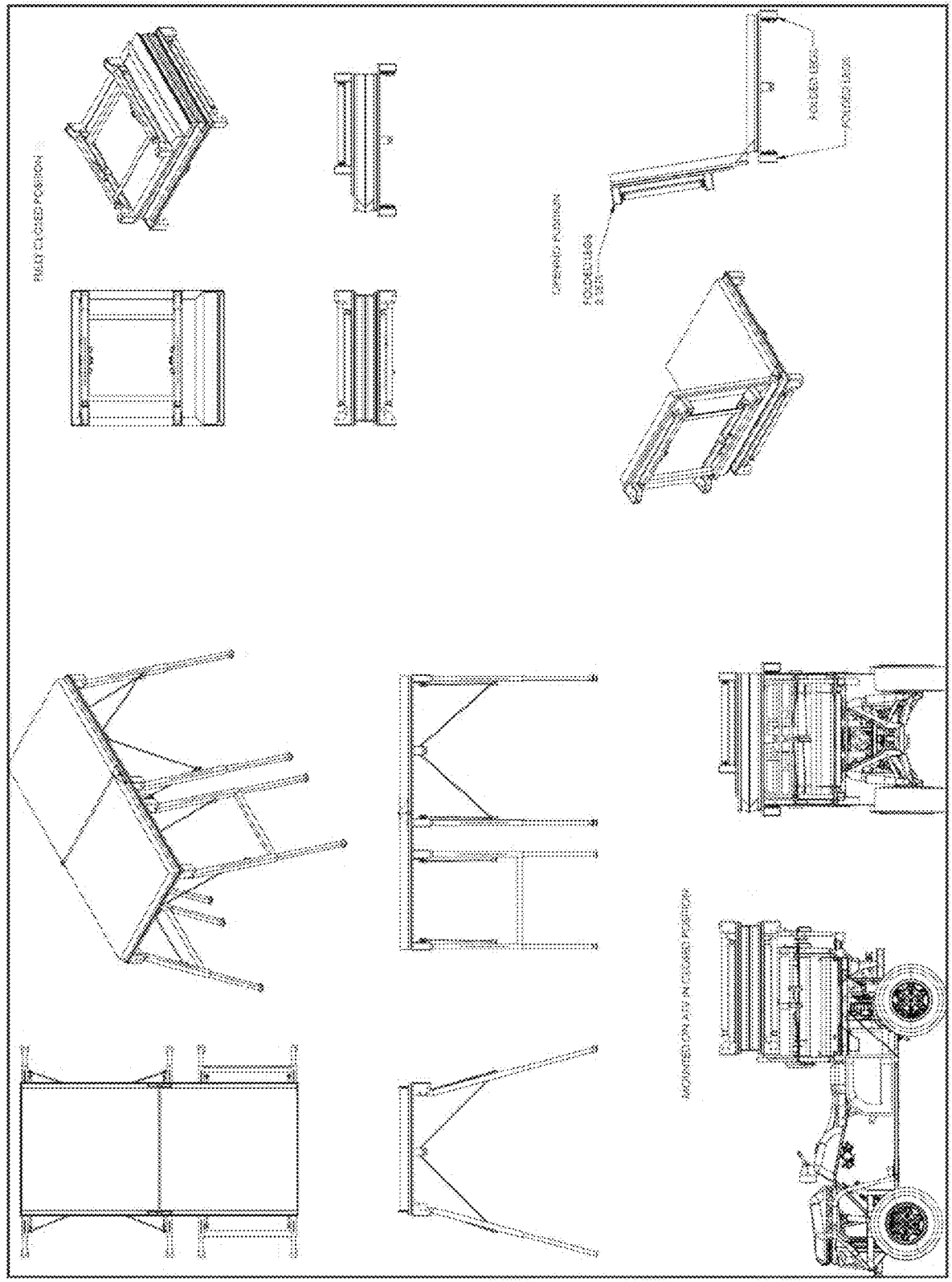
FIGS. 108 through 110 illustrate an example embodiment showing a camping kit including a tent deployed from an ATV cargo bed.
Figure 109:
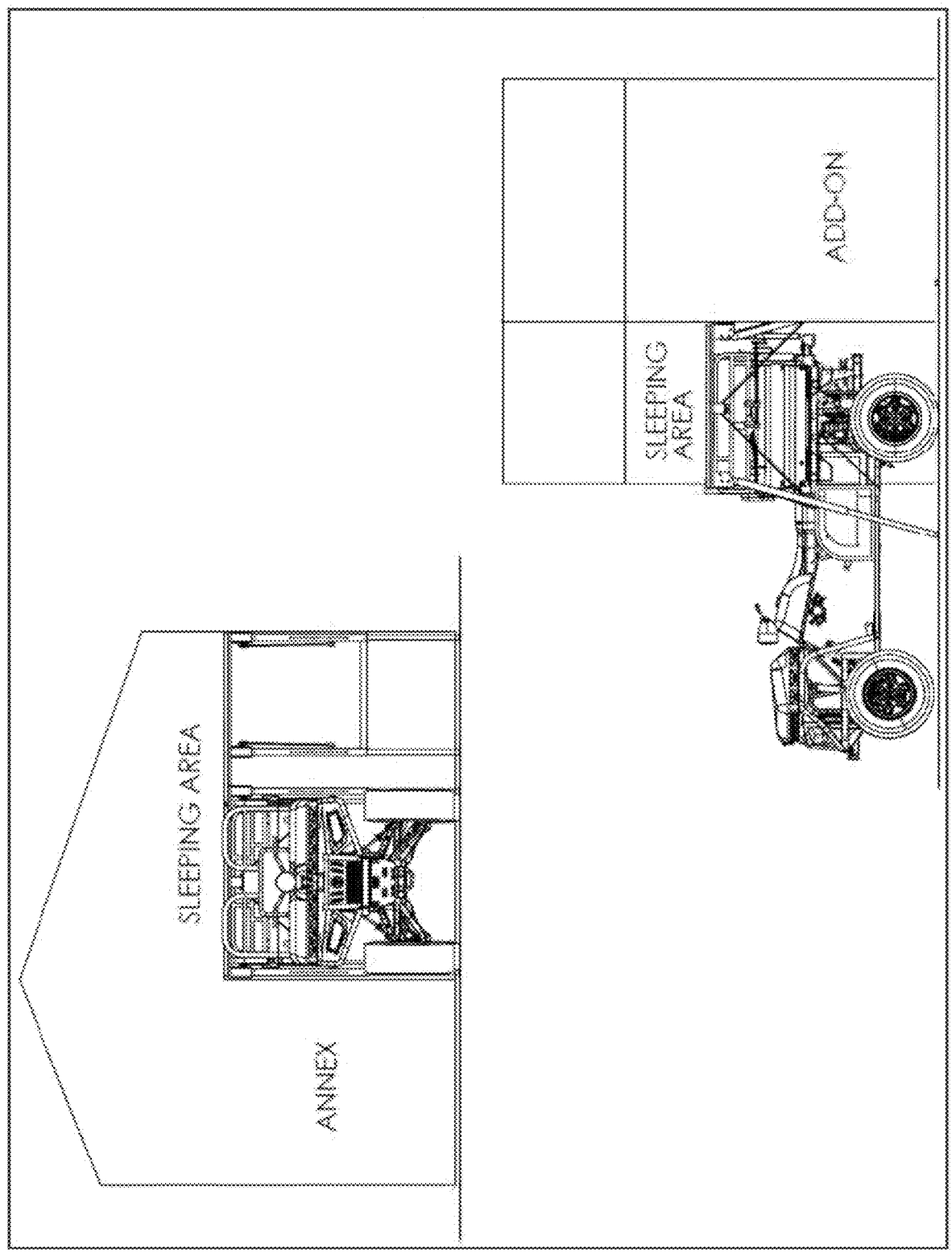
Figure 110:
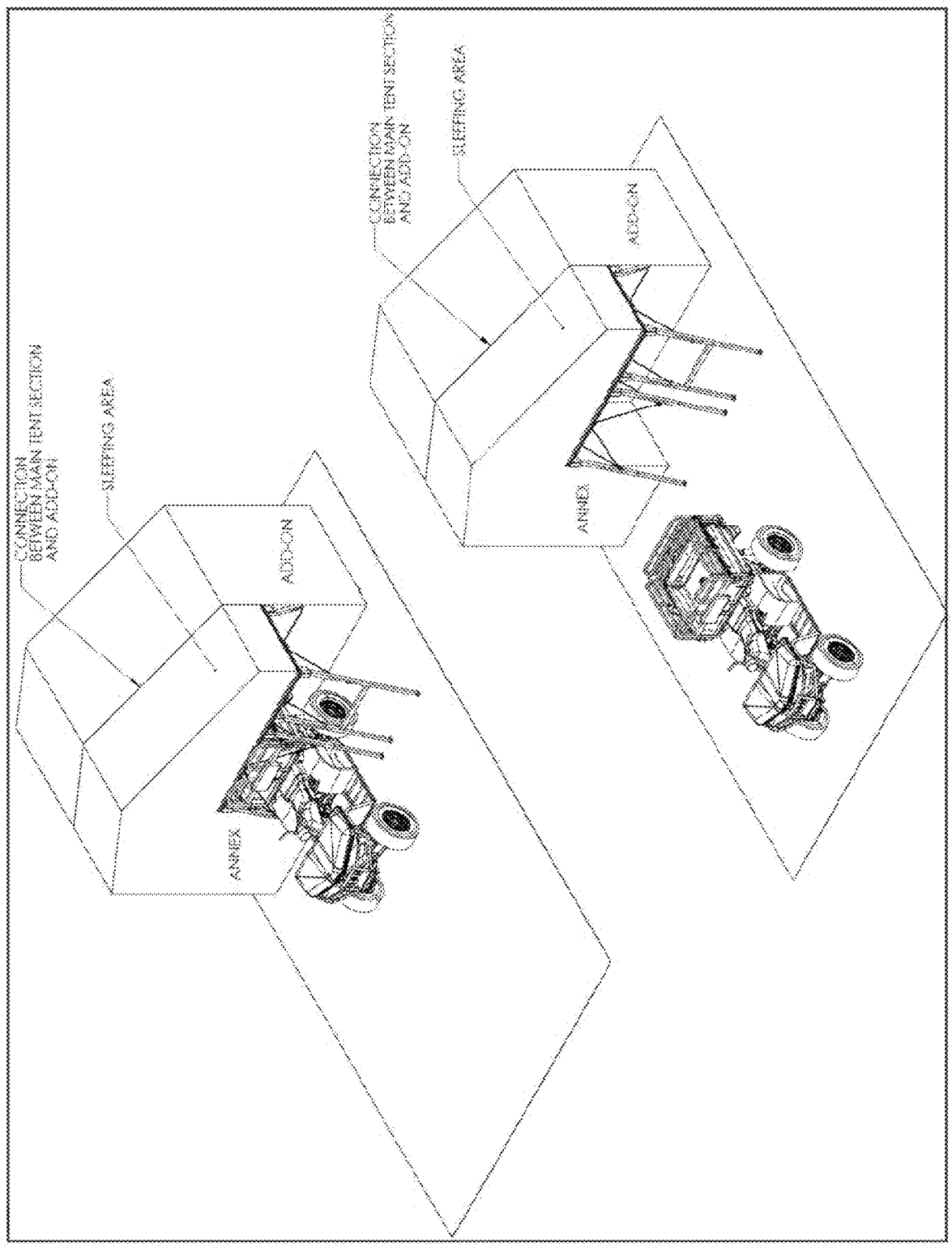
Figure 111:
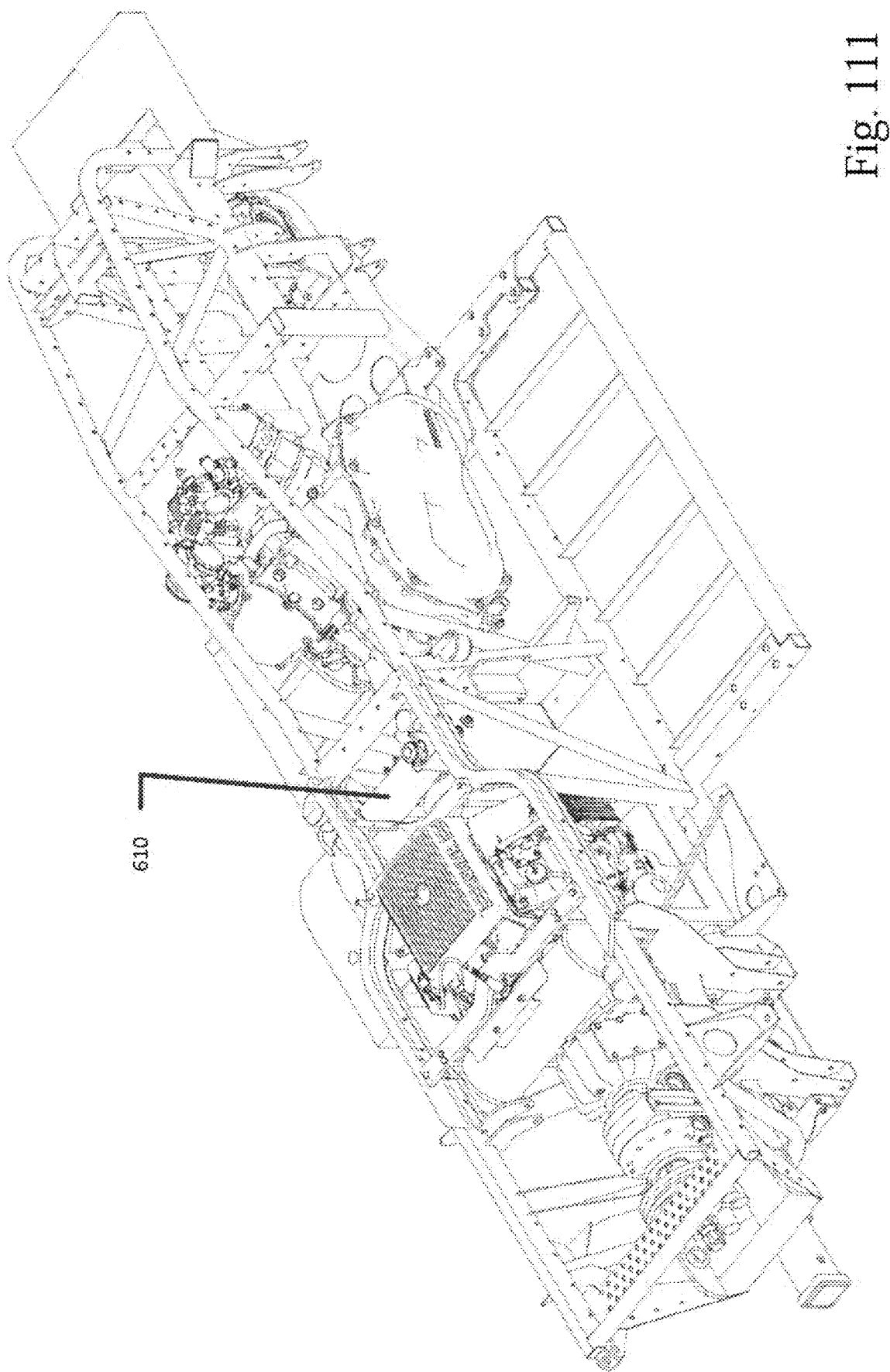
FIGS. 111 through 115 illustrate a hydraulic tank or reservoir, which can be installed inside of the frame adjacent to the PTO module.
Figure 112:
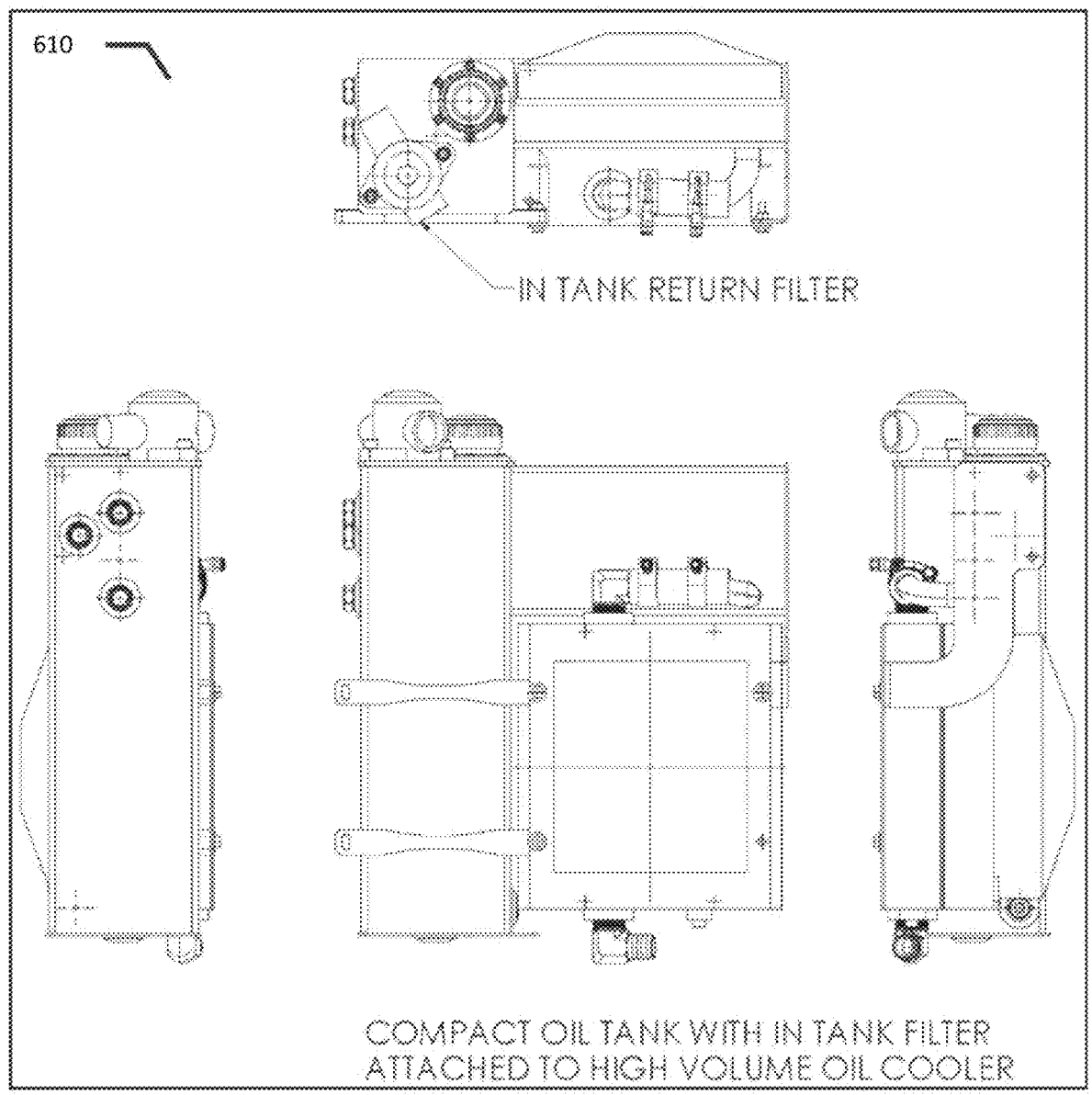
Figure 113:
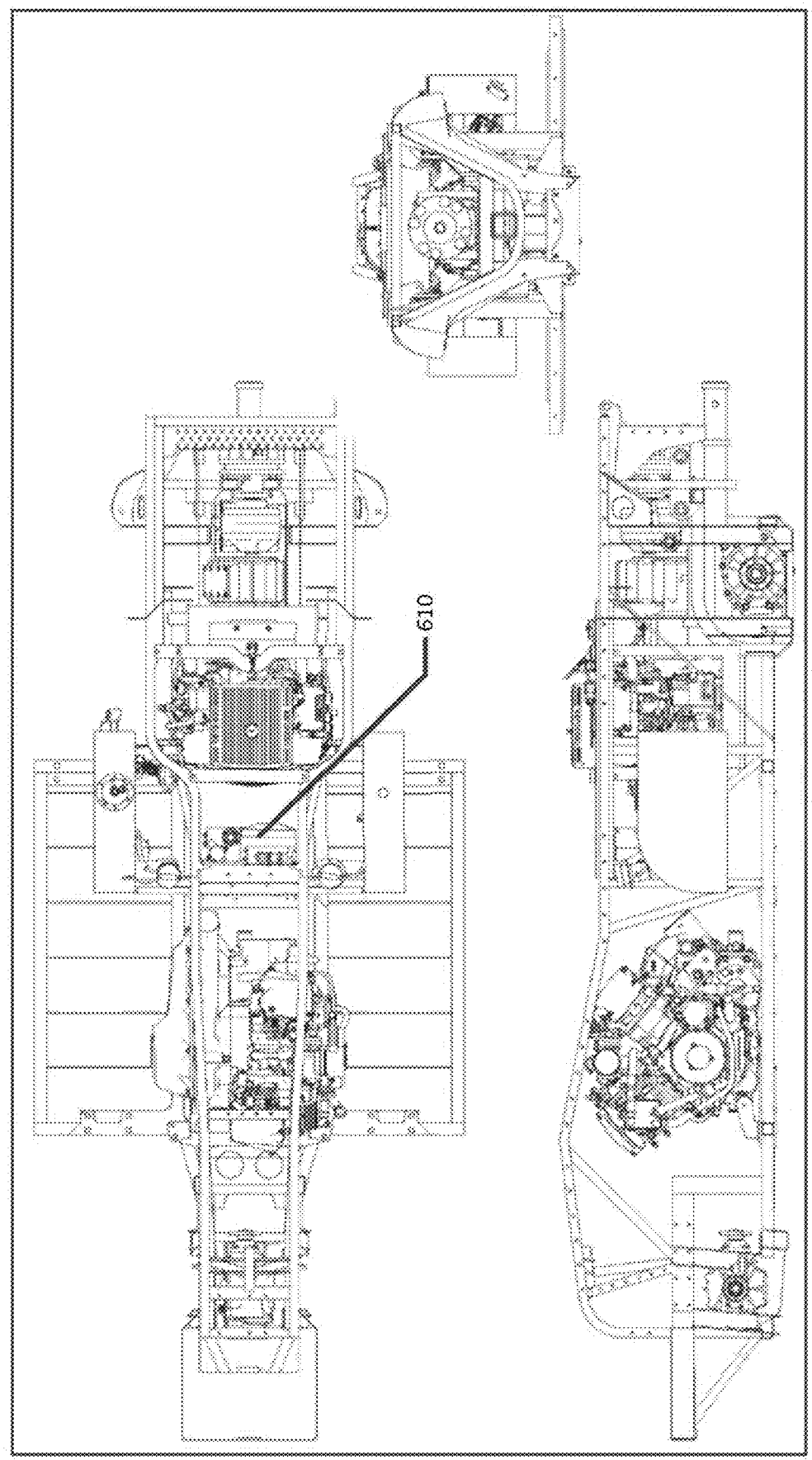
Figure 114:
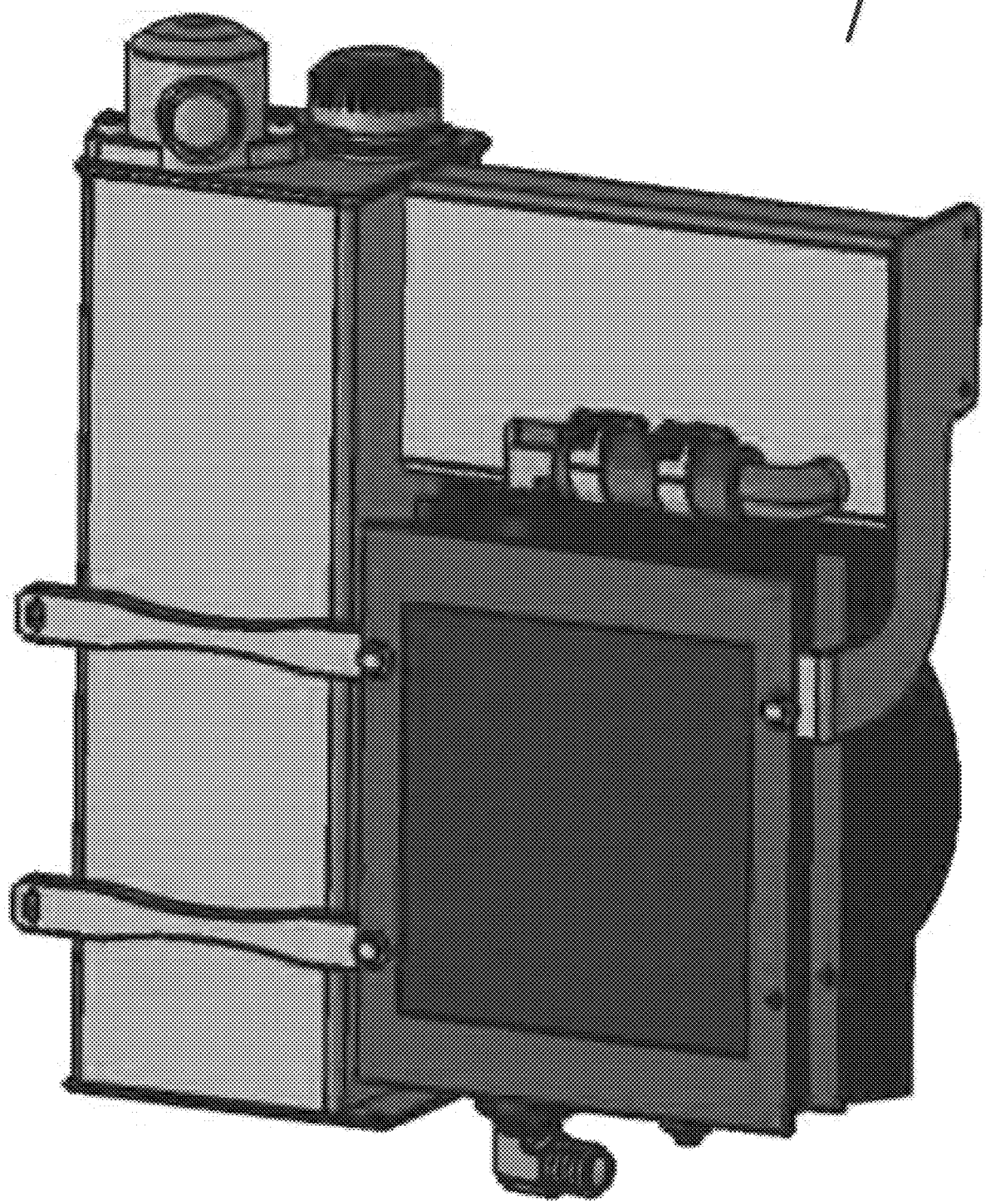
Figure 115:
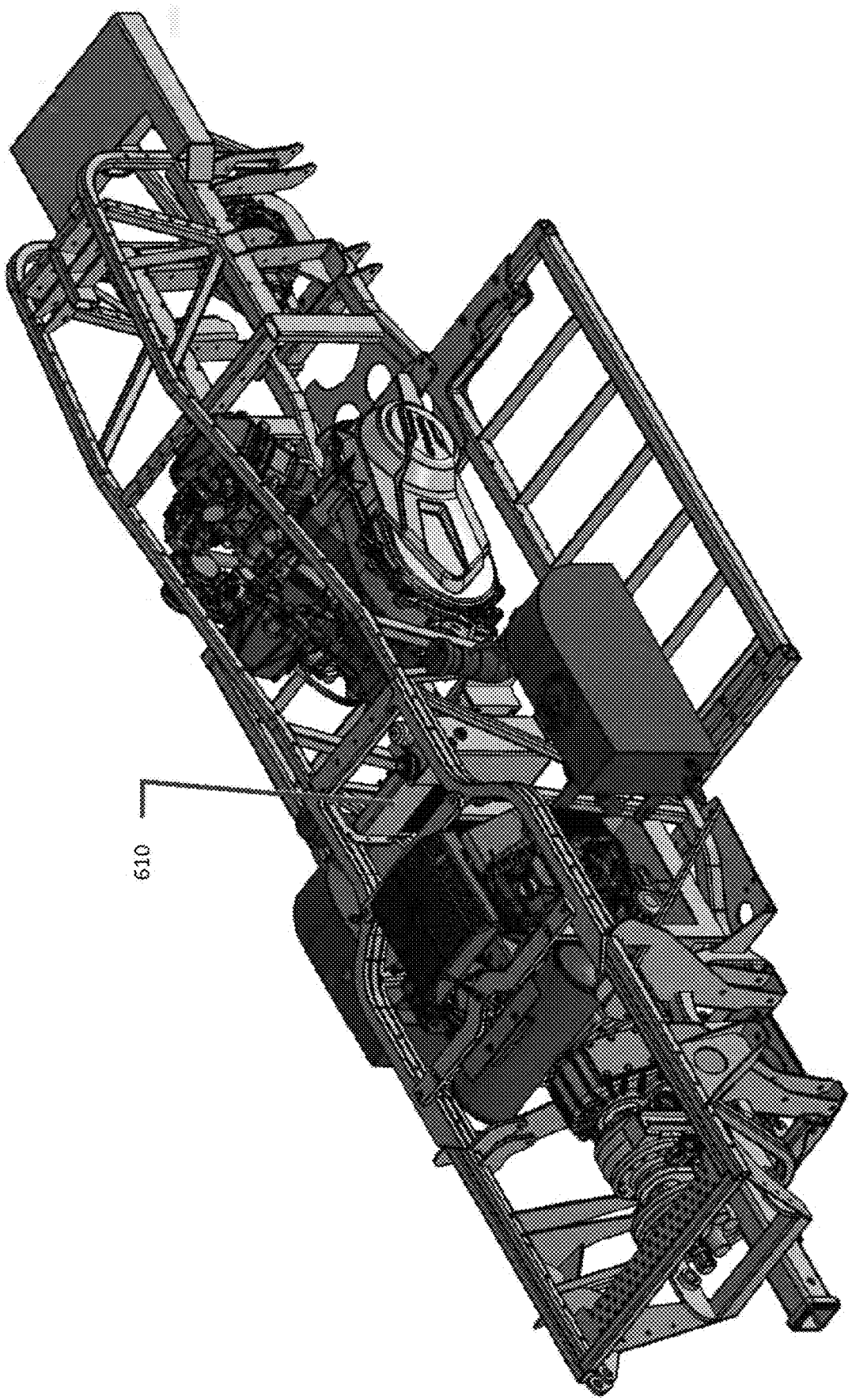

FIGS. 108 through 110 illustrate an example embodiment showing a camping kit including a tent deployed from an ATV cargo bed 130. In a particular embodiment, the cargo bed 130 can be configured with a camping kit having a tent. The camping kit of an example embodiment enables the setup of the tent from the cargo bed 130 of the ATV 100 while enabling the ATV 100 to be detached from the tent, which can be left free-standing. As a result, the ATV 100 is free to venture away from the tent while the tent provides shelter for campers. FIGS. 108 through 110 illustrate an example embodiment showing a camping kit including a tent deployed from an ATV cargo bed 130. Example embodiments of the present technology enable the disclosed ATV 100 to include a unique tent/camper kit that includes, for example: a pop open tent camper kit that can be attached to the top of the cargo bed 130, leaving space below for storage of supplies. The tent camper kit can be detached from the cargo bed 130 and can be used independently of the ATV 100. The tent/camper kit provides a fold-out camper and tent system with a large stand up living room and separate sleeping room. The tent/camper kit can have two rigid panels that fold up like a book, wherein the fabric of the tent can be stowed inside the book (i.e., the rigid panels). Release hooks can release the tent from ATV 100. The tent/camper kit of an example embodiment can include two sets of fold-out support legs (e.g., eight legs total in a particular embodiment), which can support the tent away from the ATV cargo bed 130. The two rigid panels and the fold-out support legs of the tent/camper kit can be folded in half (e.g., like a book) for storage on the cargo bed 130 while the ATV 100 is in transit. Once the ATV 100 arrives at a camping location, the rigid panels and the fold-out support legs of the tent/camper kit can be unfolded and the support legs can be extended. The tent fabric can be supported with tent poles. Then, the ATV 100 can be detached from the erected tent/camper kit and used independently of the tent/camper kit. In various example embodiments, the fold-out support legs can be configured to stand vertically or at an angle for better lateral support of the tent. As a result, a user can enjoy the convenience of an ATV mounted tent/camper kit while in transit, while enjoying the independent use of the ATV at a camp site.

FIGS. 111 through 115 illustrate a hydraulic tank or reservoir 610, which can be installed inside of the frame 110 adjacent to the PTO module 120. The hydraulic tank or reservoir 610 provides the hydraulic fluid to drive the hydraulic implements, which can be attached to the PTO module 120. As described above, the PTO module 120 can include ports on the hydraulic pump 123, which can connect with hydraulic hoses that can also connect with the hydraulic tank or reservoir 610 to provide a supply of hydraulic fluid. Installing the hydraulic tank or reservoir 610 inside of the frame allows the hydraulic tank or reservoir 610 to be centered in the frame for better balancing while the ATV 100 is used with the hydraulic implements.

Figure 116:
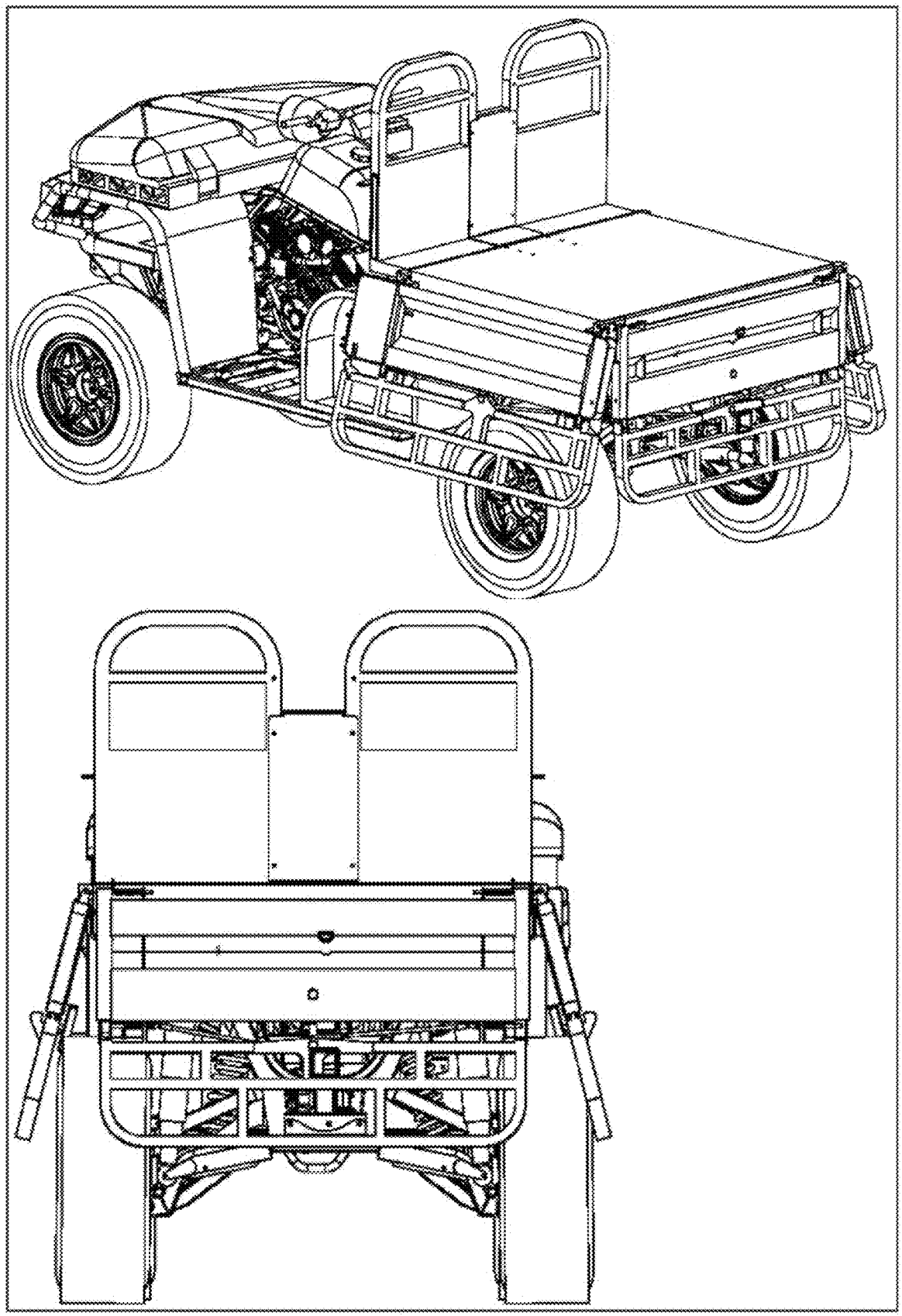
FIG. 116 illustrates an example embodiment showing a cargo bed with the side panels dropped completely downward.

FIG. 116 illustrates an example embodiment showing a cargo bed with the side panels or rails dropped completely downward.

FIG. 117 illustrates a method 1000 according to and enabled by the structures and techniques disclosed herein. In an example embodiment, method 1000 can include: constructing an All-Terrain Vehicle (ATV) frame configured with a void (operation 1010); removably installing a modular Power Take-Off (PTO) system in the ATV frame in the void (operation 1020); and removably installing a cargo bed at a rear portion of the ATV frame (operation 1030).

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used only for descriptive purposes and not to be construed as limiting. The elements, materials, geometries, dimensions, and sequence of operations may all be varied for particular applications. Parts of some embodiments may be included in, or substituted for, those of other embodiments. While the foregoing examples of dimensions and ranges are considered typical, the various embodiments are not limited to such dimensions or ranges.

The Abstract is provided to allow the reader to quickly ascertain the nature and gist of the technical disclosure. The Abstract is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

As described herein, all-terrain vehicle systems and methods configured for attachable tools and implements are disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

What is claimed is:

1. An All-Terrain Vehicle (ATV) comprising:
an ATV frame configured with a first void and a second void positioned aft of the first void;
a modular Power Take-Off (PTO) system removably installable in the ATV frame in the second void, the modular PTO system, including a PTO driving engine, a fuel tank, and a PTO shaft, the modular PTO system being fully encased within a cradle, the cradle being independent of and removable from the ATV frame, the cradle being configured to fit for installation within the second void; and a wheel-driving engine, separate from the modular PTO system, and installable in the ATV frame in the first void, the wheel-driving engine being coupled for driving wheels of the ATV, the ATV being drivable without the removably installable PTO system.

2. The ATV of claim 1 being further configured to include a cargo bed removably installable at a rear portion of the ATV frame, wherein the cargo bed being further configured to include a cargo bed base frame with ball joint pivot points on each corner.

3. The ATV of claim 2 wherein the cargo bed being further configured to include side panels on four sides of the cargo bed, the side panels on at least three sides being further configured to be raised, lowered, partially raised, dropped completely downward, or removed entirely.

4. The ATV of claim 2 wherein the cargo bed being further configured to include a scissor lift configured to lift the cargo bed.

5. The ATV of claim 1 wherein the modular PTO system being further configured to include a hydraulic pump, an overload clutch, and a gearbox.

6. The ATV of claim 1 wherein the modular PTO system being further configured to include quick disconnect hydraulic ports.

7. The ATV of claim 1 wherein the ATV frame further including a reinforcing plate extending across a width of the ATV frame and configured to provide support for a lower portion of loader support arms, the ATV frame further including a support and storage platform having notches with upper attach points for coupling the loader support arms to the ATV frame, the upper attach points configured to provide support for an upper portion of the loader support arms.

8. The ATV of claim 7 further including a loader coupled to the loader support arms.

9. The ATV of claim 1 further including a backhoe, trencher, forklift, post hole digger, auger, mower, or winch removably coupled to the ATV frame.

10. The ATV of claim 1 wherein the ATV frame includes an eight point independent suspension.

11. The ATV of claim 1 being further configured to include a support and storage platform mounted on a front of the ATV, the support and storage platform providing upper attach points for coupling support arms of a loader.

12. The ATV of claim 11 wherein the support and storage platform further includes a front hood that encloses the support and storage platform and provides a storage area within the platform, the front hood being coupled to the support and storage platform at the upper attach points.

13. The ATV of claim 1 being further configured to include configurably positioned fuel tanks, which can be removably installed at a position outside of the ATV frame when the modular PTO system is installed in the ATV frame or removably installed at a position inside of the void when the modular PTO system is not installed in the ATV frame.

14. The ATV of claim 1 being further configured to include a removable water tank, which can be removably installed at a position inside of the void when the modular PTO system is not installed in the ATV frame.

15. The ATV of claim 1 being further configured to include a rear hitch receiver to which a backhoe can be removably coupled.

16. The ATV of claim 1 being further configured to include a boom winch, which can be removably installed at a position inside of the void when the modular PTO system is not installed in the ATV frame.

17. The ATV of claim 1 being further configured to include a cargo bed weight measurement or scale system.

18. The ATV of claim 1 being further configured to include a camping and tent kit including a tent deployable from the cargo bed and enabling use independent of the ATV.

19. The ATV of claim 1 wherein the ATV frame includes ears for front implements.

20. The ATV of claim 1 wherein the ATV frame further includes a hydraulic tank or reservoir, which can be removably installed inside of the ATV frame adjacent to the modular PTO system.

* * * * *